US012710160B2

(12) United States Patent
Alper et al.

(10) Patent No.: US 12,710,160 B2
(45) Date of Patent: Aug. 18, 2026

(54) WIRELESS CONTROLLABLE LIGHTING DEVICE

(71) Applicant: Lutron Technology Company LLC, Coopersburg, PA (US)

(72) Inventors: Adam Alper, Boston, MA (US); John P. Michalko, Austin, TX (US); Ian Morrow, Dripping Springs, TX (US); William Taylor Shivell, Breinigsville, PA (US); Dragan Veskovic, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 19/048,731

(22) Filed: Feb. 7, 2025

(65) Prior Publication Data

US 2025/0290619 A1 Sep. 18, 2025

Related U.S. Application Data

(60) Provisional application No. 63/737,238, filed on Dec. 20, 2024, provisional application No. 63/642,846, (Continued)

(51) Int. Cl.
*F21V 15/01* (2006.01)
*F21S 8/02* (2006.01)
(Continued)

(52) U.S. Cl.
CPC ................ *F21V 15/01* (2013.01); *F21S 8/04* (2013.01); *F21V 13/04* (2013.01); *F21V 13/06* (2013.01);
(Continued)

(58) Field of Classification Search
CPC ...... F21V 15/01; F21V 23/0435; F21S 8/024; F21S 8/026; E04F 13/074; E04F 2290/026
See application file for complete search history.

(56) References Cited

U.S. PATENT DOCUMENTS

| | | | |
|---|---|---|---|
| 3,643,089 | A | 2/1972 | Marantz |
| 6,632,006 | B1 | 10/2003 | Rippel et al. |

(Continued)

FOREIGN PATENT DOCUMENTS

| | | | |
|---|---|---|---|
| CA | 2958351 | A1 | 8/2017 |
| EP | 3667158 | A1 | 6/2020 |
| EP | 4006413 | A2 | 6/2022 |

*Primary Examiner* — Alexander K Garlen
(74) *Attorney, Agent, or Firm* — Flaster Greenberg PC

(57) ABSTRACT

A lighting device may be configured to be installed within a building structure. The lighting device may include a lighting device assembly that includes a light-generation module having an emitter assembly configured to emit light and a wireless communication circuit configured to communicate wireless signals. The lighting device may include a housing configured to be installed within the building structure. The housing may include a lower plate and/or a trim portion that defines an aperture configured to enable the light emitted by the emitter assembly to be transmitted out of the housing. The housing may include a radio-frequency-transparent (RF-transparent) portion having a perimeter that is defined by the opening in the lower plate and surrounds the trim portion. The RF transparent portion may be configured to enable the wireless signals to be communicated by the light generation module through the lower plate of the housing.

32 Claims, 59 Drawing Sheets

Related U.S. Application Data filed on May 5, 2024, provisional application No. 63/558,921, filed on Feb. 28, 2024, provisional application No. 63/551,922, filed on Feb. 9, 2024.

(51) Int. Cl.

| | |
|---|---|
| ***F21S 8/04*** | (2006.01) |
| ***F21V 13/04*** | (2006.01) |
| ***F21V 13/06*** | (2006.01) |
| ***F21V 21/15*** | (2006.01) |
| ***F21V 23/04*** | (2006.01) |

(52) U.S. Cl.

CPC .......... *F21V 21/15* (2013.01); *F21V 23/0435* (2013.01); *F21S 8/026* (2013.01)

(56) References Cited

U.S. PATENT DOCUMENTS

| | | | | |
|---|---|---|---|---|
| 7,832,889 | B1 | 11/2010 | Cogliano | |
| 9,157,609 | B2 | 10/2015 | Littman Gatof et al. | |
| 9,388,958 | B2 | 7/2016 | Watson | |
| 9,671,091 | B2 | 6/2017 | Jones | |
| 9,726,354 | B1 | 8/2017 | Delano et al. | |
| 9,822,957 | B2 | 11/2017 | Coakley et al. | |
| 9,857,038 | B2 | 1/2018 | Coakley et al. | |
| 10,180,218 | B2 | 1/2019 | Hierzer | |
| 10,190,736 | B1 | 1/2019 | Pyshos et al. | |
| 10,344,958 | B2 | 7/2019 | Mathews et al. | |
| 10,359,162 | B2 | 7/2019 | Terumichi | |
| 10,371,329 | B2 | 8/2019 | Coakley et al. | |
| 10,834,803 | B2 * | 11/2020 | Cho | H05B 47/197 |
| 11,635,180 | B2 | 4/2023 | Yang et al. | |
| 11,873,970 | B2 | 1/2024 | Jones et al. | |
| 12,173,864 | B2 | 12/2024 | Reilly et al. | |
| 12,228,264 | B2 | 2/2025 | Beck et al. | |
| 2010/0110698 | A1 | 5/2010 | Harwood et al. | |
| 2014/0313737 | A1 | 10/2014 | Watson | |
| 2015/0078012 | A1 | 3/2015 | Delano | |
| 2015/0338077 | A1 * | 11/2015 | Johnson | H05B 45/00 362/249.02 |
| 2017/0336060 | A1 | 11/2017 | Stathes et al. | |
| 2018/0054877 | A1 * | 2/2018 | Creemers | H01Q 21/29 |
| 2018/0092192 | A1 * | 3/2018 | Arai | F21V 15/01 |
| 2018/0249563 | A1 * | 8/2018 | Alexander | F21S 8/026 |
| 2019/0181545 | A1 * | 6/2019 | Lu | F21V 33/0052 |
| 2021/0156554 | A1 | 5/2021 | Bocock et al. | |
| 2022/0412520 | A1 | 12/2022 | Yang et al. | |
| 2023/0045452 | A1 * | 2/2023 | Portinga | F21V 29/76 |

* cited by examiner

WIRELESS CONTROLLABLE LIGHTING DEVICE

CROSS-REFERENCE TO RELATED APPLICATIONS

This application claims the benefit of U.S. Provisional Patent Application No. 63/551,922, filed Feb. 9, 2024, U.S. Provisional Patent Application No. 63/558,921, filed Feb. 28, 2024, U.S. Provisional Patent Application No. 63/642,846, filed May 5, 2024, and U.S. Provisional Patent Application No. 63/737,238, filed Dec. 20, 2024, the entire disclosures of which are hereby incorporated by reference herein in their respective entireties.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a lighting device (e.g., a controllable light-emitting diode illumination device) configured to be installed within a building structure. The lighting device may include a lighting device assembly. The lighting device assembly may include a light-generation module having an emitter assembly configured to emit light and a wireless communication circuit configured to communicate wireless signals. The lighting device may include a housing configured to be installed within the building structure and to at least partially enclose the lighting device assembly. The housing may include a lower plate and/or a trim portion that defines an aperture configured to enable the light emitted by the emitter assembly to be transmitted out of the housing. The trim portion may be located within an opening in the lower plate. The housing may include a radio-frequency-transparent (RF-transparent) portion having a perimeter that is defined by the opening in the lower plate and surrounds the trim portion. The RF-transparent portion may be configured to enable the wireless signals to be communicated by the light-generation module through the lower plate of the housing.

The RF-transparent portion of the housing may include a non-conductive plate covering at least a portion of the opening in the lower plate. The non-conductive plate may include an opening. The housing may include a support structure configured to support the trim portion within the opening of the non-conductive plate. The support structure may include a support bracket attached to the non-conductive plate. The support bracket may be configured to connect the trim portion to the non-conductive plate. The support bracket of the support structure may be configured to extend across the opening of the lower plate of the housing. The support bracket of the support structure may be configured to rest on the lower plate of the housing to support the non-conductive plate such that the non-conductive plate covers the opening in the lower plate of the housing. The lower plate may include a recessed portion surrounding the opening in the lower plate of the housing. The non-conductive plate may be configured to be located below the lower plate in the recessed portion of the lower plate, such that the non-conductive plate covers the opening in the lower plate of the housing. The recessed portion of the lower plate may include a rim portion that surrounds the opening in the lower plate of the housing. The rim portion may include slots configured to receive fasteners that are received through openings in the non-conductive plate for securing the non-conductive plate to the lower plate of the housing. The fasteners may be configured to move through the slots to orient the trim portion within the opening in the lower plate of the housing. The non-conductive plate may be configured to be secured in place when the fasteners are tightened. The support bracket may include sides that are connected together to define an opening that is aligned with the opening of the non-conductive plate and extensions that extend opposed corners of the sides and are configured to rest on the lower plate. The rim portion may include notches through which the extensions of the support bracket are configured to be inserted to install the non-conductive plate within the opening in the lower plate.

The non-conductive plate may be supported by the lower plate and arranged over the opening in the lower plate. The non-conductive plate may be configured to rest on the lower plate of the housing and to rotate to orient the trim portion within the opening in the lower plate. The non-conductive plate may include openings configured to receive fasteners for securing the non-conductive plate to the lower plate of the housing. The lower plate may include notches through which the non-conductive plate is configured to be inserted to install the non-conductive plate over the opening in the lower plate. The support bracket may include sides that are connected together to define an opening that is aligned with the opening of the non-conductive plate and extensions that extend opposed corners of the sides and are configured to rest on the lower plate. The extensions of the support bracket may include openings configured to receive the fasteners for securing the support bracket to the non-conductive plate. The lower plate may include tabs located around the opening in the lower plate and may be configured to position the non-conductive plate over the opening in the lower plate.

The trim portion may include a trim ring that defines the aperture of the trim portion and a collar that is configured to support the trim ring within the opening in the lower plate. The non-conductive plate may extend radially outward from the collar to an inside edge of the opening in the lower plate. The collar may be configured to be attached to the support structure, such that the collar is received in the opening of the non-conductive plate. The trim ring may include at least two clips configured to attach the trim ring to the collar. The trim ring may include a trim insert configured to be received within a trim retainer. The support structure may be formed as part of the lower plate of the housing, such that the opening in the lower plate is formed by two opening portions. The non-conductive plate may be a first non-conductive plate and the lighting device may further include a second non-conductive plate. The first non-conductive plate and the second non-conductive plate may be located in each of the two opening portions of the lower plate of the housing.

The support bracket may include two or more portions that are configured to attach to the trim portion. The RF-transparent portion of the housing may be characterized by an area within the perimeter of the RF-transparent portion. The area of the RF-transparent portion may include one or more unobstructed portions located between the perimeter of the RF-transparent portion and the support structure. The one or more unobstructed portions of the RF-transparent portion may be characterized by a plurality of dimensions having respective lengths that enable propagation of wireless signals through the RF-transparent portion.

The non-conductive plate may be configured to be substantially parallel to the lower plate. The lower plate of the housing may be metallic. The housing may further include an upper plate and a plurality of side plates between the upper plate and the lower plate. The housing may define a cavity in which the light-generation module is located. The lighting device may include an armature attached to the housing and configured to support the light-generation module within the housing above the opening in the lower plate of the housing such that the light emitted by the light-generation module is emitted through the aperture of the trim portion and the wireless signals are communicated through the RF-transparent portion of the housing. The armature may include a first portion configured to rotate with respect to the upper plate of the housing and a second portion configured to tilt with respect to the first portion to adjust a tilt angle of the lighting device assembly. The first portion of the armature may include a base plate and opposed side plates. The second portion of the armature may include a body with a mounting portion and a heat sink portion. The body of the second portion may be tiltably coupled between the opposed side plates of the first portion. The lighting device assembly may be mounted to the mounting portion of the second portion, such that the heat sink portion is thermally-coupled to the lighting device assembly.

The first portion of the armature may include a base portion and an arm portion that extends from the base portion and defines a first curved surface. The second portion of the armature may include an adapter plate that defines a second curved surface configured to slide across the first curved surface of the arm portion of the first portion. The trim portion may include a wall-wash trim assembly having a body and a lens positioned at an angle and configured to direct light in a non-vertical direction. The body of the wall-wash trim assembly may have a tunnel configured to collect the light emitted by the light-generation module and reflect the light towards the lens. The tunnel may define an axis that is offset from an axis defined by the aperture of the trim portion. The armature may include a base portion configured to rotate with respect to the upper plate of the housing. The light-generation module may be mounted to the base portion, such that an axis defined by the light generation module is offset from an axis defined by the armature. The base portion may be configured to be rotated to position the light-generation module such that the light embittered by the light-generation module is collected by the tunnel of the body of the trim portion. The base portion may be configured to be rotated until the axis defined by the light generation module is aligned with the axis of the tunnel of the body of the wall-wash trim assembly. The armature may be attached to the upper plate of the housing. The housing may include an attachment structure having an attachment member at the end of a respective arm formed in one of the side plates of the housing. The attachment member may be configured to engage a snap on the lower portion to secure the lower portion to the housing.

The light-generation module may include a plurality of emitters in the emitter assembly that are configured to emit the light. The light-generation module may include an antenna configured to receive wireless signals. The lighting device assembly may further include a reflector that surrounds the plurality of emitters. The reflector may include an outer surface. The antenna of the light-generation module may be located external to the reflector such that the antenna is spaced a predetermined distance from the outer surface of the reflector. The reflector may include a first end located adjacent to the plurality of emitters and a second end opposite the first end. The reflector may define a first opening at the first end and a second opening at the second end. The first end of the reflector may be located adjacent to the plurality of emitters such that the plurality of emitters emit the light through the first opening. The reflector may include an inner surface configured to reflect the light emitted by the emitter towards the second opening. The light-generation module may include an antenna holder that is configured to receive a portion of the antenna. The antenna holder may be configured to maintain the spacing between the monopole antenna and the reflector. The antenna may define a distal end that extends beyond a lens of the lighting device assembly in an axial direction.

DETAILED DESCRIPTION

Figure 1:
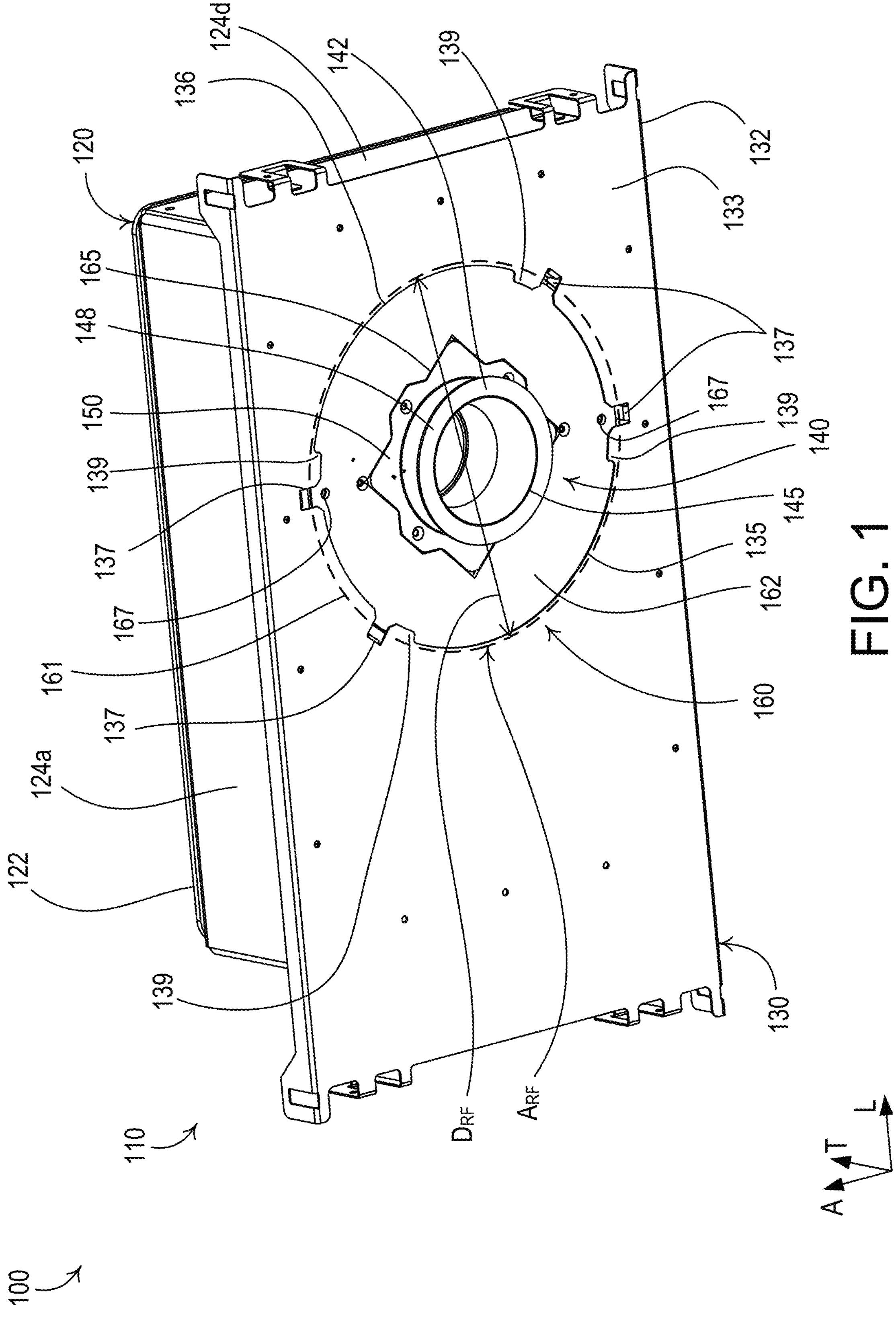
FIG. 1 is a bottom perspective view of an example lighting device.
Figure 2:
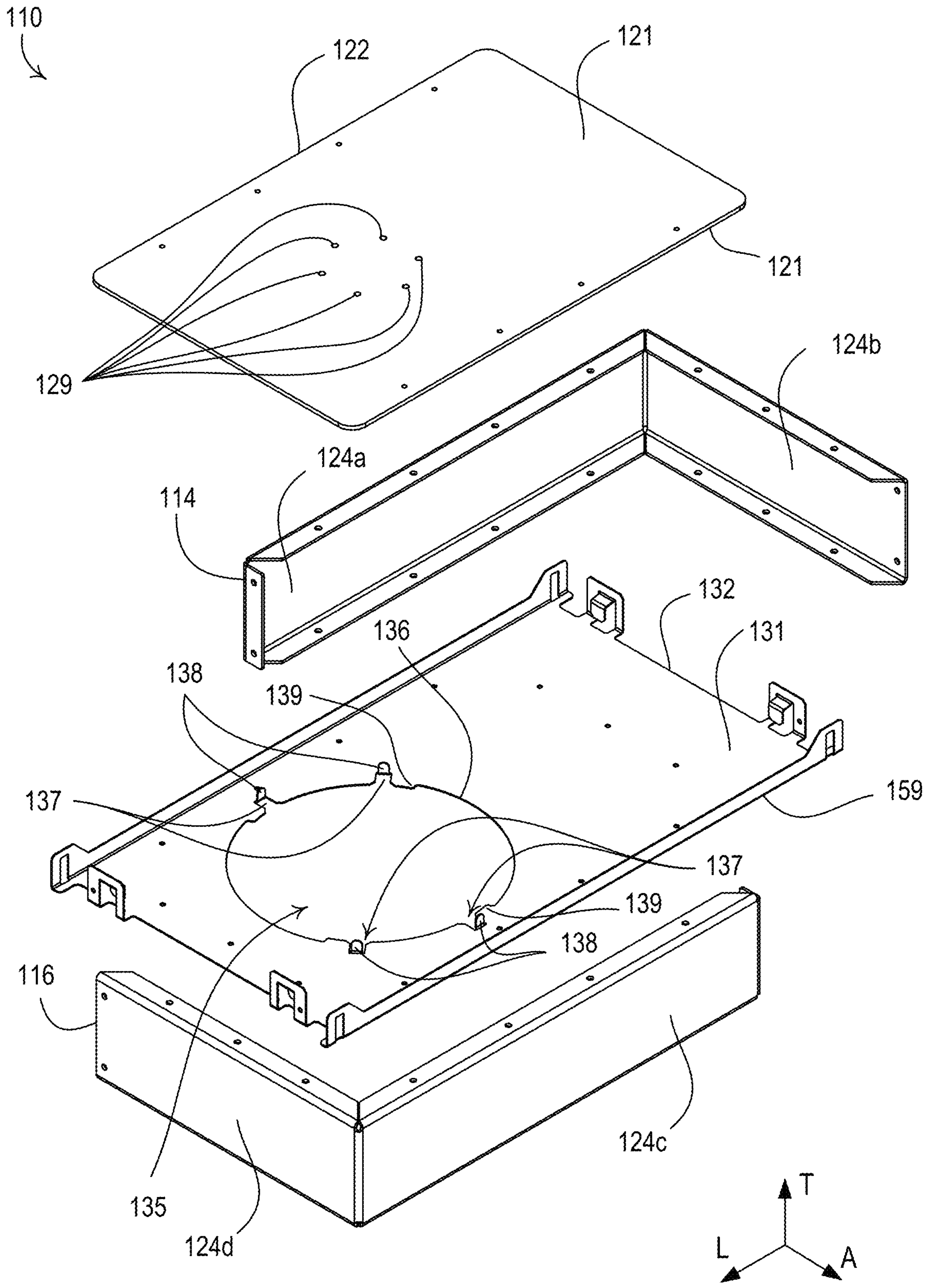
FIG. 2 is an exploded perspective view of a housing of the lighting device of FIG. 1.
Figure 3:
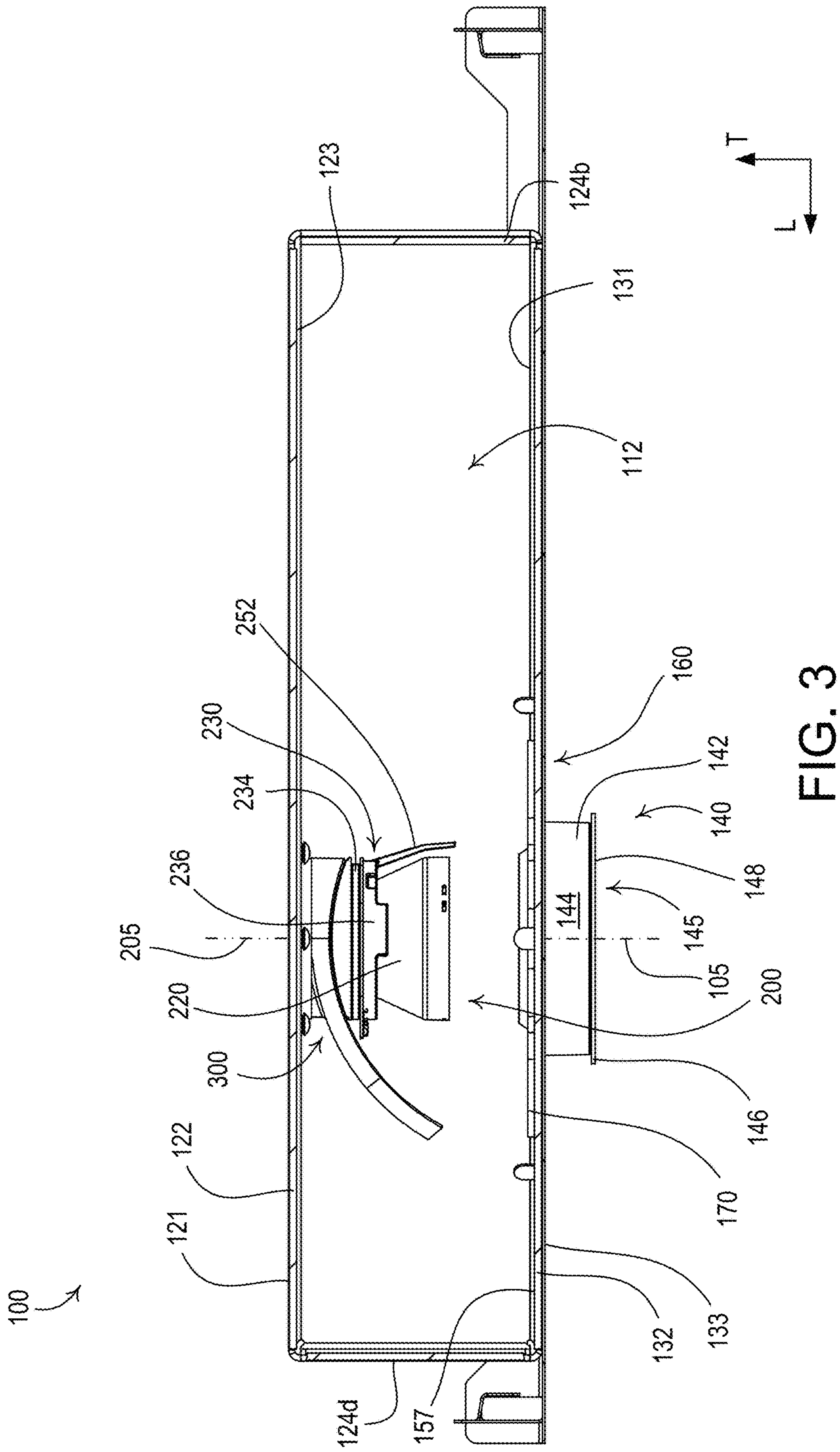
FIG. 3 is a side cross-section view of the lighting device of FIG. 1 when a lighting device assembly of the lighting device is in a centered position.
Figure 4:
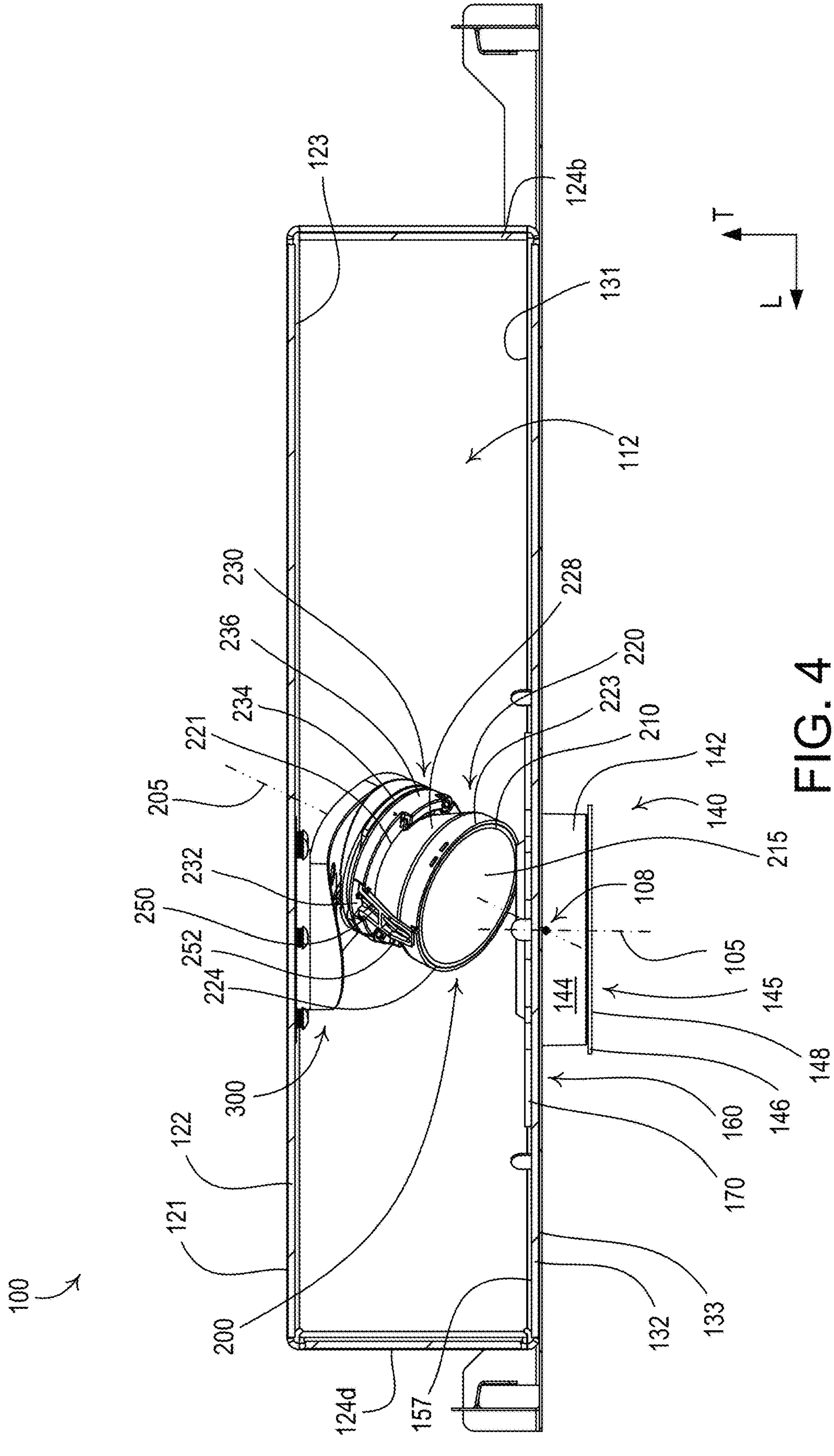
FIG. 4 is a side cross-section view of the lighting device of FIG. 1 when the lighting device assembly is in an adjusted position (e.g., tilted and rotated).
Figure 5:
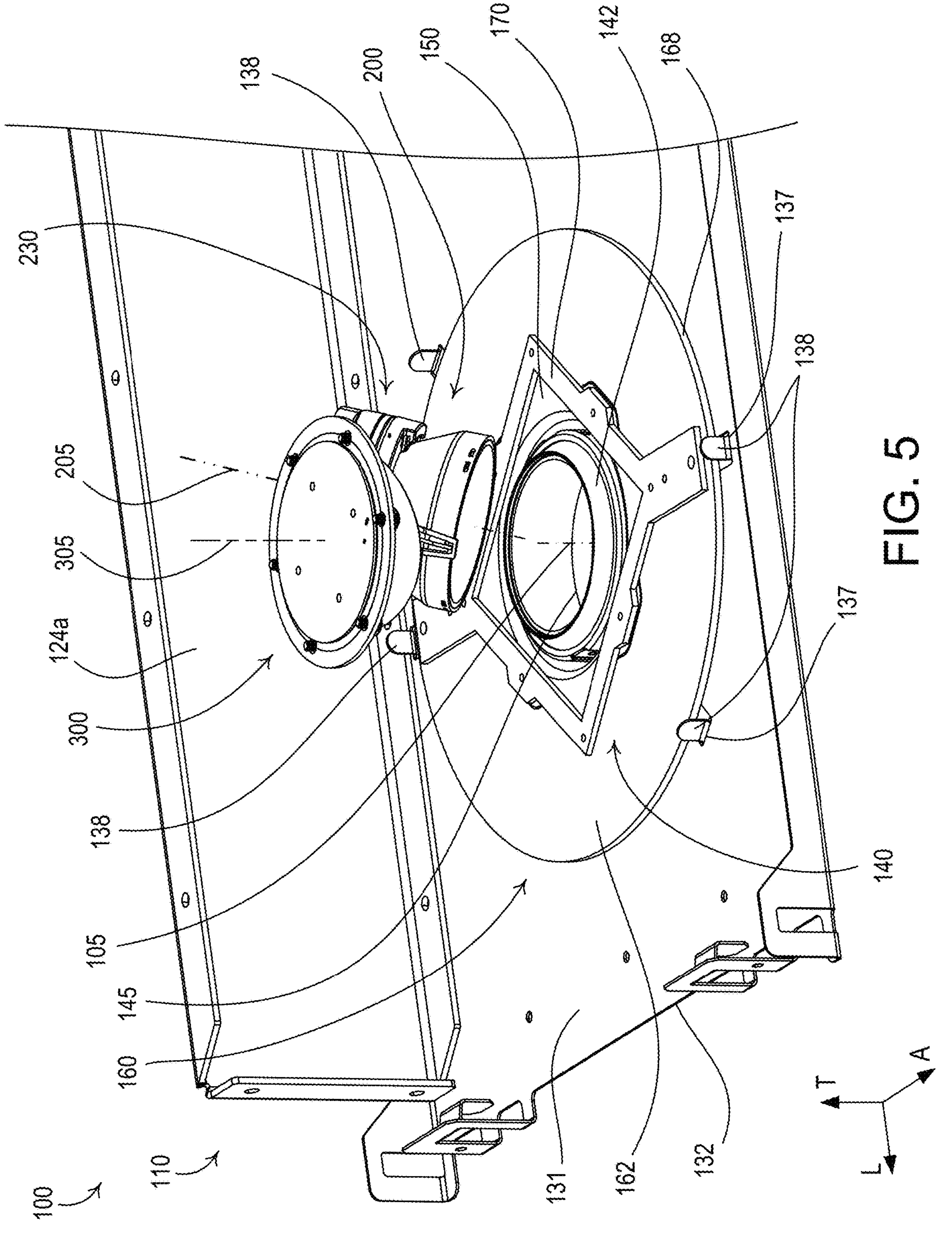
FIG. 5 is a partial perspective view of the lighting device of FIG. 1 with side plates and an upper plate of the housing removed.
Figure 6:
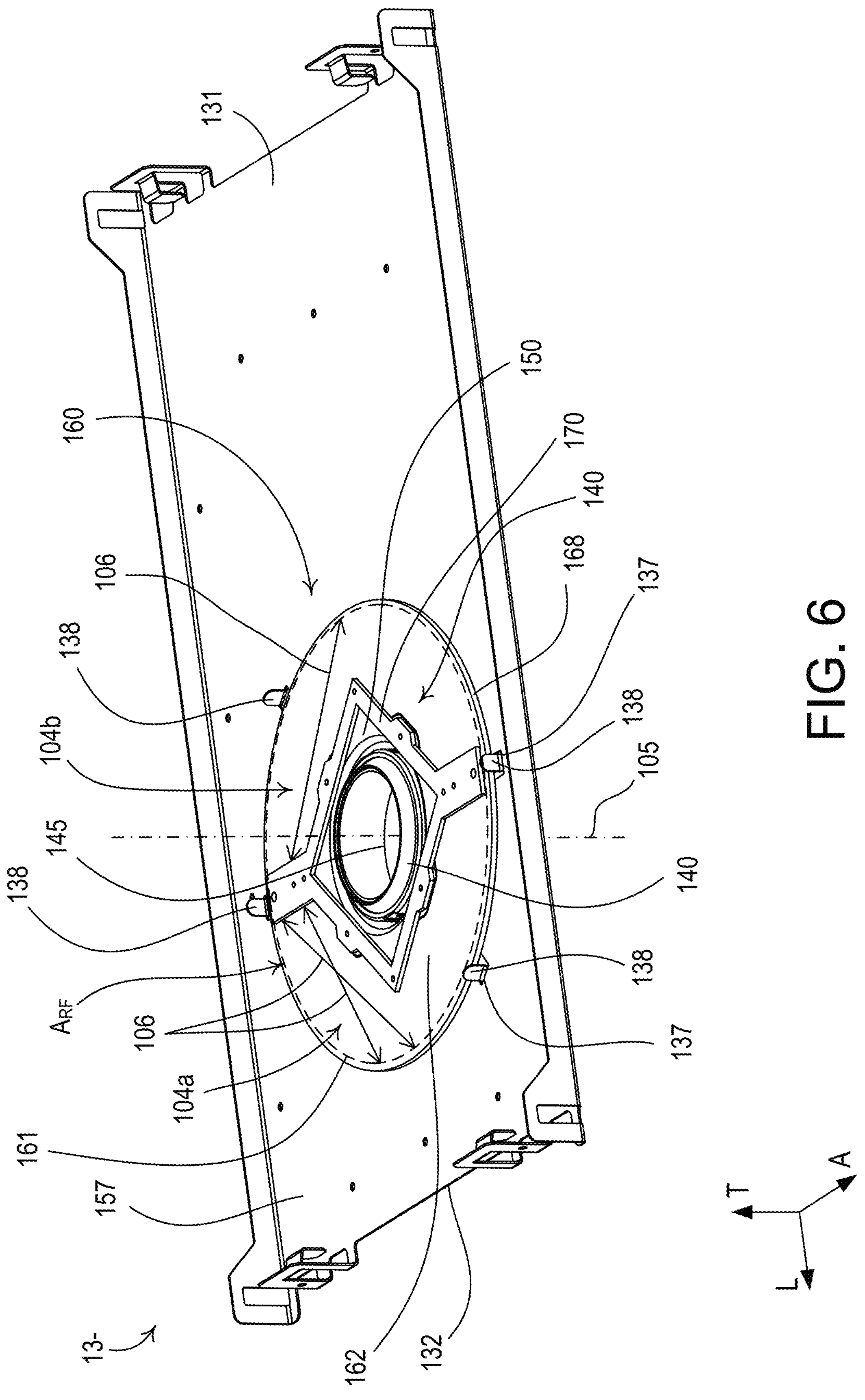
FIG. 6 is a perspective view a lower portion of the housing of the lighting device of FIG. 1.
Figure 7:
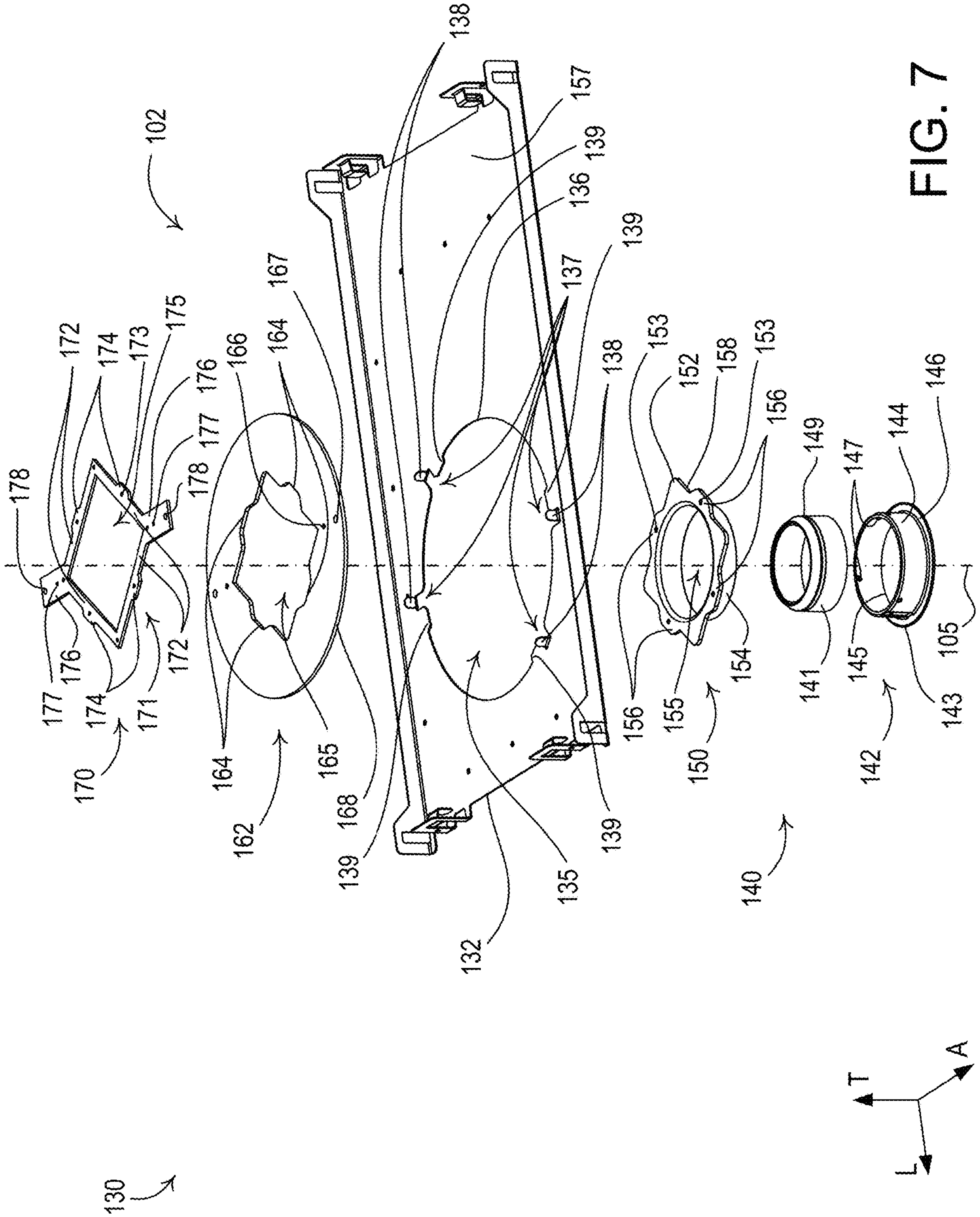
FIG. 7 is an exploded view of the lower portion of the housing of the lighting device of FIG. 1.

FIGS. 1-7 depict an example illumination device, such as a lighting device 100 (e.g., a controllable lighting device). The lighting device 100 may be configured to be installed within a building structure (e.g., such as a ceiling, wall, etc.). The lighting device 100 may include a housing 110, a lighting device assembly 200, and an armature 300 for supporting the lighting device assembly 200. FIG. 1 is a bottom perspective view of the lighting device 100. FIG. 2 is an exploded perspective view of the housing 110 of the lighting device 100. FIG. 3 is a side cross-section view of the lighting device 100 when the lighting device assembly 200 is in a centered position. FIG. 4 is a side cross-section view of the lighting device 100 when the lighting device assembly 200 is in an adjusted position (e.g., tilted and rotated). The housing 410 may include an upper portion 120 having an upper plate 122 and a plurality of side plates 124*a*, 124*b*, 124*c*, 124*d* (e.g., four side plates). The housing 410 may also include a lower portion 130 comprising a lower plate 132 configured to be attached to the upper portion 120. The side plates 124*a*-124*d* may be configured to be located between the upper plate 122 and the lower plate 132. FIG. 5 is a partial perspective view of the lighting device 100 with the side plate 124*a* and the upper plate 122 of the housing 110 removed. FIG. 6 is a perspective view of the lower portion 130 of the housing 110 of the lighting device 100 (e.g., with the side plates 124*a*-124*d*, the upper plate 122, the lighting device assembly 200, and the armature 300 of the lighting device 100 removed). FIG. 7 is an exploded view of the lower portion 130 of the housing 110 of the lighting device 100.

The housing 110 may be configured to enclose the lighting device assembly 200. For example, the housing 110 may define a cavity 112. The lighting device assembly 200 may be configured to be located (e.g., housed) within the cavity 112. The housing 110 may be configured to be installed within the building structure. The upper plate 122 may define an upper surface 121 and a lower surface 123, and may be located in a plane that extends in a longitudinal direction L and a lateral direction A. The lower plate 132 may define an upper surface 131 and a lower surface 133, and may be located in a plane that extends in the longitudinal direction L and the lateral direction A. The side plates 124*a*-124*d* may extend between the upper plate 122 and the lower plate 132 (e.g., in a transverse direction T). The housing 110 may comprise a first side portion 114 and a second side portion 116 (e.g., as shown in FIG. 2). The first side portion 114 of the housing 110 may define the side plates 124*a*, 124*b* and the second side portion 116 may define the side plates 124*c*, 124*d*. For example, the first side portion 114 may be L-shaped with side plate 124*a* connected to side plate 124*b* and the second side portion 116 may be L-shaped with side plate 124*c* connected to side plate 124*d*. The first side portion 114 and the second side portion 116 may be positioned adjacent to one another to define the shape of the upper plate 122 and the lower plate 132 (e.g., such as a rectangular cross-section). The cavity 112 may be defined by the upper plate 122, the lower plate 132, and the side plates 124*a*-124*d*. In particular, the lower surface 123 of the upper plate 122 and the upper surface 131 of the lower plate 132 may define the respective upper and lower bounds of the cavity 112. The lower plate 132 may comprise an opening 135 extending therethrough. The lower plate 132 may be metallic (e.g., at least partially metallic).

The lighting device assembly 200 may comprise an optical structure 210 (e.g., a lens), a reflector 220, and a light-generation module 230 (e.g., as shown in FIG. 4). The lighting device 100 (e.g., the light-generation module 230) may be configured to be wirelessly controllable (e.g., controlled in response to commands received via wireless signals). The light-generation module 230 of the lighting device assembly 200 may be configured to emit light and communicate messages (e.g., digital messages) via wireless signals. The light-generation module 230 may include a printed circuit board 232, a heat sink 234, a socket 236, an antenna 250 (e.g., a monopole antenna), and an antenna holder 252. The light-generation module 230 may include an emitter assembly (e.g., such as emitter assembly 1800 shown in FIGS. 57 and 58) that includes one or more emitters configured to emit the light. The emitter assembly may be mounted to the printed circuit board 232. The light-generation module 230 may include a communication circuit (e.g., a wireless communication circuit), such as communication circuit 1944 shown in FIG. 59, that may be mounted to the printed circuit board 232 and may be in electrical communication with (e.g., electrically coupled to) the antenna 250 for receiving and/or sending messages (e.g., via wireless signals). For example, the wireless communication circuit of the light generation module 230 may be configured to communicate the wireless signals at a communication frequency $f_{COMM}$ (e.g., approximately 2.4 GHz).

The optical structure 210 of the lighting device assembly 200 may be transparent or translucent, and may be made of any suitable material, for example plastic or glass. The optical structure 210 may be configured to direct the light emitted by the emitter assembly to shine through a light-exit portion 215 (e.g., a light-exit surface) of the optical structure 210. The reflector 220 of the lighting device assembly 200 may be configured to direct the light emitted by the emitter assembly to shine out through the optical structure 210. The reflector 220 may include an inner surface (e.g., such as inner surface 226 shown in FIGS. 9A and 9B) and an outer surface 228. The reflector 220 may define a first opening 222 (e.g., as shown in FIG. 10) at a first end 221 of the reflector 220 and a second opening 224 at a second end 223 of the reflector 220. The first end 221 of the reflector 220 may be located adjacent to the emitter assembly such that the emitter assembly emits light through the first opening 222. The reflector 220 may be configured to reflect the light emitted by the emitter assembly towards the second opening 224. For example, the inner surface 226 of the reflector 220 may include a reflective material. The lighting device assembly 200 may define an axis 205 that extends through a center of the lighting device assembly 200 (e.g., in the transverse direction T when the lighting device assembly 200 is in the centered position as shown in FIG. 3). For example, the axis 205 may extend through a center of the reflector 220 (e.g., the first opening 222 and the second opening 224) and the optical structure 210 of the lighting device assembly 200.

The reflector 220 may be at least partially metallic. For example, the inner surface 226 of the reflector 220 may be at least partially metallic. The antenna 250 may be positioned external to the reflector 220 such that the antenna 250 is spaced a predetermined distance from the outer surface 228 of the reflector 220. For example, the antenna 250 may extend external to the reflector 220 from a location adjacent to the first end 221 of the reflector 220 towards the second end 223 of the reflector 220. The antenna holder 252 may be configured to hold the antenna 250 such that the antenna 250 is spaced a predetermined distance from the outer surface 228 of the reflector 220. The socket 236 of the light-generation module 230 may be located between the reflector 220 and the printed circuit board 232. For example, the socket 236 may be attached to the heat sink 234 to at least partially enclose the components mounted to the printed circuit board 232. The antenna holder 252 may extend from the socket 236 and/or the printed circuit board 232. The socket 236 may be configured to removably secure the reflector 220 to the light-generation module 230.

The housing 110 may comprise a trim portion 140. The trim portion 140 may be located within the opening 135 in the lower plate 132 of the housing 110. The trim portion 140 may include a trim ring 142 and a collar 150. The trim ring 142 may comprise a trim insert 141 (e.g., a decorative trim cover) and a trim retainer 143 (e.g., the trim ring 142 may define a two-party construction). The trim ring 142 (e.g., the trim retainer 143) may comprise a sleeve 144, a bezel 146 (e.g., a flange), and a bottom surface 148 (e.g., a bottom surface of the bezel 146). The trim portion 140 (e.g., the trim ring 142) may define an aperture 145 through which the light emitted by the light-generation module 230 may be transmitted. The aperture 145 may be located in a plane that extends in the longitudinal direction L and the lateral direction A at the bottom surface 148 of the trim ring 142. The aperture 145 may have, for example, a circular shape (e.g., may be a circle). For example, the aperture 145 may have a diameter of approximately two inches. The trim retainer 143 (e.g., the sleeve 144) may receive the trim insert 141 (e.g., as shown in FIG. 7). For example, the trim retainer 143 (e.g., the sleeve 144) may comprise ball detents 147 configured to be received in a groove 149 in the trim insert 141 for retaining the trim insert 141 in the trim retainer 143. In some examples, the trim insert 141 may be integral with the trim retainer 143 (e.g., the trim ring 142 may comprise a single-part construction).

The collar 150 may be configured to be installed within the opening 135 in the lower plate 132. The opening 135 may define an inside edge 136 that may surround the trim portion 140. The collar 150 may include a flange portion 152 and a ring portion 154. The collar 150 may define an aperture 155 through which the light emitted by the light-generation module 230 may be transmitted. The ring portion 154 (e.g., the aperture 155) of the collar 150 may be configured to receive at least a portion of the trim ring 142. The collar 150 (e.g., the flange portion 152) may define a plurality of tabs 156. The collar 150 may support the trim ring 142, such that the sleeve 144 of the trim ring 142 is at least partially received by the ring portion 154. For example, the trim ring 142 (e.g., the trim retainer 143) may comprise clips (not shown) that extend from the sleeve 144 and are configured to clip onto the ring portion 154 (e.g., the aperture 155) of the collar 150 for securing the trim ring 142 to the collar 150. The trim portion 140 may define an axis 105 that extends through a center of the aperture 145 (e.g., in the transverse direction T). For example, the axis 105 may extend through a center of the trim ring 142 and the collar 150 of the trim portion 140. The trim portion 140 (e.g., the flange portion 152 of the collar 150) may define a rectangular outer edge 158. It should be appreciated that the trim portion 140 is not limited to the geometry shown in the figures, and instead, the trim portion 140 (e.g., the flange portion 152 of the collar 150) may define a circular outer edge. In some examples, the bezel 146 (e.g., the bottom surface 148) of the trim ring 142 may be thin (e.g., not configured as a flange) to present a knife-edge appearance when the lighting device 100 is installed.

The housing 110 may comprise an RF-transparent portion 160 (e.g., an electrically-non-conductive portion) that may be configured to enable the wireless signals to be transmitted and/or received via the antenna 250 of the light-generation module 230 through the opening 135 of the lower plate 132 of the housing 110. The housing 110 may include a non-conductive plate 162 that may be made from a material that does not obstruct or significantly obstruct the propagation of an electromagnetic field and/or electromagnetic waves (e.g., the wireless signals), such as an electrically-non-conductive material (e.g., plastic). The non-conductive plate 162 may cover the opening 135 in the lower plate 132 of the housing 110 (e.g., at least a portion of the opening 135). In some examples, the non-conductive plate 162 (e.g., at least a portion of the non-conductive plate 162) may be received within the opening 135 in the housing 110.

The opening 135 of the lower plate 132 (e.g., and the non-conductive plate 162) may be sized, for example, to enable the wireless control signals to be transmitted and/or received therethrough. The RF-transparent portion 160 may be characterized by a perimeter 161 having an area $A_{RF}$ and a diameter $D_{RF}$ (e.g., as shown in FIGS. 1 and 6). The perimeter 161 of the RF-transparent portion 160 may be defined by the opening 135 in the lower plate 132 of the housing 130. For example, the size of the RF-transparent portion 160 may be based on the diameter of the opening 135 of the lower plate 132. The RF-transparent portion 160 of the housing 110 may include at least a portion of the non-conductive plate 162 (e.g., the portion of the non-conductive plate 162 within the perimeter 161). The diameter $D_{RF}$ of the RF-transparent portion 160 (e.g., of the perimeter 161) may be, for example, approximately equal to a diameter of the opening 135 of the lower plate 132. The opening 135 of the lower plate 132 may be sized (e.g., to set the area $A_{RF}$ and/or the diameter $D_{RF}$ of the RF-transparent portion 160) so as to enable the wireless control signals to be transmitted and/or received through the opening 135 when the lighting device assembly 200 is in the centered position (e.g., as shown in FIG. 3) and/or when the lighting device assembly 200 is in the adjusted position (e.g., rotated and/or tilted within the housing 110 as shown in FIG. 4). For example, the diameter $D_{RF}$ of the RF-transparent portion 160 (e.g., the diameter of the opening 135 of the lower plate 132) may be approximately 7 inches. Although the RF-transparent portion 160 (e.g., and the non-conductive plate 162) is shown in the drawings as having a circular shape, it should be appreciated that the RF-transparent portion 160 (e.g., and the non-conductive plate 162) may define alternate shapes for example, such as an oval shape, an elliptical shape, a rectangular shape, a square shape, a polygon shape, etc.

The centered position of the lighting device assembly 200 may be defined as the optical structure 210 being aligned with the aperture 145 of the trim portion 140. For example, the axis 205 of the lighting device assembly 200 may be substantially parallel to and/or co-linear with the axis 105 that extends through the center of the aperture 145 when the lighting device assembly 200 is in the centered position. The adjusted position may be defined as any position where the optical structure 210 is misaligned with the aperture 145. For example, the axis 205 of the lighting device assembly 200 may not be parallel to and/or co-linear with the axis 105 that extends through the center of the aperture 145 when the lighting device assembly 200 is in an adjusted position. The RF-transparent portion 160 (e.g., the non-conductive plate 162) may be configured to enable the transmission of the wireless control signals to and/or from the antenna 250 of the light-generation module 230 whether the light-generation module 230 is aligned with or misaligned with the aperture 145.

The non-conductive plate 162 of the housing 110 may be configured to cover at least a portion of the opening 135 between the trim portion 140 and the lower plate 132 of the housing 110. For example, a diameter of the non-conductive plate 162 may be greater than the perimeter 161 of the RF-transparent portion 160. The perimeter 161 of the RF-transparent portion 160 may surround the trim portion 140. For example, the non-conductive plate 162 of the housing 110 may extend radially outward from the collar 150 to the inside edge 136 of the lower plate 132 that defines the opening 135 and past the inside edge 136 of the opening 135. The non-conductive plate 162 may be configured to be substantially parallel to the lower plate 132 of the housing 110. For example, the non-conductive plate 162 may be supported by (e.g., rest upon) the lower plate 132 and arranged over the opening 135 of the lower plate 132. When the diameter of the aperture 145 of the trim portion 140 is two inches, for example, and the transmission frequency $f_{COMM}$ is 2.4 GHZ, the aperture 145 may obstruct, block, redirect, and/or attenuate propagation of wireless signals through the aperture 145. The RF-transparent portion 160 (e.g., at least the portion of the RF-transparent portion 160 of the housing 110 covering the portion of the opening 135 between the trim portion 140 and the lower plate 132 of the housing 110) may provide additional area on the housing 110 to reduce attenuation of, blocking, obstructing, and/or redirecting the transmission and/or reception of the wireless signals through the housing 110 (e.g., as will be described in greater detail below).

The non-conductive plate 162 may define an opening 165 through which the trim portion 140 is configured to extend. For example, the opening 165 of the non-conductive plate 162 may be configured to receive (e.g., support) the collar 150. The non-conductive plate 162 may define holes 166 that are used for mounting the non-conductive plate 162 to the housing 110 (e.g., as described herein). The flange portion 152 of the collar 150 may abut the non-conductive plate 162 (e.g., at the opening 165). The opening 165 of the non-conductive plate 162 may have a rectangular (e.g., square) shape (e.g., to receive the rectangular outer edge 158 of the flange portion 152 of the collar 150). The non-conductive plate 162 may be configured to be secured proximate to the opening 135 (e.g., between the lower plate 132 and the trim portion 140). The non-conductive plate 162 (e.g., the opening 165 of the non-conductive plate 162) may define a plurality of notches 164. Each of the plurality of notches 164 may be configured to receive a respective one of the tabs 156 on the flange portion 152 of the collar 150. The notches 164 and the tabs 156 may be configured to maintain alignment of the trim portion 140 within the non-conductive plate 162 (e.g., and within the opening 135 of the lower plate 132 of the housing 110). The collar 150 may define holes 153 in each of the tabs 156 that are used for mounting the collar 150 to the housing 110 (e.g., as will be described in greater detail below).

In some examples, the aperture 145 of the trim portion 140 may have a rectangular (e.g., a square) shape. When the aperture 145 has a rectangular (e.g., a square) shape, the non-conductive plate 162 may be configured to support a collar (e.g., such as the collar 150) that also has a rectangular (e.g., square) aperture in which the trim portion 140 with the rectangular aperture may be received, for example, when the aperture 145 of the trim portion 140 is rectangular. The collar having the rectangular aperture may also comprise a flange (e.g., such as the flange portion 152) that defines a rectangular outer edge (e.g., such as the rectangular outer edge 158), wherein the rectangular aperture may fit within an area defined by the rectangular outer edge. Accordingly, the non-conductive plate 162 (e.g., the opening 165) may be configured to receive (e.g., support) trim portions having both circular and rectangular apertures.

The lighting device 100 (e.g., the housing 110) may include, for example, a cover assembly 102. The cover assembly 102 may include the trim portion 140 (e.g., the trim ring 142 and the collar 150), the non-conductive plate 162, and a support structure 170. The support structure 170 may be configured to support the trim portion 140 within the opening 165 of the non-conductive plate 162 (e.g., within the opening 135 of the lower plate 132). The support structure 170 may be configured to connect the trim portion 140 to the non-conductive plate 162. The support structure 170 may include a support bracket 171. The support structure 170 (e.g., the support bracket 171) may extend across the opening 135 in the lower plate 132 of the housing 110. The support structure 170 may be configured to abut the trim portion 140 and/or the non-conductive plate 162 when supporting the trim portion 140 in the opening 165 of the non-conductive plate 162. For example, the support structure 170 may be metallic (e.g., at least partially metallic). Depending on the material, the support structure 170 may adversely impact (e.g., attenuate, block, obstruct, and/or redirect) communication/propagation of the wireless control signals through the RF-transparent portion 160 (e.g., through the non-conductive plate 162), for example, because the support structure 170 may obstruct, block, redirect, and/or attenuate a portion of the wireless signals. The overall size of the support structure 170 may be minimized to avoid interference with the wireless control signals, but also be large enough to appropriately support the trim portion 140. In some examples, the support structure 170 may be made of a non-metallic material (e.g., to further reduce obstruction, reduce attenuation, and/or reduce blocking of communication/propagation of the wireless control signals).

The area $A_{RF}$ of the RF-transparent portion 160 (e.g., within the perimeter 161) may be characterized by one or more portions that are unobstructed by metallic components, such as the lower plate 132 and the support structure 170. For example, the area $A_{RF}$ of the RF-transparent portion 160 may include a first unobstructed portion **104*a* that is bounded by the opening 135 of the lower plate 132 (e.g., the perimeter 161 of the RF-transparent portion 160) and the support structure 170 (e.g., on one side of the support structure 170) and a second unobstructed portion 104*b* that is bounded by the perimeter 161 of the RF-transparent portion 160 and the support structure 170 (e.g., on the other side of the support structure 170). The first and second unobstructed portions 104*a*, 104*b* may each be characterized by multiple dimensions, such as chords 106 (e.g., linear lengths) that extend between opposing sides or edges that define the shape of the first and second unobstructed portions 104*a*, 104*b*. Some of the chords 106 may have different lengths. The chords 106 may extend in multiple directions in the same plane of the lower plate 132 of the lower portion 130 of the housing 110 (e.g., extending in the longitudinal direction L and the lateral direction A). The chords 106 of the first and second unobstructed portions 104*a*, 104*b* may have respective lengths that enable RF signals to propagate through the first and second unobstructed portions 104*a*, 104*b* with reduced attenuation, blocking, and/or obstruction. For example, to enable the propagation of the RF signals through the first and second unobstructed portions 104*a***,

104*b* of the RF-transparent portion 160 at the communication frequency $f_{COMM}$ of 2.4 GHZ, the lengths of multiple chords 106 of each of the first and second unobstructed portions 104*a*, 104*b* may be greater than or equal to approximately three inches (e.g., where the length of 3 inches is based on the communication frequency $f_{COMM}$). One will appreciate that if a different value of the communication frequency $f_{COMM}$ were used to transmit the wireless signals, the size of the first and second unobstructed portions 104*a*, 104*b* (e.g., the lengths of the chords 108) may be configured according to that value of the communication frequency $f_{COMM}$. In short, the shape and size of planer surface of the first and second unobstructed portions 104*a*, 104*b* may be configured such that multiple chords 108 can be "drawn" in the planer surface having lengths based on the value of the communication frequency $f_{COMM}$. In this fashion, the RF-transparent portion 160 may enable improved communications (e.g., reduction attention of, obstruction of, and/or blocking of the wireless signals).

The support structure 170 (e.g., the support bracket 171) may define sides 172 and extensions 176 extending from opposed corners of the sides 172. Each of the sides 172 may define a tab 174 that is configured to align with the tabs 156 of the collar 150. The sides 172 of the support bracket 171 may be connected together to define an opening 175 of the support structure 170. The support structure 170 may define holes 173 in each of the tabs 174 that are configured to secure the trim portion 140 to the housing 110. For example, fasteners (e.g., screws—not shown) may be received through the holes 173 in the support structure 170 and the holes 153 in the collar 150 for securing the support structure 170 to the trim portion 140 (e.g., to the collar 150). The extensions 176 may define holes 177 that are configured to secure the support structure 170 to the non-conductive plate 162. For example, fasteners (e.g., screws—not shown) may be received through the holes 177 in the support structure 170 and the holes 166 in the non-conductive plate 162 for securing the support structure 170 to the non-conductive plate 162. The opening 175 of the support structure 170 may be aligned with the opening 165 of the non-conductive plate 162 when the support structure 169 is secured to the non-conductive plate 162.

The non-conductive plate 162 may support the trim portion 140 within the opening 135 of the lower plate 132 of the housing 110. The trim portion 140 (e.g., the collar 150) may be attached to the support structure 170 and the support structure 170 may be attached to the non-conductive plate 162, for example, prior to installation of the cover assembly 102 in the housing 110. The lower plate 132 may define notches 137 around the opening 135. The notches 137 may allow for insertion of the cover assembly 102 (e.g., the non-conductive plate 162 with the support structure 170 attached to the non-conductive plate 162 and the trim portion 140 attached to the support structure 170) into the housing 110. For example, the cover assembly 102 (e.g., the non-conductive plate 162) may be oriented substantially perpendicular to the lower plate 132 and inserted through a pair of opposing ones of the notches 137. The cover assembly 102 (e.g., the non-conductive plate 162) may then be rotated to be substantially parallel to the lower plate 132 and may rest on (e.g., be supported by) the lower plate 132. The lower plate 132 may define a plurality of tabs 138 that are configured to position (e.g., contain) the non-conductive plate 162 over the opening 135 in the lower plate 132 (e.g., after insertion of the non-conductive plate 162 into the housing 110) (e.g., to limit movement of the cover assembly in the plain defined directions L and A). Each of the plurality of tabs 138 may be located at a respective one of the notches 137. Each of the plurality of tabs 138 may be configured to abut an outer edge 168 of the non-conductive plate 162 to assist in alignment of the non-conductive plate 162 with the opening 135 in the lower plate 132. A diameter of the non-conductive plate 162 may be larger than a diameter of the opening 135 such that the non-conductive plate 162 may be configured to rest on the upper surface 131 of the lower plate 132 of the housing 110.

After the cover assembly 102 (e.g., the non-conductive plate 162) is received within the cavity 112 of the housing 110, the cover assembly 102 (e.g., the non-conductive plate 162) may be rotated to appropriately orient the trim portion 140 in the space in which the lighting device 100 is installed (e.g., which may be particularly important when the trim portion has a rectangular opening). The non-conductive plate 162 may comprise holes 167 though which fasteners (e.g., screws—not shown) may be received for securing the non-conductive plate 162 to the housing 110. In addition, the extensions 176 of the support structure 170 may comprise holes 178 for also receiving the fasteners that are received in the holes 167 of the non-conductive plate 162 for securing the non-conductive plate 162 to the housing 110. After the cover assembly 102 (e.g., the non-conductive plate 162) is inserted through the notches 137 in the housing 110 and is resting on the upper surface 131 of the lower plate 132, the cover assembly 102 (e.g., the non-conductive plate 162) may be rotated, such that the holes 167 of the non-conductive plate 162 and the holes 178 of the support member 190 are located between stops 139 along the inside edge 136 of the opening 135 in the lower plate 132. The fasteners may then be inserted into the holes 167 of the non-conductive plate 162 and the holes 178 of the support member 190 (e.g., in the transverse direction T from the bottom of the lighting device 100). When the fasteners are extending through the holes 167 and the 178, the fasteners may be positioned between the stops 139 along the inside edge 136 of the opening 135 in the lower plate 132. While the fasteners are installed in the holes 167 and the holes 178 but not fully tightened, the non-conductive plate 162 may be rotated to appropriately orient the trim portion 140. As the cover assembly 102 (e.g., the non-conductive plate 162) is rotated, the fasteners may contact the stops 139 along the inside edge 136 of the opening 135 in the lower plate 132 to limit rotation of the non-conductive plate 162 (e.g., prevent full rotation of the non-conductive plate 162). When the trim portion 140 is oriented appropriately, the fasteners may be tightened to secure the cover assembly 102 (e.g., the trim portion 140, the non-conductive plate 162, and the support structure 170) in place. For example, the lower plate 132 may be clamped between heads of the respective fasteners (e.g., on the lower surface 133 of the lower plate 132) and the non-conductive plate 162 (e.g., on the upper surface 131 of the lower plate 132).

Additionally or alternatively, although not shown in the figures, it should be appreciated that the support structure 170 may be attached to the upper plate 122 and/or one or more of the side plates 124*a*-124*d*. Although the support structure 170 is shown in the figures as a separate component of the lighting device 100, it should be appreciated that the support structure 170 may be formed as part of the lower plate 132 of the housing 110, for example, such that the opening 135 comprises two opening portions. When the opening 135 comprises two opening portions, the RF-transparent portion 160 may comprise a first non-conductive plate and a second non-conductive plate that may be located in respective opening portions of the opening 135. The first and second non-conductive plates within the respective opening portions of the opening 135 may fall within the area $A_{RF}$ of the RF-transparent portion 160, such that the diameter $D_{RF}$ of the RF-transparent portion 160 is approximately equal to a diameter of the outermost edges of the opening portions of the opening 135. In one or more other examples, the opening 135 may comprise three or four opening portions, and the RF-transparent portion 160 may comprise three or four non-conductive plates, respectively.

The armature 300 of the lighting device 100 may be attached to the housing 110. The armature 300 may be configured to support the lighting device assembly 200 within the housing 110 above the opening 135 in the lower plate 132 of the housing 110, for example, such that the light emitted by the light-generation module 230 may shine through the aperture 145 of the trim portion 140 and wireless control signals transmitted by the light-generation module 230 may be transmitted through the opening 135 (e.g., through the non-conductive plate 162 and/or the aperture 145 of the trim portion 140). The armature 300 may be configured to enable tilting and rotation of the lighting device assembly 200 within the housing 110 such that the light emitted by the light-generation module 230 is directed through the trim portion 140 (e.g., the aperture 145) at a plurality of angles and directions. The armature 300 may enable the lighting device assembly 200 to be adjusted among the centered position and a plurality of adjusted positions. For example, the armature 300 may be configured to enable tilting and rotation of the lighting device assembly 200 within the housing 110 without the use of tools. For example, the lighting device assembly 200 may be tilted to approximately 40 degrees with respect to the trim portion 140. Although the figures show the armature 300 attached to the upper plate 122 of the housing 110, it should be appreciated that the armature 300 could be attached to the lower plate 132 or one or more of the side plates 124*a*-124*d*.

Figure 8:
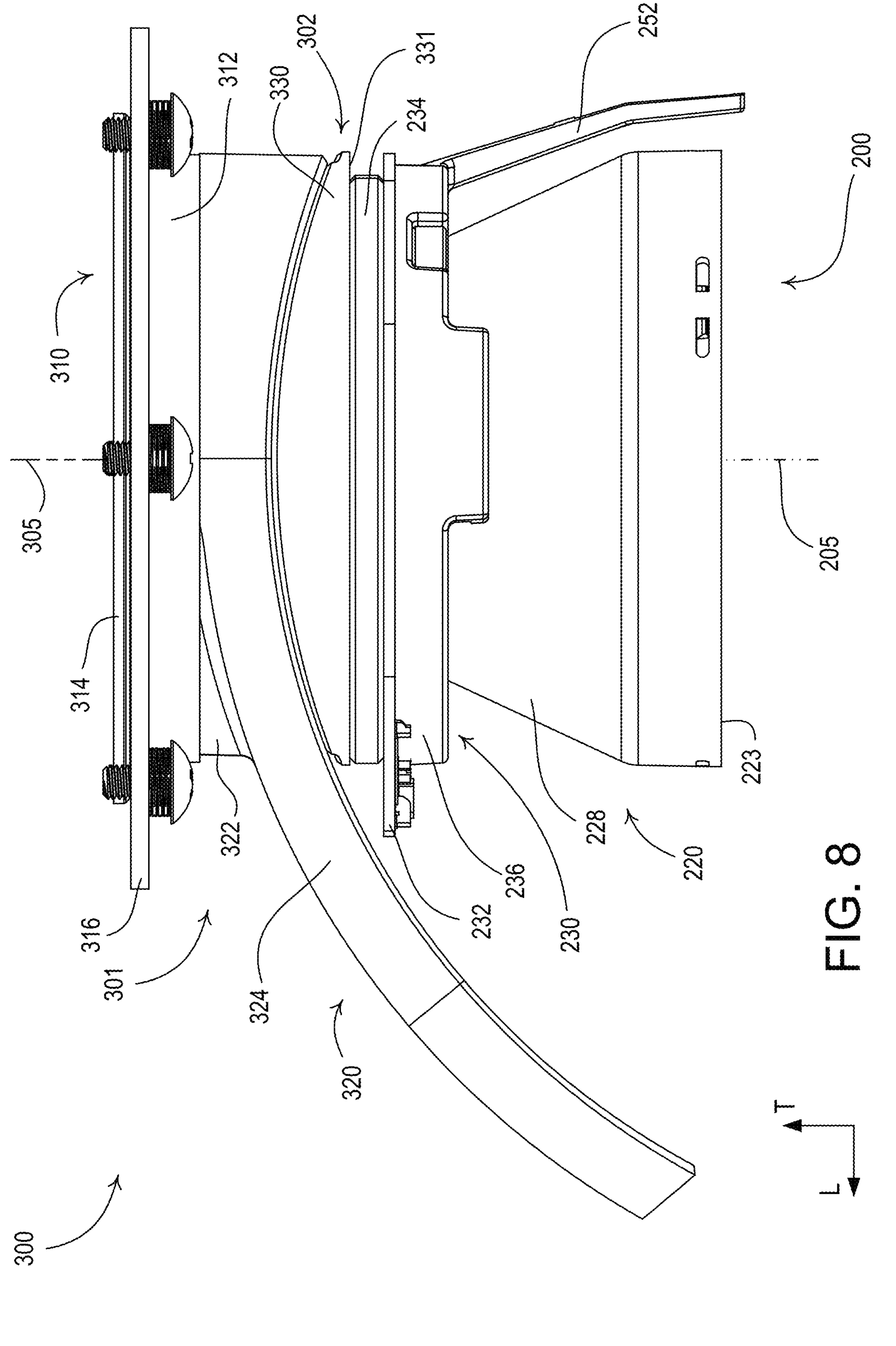
FIG. 8 is a side view of the lighting device assembly of FIG. 4 attached to the armature with the lighting device assembly in a first position on the armature.
Figure 9A:
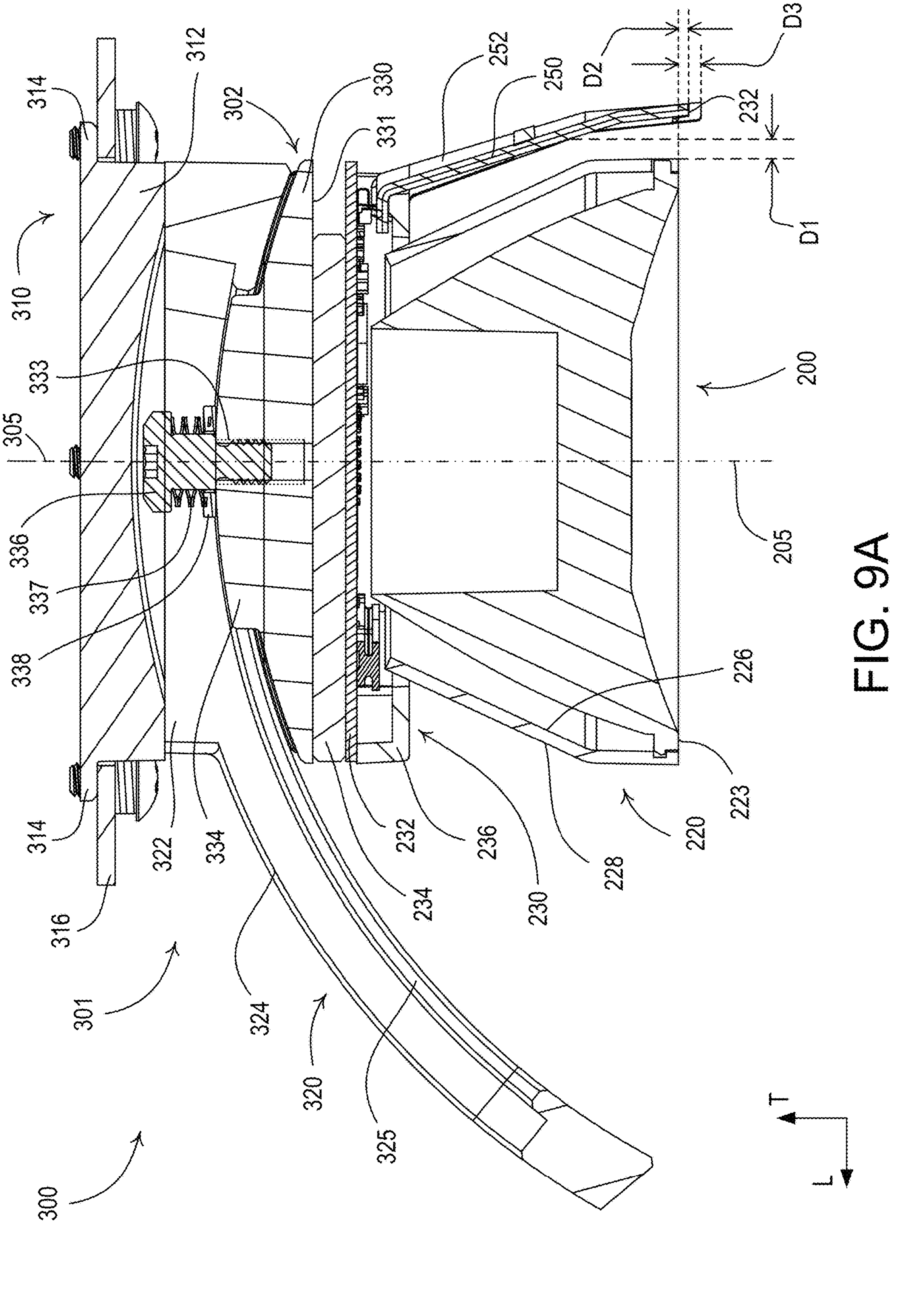
FIG. 9A is a side cross-section view of the lighting device assembly of FIG. 4 attached to the armature with the lighting device assembly in the first position on the armature.
Figure 9B:
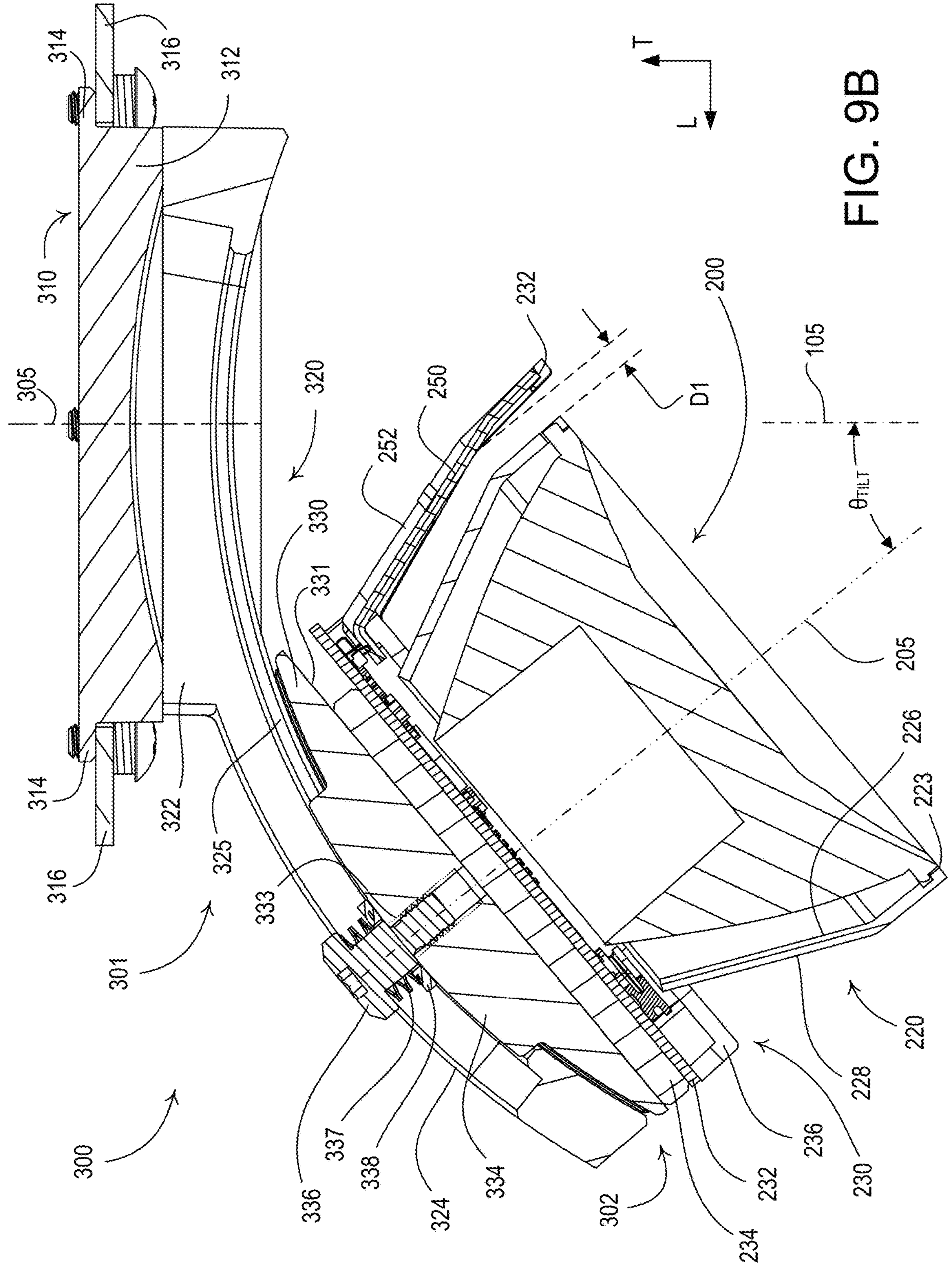
FIG. 9B is a side cross-section view of the lighting device assembly of FIG. 4 attached to the armature with the lighting device assembly in a second position on the armature.
Figure 10:
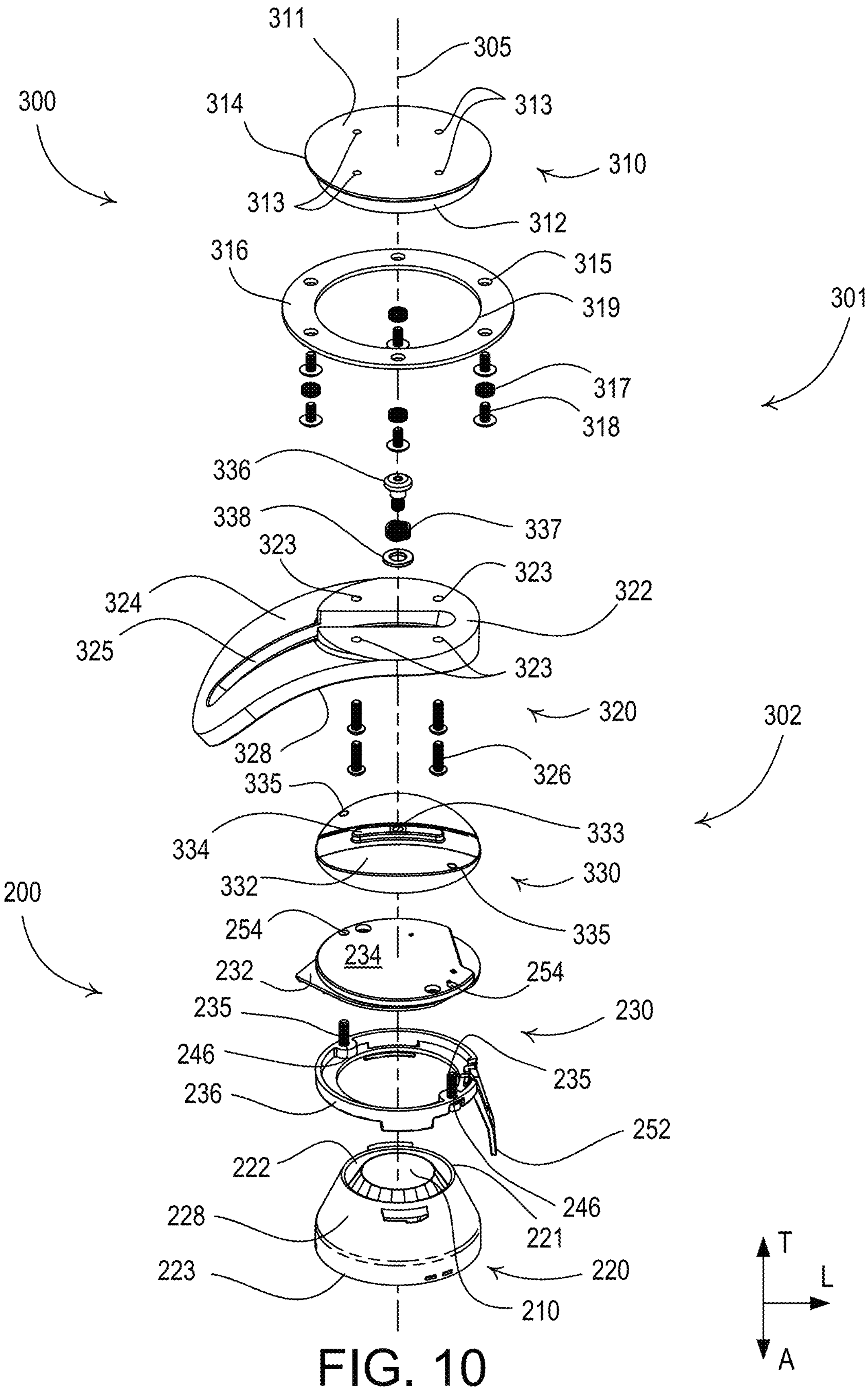
FIG. 10 is a partially exploded view of the lighting device assembly of FIG. 4 and the armature.

FIGS. 8-10 depict the lighting device assembly 200 attached to the armature 300. FIG. 8 is a side view of the lighting device assembly 200 attached to the armature 300 with the lighting device assembly 200 in a first position (e.g., a centered or downward-facing position) on the armature 300. FIG. 9A is a side cross-section view of the lighting device assembly 200 attached to the armature 300 with the lighting device assembly 200 in the first position. FIG. 9B is a side cross-section view of the lighting device assembly 200 attached to the armature 300 with the lighting device assembly 200 in a second position (e.g., an adjusted or angled position). FIG. 10 is a partially exploded view of the lighting device assembly 200 and the armature 300.

The armature 300 may include a first portion 301 and a second portion 302. The lighting device assembly 200 may be coupled to the second portion 302 of the armature 300. The first portion 301 may comprise a base portion 310 and an arm portion 320. The first portion 301 (e.g., the base portion 310) may be coupled (e.g., rotatably coupled) to an upper portion of the housing 110 (e.g., such as the upper plate 122 of the housing 110 shown in FIGS. 3-4). The armature 300 may define an axis 305 that extends through a center of the first portion 301 (e.g., through a center of the base portion 310) (e.g., in the transverse direction T). For example, the first portion 301 may be coupled to the upper plate 122 of the housing 110, such that the axis 305 of the armature 300 is aligned with the axis 105 that extends through the center of the aperture 145 of the trim portion 140 (e.g., as shown in FIG. 5). The arm portion 320 may define a drum 322 and a projection 324. The arm portion 320 (e.g., the drum 322) may be attached to the base portion 310.

The second portion 302 may be configured to tilt (e.g., pivot) with respect to the first portion 301 (e.g., to tilt the lighting device assembly 200). The armature 300 (e.g., the arm portion 320 of the first portion 301) may define a slot 325 that is configured to slidingly receive the second portion 302 (e.g., and the lighting device assembly 200). For example, the lighting device assembly 200 may be attached to the armature 300 via the slot 325. The slot 325 may extend along the arm portion 320 of the armature 300 (e.g., along the drum 322 and the projection 324). The arm portion 320 may be curved, such that the slot 325 may also be curved. The projection 324 of the arm portion 320 may extend from the drum 322 in the longitudinal direction L (e.g., as shown in FIG. 8). The projection 324 (e.g., the arm portion 320) may be curved downward towards (e.g., in the transverse direction T) a lower portion of the housing 110 (e.g., such as the lower plate 132 of the housing 110 shown in FIGS. 1-7). The slot 325 may be located within a plane that extends in the longitudinal direction L and the transverse direction T (e.g., as shown in FIG. 9A). For example, the first portion 301 (e.g., the arm portion 320) may define a first curved surface 328 that is concave. The armature 300 may include a fastener 336 (e.g., a screw), that is configured to secure the second portion 302 to the first portion 301 (e.g., the arm portion 320). The armature 300 may include a spring 337 and/or a washer 338 that are configured to receive the fastener 336. The spring 337 may enable manual operation of the second portion 302 (e.g., the lighting device assembly 200), for example, along the slot 325. The spring 337 may be a stacked-wave spring. For example, when the spring 337 is compressed, the second portion 302 (e.g., the lighting device assembly 200) may be operated along the slot 325, such that the lighting device assembly 200 is tilted with respect to the armature 300 (e.g., the axis 205 is tilted with respect to the axis 105 and/or the axis 305).

A user may adjust a tilt angle $\theta_{TILT}$ (e.g., as shown in FIG. 9B) between the axis 205 of the lighting device assembly 200 and the axis 105 of the trim portion 140 (e.g., and the axis 305 of the armature 300). For example, the user may apply a force to the lighting device assembly 200 (e.g., in the axial direction) to compress the spring 337. When the spring 337 is expanded, the tilt angle $\theta_{TILT}$ of the lighting device assembly 200 and the position of the lighting device assembly 200 within the slot 325 may be secured. For example, the spring 337 may expand to hold the lighting device assembly 200 in the position along the slot 325 that the user selects. The spring 337 may expand when the user removes the force from the lighting device assembly 200. The position of the lighting device assembly 200 within the slot 325 may define the tilt angle $\theta_{TILT}$ between the axis 205 of the lighting device assembly 200 and the axis 105 of the trim portion 140 (e.g., and the axis 305 of the armature 300). For example, the position of the lighting device assembly 200 along the slot 325 (e.g., the tilt angle $\theta_{TILT}$) may be adjusted between the centered position (e.g., as shown in FIG. 9A) and the adjusted position (e.g., as shown in FIG. 9B), such that the light emitted by the light-generation module 230 may be directed through the trim portion 140 at a plurality of angles.

The second portion 302 may comprise an adapter plate 330. The adapter plate 330 may be configured to enable the lighting device assembly 200 to slide along the slot 325. The adapter plate 330 may be configured to enable the lighting device assembly 200 to be attached to the armature 300. The second portion 302 (e.g., the adapter plate 330) may be coupled to the lighting device assembly 200. The adapter plate 330 may define a mounting surface 331 to which the lighting device assembly 200 may be secured (e.g., mounted). For example, the light-generation module 230 of the lighting device assembly 200 may comprise fasteners 235 received through openings 246 in the socket 236, openings 254 in the heat sink 234, and openings 335 in the adapter plate 330. The adapter plate 330 may define a second curved surface 332 and a ridge 334. The ridge 334 may be a raised portion of the adapter plate 330 that extends from the second curved surface 332 of the adapter plate 330. The second curved surface 332 of the second portion 302 may be convex such that its geometry is complimentary to the first curved surface 328 of the first portion 301. The second curved surface 332 of the second portion 302 may be shorter than the first curved surface 328 of the first portion 301. The second curved surface 332 of the second portion 302 may be configured to slide along the first curved surface 328 of the first portion 301. The ridge 334 may be configured to be at least partially received within the slot 325. For example, the ridge 334 may define a geometry that is complimentary to the geometry defined by the slot 325 such that the ridge 334 remains engaged with the slot 325 as the lighting device assembly 200 slides along the slot 325. The engagement between the ridge 264 and the slot 325 may prevent rotation of the lighting device assembly 200 with respect to the arm portion 320. The second curved surface 332 (e.g., the ridge 334) may define a threaded hole 263 that is configured to receive the screw 265 to slidingly attach the lighting device assembly 200 to the armature 300 via the slot 325.

The lighting device assembly 200 (e.g., the second portion 302) may be configured to tilt (e.g., pivot) about a point 108 (e.g., a fulcrum) that is located below the armature 300 (e.g., as shown in FIG. 4). For example, the point 108 (e.g., the fulcrum) may be located along the axis 105 of the trim portion 140 at approximately the intersection of the axis 105 of the trim portion 140 and a plane of the lower plate 132 of the housing 110 (e.g., which may extend in the longitudinal direction L and the lateral direction A). The point 108 may be located at, for example, the center of the aperture 145 of the trim portion 140 and/or the center of the opening 135 in the lower plate 132. Since the point 108 (e.g., the fulcrum) is located at approximately the center of the aperture 145 of the trim portion 140, the light-generation module 230 may be configured to emit light through the aperture 145 when the lighting device assembly 200 is located at any position between the centered position and the adjusted position (e.g., when the adapter plate 330 is located at any position along the arm portion 320). For example, the axis 205 of the lighting device assembly 200 may extend approximately through the point 108 (e.g., the fulcrum) along the axis 105 of the trim portion 140 when the lighting device assembly 200 is in the centered position and the adjusted position (e.g., and any positions in between the centered position and the adjusted position). The first curved surface 328 of the arm portion 320 may be shaped as an arc (e.g., a portion of a circle) having a center located at the point 108 (e.g., the fulcrum). For example, a radius of the first curved surface 328 of the arm portion 320 may be constant along the length of the first curved surface 328. As a result, a radial distance between the second end 223 of the reflector 220 and the point 108 (e.g., the fulcrum) may be maintained approximately constant as the lighting device assembly 200 is adjusted between the centered position and the adjusted position.

The base portion 310 of the first portion 301 may define a drum 312 and a flange 314. The armature 300 may comprise a mounting ring 316 that is configured to secure the armature 300 to the housing 110. For example, the mounting ring 316 may define a plurality of holes 315. Each of the plurality of holes 315 may be configured to receive a respective one of a plurality of fasteners 318 (e.g., screws) to secure the armature 300 to the housing 110. Each of the fasteners 318 may receive a respective spring 317. The fasteners 318 may be configured to be received by corresponding holes 129 in the upper plate 122 of the housing 110 (e.g., as shown in FIG. 2). The spring 317 may be configured to bias the mounting ring 316 towards the upper plate 122 of the housing 110. The mounting ring 316 may define an opening 319 that is configured to receive the drum 312 of the base portion 310. The flange 314 of the base portion 310 may be captured between the mounting ring 316 and the upper plate 122 of the housing 110. The drum 312 of the base portion 310 may define holes 313 therethrough. The drum 322 of the arm portion 320 may define holes 323. The holes 313 of the drum 312 of the base portion 310 and the holes 323 of the drum 322 of the arm portion 320 may be configured to receive fasteners 326 (e.g., screws) to secure the arm portion 320 to the base portion 310. For example, the drum 312 of the base portion 310 and the drum 322 of the arm portion 320 may have approximately the same diameter.

The user may adjust a rotational position of the base portion 310 (e.g., and thus the lighting device assembly 200) around the axis 305 of the armature 300. When the flange 314 of the base portion 310 is captured between the mounting ring 316 and the housing 110, the first portion 301 of the armature 300 may be configured to rotate within the opening 319 of the mounting ring 316 (e.g., around the axis 305 of the armature 300). For example, the user may apply a force to the lighting device assembly 200 to rotate the base portion 310 around the axis 305. The springs 317 may be configured to enable the base portion 310 to more easily rotate within the opening 319 of the mounting ring 316. For example, the springs 317 may be configured to be compressed to enable the base portion 310 and the mounting ring 316 to move away from (e.g., out of contact with) the upper plate 122 when the base portion 310 is being rotated. When the user applies the force to the lighting device assembly 200 to pull the lighting device assembly 200 in the transverse direction T, the springs 317 may compress to allow the base portion 310 and the mounting ring 316 to move away from the upper plate 122 of the housing 110. When the base portion 310 is not contacting the upper plate 122 of the housing 110, the base portion 310 may be more easily rotated within the opening 319 of the mounting ring 316. The lighting device assembly 200 may be rotated around the axis 305 of the armature 300 and may be tilted to adjust the tilt angle $\theta_{TILT}$, such that the light emitted by the light-generation module 230 can be directed through the trim portion 140 at a plurality of angles and directions.

The antenna holder 252 may be configured to hold the antenna 250 such that the antenna 250 is spaced the predetermined distance from the outer surface 228 of the reflector 220 (e.g., as shown in FIG. 9A). For example, the predetermined distance may be a first distance D1 (e.g., in the longitudinal direction L when the lighting device assembly 200 is in the centered position as shown in FIG. 9A). The distance D1 may be in the range of 1-4 mm, preferably 2-3 mm, when the reflector 220 is metal. The antenna holder 252 (e.g., and the first distance D1) may be configured such that the antenna 250 extends beyond the second end 223 of the reflector 220 (e.g., and the optical structure 210). For example, the antenna 250 may extend a second distance D2 beyond the second end 223 of the reflector 220 (e.g., in the transverse direction T when the lighting device assembly 200 is in the centered position as shown in FIG. 9A). The antenna holder 252 may extend a third distance D3 beyond the second end 223 of the reflector 220 (e.g., in the transverse direction T when the lighting device assembly 200 is in the centered position as shown in FIG. 9A). The second distance D2 may be less than the third distance D3. In some examples, the antenna 250 and the antenna holder 252 may not extend beyond the second end 223 of the reflector 220.

The antenna 250 may be located on the lighting device assembly 200, such that the antenna 250 is located above the RF-transparent portion 160 of the housing 110 in both the centered position (e.g., as shown in FIG. 3) and the adjusted position (e.g., as shown in FIG. 4). The antenna 250 may be located on the opposite side of the lighting device assembly 200 (e.g., the light-generation module 230) as the projection 324 of the arm portion 320 is located (e.g., as shown in FIGS. 9A and 9B). When the lighting device assembly 200 is in the first position (e.g., the centered position as shown in FIGS. 3 and 9A), the antenna 250 may be located as close as possible to the axis 105 of the trim portion 140 (e.g., as close as possible to a position above the center of the RF-transparent portion 160 of the housing 110). As the lighting device assembly 200 is adjusted from the first position to the second position (e.g., the adjusted position as shown in FIGS. 4 and 9B), the antenna 250 may move towards the upper plate 122 of the housing 110 (e.g., in the transverse direction T) and towards the axis 105 of the trim portion 140 (e.g., in the longitudinal direction L). When the lighting device assembly 200 is in the second position, the antenna 250 may be located as close as possible to the axis 105 of the trim portion 140 (e.g., as close as possible to a position above the center of the RF-transparent portion 160 of the housing 110). For example, the antenna 250 may be aligned with the slot 325 in the arm portion 320 (e.g., the antenna 250 may be located within a plane that extends in the longitudinal direction L and the transverse direction T). The antenna 250 may be configured to extend towards the aperture 145 of the trim portion 140 when the lighting device assembly 200 is in either of the first position or the second position.

The lighting device assembly 200 may be configured to be replaced while the armature 300 remains within the housing 110. The lighting device assembly 200 may be removably secured to the armature 300 using fasteners 235 (e.g., screws). The fasteners 235 may be loosened and the lighting device assembly 200 may be removed from the housing 110 of the lighting device 100. The fasteners 235 may be retained by the lighting device assembly 200 to facilitate ease of removal of the lighting device assembly 200 from the armature 300. A replacement lighting device assembly 200 may be installed within the housing 110 without requiring removal of the housing 110 and/or the lighting device 100 from the building structure. Additionally or alternatively, the lighting device assembly 200 (e.g., the light-generation module 230) may be assembled and calibrated prior to the lighting device assembly 200 being installed in a lighting device (e.g., such as the lighting device 100).

The armature 300 may operate as a heat sink for the light-generation module 230 of the lighting device assembly 200. For example, the armature 300 (e.g., the base portion 310, the arm portion 320, and/or the adapter plate 330) may be thermally coupled to the light-generation module 230 (e.g., the heat sink 234). The armature 300 may be configured to dissipate heat generated by the light-generation module 230 to the cavity (e.g., such as the cavity 112 shown in FIGS. 3 and 4) and/or the housing (e.g., such as the housing 110 shown in FIGS. 1-7). The light-generation module 230 may be thermally coupled to the housing 110 through the armature 300. For example, the armature 300 may be configured to conduct heat from the light-generation module 230 through the second portion 302 and the first portion 301 to the housing 110. When the spring 337 of the armature 300 is expanded, the first curved surface 328 of the first portion 301 and the second curved surface 332 of the second portion 302 be in contact and may define a contact area between the first curved surface 328 and the second curved surface 332. The contact area between the first curved surface 328 and the second curved surface 332 may be large enough to appropriately conduct heat from the second portion 302 (e.g., from the light-generation module 230) to the first portion 301 (e.g., to the housing 110). For example, thermal grease may be applied between the adapter plate 330 of the second portion 302 (e.g., the second curved surface 332) and the arm portion 320 of the first portion 301 (e.g., the first curved surface 328).

Figure 11:
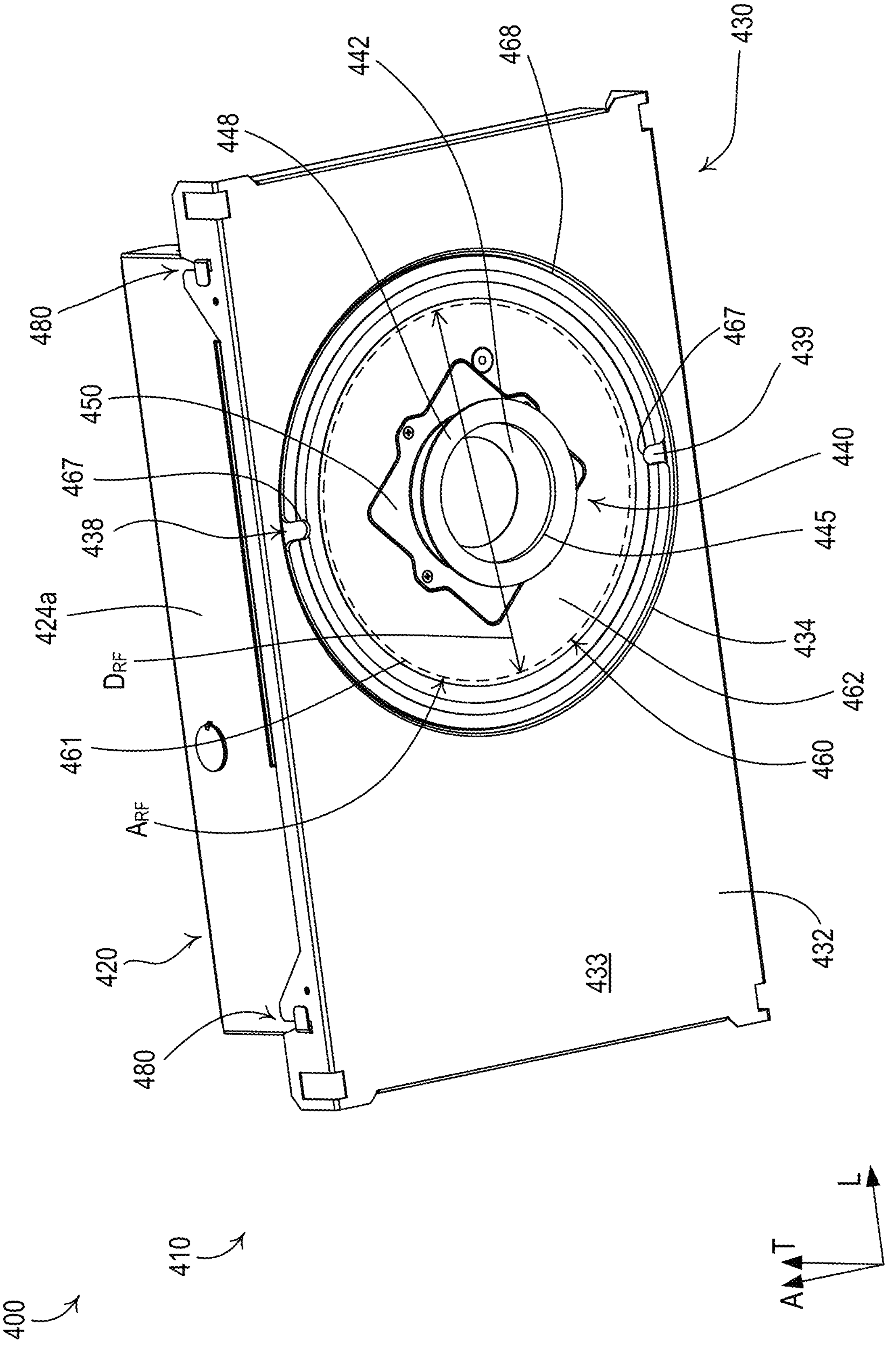
FIG. 11 is a bottom perspective view of another example lighting device.
Figure 12A:
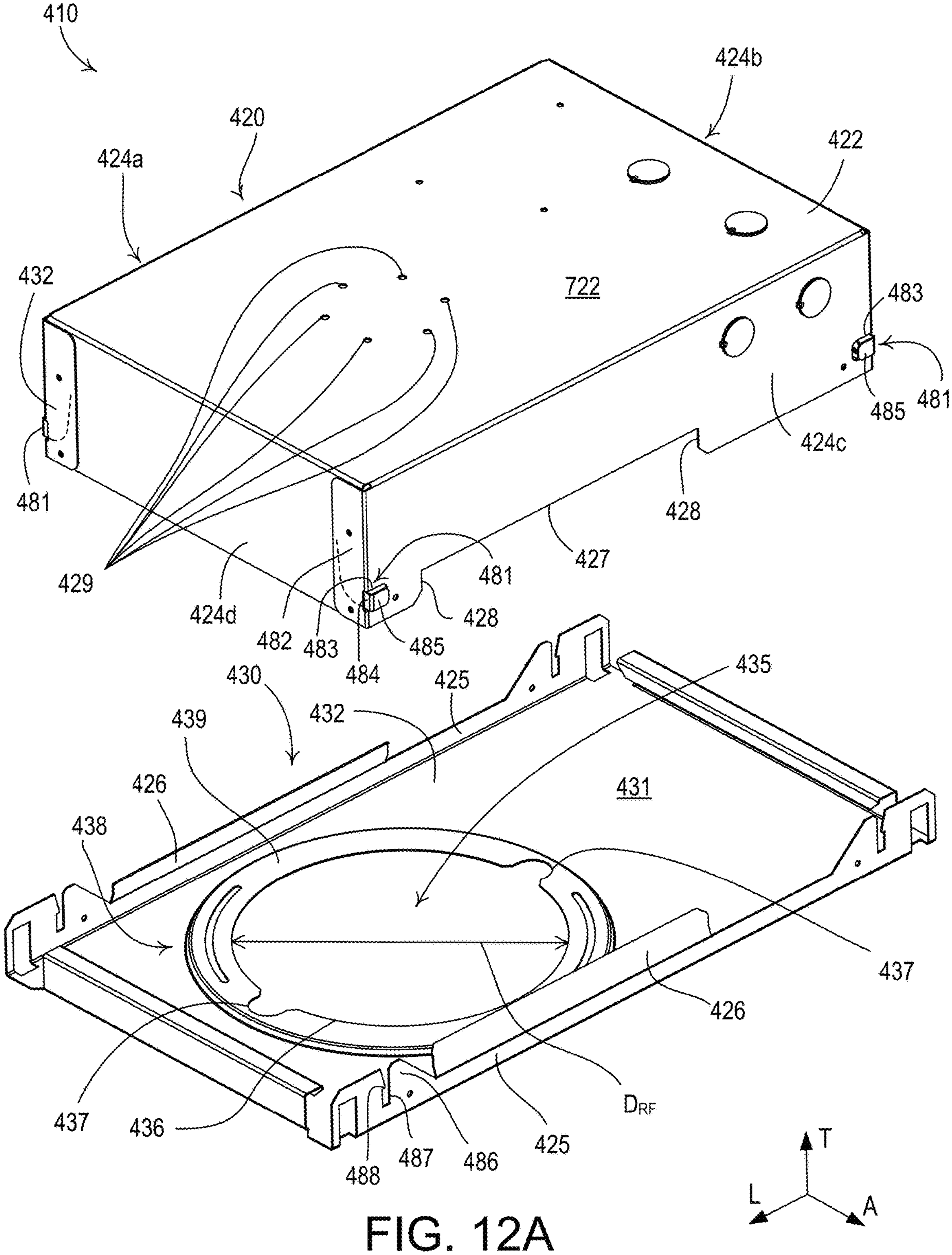
FIG. 12A is an exploded perspective view of a housing of the lighting device of FIG. 11.
Figure 12B:
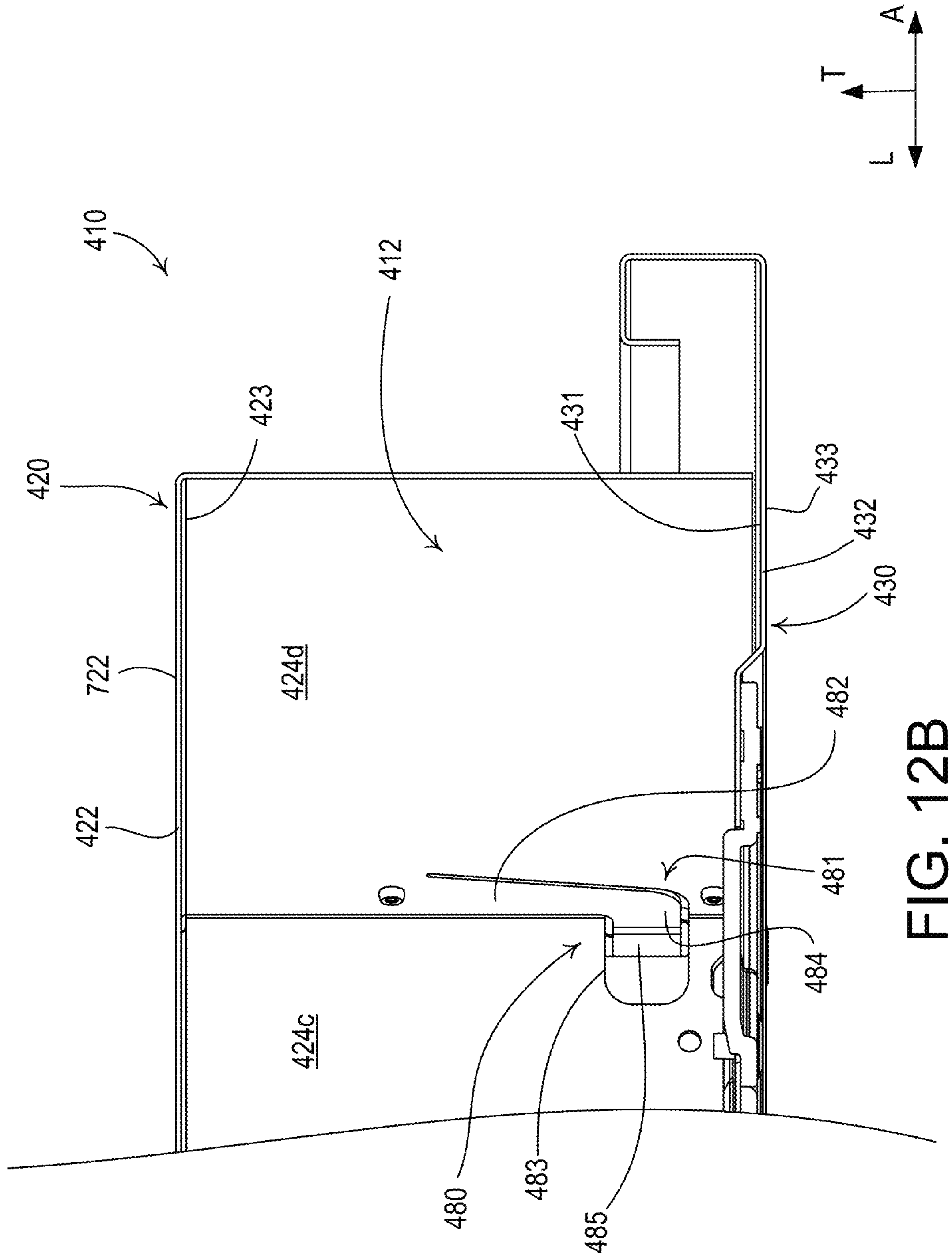
FIG. 12B is a perspective cross-section view of a portion (e.g., one of the inside corners) of the housing of FIG. 12A when assembled showing an attachment structure of the housing.
Figure 13:
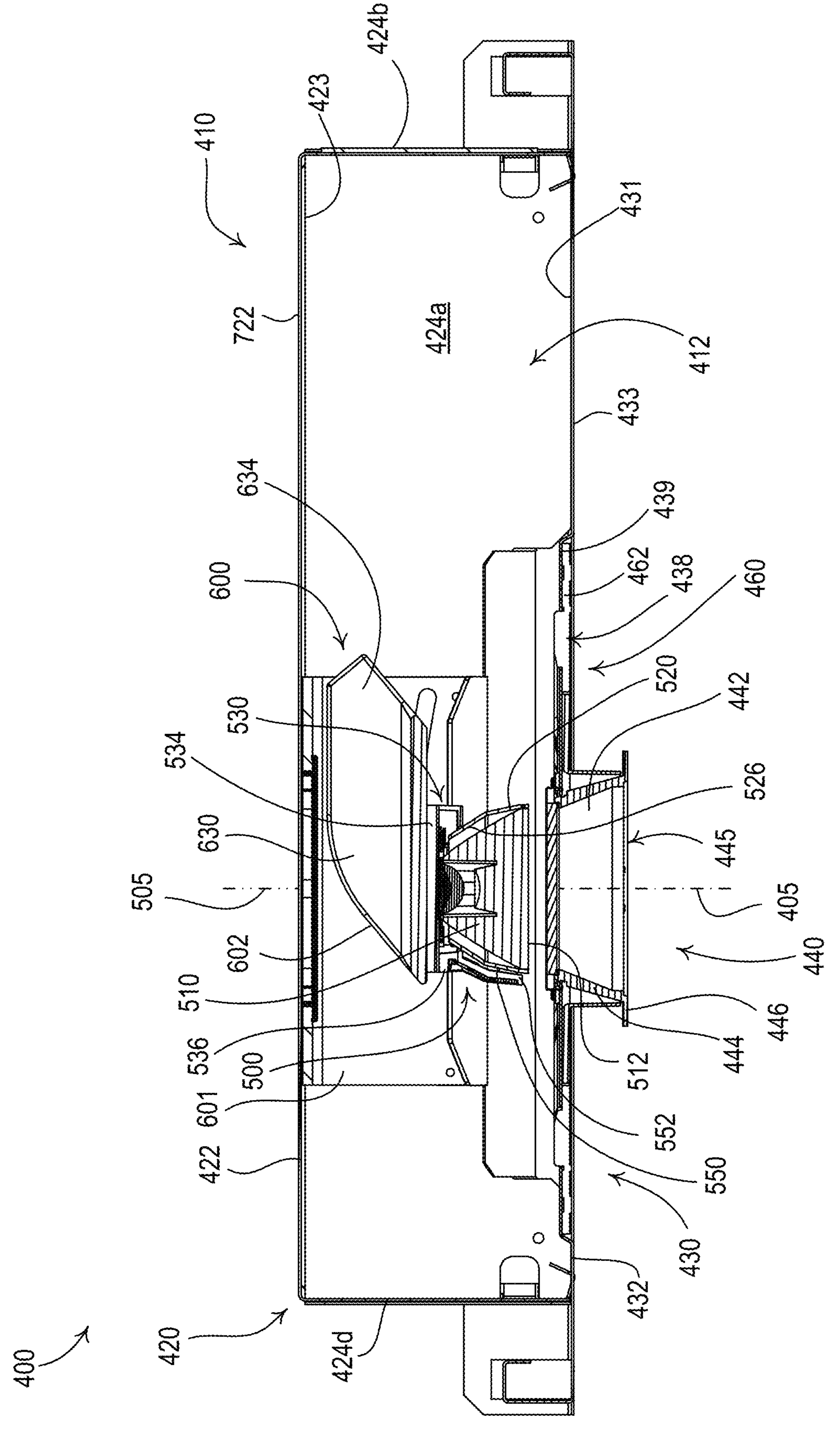
FIG. 13 is a side cross-section view of the lighting device of FIG. 11 when a lighting device assembly of the lighting device is in a centered position.
Figure 14:
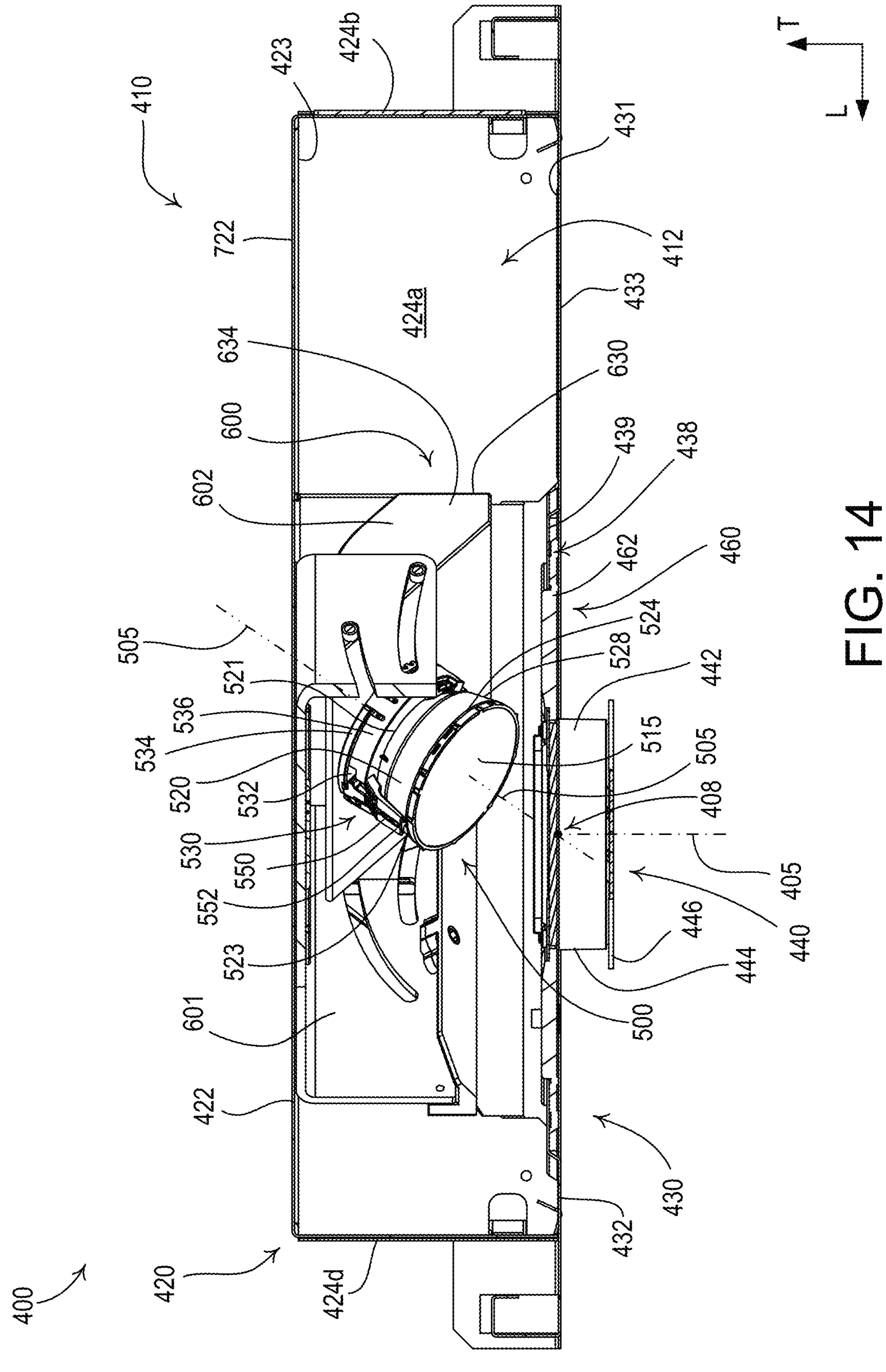
FIG. 14 is a side cross-section view of the lighting device of FIG. 11 when the lighting device assembly is in an adjusted position (e.g., tilted and rotated).
Figure 15:
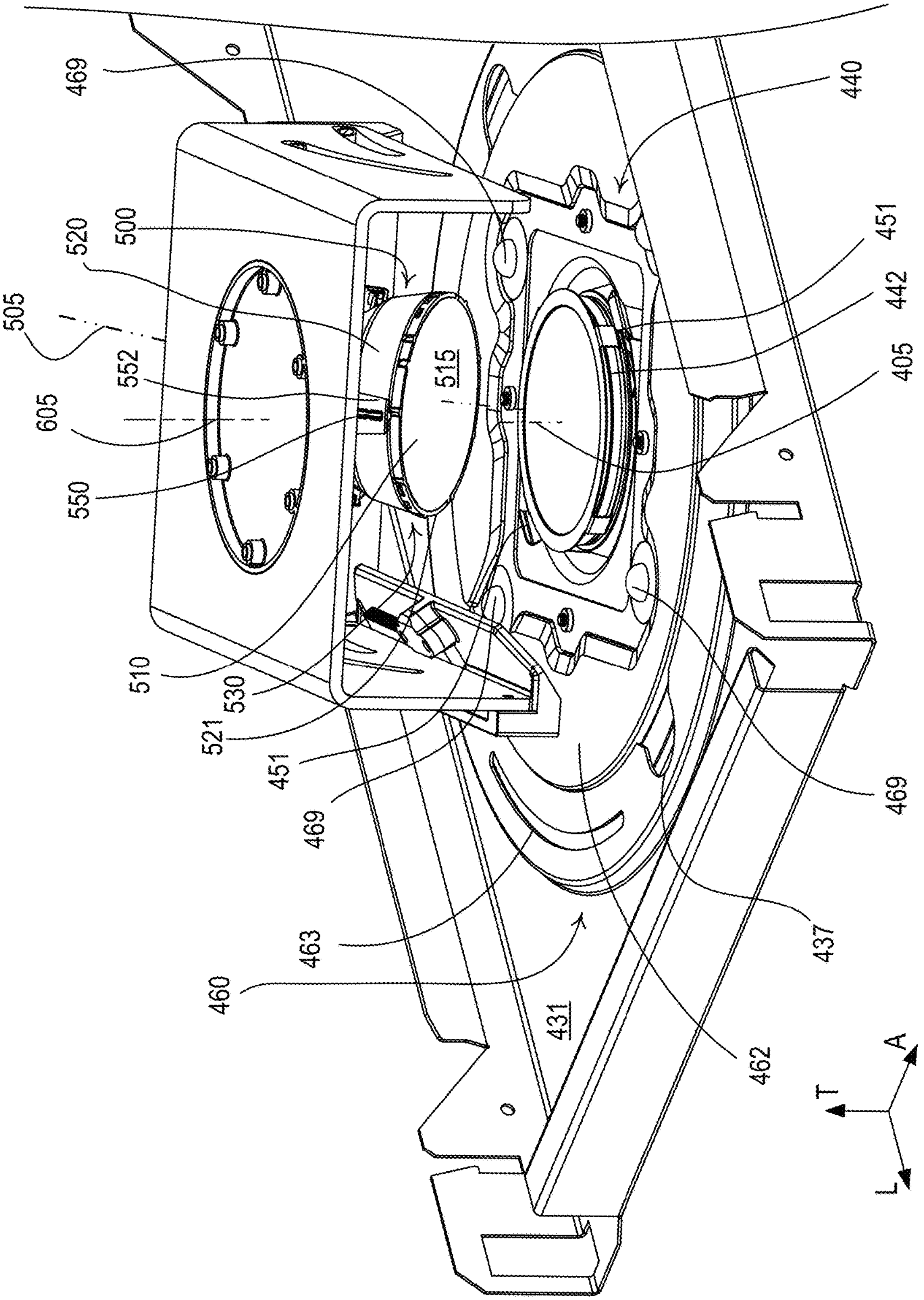
FIG. 15 is a partial perspective view of the lighting device of FIG. 11 with side plates and an upper plate of the housing removed.
Figure 16:
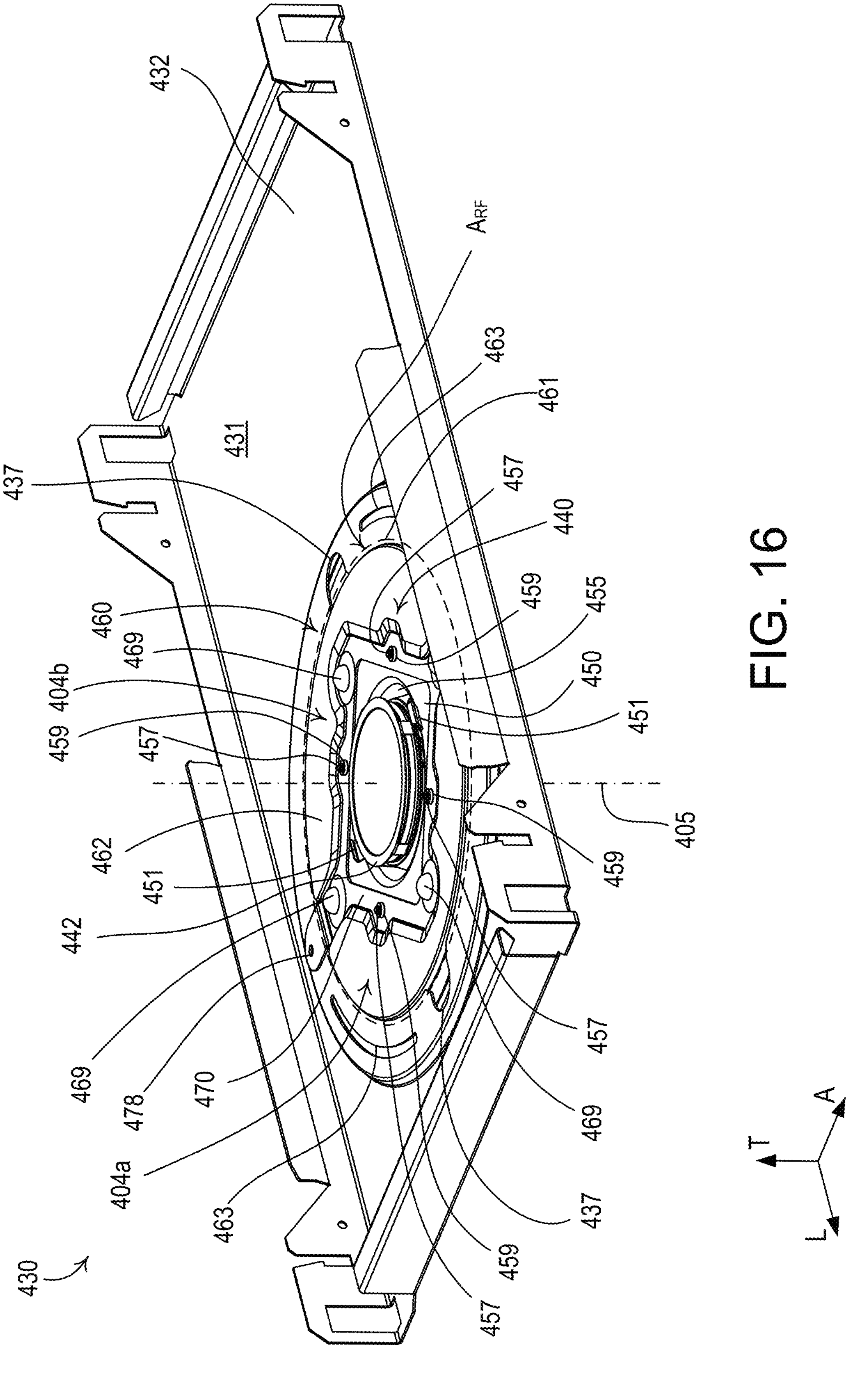
FIG. 16 is a perspective view of the lighting device of FIG. 11 with the side plates, the upper plate, the lighting device assembly, and an armature of the lighting device removed.
Figure 17:
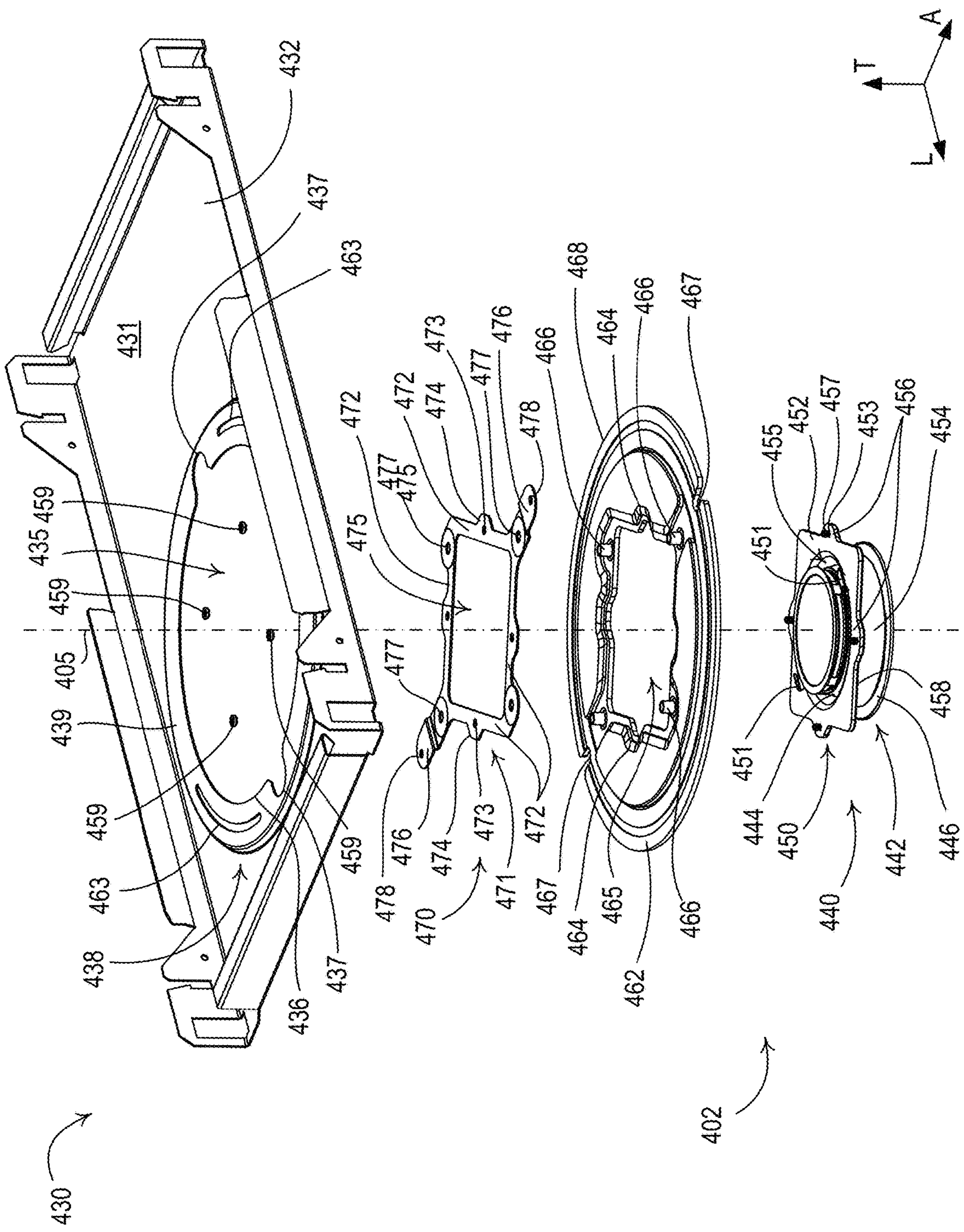
FIG. 17 is an exploded view of the lighting device of FIG. 11 with the side plates, the upper plate, the lighting device assembly, and the armature of the lighting device removed.

FIGS. 11-17 depict another example illumination device, such as a lighting device 400 (e.g., a controllable LED lighting device). The lighting device 400 may be configured to be installed within a building structure (e.g., such as a ceiling, wall, etc.). The lighting device 400 may include a housing 410, a lighting device assembly 500, and an armature 600 for supporting the lighting device assembly 500. FIG. 11 is a bottom perspective view of the lighting device 400. FIG. 12A is an exploded perspective view of the housing 410 of the lighting device 400. FIG. 13 is a side cross-section view of the lighting device 400 (e.g., taken through the center of lighting device assembly 500 and the armature 600) when the lighting device assembly 500 is in a centered position. FIG. 14 is another side cross-section view of the lighting device 400 when the lighting device assembly 500 is in an adjusted position (e.g., tilted and rotated). The housing 410 may include an upper portion 420 having an upper plate 422 and a plurality of side plates 424*a*, 424*b*, 424*c*, 424*d* (e.g., four side plates). The housing 410 may also include a lower portion 430 comprising a lower plate 432 configured to be attached to the upper portion 420. FIG. 15 is a partial perspective view of the lighting device 400 with the upper portion 420 of the housing 410 removed. FIG. 16 is a perspective view of the lower portion 430 of the housing 410. FIG. 17 is an exploded view of the lower portion 430 of the housing 410.

The housing 410 may be configured to enclose the lighting device assembly 500. For example, the housing 410 may define a cavity 412. The lighting device assembly 500 may be configured to be located (e.g., housed) within the cavity 412. The housing 410 may be configured to be installed within the building structure. The upper plate 422 may define an upper surface 421 and a lower surface 423, and may be located in a plane that extends in a longitudinal direction L and a lateral direction A. The lower plate 432 may define an upper surface 431 and a lower surface 433, and may be located in a plane that extends in the longitudinal direction L and the lateral direction A. The side plates 424*a*-424*d* may extend between the upper plate 422 and the lower plate 432 (e.g., in a transverse direction T). The lower plate 432 may be metallic (e.g., at least partially metallic). The cavity 412 may be defined by the upper plate 422, the side plates 424*a*-424*d*, and the lower plate 432.

The housing 410 may comprise one or more attachment structures 480 (e.g., as shown in FIG. 11). For example, the attachment structures 480 may be located at each corner (e.g., the four lower corners) of the housing 410. FIG. 12B is a perspective cross-section view of a portion (e.g., one of the inside corners) of the housing 410 when assembled showing one of attachment structures 480 (e.g., as viewed from inside of the cavity 412 of the housing 410). Each attachment structure 480 may comprise an attachment member 481 at the end of a respective arm 482 (e.g., a spring arm). For example, the arms 482 of the attachment member 481 may be formed in (e.g., cut into) the side plates 424*b*, 424*d* of the upper portion 420 of the housing 410. The attachment member 481 of each attachment structure 480 may extend through a respective opening 483 in the side plates 424*a*, 424*c* (e.g., that are adjacent to the side plates 424*b*, 424*d* in which the arms 482 are formed). The attachment member 481 of each attachment structure 480 may comprise a first portion 484 (e.g., a first plate) that extends through the respective opening 483 and a second portion 485 (e.g., a second plate) that extends perpendicular to the first portion 484 (e.g., parallel to the side plates 424*a*, 424*c* in which the openings 483 are formed). For example, each attachment member 481 may be bent to form the first portion 484 and the second portion 485.

The lower portion 430 of the housing 410 may comprise sidewalls 425 that extend from the upper surface 431 of the lower plate 432 (e.g., in the transverse direction T). When the housing 410 is assembled (e.g., when the lower portion 430 is attached to the upper portion 420), the sidewalls 425 of the lower portion 430 may extend parallel to the side plates 424*a*, 424*c* of the upper portion 420 within the cavity 412 of the housing 410. The attachment structures 480 of the housing 410 may further comprise respective attachment plates 486 formed in the sidewalls 425. For example, each sidewall 425 may comprise two attachment plates 486 (e.g., as shown in FIG. 12A). Each of the attachment plates 486 may be configured to be attached to a respective attachment member 481 of the upper portion 420 of the housing 410. For example, each attachment plate 486 may define a respective slot 487 having a snap 488. The slot 487 of each attachment plate 486 is configured to receive the first portion 484 of the respective attachment member 481. When the housing 410 is assembled, the snap 488 of each attachment plate 486 may be configured to engage the first portion 484 of each attachment member 481 to hold the lower portion 430 in attachment to the upper portion 420 of the housing 410. The second portion 485 of each attachment member 481 may extend around (e.g., parallel to) the respective attachment plate 486 when the housing 410 is assembled (e.g., as shown in FIG. 11).

To install the lower portion 430 onto the upper portion 420 of the housing 410, the attachment members 481 (e.g., the first portions 484) may be inserted into the slots 487 of the respective attachment plates 486 (e.g., in the transverse direction T). As the attachment members 481 (e.g., the first portions 484) contact the snaps 488 of the respective slots 487, the arms 482 in the upper portion 420 may be configured to flex (e.g., in towards the cavity 412 of the housing 410). When the attachment members 481 pass the respective snaps 488, the arms 482 may be configured to unflex (e.g., at least partially unflex), such that the attachment members 481 are captured by the respective snaps 488. For example, the arms 482 may be partially biased towards the cavity 412 (e.g., partially flexed) when the respective attachment members 481 are received in the slots 487 and captured by the snaps 488 of the respective attachment plates 486. The engagement between the attachment members 481 and the respective snaps 488 may minimize movement of the lower portion 430 with respect to the upper portion 420 in the transverse direction T. To uninstall the lower portion 430 from the upper portion 420 of the housing 410, a user may actuate one or more of the attachment members 481 to push the attachment member 481 towards the sidewalls 425 (e.g., in the longitudinal direction L), such that the attachment members 481 are not captured by the respective snaps 488 and may be moved past the respective snaps 488 (e.g., in the transverse direction T).

The lower portion 430 of the housing 410 may further comprise sloped walls 426 (e.g., wing portions) extending from the respective sidewalls 425. When the housing 410 is assembled (e.g., when the lower portion 430 is attached to the upper portion 420), the sloped walls 426 may extend into the cavity 412 of the housing 410. The sloped wall 426 may be configured to facilitate installation of the lower portion 430 onto the upper portion 420 of the housing 410, for example, by being received on inner sides of the side plates 424*a*, 424*c* of the upper portion 420 as the lower portion 430 is moved towards the upper portion 420 (e.g., in the transverse direction T). When the housing 410 is assembled, the sloped walls 426 may be received in slots 427 in the respective side plates 424*a*, 424*c* of the upper portion 420 of the housing 410, such that the sloped walls 426 may be captured between side edges 428 of the slots 427. Engagement between the sloped wall 426 and the side edges 428 of the slots 427 when the housing 410 is assembled may minimize movement of the lower portion 430 with respect to the upper portion 420 in the longitudinal direction L and the lateral direction A.

The lower plate 432 may comprise a recessed portion 438 that extends above the upper surface 431 (e.g., as shown in FIG. 12). The lower plate 432 (e.g., the lower surface 433) may comprise an outer opening 434 (e.g., as shown in FIG. 11). The recessed portion 438 may be located within an area of the outer opening 434. The recessed portion 438 may comprise a rim portion 439 that surrounds an inner opening 435 of the lower plate 432. The rim portion 439 of the recessed portion 438 may be positioned in a plane that is parallel to a plane of the upper surface 431 and/or the lower surface 433 of the lower plate 432. The recessed portion 438 of the lower plate 432 may extend from the outer opening 434 (e.g., at the lower surface 433) to the inner opening 435 (e.g., at the rim portion 439).

The lighting device assembly 500 may comprise an optical structure 510 (e.g., a lens), a reflector 520, and a light-generation module 530 (e.g., as shown in FIG. 14). The lighting device 400 (e.g., the light-generation module 530) may be configured to be wirelessly controllable (e.g., controlled in response to commands received via wireless signals). The light-generation module 530 of the lighting device assembly 500 may be configured to emit light and communicate messages (e.g., digital messages) via wireless signals. The light-generation module 530 may include a printed circuit board 532, a heat sink 534, a socket 536, an antenna 550 (e.g., a monopole antenna), and an antenna holder 552. The light-generation module 530 may include an emitter assembly (e.g., such as emitter assembly 1800 shown in FIGS. 57 and 58) that includes one or more emitters configured to emit the light. The emitter assembly may be mounted to the printed circuit board 532. The light-generation module 530 may include a communication circuit (e.g., a wireless communication circuit), such as communication circuit 1944 shown in FIG. 59, that may be mounted to the printed circuit board 532 and may be in electrical communication with (e.g., electrically coupled to) the antenna 550 for receiving and/or sending messages (e.g., via wireless signals). For example, the wireless communication circuit of the light generation module 530 may be configured to communicate the wireless signals at a communication frequency $f_{COMM}$ (e.g., approximately 2.4 GHz).

The optical structure 510 of the lighting device assembly 500 may be transparent or translucent, and may be made of any suitable material, for example plastic or glass. The optical structure 510 may be configured to direct the light emitted by the emitter assembly to shine through a light-exit portion 515 (e.g., a light-exit surface) of the optical structure 510. The reflector 520 of the lighting device assembly 500 may be configured to direct the light emitted by the emitter assembly to shine out through the optical structure 510. The reflector 520 may include an inner surface 526 and an outer surface 528. The reflector 520 may define a first opening (e.g., such as the first opening 222 shown in FIG. 10) at a first end 521 of the reflector 520 and a second opening 524 at a second end 523 of the reflector 520. The first end 521 of the reflector 520 may be located adjacent to the emitter assembly such that the emitter assembly emits light through the first opening. The reflector 520 may be configured to reflect the light emitted by the emitter assembly towards the second opening 524. For example, the inner surface of the reflector 520 may include a reflective material. The lighting device assembly 500 may define an axis 505 that extends through a center of the lighting device assembly 500 (e.g., in the transverse direction T when the lighting device assembly 200 is in the centered position as shown in FIG. 13). For example, the axis 505 may extend through a center of the reflector 520 (e.g., the first opening and the second opening 524) and the optical structure 510 of the lighting device assembly 500.

The reflector 520 may be at least partially metallic. For example, the inner surface 526 of the reflector 520 may be at least partially metallic. The antenna 550 may be positioned external to the reflector 520 such that the antenna 550 is spaced a predetermined distance from the outer surface 528 of the reflector 520. For example, the antenna 550 may extend external to the reflector 520 from a location adjacent to the first end 521 of the reflector 520 towards the second end 523 of the reflector 520. As with the antenna holder 252 of the light-generation module 230 shown in FIG. 9A, the antenna holder 552 may be configured to hold the antenna 550 external to the reflector 520 such that the antenna 550 is spaced the predetermined distance from the outer surface 528 of the reflector 520 (e.g., such as the first distance D1 as shown in FIG. 9A). The antenna holder 552 may be configured such that the antenna 550 extends beyond the second end 523 of the reflector 520 (e.g., by the second distance D2 as shown in FIG. 9A) and the antenna holder 552 extends beyond the second end 523 of the reflector 522 (e.g., by the third distance D3 as shown in FIG. 9A). In some examples, the antenna 550 and the antenna holder 552 may not extend beyond the second end 523 of the reflector 520. The socket 536 of the light-generation module 530 may be located between the reflector 520 and the printed circuit board 532. For example, the socket 536 may be attached to the heat sink 534 to at least partially enclose the components mounted to the printed circuit board 532. The antenna holder 552 may extend from the socket 536 and/or the printed circuit board 532. The socket 536 may be configured to removably secure the reflector 520 to the light-generation module 530.

The housing 410 may comprise a trim portion 440. The trim portion 440 may be configured to be located within the inner opening 435 in the lower plate 432 of the housing 410 (e.g., and also within the outer opening 434). The trim portion 440 may include a trim ring 442 and a collar 450. The trim ring 442 may include a sleeve 444, a bezel 446 (e.g., a flange), and a bottom surface 448 (e.g., a bottom surface of the bezel 446). The trim portion 440 (e.g., the trim ring 442) may define an aperture 445 through which the light emitted by the light-generation module 530 may be transmitted. The aperture 445 may be located in a plane that extends in the longitudinal direction L and the lateral direction A at the bottom surface 448 of the trim ring 442. The aperture 445 may have, for example, a circular shape (e.g., may be a circle). For example, the aperture 445 may have a diameter of approximately two inches. For example, the trim ring 442 may comprise a single-part construction. In some examples, the trim ring 442 may comprise a two-part construction (e.g., including a trim insert and a trim retainer, such as the trim insert 141 and the trim retainer 143 shown in FIG. 7).

The collar 450 may be configured to be installed within the inner opening 435 in the lower plate 432. The inner opening 435 may define an inside edge 436 that may surround the trim portion 440. The collar 450 may include a flange portion 452 and a ring portion 454. The collar 450 may define an aperture 455 through which the light emitted by the light-generation module 530 may be transmitted. The ring portion 454 (e.g., the aperture 455) of the collar 450 may be configured to receive at least a portion of the trim ring 442. For example, the trim ring 442 may be configured to extend through the aperture 455 of the collar 450. The collar 450 (e.g., the flange portion 452) may define a plurality of tabs 456. The collar 450 may support the trim ring 442, such that the sleeve 444 is at least partially received by the ring portion 454. For example, the trim portion 440 may comprise clips 451 that extend from the sleeve 444 and are configured to clip onto the ring portion 454 (e.g., the aperture 455) of the collar 450 for securing the trim ring 442 to the collar 450. The trim portion 440 may define an axis 405 that extends through a center of the aperture 445. For example, the axis 405 may extend through a center of the trim ring 442 and the collar 450 of the trim portion 440. The trim portion 440 (e.g., the flange portion 452 of the collar 450) may define a rectangular outer edge 458. It should be appreciated that the trim portion 440 is not limited to the geometry shown in the figures, instead the trim portion 440 (e.g., the flange portion 452 of the collar 450) may define a circular outer edge. In some examples, the bezel 446 (e.g., the bottom surface 448) of the trim ring 442 may be thin (e.g., not configured as a flange) to present a knife-edge appearance when the lighting device 400 is installed.

The housing 410 may comprise an RF-transparent portion 460 (e.g., an electrically-non-conductive portion) that may be configured to enable the wireless signals to be transmitted and/or received via the antenna 550 of the light-generation module 530 through the inner opening 435 of the lower plate 432 of the housing 410. The housing 410 may include a non-conductive plate 462 that may be made from a material that does not obstruct or significantly obstruct the propagation of an electromagnetic field and/or electromagnetic waves (e.g., the wireless signals), such as an electrically-non-conductive material (e.g., plastic). The non-conductive plate 462 (e.g., at least a portion of the non-conductive plate 462) may be received within the outer opening 434 of the lower plate 432 of the housing 410 (e.g., within the recessed portion 438). For example, the non-conductive plate 462 may have an outer edge 468 configured to be located within the outer opening 434 of the lower plate 432 of the housing 410 (e.g., within the recessed portion 438). The non-conductive plate 462 may cover the inner opening 435 of the lower plate 432 of the housing 410 (e.g., at least a portion of the inner opening 435).

The inner opening 435 of the lower plate 432 may be sized, for example, to enable the wireless control signals to be transmitted and/or received therethrough. The RF-transparent portion 460 may be characterized by a perimeter 461 having an area $A_{RF}$ and a diameter $D_{RF}$ (e.g., as shown in FIGS. 11 and 16). The perimeter 461 of the RF-transparent portion 460 may be defined by the opening 435 in the lower plate 432 of the housing 430. For example, the size of the RF-transparent portion 460 may be based on the diameter of the opening 435 of the lower plate 432. The RF-transparent portion 460 of the housing 410 may include at least a portion of the non-conductive plate 462 (e.g., the portion of the non-conductive plate 462 within the perimeter 461). The diameter $D_{RF}$ of the RF-transparent portion 460 (e.g., of the perimeter 461) may be, for example, approximately equal to a diameter of the inner opening 435 of the lower plate 432 (e.g., as shown in FIG. 12). The inner opening 435 of the lower plate 432 may be sized (e.g., to set the area $A_{RF}$ and/or the diameter $D_{RF}$ of the RF-transparent portion 460) so as to enable the wireless control signals to be transmitted and/or received through the inner opening 435 when the lighting device assembly 500 is in a centered position (e.g., as shown in FIG. 13) and/or when the lighting device assembly 500 is the adjusted position (e.g., rotated and/or tilted within the housing 110 as shown in FIG. 14). For example, the diameter $D_{RF}$ of the RF-transparent portion 460 (e.g., the diameter of the inner opening 435 of the lower plate 432) may be approximately 7 inches. Although the RF-transparent portion 460 (e.g., and the non-conductive plate 462) is shown in the drawings as having a circular shape, it should be appreciated that the RF-transparent portion 460 (e.g., and the non-conductive plate 462) may define alternate shapes for example, such as an oval shape, an elliptical shape, a rectangular shape, a square shape, a polygon shape, etc.

The centered position of the lighting device assembly 500 may be defined as the optical structure 510 being aligned with the aperture 445 of the trim portion 440. For example, the axis 505 of the lighting device assembly 500 may be substantially parallel to and/or co-linear with the axis 405 that extends through the center of the aperture 445 when the lighting device assembly 500 is in the centered position. The adjusted position may be defined as any position where the optical structure 510 is misaligned with the aperture 445. For example, the axis 505 of the lighting device assembly 500 may not be parallel to and/or co-linear with the axis 405 that extends through the center of the aperture 445 when the lighting device assembly 500 is in an adjusted position. The RF-transparent portion 460 (e.g., the non-conductive plate 462) may be configured to enable the transmission of the wireless control signals to and/or from the antenna 550 of the light-generation module 530 whether the light-generation module 530 is aligned with or misaligned with the aperture 445.

The non-conductive plate 462 of the housing 410 may be configured to cover at least a portion of the inner opening 435 between the trim portion 440 (e.g., the collar 450) and the rim portion 439 of the recessed portion 438 of the lower plate 432. The perimeter 461 of the RF-transparent portion 460 may surround the trim portion 440. For example, the non-conductive plate 462 of the housing 410 may extend radially outward from the collar 450 towards the inside edge 436 of the lower plate 432 that defines the inner opening 435 (e.g., and also towards the outer opening 434) and past the inside edge 436 of the inner opening 435. The non-conductive plate 462 may be configured to be substantially parallel to the lower plate 432 of the housing 410. The rim portion 439 of the lower plate 432 may comprise slots 463 (e.g., curved slots) for securing the trim portion 440 to the housing 410 (e.g., as will be described in greater detail below). When the diameter of the aperture 445 of the trim portion 440 is two inches, for example, and the transmission frequency $f_{COMM}$ is 2.4 GHZ, the aperture 445 may obstruct, block, redirect, and/or attenuate propagation of wireless signals through the aperture 445. The RF-transparent portion 460 (e.g., at least the portion of the RF-transparent portion 460 of the housing 410 covering the portion of the inner opening 435 between the trim portion 440 and the lower plate 432 of the housing 410) may provide additional area on the housing to reduce attenuation of, blocking of, and/or redirecting of the transmission and/or reception of the wireless signals through the housing 410 (e.g., as will be described in greater detail below).

The non-conductive plate 462 may define an opening 465 through which the trim portion 440 is configured to extend. For example, the opening 465 of the non-conductive plate 462 may be configured to receive (e.g., support) the collar 450. The non-conductive plate 462 may define posts, such as unformed stakes 466, which may be used for mounting the non-conductive plate 462 to the housing 410 (e.g., as will be described in greater detail below). The flange portion 452 of the collar 450 may abut the non-conductive plate 462 (e.g., at the opening 465). The opening 465 of the non-conductive plate 462 may have a rectangular (e.g., square) shape (e.g., to receive the rectangular outer edge 458 of the flange portion 452 of the collar 450). The non-conductive plate 462 may be configured to be secured proximate to the inner opening 435 (e.g., between the inside edge 436 of the lower plate 432 and the trim portion 440). The non-conductive plate 462 (e.g., the opening 465 of the non-conductive plate 462) may define a plurality of notches 464. Each of the plurality of notches 464 may be configured to receive a respective one of the tabs 456 on the flange portion 452 of the collar 450. The notches 464 and the tabs 456 may be configured to maintain alignment of the trim portion 440 within the non-conductive plate 462 (e.g., and within the inner opening 435 of the lower plate 432 of the housing 410). The collar 450 may define holes 453 in each of the tabs 456 that are used for mounting the collar 450 to the housing 410 (e.g., as will be described in greater detail below).

In some examples, the aperture 445 of the trim portion 440 may have a rectangular (e.g., a square) shape. When the aperture 445 has a rectangular (e.g., a square) shape, the non-conductive plate 462 may be configured to support a collar that also has a rectangular (e.g., square) aperture in which the trim portion with the rectangular aperture may be received, for example, when the aperture 145 of the trim portion 140 is rectangular. The collar having the rectangular aperture may also comprise a flange (e.g., such as the flange portion 452) that defines a rectangular outer edge (e.g., such as the rectangular outer edge 458), wherein the rectangular aperture may fit within an area defined by the rectangular outer edge. Accordingly, the non-conductive plate 462 (e.g., the opening 465) may be configured to receive (e.g., support) trim portions having both circular and rectangular apertures.

The lighting device 400 (e.g., the housing 410) may include, for example, a cover assembly 402. The cover assembly 402 may include the trim portion 440 (e.g., the trim ring 442 and the collar 150), the non-conductive plate 462, and a support structure 470. The support structure 470 may be configured to support the trim portion 440 within the opening 465 of the non-conductive plate 462 (e.g., within the inner opening 435 of the lower plate 432). The support structure 470 may be configured to connect the trim portion 440 to the non-conductive plate 462. The support structure 470 may include a support bracket 471. The support structure 470 (e.g., the support bracket 471) may extend across the inner opening 435 in the lower plate 432 of the housing 410. The support structure 470 may be configured to abut the trim portion 440 and/or the non-conductive plate 462 when supporting the trim portion 440 in the opening 465 of the non-conductive plate 462. Depending on the material, the support structure 470 may adversely impact (e.g., attenuate, block, obstruct, and/or redirect) communication/propagation of the wireless control signals through the RF-transparent portion 460 (e.g., through the non-conductive plate 462), for example, because the support structure 470 may obstruct (e.g., block) and/or redirect or attenuate a portion of the wireless signals. The overall size of the support structure 470 may be minimized to avoid interference with the wireless control signals, but also be large enough to appropriately support the trim portion 440.

The area $A_{RF}$ of the RF-transparent portion 460 (e.g., within the perimeter 461) may be characterized by one or more portions that are unobstructed by metallic components, such as the lower plate 432 and the support structure 470. For example, the area $A_{RF}$ of the RF-transparent portion 460 may include a first unobstructed portion 404*a* that is bounded by the inner opening 435 of the lower plate 432 (e.g., the perimeter 461 of the RF-transparent portion 460) and the support structure 470 (e.g., on one side of the support structure 470) and a second unobstructed portion 404*b* that is bounded by the inner opening 435 of the lower plate 432 (e.g., the perimeter 461 of the RF-transparent portion 460) and the support structure 470 (e.g., on the other side of the support structure 470). The first and second unobstructed portions 404*a*, 404*b* may each be characterized by multiple dimensions, such as chords (e.g., linear lengths, such as the chords 106 of the first and second unobstructed portions 104*a*, 104*b* shown in FIG. 6) that extend between opposing sides or edges that define the shape of the first and second unobstructed portions 404*a*, 404*b*. Some of the chords may have different lengths. The chords of the first and second unobstructed portions 404*a*, 404*b* may extend in multiple directions in the same plane of the lower plate 432 of the lower portion 430 of the housing 410 (e.g., extending in the longitudinal direction L and the lateral direction A). The chords of the first and second unobstructed portions 404*a*, 404*b* may have respective lengths that enable RF signals to propagate through the first and second unobstructed portions 404*a*, 404*b* with reduced attenuation, reduced blocking, and/or reduced obstruction. For example, to enable propagation of the RF signals through the first and second unobstructed portions 404*a*, 404*b* of the RF-transparent portion 460 at the communication frequency $f_{COMM}$ of 2.4 GHz, the lengths of multiple chords of each of the first and second unobstructed portions 404*a*, 404*b* may be greater than or equal to approximately three inches (e.g., where the length of 3 inches is based on the communication frequency $f_{COMM}$). One will appreciate that if a different value of the communication frequency $f_{COMM}$ were used to transmit the wireless signals, the size of the first and second unobstructed portions 404*a*, 404*b* (e.g., the lengths of the chords) may be configured according to that value of the communication frequency $f_{COMM}$. In short, the shape and size of planar surface of the first and second unobstructed portions 404*a*, 404*b* may be configured such that multiple chords can be "drawn" in the planer surface having lengths based on the value of the communication frequency $f_{COMM}$. In this fashion, the RF-transparent portion 460 may enable improved communications (e.g., reduction attention of, obstruction of, and/or blocking of the wireless signals).

The support structure 470 (e.g., the support bracket 471) may define sides 472 and extensions 476 extending from opposed corners of the sides 472. Each of the sides 472 may define a tab 474 that is configured to align with the tabs 456 of the collar 450. The sides 472 of the support bracket 471 may be connected together to define an opening 475 of the support structure 470. The support structure 470 may define holes 473 in each of the tabs 474 that are configured to secure the trim portion 440 to the housing 410. For example, fasteners 457 (e.g., screws) may be received through the holes 453 in the collar 450 and the holes 473 in the support structure 470 for securing the support structure 470 to the trim portion 440 (e.g., to the collar 450). In addition, nuts 459 may be attached to the fasteners 457 for securing the support structure 470 to the trim portion 440 (e.g., to the collar 450). The extensions 476 may define holes 477 that are configured to secure the support structure 470 to the non-conductive plate 462 (e.g., as shown in FIG. 17). For example, the unformed stakes 466 of the non-conductive plate 462 may be received through the holes 477 of the support structure 470 and formed (e.g., heated and/or melted as part of a heat-staking process) to produce formed stakes 469 (e.g., as shown in FIG. 16) for securing the support structure 470 to the non-conductive plate 462. The opening 475 of the support structure 470 may be aligned with the opening 465 of the non-conductive plate 462 when the support structure 470 is secured to the non-conductive plate 462.

The non-conductive plate 462 may support the trim portion 440 within the inner opening 435 of the lower plate 432 of the housing 410. The trim portion 440 (e.g., the collar 450) may be attached to the non-conductive plate 462 (e.g., via the heat-staking process) and the support structure 470 may be attached to the trim portion 440 (e.g., the collar 450), for example, prior to installation of the cover assembly 402 in the housing 410. The lower plate 432 may define notches 437 around the inner opening 435. The notches 437 may allow for insertion of the cover assembly 402 (e.g., the support structure 470 when already attached to trim portion 440, which is attached to the non-conductive plate 462) into the housing 410. For example, the cover assembly 402 (e.g., the non-conductive plate 462) may be oriented substantially parallel to the lower plate 432 and the extensions 476 of the support structure 470 may be inserted through the notches 437. After the extensions 476 of the support structure 470 are inserted through the notches 437, the cover assembly 402 (e.g., the non-conductive plate 462) may be rotated such that the extensions 476 of the support structure 470 move away from the notches 437 and the rim portion 439 of the recessed portion 438 may be captured between the extensions 476 of the support structure 470 and the non-conductive plate 462. The extensions 476 of the support structure 470 may be configured to rest on the rim portion 439 to support the non-conductive plate 462 within the recessed portion 438 of the lower plate 432 (e.g., within the outer opening 434 and covering the inner opening 435 of the lower plate 432).

After the extensions 476 of the support structure 470 are resting on the rim portion 439 of the lower plate 432 and the non-conductive plate 462 is positioned within the recessed portion 438 of the lower plate 432, the cover assembly 402 (e.g., the non-conductive plate 462) may be rotated to appropriately orient the trim portion 440 in the space in which the lighting device 400 is installed (e.g., which may be particularly important when the trim portion has a rectangular opening). The extensions 476 of the support structure 470 may comprise holes 478 though which fasteners (e.g., screws—not shown) may be received for securing the cover assembly 402 (e.g., the trim portion 440, the non-conductive plate 462, and the support structure 470) to the housing 410. The non-conductive plate 462 may comprise notches 467 through which the fasteners that are received in the holes 478 in the support structure 470 may extend while the cover assembly 402 (e.g., the support structure 470) is being secured to the housing 410. When the support structure 470 is attached to the non-conductive plate 462, the notches 467 in the non-conductive plate 762 may be aligned with the holes 478 in the support structure 470. After the extensions 476 of the support structure 470 are inserted through the notches 437 in the rim portion 439 of the lower plate 432, the cover assembly 402 (e.g., the non-conductive plate 462) may be rotated slightly and the extensions 476 of the support structure 470 may rest on the rim portion 439 of the lower plate 432. The cover assembly 402 (e.g., the non-conductive plate 462) may be rotated such that the holes 478 are aligned with the slots 463 in the rim portion 439 of the lower plate 432. The fasteners may then be inserted through the notches 467 in the non-conductive plate 462, through the respective slots 463 in the rim portion 439 of the lower plate 432, and into the holes 478 of the support structure 470 (e.g., in the transverse direction T from the bottom of the lighting device 400). When the fasteners are extending through the respective slots 463 and installed in the holes 478 but are not fully tightened, the cover assembly 402 (e.g., the non-conductive plate 462) may be rotated to appropriately orient the trim portion 440 within the inner opening 435. As the cover assembly 402 (e.g., the non-conductive plate 462) is rotated, the fasteners may move through the respective slots 463 and contact ends of the respective slots 463 to limit rotation of the cover assembly 402 (e.g., prevent full rotation of the cover assembly 402). When the trim portion 440 is oriented appropriately, the fasteners may be tightened to secure the cover assembly 402 (e.g., the trim portion 440, the non-conductive plate 462, and the support structure 470) in place.

Additionally or alternatively, although not shown in the figures, it should be appreciated that the support structure 470 may be attached to the upper plate 422 and/or one or more of the side plates 424*a*-424*d*. Although the support structure 470 is shown in the figures as a separate component of the lighting device 400, it should be appreciated that the support structure 470 may be formed as part of the lower plate 432 of the housing 410, for example, such that the inner opening 435 comprises two aperture portions. When the inner opening 435 comprises two opening portions, the RF-transparent portion 460 may comprise a first non-conductive plate and a second non-conductive plate that are located in respective opening portions of the inner opening 435. The first and second non-conductive plates within the respective opening portions of the inner opening 435 may fall within the area $A_{RF}$ of the RF-transparent portion 460, such that the diameter $D_{RF}$ of the RF-transparent portion 460 is approximately equal to a diameter of the outermost edges of the opening portions of the inner opening 435. In one or more other examples, the inner opening 435 may comprise three or four opening portions, and the RF-transparent portion 460 may comprise three or four non-conductive plates, respectively.

The armature 600 of the lighting device 400 may be attached to the housing 410. The armature 600 may be configured to support the lighting device assembly 500 within the housing 410 above the inner opening 435 in the lower plate 432 of the housing 410, for example, such that the light emitted by the light-generation module 530 may shine through the aperture 445 of the trim portion 440 and wireless control signals transmitted by the light-generation module 530 may be transmitted through the inner opening 435 (e.g., through the non-conductive plate 462 and/or the aperture 445 of the trim portion 440). The armature 600 may be configured to enable tilting and rotation of the lighting device assembly 500 within the housing 410 such that the light emitted by the light-generation module 530 is directed through the trim portion 440 (e.g., the aperture 445) at a plurality of angles and directions. For example, the lighting device assembly 500 may be tilted from 0 degrees to approximately 40 degrees with respect to the trim portion 440. Although the figures show the armature 600 attached to the upper plate 422 of the housing 410, it should be appreciated that the armature 600 could be attached to the lower plate 432 or one or more of the side plates 424*a*-424*d*.

Figure 18:
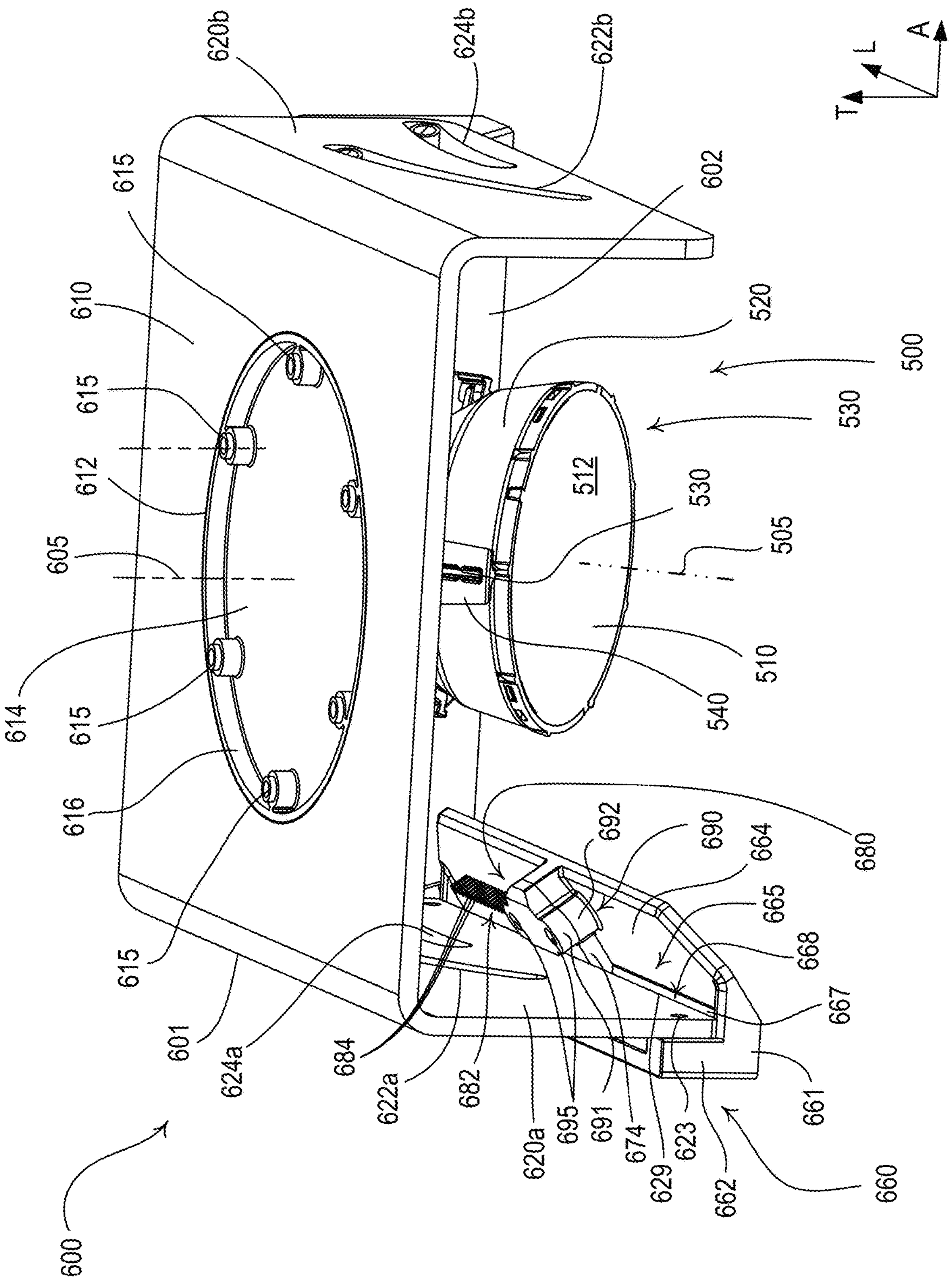
FIG. 18 is a perspective view of the armature of the lighting device of FIG. 11.

FIGS. 18-20B depict the armature 600 of the lighting device 400. FIG. 18 is a perspective view of the armature 600. The armature 600 may include a first portion 601 and a second portion 602. The lighting device assembly 500 may be coupled to the second portion 602 of the armature 600. FIG. 19A is a side view of the armature 600 with the second portion 602 in a first position (e.g., such that the lighting device assembly 500 is in a first position, such as a centered or downward-facing position). FIG. 19B is a side view of the armature 600 with the second portion 602 in a second position (e.g., such that the light devices assembly 500 is in a second position, such as an adjusted or angled position). FIG. 20A is an exploded view of the armature 600.

The first portion 601 may comprise a base plate 610 and two side plates 620*a*, 620*b* (e.g., side walls of the first portion 601) extending from the base plate 610 at opposing sides of the base plate 610. The first portion 601 (e.g., the base plate 610) may be coupled (e.g., rotatably coupled) to an upper portion of the housing 410 (e.g., such as the upper plate 422 of the housing 410 shown in FIGS. 13-14). The base plate 610 may define an opening 612 (e.g., a circular opening) that may be centered in the base plate 610. The armature 600 may define an axis 605 that extends through a center of the opening 612 in the base plate 610 of the first portion 601 (e.g., through a center of the base plate 610). For example, the first portion 601 may be coupled to the upper plate 422 of the housing 410, such that the axis 605 of the armature 600 is aligned with the axis 405 that extends through the center of the aperture 445 of the trim portion 440 (e.g., as shown in FIG. 15).

The armature 600 may comprise a mounting member 614 that is configured to secure the armature 600 to the housing 410. The mounting member 614 may be attached (e.g., fixedly attached) to the upper plate 422 of the housing 410. For example, the mounting member 614 may define a plurality of holes 615. Each of the plurality of holes 615 may be configured to receive a respective one of a plurality of fasteners (e.g., screws—not shown) to secure the armature 600 to the housing 410. The fasteners may be configured to be received by corresponding holes 429 in the upper plate 422 of the housing 410 (e.g., as shown in FIG. 12A). The mounting member 614 may comprise a drum 616 (e.g., a cylindrical drum) and a flange 618. The drum 616 may be received through the opening 612 in the base plate 610 of the first portion 601. When the drum 616 is received though the opening 612 and the mounting member 614 is attached to the upper plate 422, the base plate 610 may be captured between the flange 618 and the upper plate 422 of the housing 410, and the first portion 601 of the armature 600 may be configured to rotate about the mounting member 614 with respect to the housing 410.

The second portion 602 of the armature 600 may comprise a body 630. The body 630 may comprise a mounting portion 632 (e.g., a shelf or plate portion) and a heat sink portion 634 that extends at least partially around the mounting portion 632, such that the body 630 defines a recess 635. The heat sink portion 634 may extend from a first side 636*a* to a second side 636*b* of the body 630 as the heat sink portion 634 wraps around the mounting portion 632. The mounting portion 632 of the body 630 of the second portion 602 may define a mounting surface 631 in the recess 635. The lighting device assembly 500 may be mounted to the mounting portion 632 (e.g., the mounting surface 631) of the body 630 of the second portion 602, such that the lighting device assembly 500 is received (e.g., at least partially received) in the recess 635 of the body 630. For example, the light-generation module 530 of the lighting device assembly 500 may comprise fasteners (e.g., such as the fasteners 235) that may be received through openings in the socket 536 (e.g., the openings 246 in the socket 236), openings in the heat sink 534 (e.g., the openings 254 in the heat sink 234), and openings 638 in the mounting portion 632 of the body 630. The heat sink portion 634 of the body 630 may be configured to operate as a heat sink. For example, the light-generation module 530 of the lighting device assembly 500 may be thermally-coupled to the heat sink portion 634 through the heat sink 534 of the lighting device assembly 500 and the mounting portion 632 of the body 630.

Figure 19A:
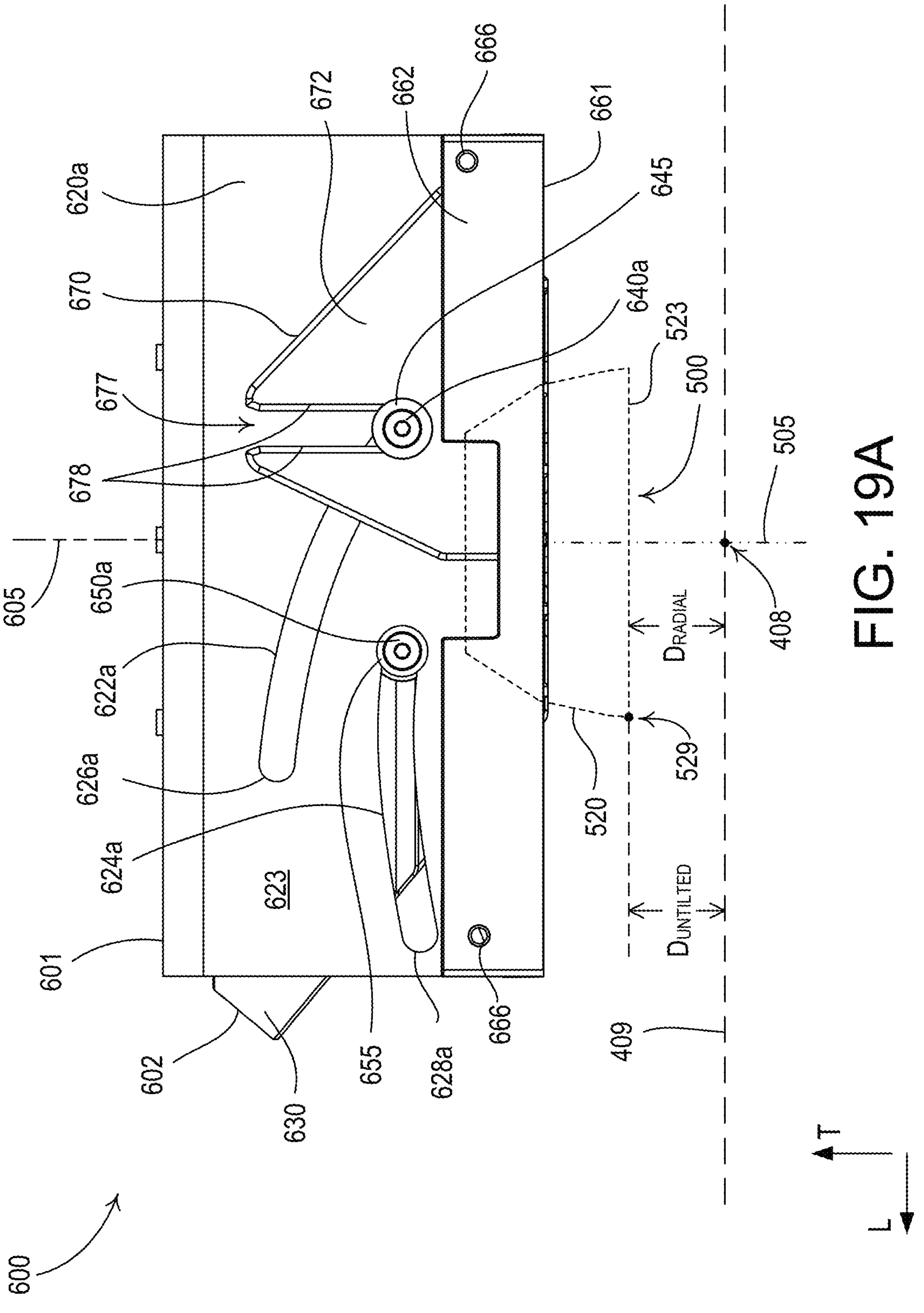
FIG. 19A is a side view of armature of the lighting device of FIG. 11 in a first position.
Figure 19B:
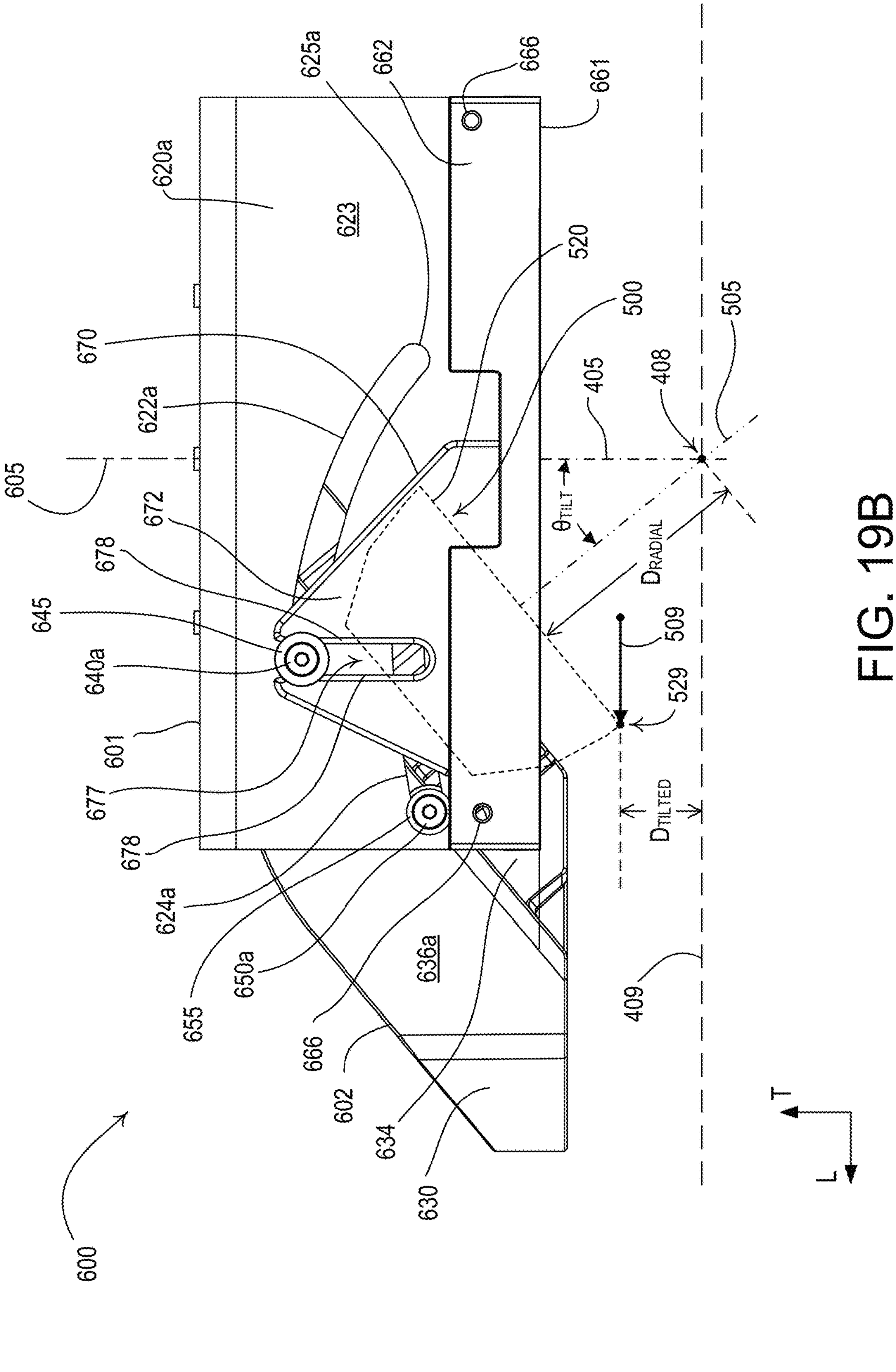
FIG. 19B is a side view of armature of the lighting device of FIG. 11 in a second position.

The second portion 602 may be tiltably (e.g., pivotably) coupled to the first portion 601 (e.g., tiltably coupled between the side plates 610*a*, 620*b*), such that the second portion 602 may be adjusted from the first position to the second position to adjust the lighting device assembly 500 from the first position to the second position (and vice versa). The second portion 602 may comprise sliding members 640*a*, 650*a*, 640*b*, 650*b* configured to be received in respective slots 622*a*, 624*a*, 622*b*, 624*b* in the side plates 620*a*, 620*b*. The sliding members 640*a*, 650*a*, 640*b*, 650*b* may be configured to travel through the respective slots 622*a*, 624*a*, 622*b*, 624*b* as the second portion 602 is adjusted between the first position and the second position. When the second portion 602 is in the first position, the sliding members 640*a*, 650*a*, 640*b*, 650*b* may be located at respective first ends 625*a*, 627*a*, 625*b*, 627*b* of the first and second slots 622*a*, 624*a*, 622*b*, 624*b* (e.g., as shown in FIG. 19A). When the second portion 602 is in the second position, the sliding members 640*a*, 650*a*, 640*b*, 650*b* may be located at respective second ends 626*a*, 628*a*, 626*b*, 628*b* of the first and second slots 622*a*, 624*a*, 622*b*, 624*b* (e.g., as shown in FIG. 19B). The heat sink portion 634 of the body 630 of the second portion 602 may tilt down towards the lower plate 432 as the second portion 602 is adjusted from the first position to the second position.

The sliding members 640*a*, 650*a*, 640*b*, 650*b* may extend from the body 630 of the second portion 602. The sliding members 640*a*, 650*a* may be configured to be received in openings (not shown) in the first side 636*a* of the body 630 of the second portion 602, such that the sliding members 640*a*, 650*a* may be configured to extend from the first side 636*a* of the body 630. The sliding members 640*b*, 650*b* may be configured to be received in openings 639 in the first side 636*a* of the body 630 of the second portion 602, such that the sliding members 640*b*, 650*b* may be configured to extend from the first side 636*a* of the body 630. While not shown in FIG. 20A, the openings in the first side 636*a* in which the sliding members 640*a*, 650*a* are received may be similar to the openings 639 in the second side 636*b* in which the sliding members 640*a*, 650*b* are received. For example, the sliding members 640*a*, 650*a*, 640*b*, 650*b* may comprise bolts configured to be screwed into the respective openings in the first side 636*a* and openings 639 in the second side 636*b*.

The sliding members 640*a*, 650*a*, 640*b*, 650*b* may be received through respective washers 641*a*, 651*a*, 641*b*, 651*b* (e.g., shoulder washers). The washer 641*a* may comprise a drum 642*a*, a flange 643*a*, and an opening 644*a* extending through the drum 642*a*. The washer 651*a* may comprise a drum 652*a*, a flange 653*a*, and an opening 654*a* extending through the drum 652*a*. The washer 641*b* may comprise a drum 642*b*, a flange 643*b*, and an opening 644*b* extending through the drum 642*b*. The washer 651*b* may comprise a drum 652*b*, a flange 653*b*, and an opening 654*b* extending through the drum 652*b*. The sliding members 640*a*, 650*a*, 640*b*, 650*b* may extend through the openings 644*a*, 654*a*, 644*b*, 654*b* of the respective washers 641*a*, 651*a*, 641*b*, 651*b*. The drums 642*a*, 652*a*, 642*b*, 652*b* of the respective washers 641*a*, 651*a*, 641*b*, 651*b* may extend into the slots 622*a*, 624*a*, 622*b*, 624*b* through which the respective sliding members 640*a*, 650*a*, 640*b*, 650*b* extend. The drums 642*a*, 652*a*, 642*b*, 652*b* of the respective washers 641*a*, 651*a*, 641*b*, 651*b* may extend into the slots 622*a*, 624*a*, 622*b*, 624*b* from inside the side plates 620*a*, 620*b* of the first portion 601, such that the respective flanges 643*a*, 653*a*, 643*b*, 653*b* are located between the side plates 620*a*, 620*b* and the respective sides 636*a*, 636*b* of the body 630. The drums 642*a*, 652*a*, 642*b*, 652*b* of the respective washers 641*a*, 641*b*, 651*a*, 651*b* may be configured to support the sliding members 640*a*, 650*a*, 640*b*, 650*b* within the respective slots 622*a*, 624*a*, 622*b*, 624*b* as the second portion 602 is adjusted between the first position and the second position.

The armature 600 may comprise a drive system 660 configured to facilitate adjustment of the second portion 602 from between the first position and the second position. For example, the drive system 660 may enable adjustment of the lighting device assembly 500 within the housing 410 such that the light emitted by the light-generation module 530 is directed through the trim portion 440 (e.g., the aperture 445) at a plurality of angles and directions. The drive system 660 may comprise a base member 661 and a coupling member 670, which may be supported by the base member 661 and may be coupled to at least one of the sliding members 640*a*, 640*b*, 650*a*, 650*b* (e.g., to the sliding member 640*a*) for adjusting the second portion 602 between the first position and the second position. The drive system 660 may also comprise a gear assembly 680, which may be coupled between the base member 661 and the coupling member 670 for causing the coupling member 670 to move with respect to the base member 661 when the drive system 660 is driven with a tool (e.g., as will be described in greater detail below).

The base member 661 may be attached (e.g., fixedly attached) to a lower end 629 of the first side plate 620*a* of the first portion 601. The base member 661 may comprise a horizontal wall 662 and an angled wall 664. The base member 661 may define a channel 665 between the horizontal wall 662 and the angled wall 664. The first side plate 620*a* of the first portion 601 of the armature 600 may extend into the channel 665 when the base member 661 is attached to the first side plate 620*a*. For example, the base member 661 (e.g., the horizontal wall 662) may comprise openings 666 configured to receive respective fasteners (e.g., screws—not shown), which may also be received in respective openings 623 in the first side plate 620*a* for attaching the base member 661 to the first side plate 620*a*. The base member 661 may also comprise an upper surface 667 (FIG. 18) that may be located within the channel 665 and may extend between the horizontal wall 662 and the angled wall 664. When the base member 661 is attached to the first side plate 620*a*, the first side plate 620*a* may not extend all of the way to the upper surface 667, such that a gap 668 is formed between the lower end 629 of the first side plate 620*a* and the upper surface 667 of the base member 661 (e.g., as shown in FIG. 18).

The coupling member 670 may comprise a horizontal wall 672 and an angled wall 674. The coupling member 670 may be configured to be located within the channel 665 of the base member 661 such that a lower edge 676 of the coupling member is configured to rest on the upper surface 667 of the coupling member 670 in the channel 665. When the base member 661 is attached to the first side plate 620*a*, the coupling member 670 may extend through the gap 668 between the lower end 629 of the first side plate 620*a* and the upper surface 667 of the base member 661, such that the horizontal wall 672 of the coupling member 670 is located outside of the first portion 601 and the angled wall 674 of the coupling member 670 is located inside of the first portion 601 (e.g., the coupling member 670 may be captured between the lower end 629 of the first side plate 620*a* and the upper surface 667 of the base member 661). The horizontal wall 672 of the coupling member 670 may be located between the first side plate 620*a* and the horizontal wall 662 of the base member 661. The angled wall 674 of the coupling member 670 may rest against the angled wall 664 of the base member 661. The coupling member 670 (e.g., the lower edge 676) may be configured to slide across the base member 661 (e.g., the upper surface 667).

The horizontal wall 672 may comprise a slot 677 (e.g., a horizontally-oriented slot) having sides 678. The sliding member 640*a* of the second portion 602 may extend through the slot 677 in the horizontal wall 672 of the coupling member 670. The sliding member 640*a* may also extend through a washer 645 (e.g., a shoulder washer) before extending through the slot 677 in the horizontal wall 672 of the coupling member 670, through the slot 622*a* in the first side plate 620*a*, and through the washer 641*a*. The washer 645 may comprise a drum 646, a flange 647, and an opening 648 extending through the drum 646. The sliding member 640*a* may extend through the opening 648 of the washer 645. The drum 646 of the washer 645 may extend into the slot 677 in the horizontal wall 672 of the coupling member 670, for example, from outside the horizontal wall 672 of the coupling member 670, such that the flange 647 is located between the horizontal wall 672 and a head of the sliding member 640*a* (e.g., a head of the bolt). The sliding member 650*a* may also extend through a washer 655 (e.g., a standard washer) before extending through the slot 624*a* in the first side plate 620*a* and through the washer 651*a*. The sliding member 650*a* may extend through an opening 658 of the washer 655, such that the washer 655 is located between the first side plate 620*a* and a head of the sliding member 650*a* (e.g., a head of the bolt).

Figure 20A:
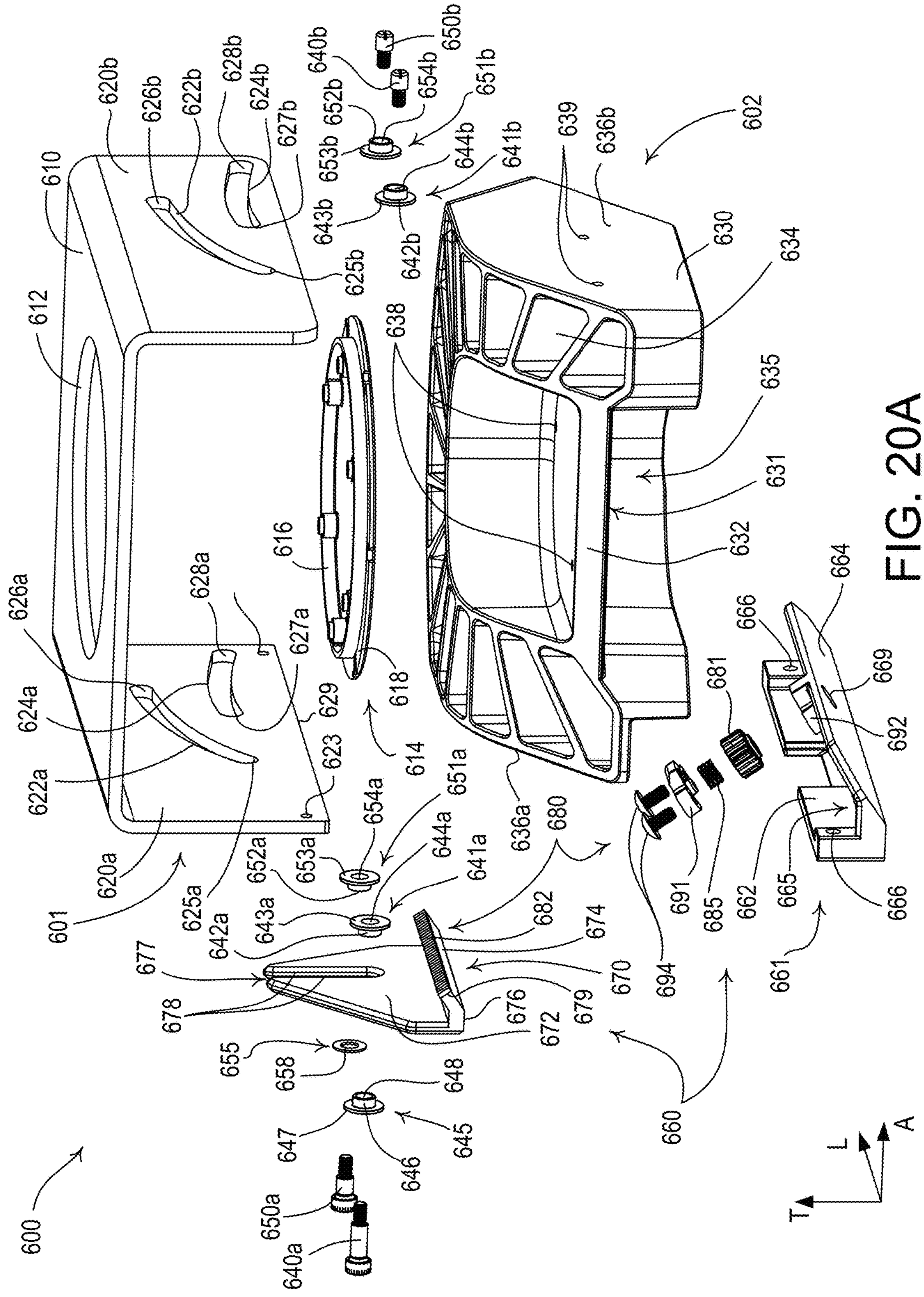
FIG. 20A is an exploded view of the armature of the lighting device of FIG. 11.
Figure 20B:
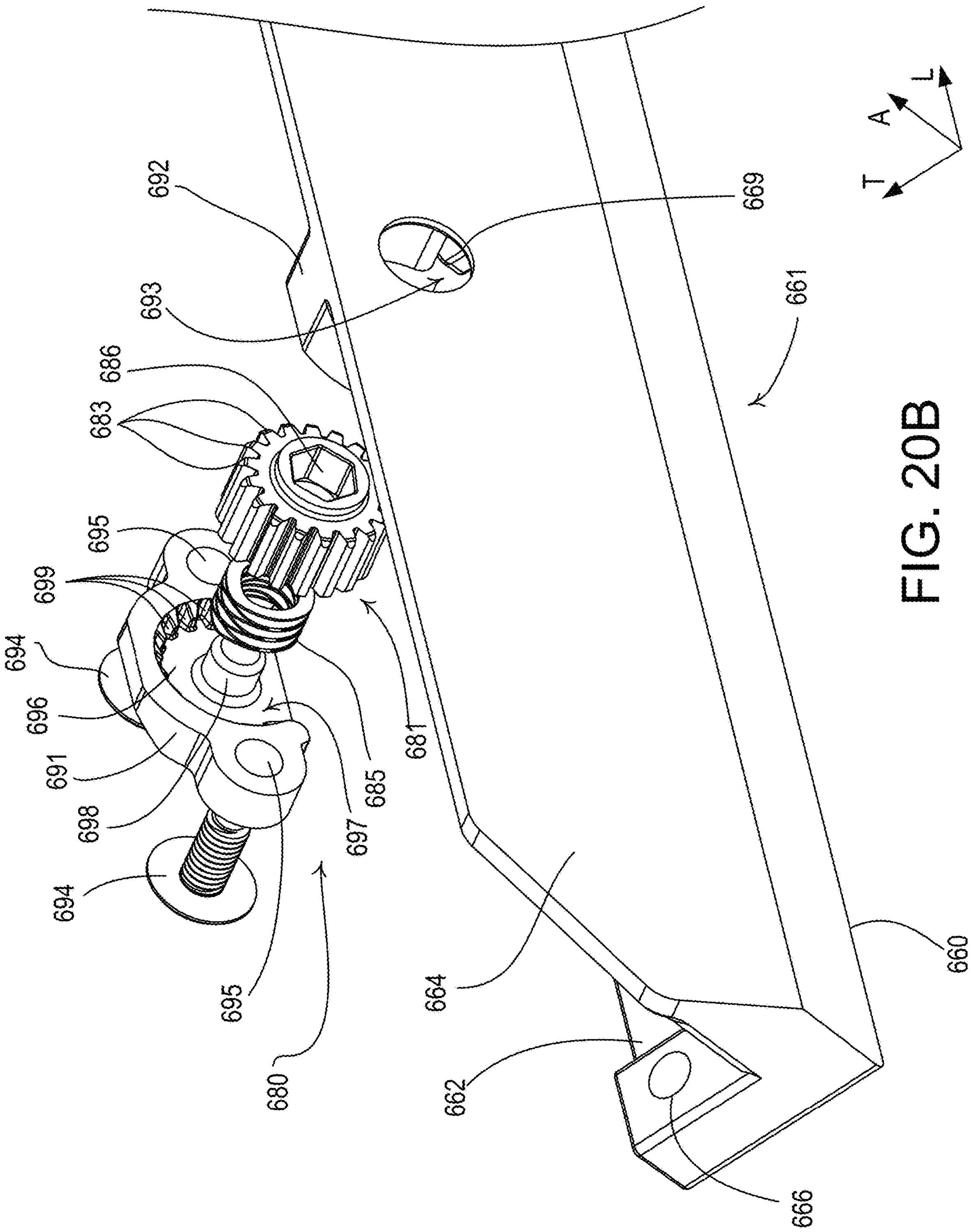
FIG. 20B is an exploded view of a portion of the armature of the lighting device of FIG. 11.

As previously mentioned, the coupling member 670 may be coupled to the base member 661 through the gear assembly 680. For example, the gear assembly 680 may comprise a rack and pinion gear assembly. FIG. 20B is a partial exploded view of the gear assembly 680. As shown in FIG. 20A, the gear assembly 680 may comprise a circular gear 681 (e.g., a pinion) and a linear gear 682 (e.g., a rack). The circular gear 681 may be housed in a gear enclosure 690, which may include a first portion 691 and a second portion 692. For example, the second portion 692 of the gear enclosure 690 may be formed (e.g., molded) as part of the base member 661. The second portion of the 692 may define a cavity 693 (FIG. 20B) in which the circular gear 681 may be received. The first portion 691 may be attached to the second portion 692 of the gear enclosure 690 via two fasteners 694 (e.g., screws) received through respective openings 695 in the first portion 691 and respective openings (not shown) in the second portion 692. When the first portion 691 is attached to the second portion 692 of the gear enclosure 690, the circular gear 681 may be held in (e.g., biased into) the cavity 693 of the second portion 692 by a spring 685. The spring 685 may be located between an inner surface 696 in a cavity 697 of the first portion 691 of the gear enclosure 690 and may be received around a post 698 that may extend from the inner surface 696 of the first portion 691 (e.g., as shown in FIG. 20B). The circular gear 681 may comprise a keyed opening 686 that may be configured to receive a keyed tool (e.g., an Allen wrench or screwdriver) through an opening 669 in the angled wall 664 of the base member 661.

The circular gear 681 may comprise a plurality of teeth 683 arranged around the circumference of the circular gear 681. The linear gear 682 may be formed on an end 679 of the angled wall 674 of the coupling member 670. The linear gear 682 may comprise a plurality of teeth 684 arranged in a linear array along the end 679 of the angled wall 674. When the base member 661 is attached to the first side plate 620*a* of the first portion 601 with the coupling member 670 captured between the first side plate 620*a* and the base member 661, and the spring 685 is biasing the circular gear 681 in the cavity 693 of the second portion 692 of the gear enclosure 690, the teeth 683 of the circular gear 681 may be configured to engage the teeth 684 of the linear gear 682. The circular gear 681 may be driven (e.g., by inserting a tool into the keyed opening 686 of the circular gear 681 and rotating the tool). Rotation of the circular gear 681 may engage the linear gear 682 causing the coupling member 670 to slide (e.g., linearly slide) through the channel 665 of the base member 661 (e.g., in lateral direction L). As the coupling member 670 slides through the channel 665, one of the sides 678 of the slot 677 of the horizontal wall 672 may contact the sliding member 640*a* and move the sliding member 640*a* through the slot 622*a*, thus causing the second portion 602 of the armature 600 to move with respect to the first portion 601 to adjust the second portion 602 between the first position and the second position.

A user may adjust a tilt angle $\theta_{TILT}$ (as shown in FIG. 19B) between the axis 505 of the lighting device assembly 500 and the axis 405 of the trim portion 440 (e.g., and the axis 605 of the armature 600). For example, the user may insert a tool (e.g., an Allen wrench or screwdriver) through the opening 669 in the angled wall 664 of the base member 661 and into the keyed opening 686 of the circular gear 681, and then rotate the tool to rotate the circular gear 681. The circular gear 681 may engage the linear gear 682 to cause the coupling member 670 to move through the channel 665 in the base member 661, thus causing the second portion 602 of the armature to be adjusted between the first position and the second position (e.g., to adjust the tilt angle $\theta_{TILT}$).

The lighting device assembly 400 (e.g., the second portion 402) may be configured to tilt (e.g., pivot) about a point 408 (e.g., a fulcrum) that is located below the armature 600 (e.g., as shown in FIGS. 14, 19A, and 19B). For example, the point 408 may be located along the axis 105 of the trim portion 140 at approximately the intersection of the axis 405 of the trim portion 440 and a plane 409 of the lower plate 432 of the housing 410 (e.g., which may extend in the longitudinal direction L and the lateral direction A, and may be represented by a dashed line in FIGS. 19A and 19B). The point 408 may be located at, for example, the center of the aperture 445 of the trim portion 440 and/or the center of the outer opening 434 in the lower plate 432. Since the point 408 is located at approximately the center of the aperture 445 of the trim portion 440, the light-generation module 530 may be configured to emit light through the aperture 445 when the lighting device assembly 500 is located at any position between the centered position (e.g., as shown in FIG. 19A) and the adjusted position (e.g., as shown in FIG. 19B). For example, the axis 505 of the lighting device assembly 500 may extend through approximately the point 408 along the axis 405 of the trim portion 440 when the lighting device assembly 500 is in the centered position and in the adjusted position (e.g., and any positions in between the centered position and the adjusted position).

When the lighting device assembly 500 is in the centered position (e.g., as shown in FIG. 19A), the second end 523 of the reflector 520 may be located at a distance $D_{UNTILTED}$ (e.g., approximately 0.5 inches) from the plane 409 of the lower plate 432 of the housing 410. As the lighting device assembly 500 is adjusted from the centered position to the adjusted position, a point 529 at the second end 523 of the reflector 520 may move through a path 509 (e.g., as shown in FIG. 19B). When the lighting device assembly 500 is in the adjusted position (e.g., as shown in FIG. 19B), the second end 523 (e.g., the point 529 on the second end 523) of the reflector 520 may be located at a distance $D_{TILTED}$ from the plane 409 of the lower plate 432 of the housing 410. For example, the path 509 through which the point 529 on the second end 523 of the reflector 220 moves may be approximately linear in the longitudinal direction L, such that the distance $D_{TILTED}$ (e.g., as shown in FIG. 19B) may be approximately equal to the distance $D_{UNTILTED}$ (e.g., as shown in FIG. 19A). In some examples, the path 509 through which the point 529 on the second end 523 of the reflector 520 moves may be non-linear (e.g., a curve) and/or may extend in a direction that is slightly unaligned with the longitudinal direction L.

As the lighting device assembly 500 is adjusted from the centered position to the adjusted position, the armature 600 may operate to maintain the axis 505 of the lighting device assembly 500 substantially aligned with the point 408 along the axis 405 of the trim portion 440 while causing a radial distance $R_{RADIAL}$ between the second end 523 of the reflector 520 and the point 408 along the axis 405 of the trim portion 440 to increase (e.g., to cause the lighting device assembly 500 to move away from the aperture 145 of the trim portion 140). In addition, as the lighting device assembly 500 is adjusted from the adjusted position to the centered position, the armature 600 may operate to maintain the axis 505 of the lighting device assembly 500 substantially aligned with the point 408 along the axis 405 of the trim portion 440 while causing the radial distance $R_{RADIAL}$ between the second end 523 of the reflector 520 and the point 408 along the axis 405 of the trim portion 440 to decrease (e.g., to cause the lighting device assembly 500 to move towards the aperture 445 of the trim portion 440). The armature 600 may allow the second end 523 of the reflector 520 to be located close (e.g., proximate) to the aperture 445 of the trim portion 440 when in the centered position (e.g., to increase efficiency of light emitted through the aperture 445) and maintain alignment of the axis 505 of the lighting device assembly 500 with the aperture 445 of the trim portion 440 when in the adjusted position. In addition, the armature 600 may ensure that the lighting device assembly 500 does not contact the lower plate 432 of the lower portion 430 of the housing 410 when in the adjusted position (e.g., maintained at the distance $D_{TILTED}$ from the plane 409 of the lower plate 432). For example, the armature 600 may ensure that the lighting device assembly 500 remains spaced away from the lower plate 432 of the lower portion 430 of the housing 410 when the lighting device assembly 500 is in the adjusted position (e.g., maintained at the distance $D_{TILTED}$ from the plane 409 of the lower plate 432).

The user may also adjust a rotational position of the second portion 602 (e.g., and thus the lighting device assembly 500) around the axis 605 of the armature 600. For example, the user may push the tool into cavity 693 of the second portion 692 of the gear enclosure 690 to cause the spring 685 to compress and the circular gear 681 to move into the cavity 697 of the first portion 691 of the gear enclosure 690. When the circular gear 681 is located in the cavity 697 of the first portion 691 of the gear enclosure 690, the teeth 683 of the circular gear 681 engage with pockets 699 formed in the first portion 691, such that the circular gear 681 may be prevented from rotating (e.g., causing the second portion 602 to be locked in place with respect to the first portion 601). At this time, the user may hold the tool in place but move their arm to cause the first portion 601 to rotate with respect to the housing 410. The lighting device assembly 500 may be rotated around the axis 605 of the armature 600 and may be tilted to adjust the tilt angle $\theta_{TILT}$, such that the light emitted by the light-generation module 530 can be directed through the trim portion 440 at a plurality of angles and directions.

The antenna 550 may be located on the lighting device assembly 500, such that the antenna 550 is located above the RF-transparent portion 460 of the housing 410 in both the centered position (e.g., as shown in FIG. 13) and the adjusted position (e.g., as shown in FIG. 14). The antenna 550 may be located on the opposite side of the lighting device assembly 500 (e.g., the light-generation module 530) as the heat sink portion 634 of the body 630 of the second portion 602. When the armature 600 is in the first position (e.g., and the lighting device assembly 500 is in the centered position as shown in FIG. 13), the antenna 550 may be located close to (e.g., as close as possible to) the axis 405 of the trim portion 440 (e.g., as close as possible to a position above the center of the RF-transparent portion 460 of the housing 410). As the armature 600 is adjusted from the first position to the second position (e.g., to the adjusted position as shown in FIGS. 14 and 19B), the antenna 550 may move towards the upper plate 422 of the housing 410 (e.g., in the transverse direction T) and towards the axis 405 of the trim portion 440 (e.g., in the longitudinal direction L). When the armature 600 is in the second position, the antenna 550 may be located as close to (e.g., as close as possible to) the axis 405 of the trim portion 440 (e.g., as close as possible to a position above the center of the RF-transparent portion 460 of the housing 410). For example, the antenna 550 may be located within a plane that extends in the longitudinal direction L and the transverse direction T. The antenna 550 may be configured to extend towards the aperture 445 of the trim portion 440 when the armature 600 is in either of the first position or the second position.

Figure 21:
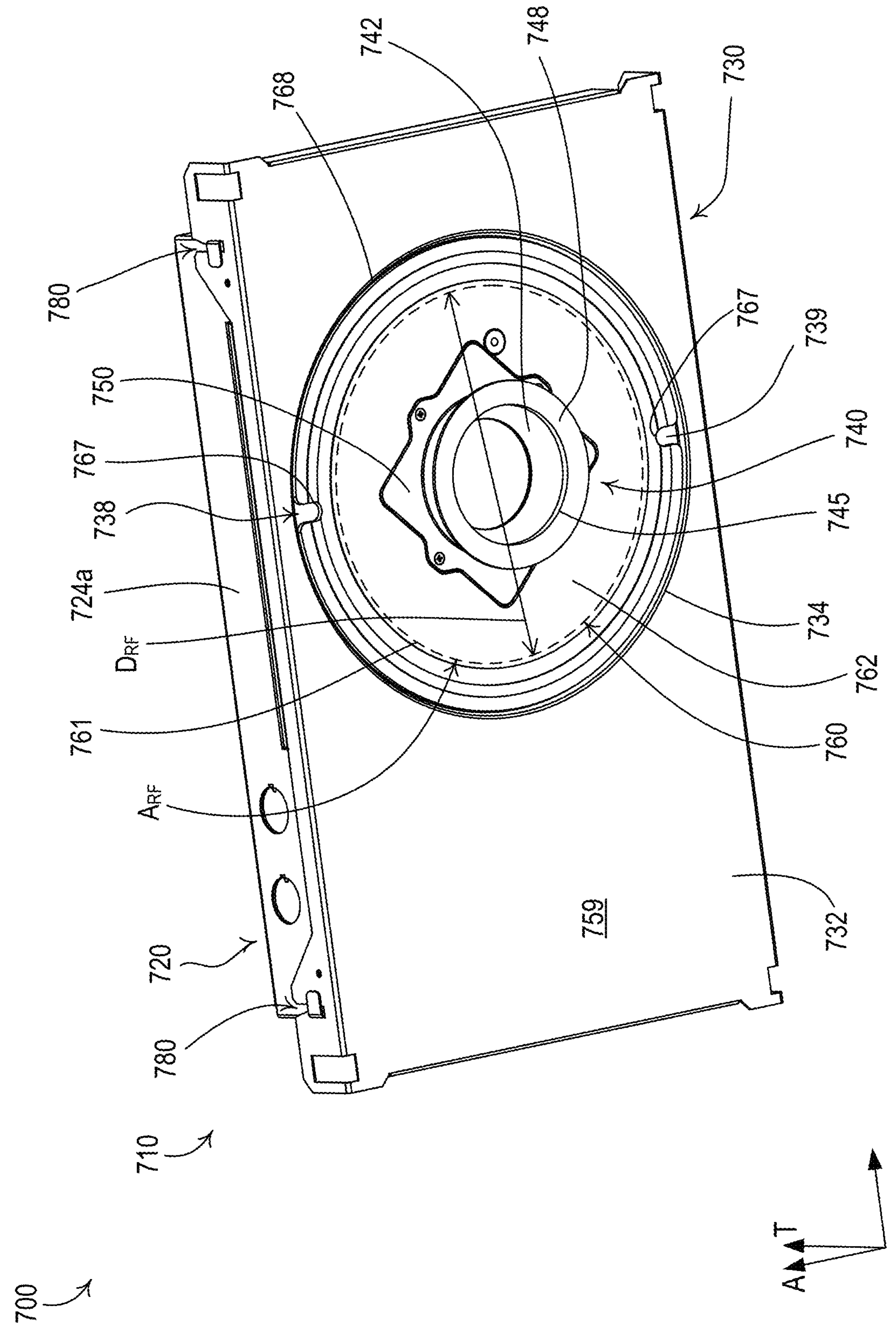
FIG. 21 is a bottom perspective view of another example lighting device.
Figure 22:
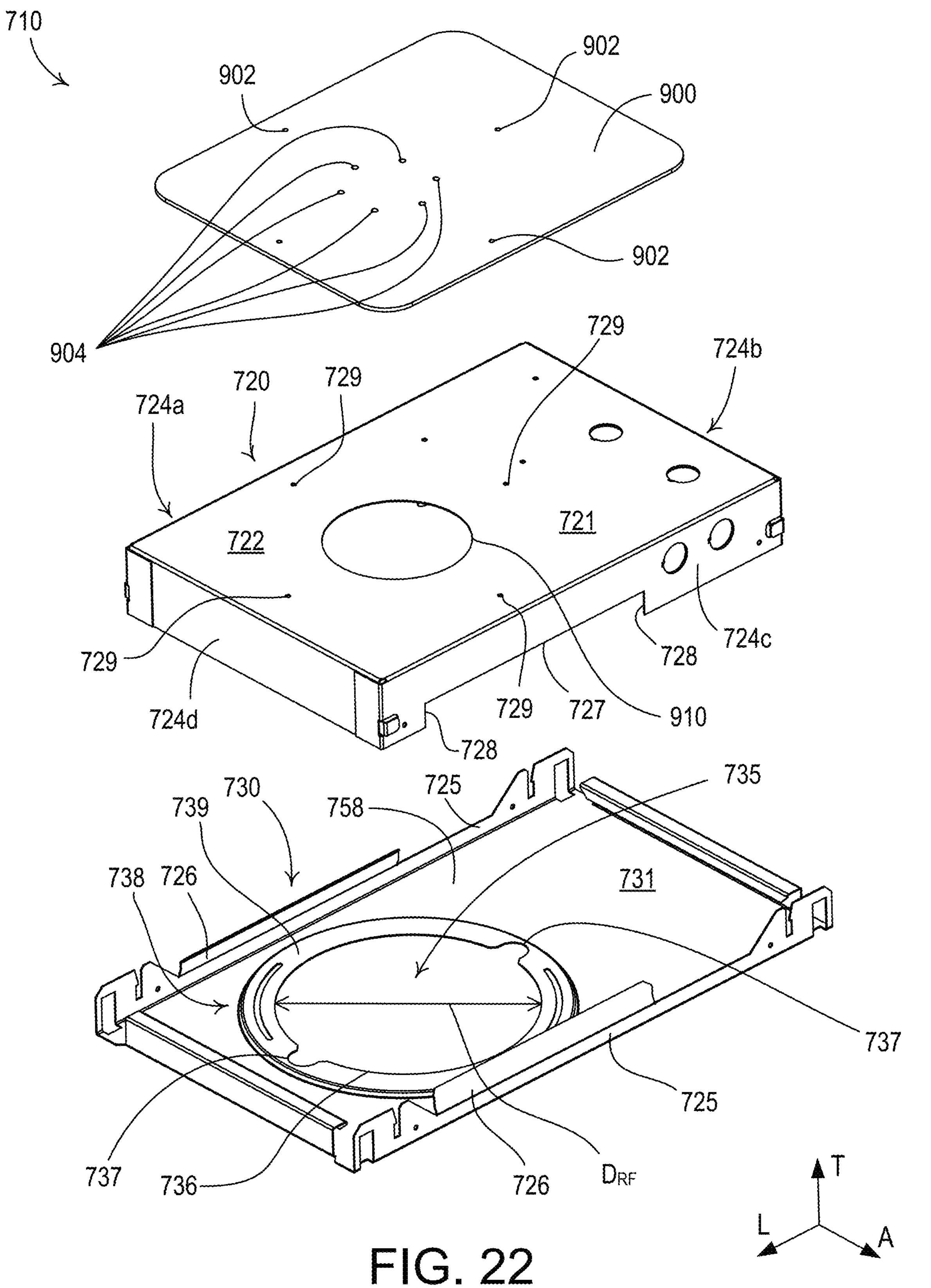
FIG. 22 is an exploded perspective view of a housing of the lighting device of FIG. 21.
Figure 23:
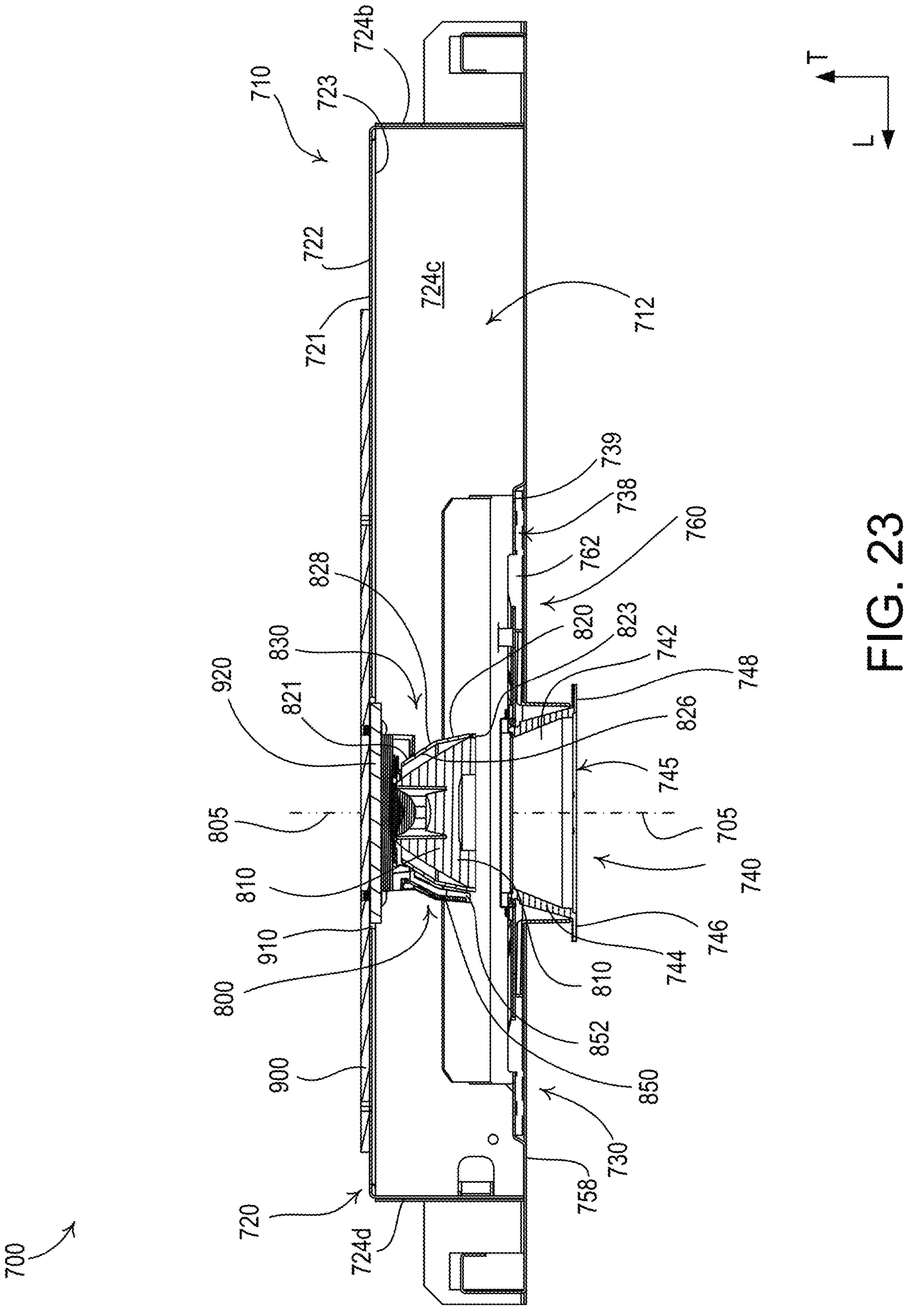
FIG. 23 is a side cross-section view of the lighting device of FIG. 21.
Figure 24:
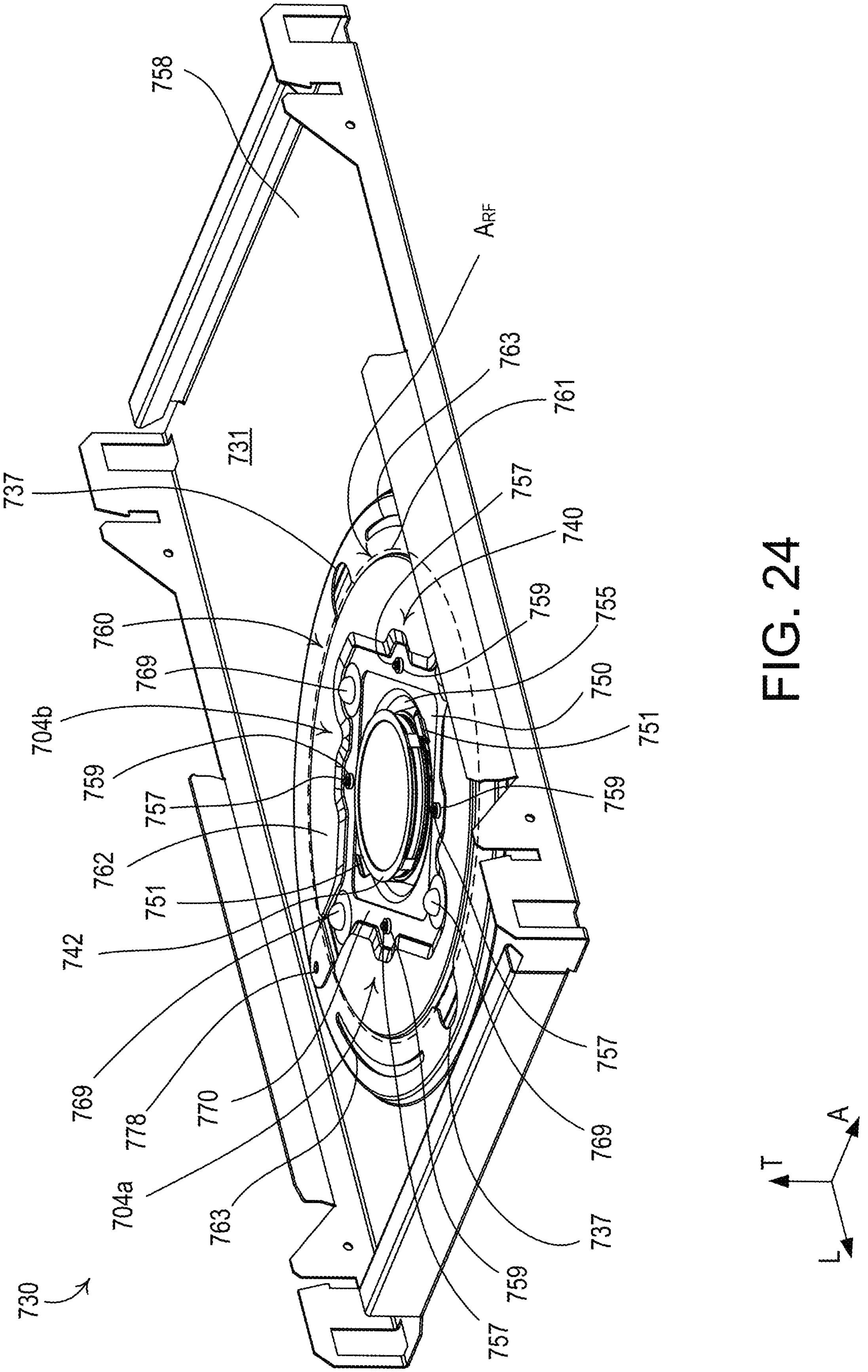
FIG. 24 is a perspective view of the lighting device of FIG. 21 with the side plates, the upper plate, the lighting device assembly, and an armature of the lighting device removed.
Figure 25:
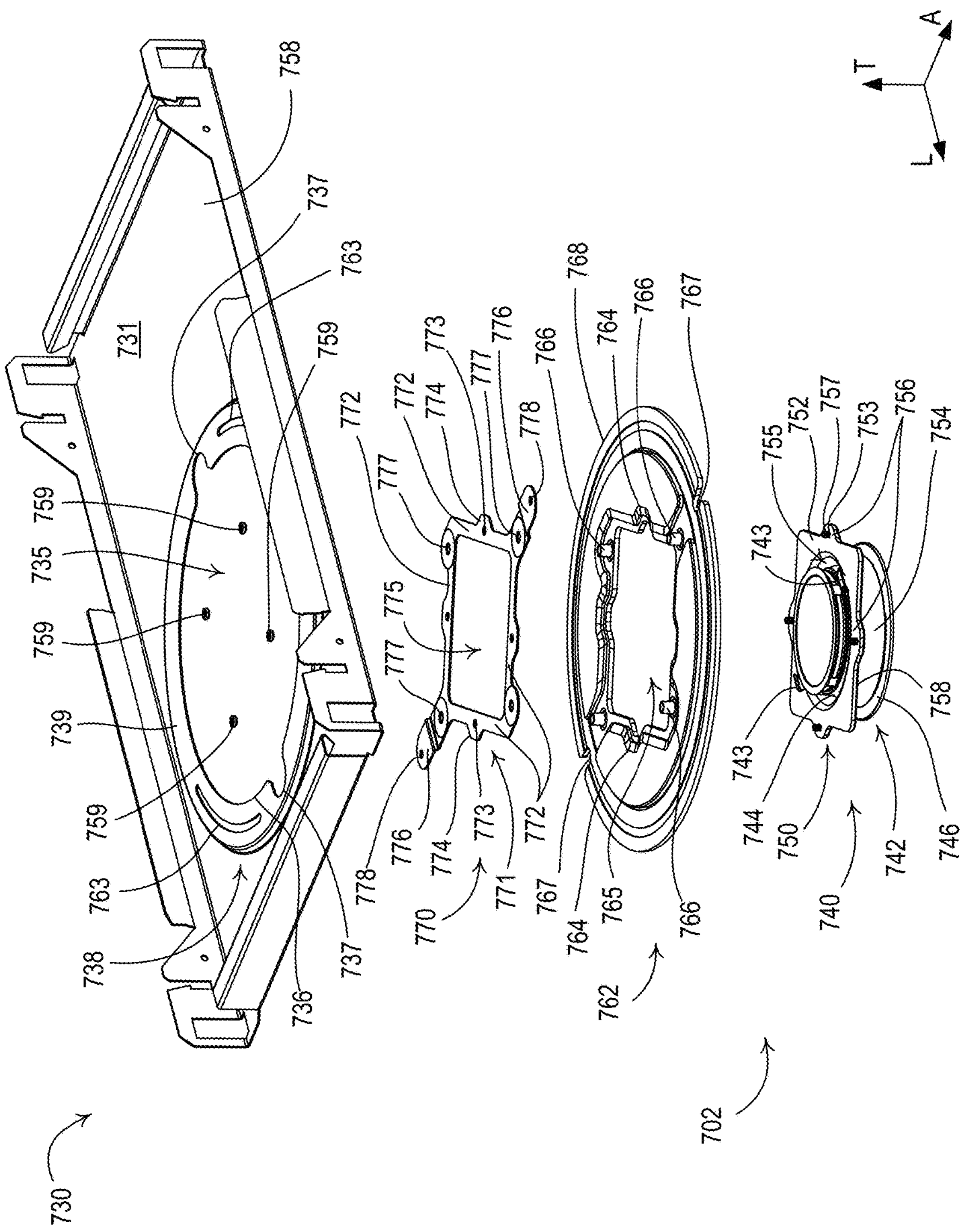
FIG. 25 is an exploded view of the lighting device of FIG. 21 with the side plates, the upper plate, the lighting device assembly, and the armature of the lighting device removed.

FIGS. 21-25 depict another example illumination device, such as a lighting device 700 (e.g., a controllable LED lighting device). The lighting device 700 may be configured to be installed within a building structure (e.g., such as a ceiling, wall, etc.). The lighting device 700 may include a housing 710 and a lighting device assembly 800 (e.g., the lighting device 700 may not comprise an armature, such as the armatures 300, 600). FIG. 21 is a bottom perspective view of the lighting device 700. FIG. 22 is an exploded perspective view of the housing 710 of the lighting device 700. The housing 710 may include an upper portion 720 having an upper plate 722 and a plurality of side plates 724A-724D. The housing 710 may also include a lower portion 730 comprising a lower plate 732 configured to be attached to the upper portion 720. FIG. 23 is a side cross-section view of the lighting device 700 (e.g., taken through the center of lighting device assembly 800). FIG. 24 is a perspective view of the lower portion 730 of the housing 710. FIG. 25 is an exploded view of the lower portion 730 of the housing 710.

The housing 710 may be configured to enclose the lighting device assembly 800. For example, the housing 710 may define a cavity 712. The lighting device assembly 800 may be configured to be located (e.g., housed) within the cavity 712. The housing 710 may be configured to be installed within the building structure. The upper plate 722 may define an upper surface 721 and a lower surface 723, and may be located in a plane that extends in a longitudinal direction L and a lateral direction A. The lower plate 732 may define an upper surface 731 and a lower surface 733, and may be located in a plane that extends in the longitudinal direction L and the lateral direction A. The side plates 724*a*-724*d* may extend between the upper plate 722 and the lower plate 732 (e.g., in a transverse direction T). The lower plate 732 may be metallic (e.g., at least partially metallic). The cavity 712 may be defined by the upper plate 722, the side plates 724*a*-724*d*, and the lower plate 732.

As shown in FIG. 21, the housing 710 may comprise one or more attachment structures 780. For example, the attachment structures 780 may be located at each corner (e.g., the four lower corners) of the housing 710. The attachment structures 780 may be configured to attach the lower portion 730 to the upper portion 720 of the housing 710 in a similar manner as the attachment structures 480 of the housing 410 shown in FIGS. 11-12B attach the lower portion 430 to the upper portion 420 of the housing 410. The lower portion 730 of the housing 710 may comprise sidewalls 725 that extend from the upper surface 731 of the lower plate 732 (e.g., in the transverse direction T). When the housing 710 is assembled (e.g., when the lower portion 730 is attached to the upper portion 720), the sidewalls 725 of the lower portion 730 may extend parallel to the side plates 724*a*, 724*c* of the upper portion 720 within the cavity 712 of the housing 710.

The lower portion 730 of the housing 710 may further comprise sloped walls 726 (e.g., wing portions) that extend from the respective sidewalls 725. When the housing 710 is assembled (e.g., when the lower portion 730 is attached to the upper portion 720), the sloped walls 726 may extend into the cavity 712 of the housing 710. The sloped walls 726 may be configured to facilitate installation of the lower portion 730 onto the upper portion 720 of the housing 710, for example, by being received on inner sides of the side plates 724*a*, 724*c* of the upper portion 720 as the lower portion 730 is moved towards the upper portion 720 (e.g., in the transverse direction T). When the housing 710 is assembled, the sloped walls 726 may be received in slots 727 in the respective side plates 724*a*, 724*c* of the upper portion 720 of the housing 710, such that the sloped walls 726 may be captured between side edges 728 of the slots 727. Engagement between the sloped wall 726 and the side edges 728 of the slots 727 when the housing 710 is assembled may minimize movement of the lower portion 730 with respect to the upper portion 720 in the longitudinal direction L and the lateral direction A.

The lower plate 732 may comprise a recessed portion 738 that extends above the upper surface 731 (e.g., as shown in FIG. 22). The lower plate 732 (e.g., the lower surface 733) may comprise an outer opening 734 (e.g., as shown in FIG. 21). The recessed portion 738 may be located within an area of the outer opening 734. The recessed portion 738 may comprise a rim portion 739 that surrounds an inner opening 735 of the lower plate 732. The rim portion 739 of the recessed portion 738 may be positioned in a plane that is parallel to a plane of the upper surface 731 and/or the lower surface 733 of the lower plate 732. The recessed portion 738 of the lower plate 732 may extend from the outer opening 734 (e.g., at the lower surface 733) to the inner opening 735 (e.g., at the rim portion 739).

The lighting device assembly 800 may be the same as (e.g., identical to) the lighting device assembly 200 of the lighting device 100 and/or the lighting device assembly 500 of the lighting device 400. As shown in FIG. 23, the lighting device assembly 800 may comprise an optical structure 810 (e.g., the optical structure 210, 510), a reflector 820 (e.g., the reflector 220, 520), and a light-generation module 830 (e.g., the light-generation module 230, 530). The lighting device 700 (e.g., the light-generation module 830) may be configured to be wirelessly controllable (e.g., controlled in response to commands received via wireless signals). The light-generation module 830 of the lighting device assembly 800 may be configured to emit light and communicate messages (e.g., digital messages) via wireless signals. The light-generation module 830 may include a printed circuit board (e.g., such as the printed circuit board 232, 532), a heat sink (e.g., such as the heat sink 234, 534), a socket (e.g., such as the socket 236, 536), an antenna 850 (e.g., the antenna 250, 550), and an antenna holder 852 (e.g., the antenna holder 252, 552). The light-generation module 830 may include an emitter assembly (e.g., such as emitter assembly 1800 shown in FIGS. 57 and 58) that includes one or more emitters configured to emit the light. The emitter assembly may be mounted to the printed circuit board of the light-generation module 830. The light-generation module 830 may include a communication circuit (e.g., a wireless communication circuit), such as communication circuit 1944 shown in FIG. 59, that may be mounted to the printed circuit board and may be in electrical communication with (e.g., electrically coupled to) the antenna 850 for receiving and/or sending messages (e.g., via wireless signals). For example, the wireless communication circuit of the light generation module 830 may be configured to communicate the wireless signals at a communication frequency $f_{COMM}$ (e.g., approximately 2.4 GHz).

The optical structure 810 of the lighting device assembly 800 may be transparent or translucent, and may be made of any suitable material, for example plastic or glass. The optical structure 810 may be configured to direct the light emitted by the emitter assembly to shine through a light-exit portion (e.g., such as the light-exit portions 215, 515) of the optical structure 810. The reflector 820 of the lighting device assembly 800 may be configured to direct the light emitted by the emitter assembly to shine out through the optical structure 810. The reflector 820 may include an inner surface 826 and an outer surface 828. The reflector 820 may define a first opening (e.g., such as the first opening 222 shown in FIG. 10) at a first end 821 of the reflector 820 and a second opening (e.g., such as the second opening 224 shown in FIG. 4) at a second end 823 of the reflector 820. The first end 821 of the reflector 820 may be located adjacent to the emitter assembly such that the emitter assembly emits light through the first opening. For example, the inner surface 826 of the reflector 820 may include a reflective material. The reflector 820 may be configured to reflect the light emitted by the emitter assembly towards the light-exit surface of the optical structure 810. The lighting device assembly 800 may define an axis 805 that extends through a center of the lighting device assembly 800. For example, the axis 805 may extend through a center of the reflector 820 and the optical structure 810 of the lighting device assembly 800.

The reflector 820 may be at least partially metallic. For example, the inner surface 826 of the reflector 820 may be at least partially metallic. The antenna 850 may extend, for example, external to the reflector 580 (e.g., in a similar manner as the antenna 250 of the light-generation module 230). As with the antenna holder 252 of the light-generation module 230 shown in FIG. 9A, the antenna holder 852 may be configured to hold the antenna 850 external to the reflector 820 such that the antenna 850 is spaced the predetermined distance from the outer surface 822 of the reflector 820 (e.g., by the first distance D1 as shown in FIG. 9A). The antenna holder 852 may be configured such that the antenna 850 extends beyond the second end 823 of the reflector 820 (e.g., by the second distance D2 as shown in FIG. 9A) and the antenna holder 852 extends beyond the second end 823 of the reflector 820 (e.g., by the third distance D3 as shown in FIG. 9A). In some examples, the antenna 850 and the antenna holder 852 may not extend beyond the second end 823 of the reflector 820. For example, the antenna 850 may extend external to the reflector 820 from a location adjacent to a first end of the reflector 820 adjacent to the printed circuit board of the light-generation module 830 towards a second end of the reflector 820 adjacent to the light-exit surface of the optical structure 810. The antenna holder 852 may be configured to hold the antenna 850 such that the antenna 850 is spaced a predetermined distance from the outer surface 828 of the reflector 820. The antenna holder 852 may extend from the socket and/or the printed circuit board of the light-generation module 830.

The lighting device 700 may further comprise an exterior plate 900, which may be located outside of the housing 710 (e.g., as shown in FIGS. 22 and 23). The exterior plate 900 may be configured to be attached to the upper plate 722 of the upper portion 720 of the housing 710. For example, the exterior plate 900 may comprise openings 902 configured to receive fasteners (e.g., screws—not shown) that may also be received through openings 729 in the upper plate 722 of the upper portion 720 of the housing 710. The lighting device assembly 800 may be configured to be mounted to the exterior plate 900. The upper plate 722 may comprise an opening 910 (e.g., a circular opening) through which the exterior plate 900 may be exposed to the cavity 712 of the housing 710. The lighting device assembly 800 may extend through the opening 910 to be mounted to the exterior plate 900. For example, the lighting device assembly 800 may be mounted to the exterior plate 900 via a support plate 920 (e.g., as shown in FIG. 23). The lighting device assembly 800 may be configured to be attached to the support plate 920, for example, via one or more fasteners (e.g., screws—not shown). In addition, the support plate 920 may be configured to be attached to the exterior plate 900 via a plurality of fasteners (e.g., screws—not shown) received by in holes 904 in the exterior plate 900 (e.g., as shown in FIG. 22). The exterior plate 900 may be configured to operate as a heat sink for the light-generation module 830 of the lighting device assembly 800. The light-generation module 830 may be thermally coupled to the exterior plate 900 via the support plate 920.

The housing 710 may comprise a trim portion 740. The trim portion 740 may be configured to be located within the inner opening 735 in the lower plate 732 of the housing 410 (e.g., and also within the outer opening 734). The trim portion 740 may include a trim ring 742 and a collar 750. The trim ring 742 may include a sleeve 744, a bezel 746 (e.g., a flange), and a bottom surface 748 (e.g., a bottom surface of the bezel 746). The trim portion 740 (e.g., the trim ring 742) may define an aperture 745 through which the light emitted by the light-generation module 830 may be transmitted. The aperture 745 may be located in a plane that extends in the longitudinal direction L and the lateral direction A at the bottom surface 748 of the trim ring 742. The aperture 745 may have, for example, a circular shape (e.g., may be a circle). For example, the aperture 745 may have a diameter of approximately two inches. For example, the trim ring 742 may comprise a single-part construction. In some examples, the trim ring 742 may comprise a two-part construction (e.g., including a trim insert and a trim retainer, such as the trim insert 141 and the trim retainer 143 shown in FIG. 7).

The collar 750 may be configured to be installed within the inner opening 735 in the lower plate 732. The inner opening 735 may define an inside edge 736 that may surround the trim portion 740. The collar 750 may include a flange portion 752 and a ring portion 754. The collar 750 may define an aperture 755 through which the light emitted by the light-generation module 830 may be transmitted. The ring portion 754 (e.g., the aperture 755) of the collar 750 may be configured to receive at least a portion of the trim ring 742. For example, the trim ring 742 may be configured to extend through the aperture 755 of the collar 750. The collar 750 (e.g., the flange portion 752) may define a plurality of tabs 756. The collar 750 may support the trim ring 742, such that the sleeve 744 is at least partially received by the ring portion 754. For example, the trim portion 740 may comprise clips 751 that extend from the sleeve 744 and are configured to clip onto the ring portion 754 (e.g., the aperture 755) of the collar 750 for securing the trim ring 742 to the collar 750. The trim portion 740 may define an axis 705 that extends through a center of the aperture 745. For example, the axis 705 may extend through a center of the trim ring 742 and the collar 750 of the trim portion 740. The trim portion 740 (e.g., the flange portion 752 of the collar 750) may define a rectangular outer edge 758. It should be appreciated that the trim portion 740 is not limited to the geometry shown in the figures, instead the trim portion 740 (e.g., the flange portion 752 of the collar 750) may define a circular outer edge. In some examples, the bezel 746 (e.g., the bottom surface 748) of the trim ring 742 may be thin (e.g., not configured as a flange) to present a knife-edge appearance when the lighting device 700 is installed.

The housing 710 may comprise an RF-transparent portion 760 (e.g., an electrically-non-conductive portion), which may include a non-conductive plate 762 (e.g., an RF-transmissive or non-shielding plate) that may be configured to enable the wireless signals to be transmitted and/or received via the antenna 850 of the light-generation module 830 through the inner opening 735 of the lower plate 732 of the housing 710. For example, the non-conductive plate 762 may be made from a material that does not significantly obstruct the propagation of an electromagnetic field and/or electromagnetic waves (e.g., the wireless signals), such as an electrically-non-conductive material (e.g., plastic). The non-conductive plate 762 (e.g., at least a portion of the non-conductive plate 762) may be received within the outer opening 734 of the lower plate 732 of the housing 710 (e.g., within the recessed portion 738). For example, the non-conductive plate 762 may have an outer edge 768 configured to be located within the outer opening 734 of the lower plate 732 of the housing 710 (e.g., within the recessed portion 738). The non-conductive plate 762 may cover the inner opening 735 of the lower plate 732 of the housing 710 (e.g., at least a portion of the inner opening 735). In some examples, the non-conductive plate 762 (e.g., at least a portion of the non-conductive plate 762) may be received within the opening 735 in the housing 710.

The inner opening 735 of the lower plate 732 may be sized, for example, to enable the wireless control signals to be transmitted and/or received therethrough. The RF-transparent portion 760 may comprise a perimeter 761 characterized by an area $A_{RF}$ and a diameter $D_{RF}$ (e.g., as shown in FIGS. 21 and 24). The perimeter 761 of the RF-transparent portion 760 may be defined by the inner opening 735 in the lower plate 732 of the housing 730. For example, the size of the RF-transparent portion 760 may be based on the diameter of the inner opening 735 of the lower plate 732. The diameter $D_{RF}$ of the RF-transparent portion 760 (e.g., the perimeter 761) may be approximately equal to a diameter of the inner opening 735 of the lower plate 732 (e.g., as shown in FIG. 22). The outer opening 734 of the lower plate 732 may be sized (e.g., to set the area $A_{RF}$ and/or the diameter $D_{RF}$ of the RF-transparent portion 760) so as to enable the wireless control signals to be transmitted and/or received through the outer opening 734. For example, the diameter $D_{RF}$ of the RF-transparent portion 760 (e.g., the diameter of the outer opening 734 of the lower plate 732) may be approximately 7 inches. The non-conductive plate 762 may be configured to allow the transmission of the wireless control signals to and/or from the antenna 850 of the light-generation module 830.

The non-conductive plate 762 of the RF-transparent portion 760 of the housing 710 may be configured to cover at least a portion of the inner opening 735 between the trim portion 740 (e.g., the collar 750) and the rim portion 739 of the recessed portion 738 of the lower plate 732. The perimeter 761 of the RF-transparent portion 760 may surround the trim portion 740. For example, the RF-transparent portion 760 of the housing 710 (e.g., the portion of the non-conductive plate 762 that covers the inner opening 735 of the lower plate 732) may extend radially outward from the collar 750 towards the inside edge 736 of the lower plate 732 that defines the inner opening 735 (e.g., and also towards the outer opening 734). The non-conductive plate 762 may be configured to be substantially parallel to the lower plate 732 of the housing 710. The rim portion 739 of the lower plate 732 may comprise slots 763 (e.g., curved slots) for securing the trim portion 740 to the housing 710 (e.g., as will be described in greater detail below). When the diameter of the aperture 745 of the trim portion 740 is two inches and the transmission frequency $f_{COMM}$ is 2.4 GHZ, the aperture 745 may not allow for propagation of wireless signals through the aperture 745 without attenuation. The RF-transparent portion 760 (e.g., at least the portion of the RF-transparent portion 760 of the housing 710 covering the portion of the inner opening 735 between the trim portion 740 and the lower plate 732 of the housing 710) may provide additional area on the housing 710 to allow for the transmission of the wireless signals through the housing 710 (e.g., as will be described in greater detail below).

The non-conductive plate 762 may define an opening 765 through which the trim portion 740 is configured to extend. For example, the opening 765 of the non-conductive plate 762 may be configured to receive (e.g., support) the collar 750. The non-conductive plate 762 may define posts, such as unformed stakes 766, which may be used for mounting the non-conductive plate 762 to the housing 710 (e.g., as will be described in greater detail below). The flange portion 752 of the collar 750 may abut the non-conductive plate 762 (e.g., at the opening 765). The opening 765 of the non-conductive plate 762 may have a rectangular (e.g., square) shape (e.g., to receive the rectangular outer edge 758 of the flange portion 752 of the collar 750). The non-conductive plate 762 may be configured to be secured proximate to the inner opening 735 (e.g., between the inside edge 736 of the lower plate 732 and the trim portion 740). The non-conductive plate 762 (e.g., the opening 765 of the non-conductive plate 762) may define a plurality of notches 764. Each of the plurality of notches 764 may be configured to receive a respective one of the tabs 756 on the flange portion 752 of the collar 750. The notches 764 and the tabs 756 may be configured to maintain alignment of the trim portion 740 within the non-conductive plate 762 (e.g., and within the inner opening 735 of the lower plate 732 of the housing 710). The collar 750 may define holes 753 in each of the tabs 756 that are used for mounting the collar 750 to the housing 710 (e.g., as will be described in greater detail below).

In some examples, the aperture 745 of the trim ring 742 may have a rectangular (e.g., a square) shape. When the aperture 745 has a rectangular (e.g., a square) shape, the non-conductive plate 762 may be configured to support a collar that also has a rectangular (e.g., square) aperture in which the trim portion with the rectangular opening may be received. The collar having the rectangular aperture may also comprise a flange (e.g., such as the flange portion 752) that defines a rectangular outer edge (e.g., such as the rectangular outer edge 758), wherein the rectangular aperture may fit within an area defined by the rectangular outer edge. Accordingly, the non-conductive plate 762 (e.g., the opening 765) may be configured to receive (e.g., support) trim portions having both circular and rectangular apertures.

The lighting device 700 (e.g., the housing 710) may include, for example, a cover assembly 702. The cover assembly 702 may include the trim portion 740 (e.g., the trim ring 742 and the collar 750), the non-conductive plate 762, and a support structure 770. The support structure 770 may be configured to support the trim portion 740 within the opening 765 of the non-conductive plate 762 (e.g., within the inner opening 735 of the lower plate 732). The support structure 770 may be configured to connect the trim portion 740 to the non-conductive plate 762. The support structure 770 may include a support bracket 771. The support structure 770 (e.g., the support bracket 771) may extend across the inner opening 735 in the lower plate 732 of the housing 710. The support structure 770 may be configured to abut the trim portion 740 and/or the non-conductive plate 762 when supporting the trim portion 740 in the opening 765 of the non-conductive plate 762. Depending on the material, the support structure 770 may adversely impact communication of the wireless control signals through the RF-transparent portion 760 (e.g., through the non-conductive plate 762), for example, because the support structure 770 may block and/or redirect a portion of the wireless signals. The overall size of the support structure 770 may be minimized to avoid interference with the wireless control signals, but also be large enough to appropriately support the trim portion 740.

The area $A_{RF}$ of the RF-transparent portion 760 (e.g., within the perimeter 761) may be characterized by one or more portions that are unobstructed by metallic components, such as the lower plate 732 and the support structure 770. For example, the area $A_{RF}$ of the RF-transparent portion 760 may include a first unobstructed portion 704*a* that is bounded by the perimeter 761 of the RF-transparent portion 760 and the support structure 770 (e.g., on one side of the support structure 770) and a second unobstructed portion 704*b* that is bounded by the perimeter 761 of the RF-transparent portion 760 and the support structure 770 (e.g., on the other side of the support structure 770). The first and second unobstructed portions 704*a*, 704*b* may each be characterized by multiple dimensions, such as chords (e.g., linear lengths, such as the chords 106 of the first and second unobstructed portions 104*a*, 104*b* shown in FIG. 6) between opposing sides of the first and second unobstructed portions 704*a*, 704*b*. The chords of the first and second unobstructed portions 704*a*, 704*b* may extend in multiple directions in the plane of the lower plate 732 of the lower portion 730 of the housing 710 (e.g., extending in the longitudinal direction L and the lateral direction A). The chords of the first and second unobstructed portions 704*a*, 704*b* may have respective lengths that allow RF signals to propagate through the first and second unobstructed portions 704*a*, 704*b* with little attenuation. For example, to allow for propagation of the RF signals through the first and second unobstructed portions 704*a*, 704*b* of the RF-transparent portion 760 at the communication frequency $f_{COMM}$ of 2.4 GHZ, the lengths of multiple chords of each of the first and second unobstructed portions 704*a*, 704*b* may be greater than or equal to approximately three inches.

The support structure 770 (e.g., the support bracket 771) may define sides 772 and extensions 776 extending from opposed corners of the sides 772. The sides 772 of the support bracket 771 may be connected together to define an opening 775 of the support structure 770. Each of the sides 772 may define a tab 774 that is configured to align with the tabs 756 of the collar 750. The support structure 770 may define holes 773 in each of the tabs 774 that are configured to secure the trim portion 740 to the housing 710. For example, fasteners 757 (e.g., screws) may be received through the holes 753 in the collar 750 and the holes 773 in the support structure 770 for securing the support structure 770 to the trim portion 740 (e.g., to the collar 450). In addition, nuts 759 may be attached to the fasteners 757 for securing the support structure 770 to the trim portion 740 (e.g., to the collar 750). The extensions 776 may define holes 777 that are configured to secure the support structure 770 to the non-conductive plate 762 (e.g., as shown in FIG. 25). For example, the unformed stakes 766 of the non-conductive plate 762 may be received through the holes 777 of the support structure 770 and formed (e.g., heated and/or melted as part of a heat-staking process) to produce formed stakes 769 (e.g., as shown in FIG. 24) for securing the non-conductive plate 762 to the support structure 770. The opening 775 of the support bracket 771 may be aligned with the opening 765 of the non-conductive plate 762 when the support structure 770 is secured to the non-conductive plate 762.

The non-conductive plate 762 may support the trim portion 740 within the inner opening 735 of the lower plate 732 of the housing 710. The trim portion 740 (e.g., the collar 750) may be attached to the non-conductive plate 762 (e.g., via the heat-staking process) and the support structure 770 may be attached to the trim portion 740 (e.g., the collar 750), for example, prior to installation of the non-conductive plate 762 in the housing 710. The lower plate 732 may define notches 737 around the inner opening 735. The notches 737 may allow for insertion of the cover assembly 702 (e.g., the support structure 770 when already attached to trim portion 740, which is attached to the non-conductive plate 762) into the housing 710. For example, the cover assembly 702 (e.g., the non-conductive plate 762) may be oriented substantially parallel to the lower plate 732 and the extensions 776 of the support structure 770 may be inserted through the notches 737. After the extensions 776 of the support structure 770 are inserted through the notches 737, the cover assembly 702 (e.g., non-conductive plate 762) may be rotated such that the extensions 776 of the support structure 770 move away from the notches 737 and the rim portion 739 of the recessed portion 738 may be captured between the extensions 776 of the support structure 770 and the non-conductive plate 762. The extensions 776 of the support structure 770 may be configured to rest on the rim portion 739 to support the non-conductive plate 762 within the recessed portion 738 of the lower plate 732 (e.g., within the outer opening 734 and covering the inner opening 735 of the lower plate 732).

After the extensions 776 of the support structure 770 are resting on the rim portion 739 of the lower plate 732 and the non-conductive plate 762 is positioned within the recessed portion 738 of the lower plate 732, the cover assembly 702 (e.g., the non-conductive plate 762) may be rotated to appropriately orient the trim portion 740 in the space in which the lighting device 700 is installed (e.g., which may be particularly important when the trim portion has a rectangular opening). The extensions 776 of the support structure 770 may comprise holes 778 though which fasteners (e.g., screws—not shown) may be received for securing the cover assembly 702 (e.g., the trim portion 740, the non-conductive plate 762, and the support structure 770) to the housing 710. The non-conductive plate 762 may comprise notches 767 through which the fasteners that are received the holes 778 in the support structure 770 may extend while the cover assembly 702 (e.g., the support structure 770) is being secured to the housing 710. When the support structure 770 is attached to the non-conductive plate 762, the notches 767 in the non-conductive plate 762 may be aligned with the holes 778 in the support structure 770. After the extensions 776 of the support structure 770 are inserted through the notches 737 in the rim portion 739 of the lower plate 732, the cover assembly 702 (e.g., the non-conductive plate 762) may be rotated slightly and the extensions 776 of the support structure 770 may rest on the rim portion 739 of the lower plate 732. The cover assembly 702 (e.g., the non-conductive plate 762) may be rotated such that the holes 778 are aligned with the slots 763 in the rim portion 739 of the lower plate 732. The fasteners may then be inserted through the notches 767 in the non-conductive plate 762, through the respective slots 763 in the rim portion 739 of the lower plate 732, and into the holes 778 of the support structure 770 (e.g., in the transverse direction T from the bottom of the lighting device 700). When the fasteners are extending through the respective slots 763 and installed in the holes 778 but are not fully tightened, the cover assembly 702 (e.g., the non-conductive plate 762) may be rotated to appropriately orient the trim portion 740 within the inner opening 735. As the cover assembly 702 (e.g., the non-conductive plate 762) is rotated, the fasteners may move through the respective slots 763 and contact ends of the respective slots 763 to limit rotation of the cover assembly 702 (e.g., prevent full rotation of the cover assembly 702). When the trim portion 740 is oriented appropriately, the fasteners may be tightened to secure the cover assembly 702

(e.g., the trim portion 740, the non-conductive plate 762, and the support structure 770) in place.

Additionally or alternatively, although not shown in the figures, it should be appreciated that the support structure 770 may be attached to the upper plate 722 and/or one or more of the side plates 724*a*-724*d*. Although the support structure 770 is shown in the figures as a separate component of the lighting device 700, it should be appreciated that the support structure 770 may be formed as part of the lower plate 732 of the housing 710, for example, such that the inner opening 735 comprises two aperture portions. When the inner opening 735 comprises two opening portions, the RF-transparent portion 760 may comprise a first non-conductive plate and a second non-conductive plate that are located in respective opening portions of the inner opening 735. The first and second non-conductive plates within the respective opening portions of the inner opening 735 may fall within the area $A_{RF}$ of the RF-transparent portion 760, such that the diameter $D_{RF}$ of the RF-transparent portion 760 is approximately equal to a diameter of the outermost edges of the opening portions of the inner opening 735. In one or more other examples, the inner opening 735 may comprise three or four opening portions, and the RF-transparent portion 760 may comprise three or four non-conductive plates, respectively.

Figure 26:
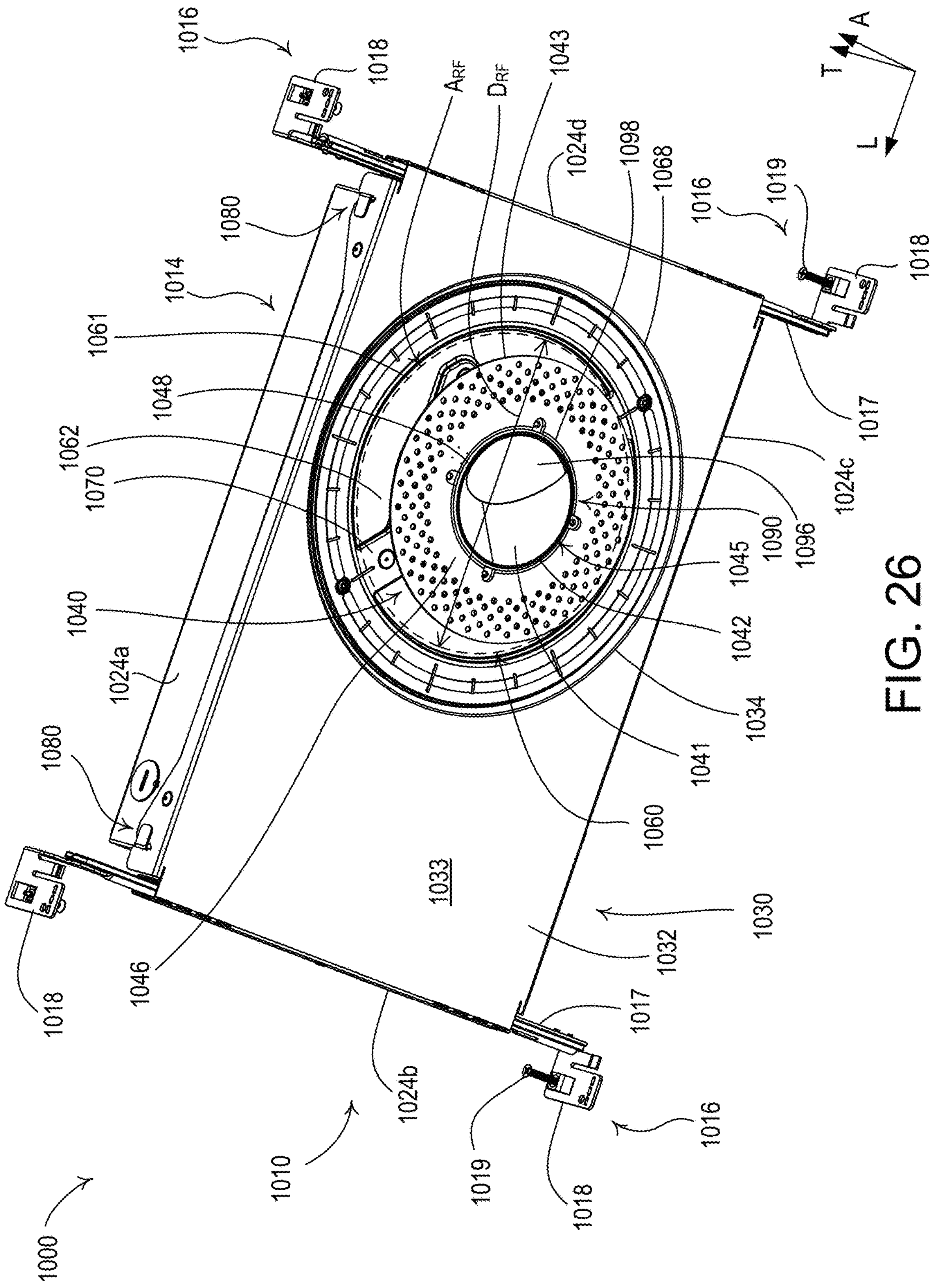
FIG. 26 is a bottom perspective view of another example lighting device.
Figure 27:
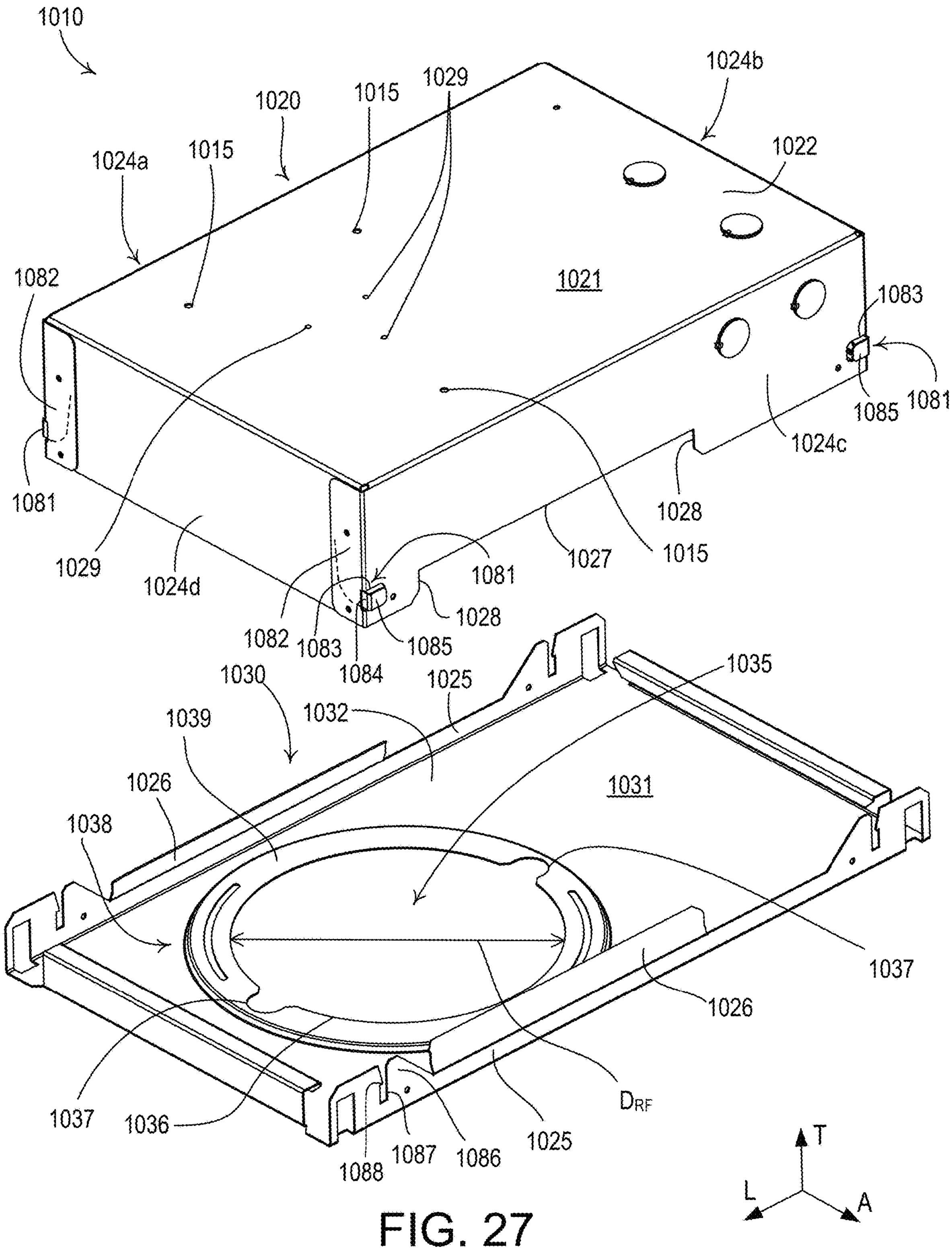
FIG. 27 is another bottom perspective view of the lighting device of FIG. 26 with a lower portion of the lighting device removed.
Figure 28A:
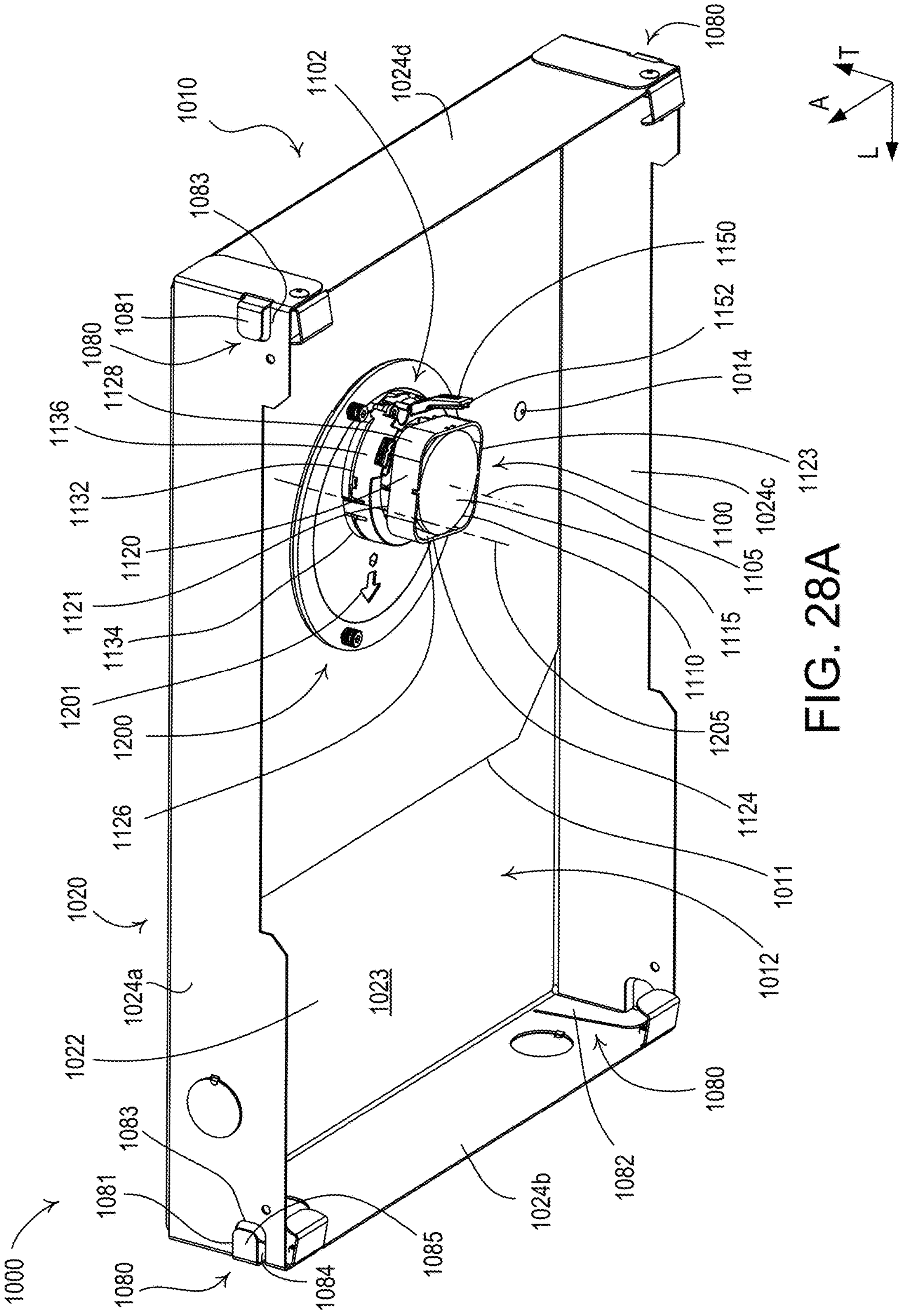
FIG. 28A is a bottom perspective view of the lighting device of FIG. 26 with the lower portion of the lighting device removed.
Figure 28B:
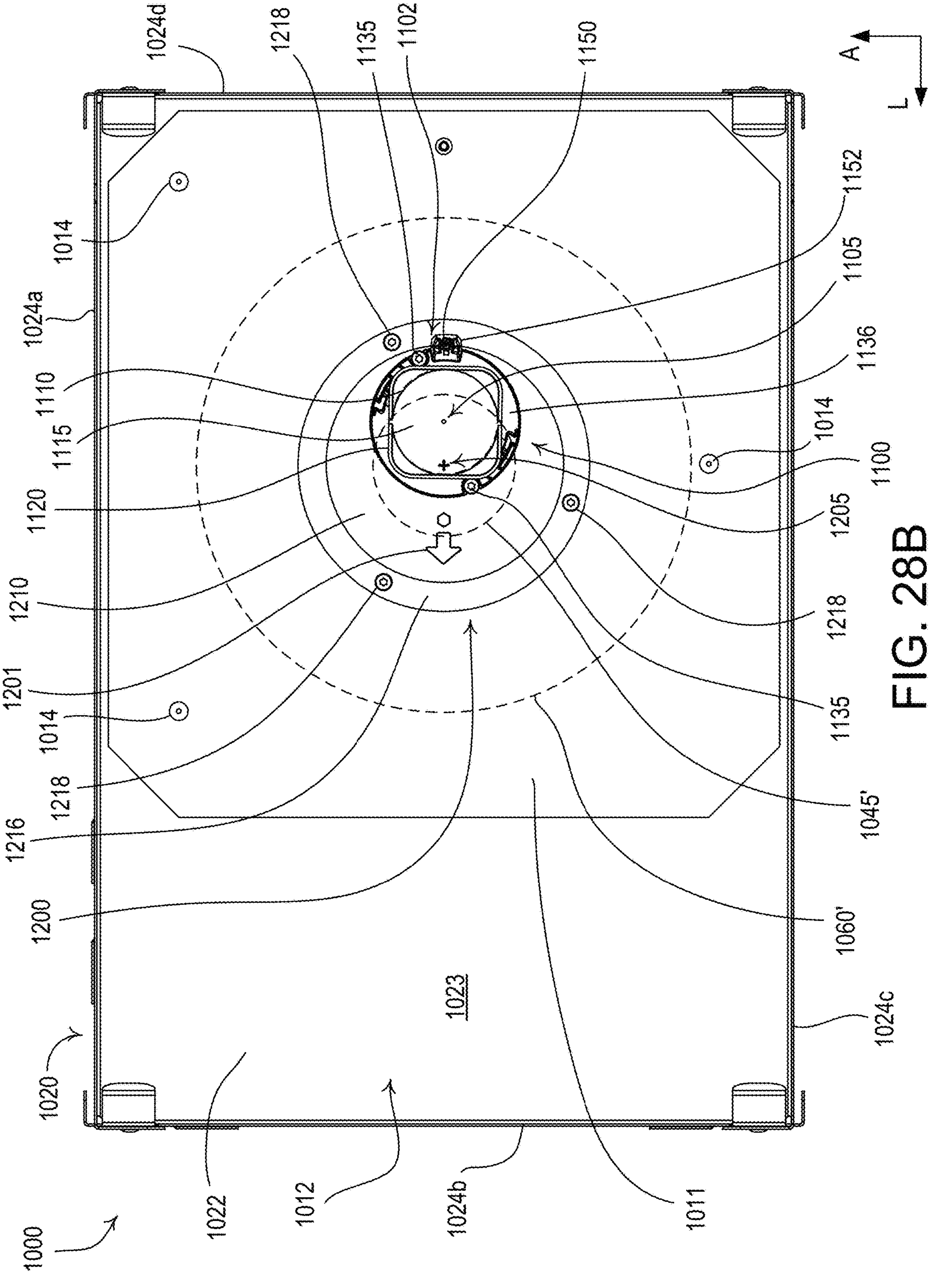
FIG. 28B is a bottom view of the lighting device of FIG. 26 with the lower portion of the lighting device removed.
Figure 29:
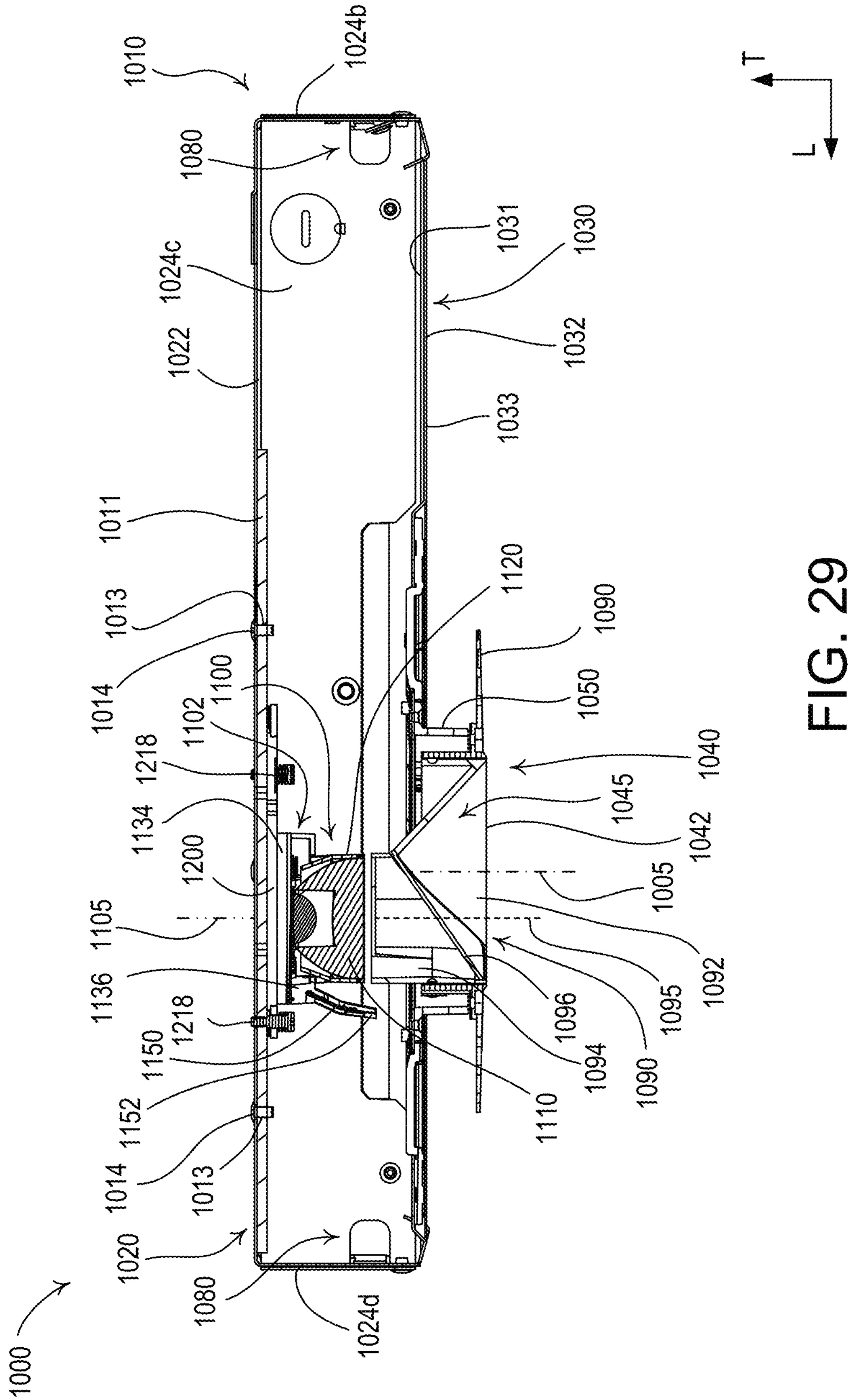
FIG. 29 is a side cross-section view of the lighting device of FIG. 26 taken through a center of the lighting device.
Figure 30:
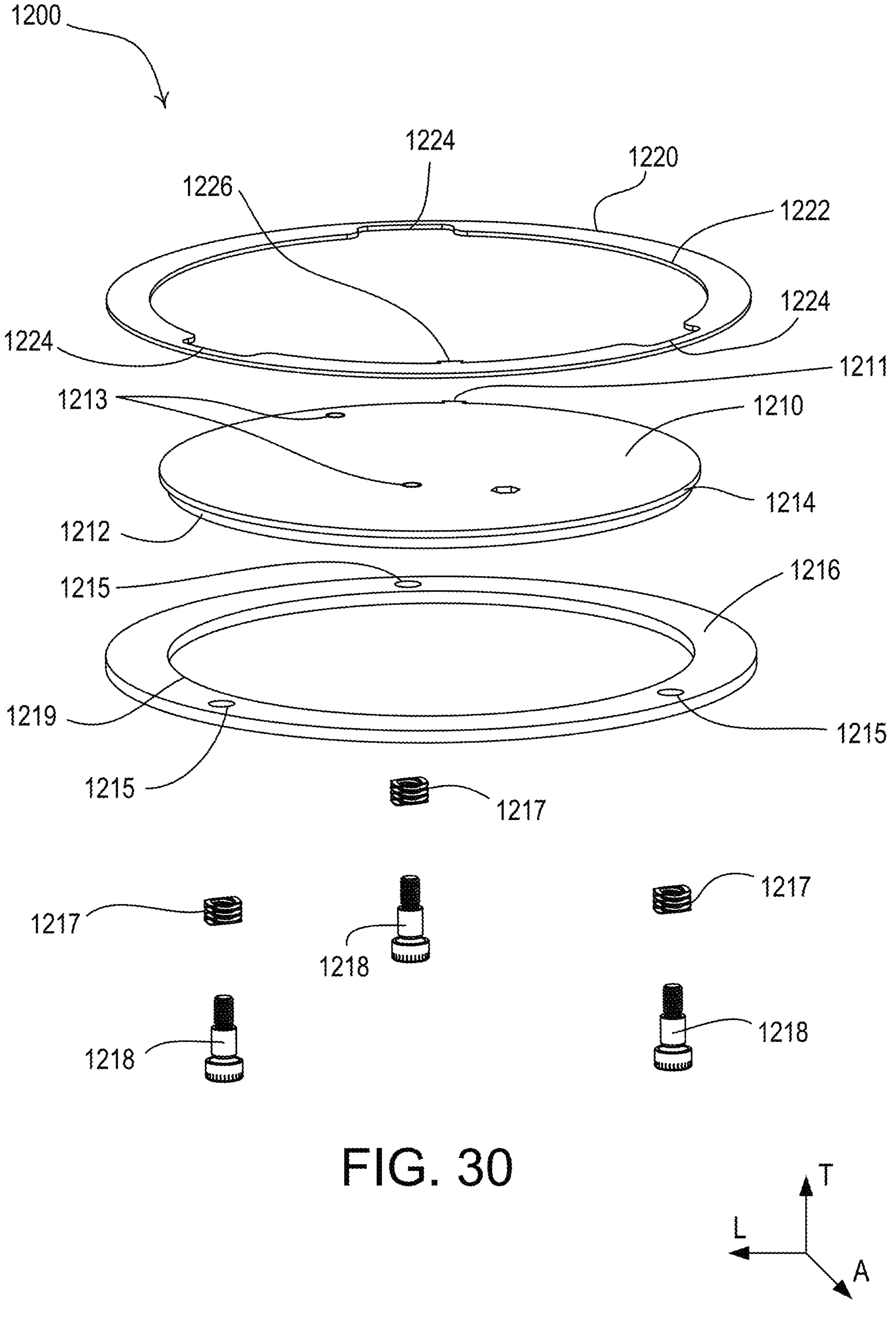
FIG. 30 is an exploded view of an armature of the lighting device of FIG. 26.
Figure 31:
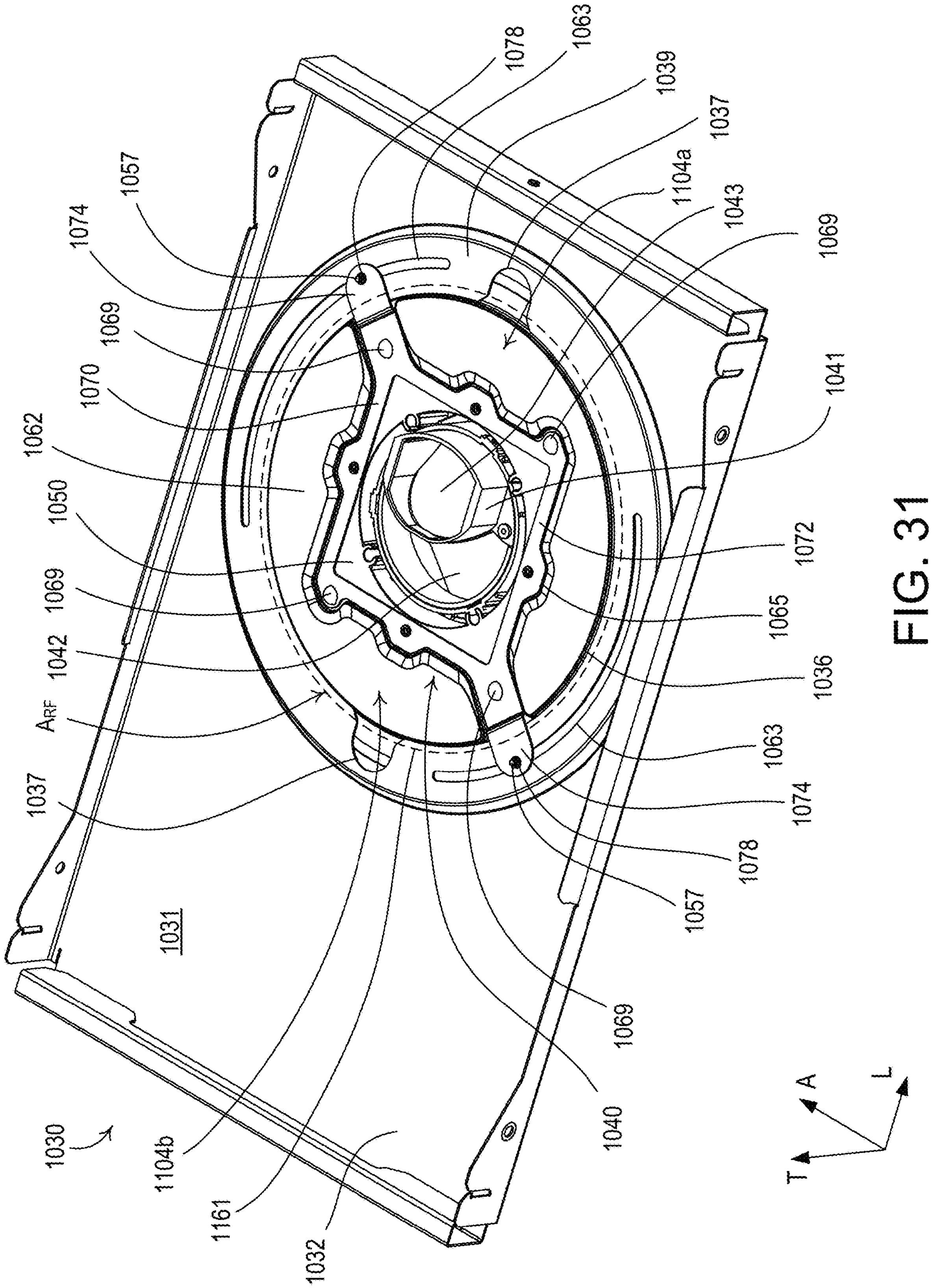
FIG. 31 is a top perspective view of the lighting device of FIG. 26 with the side plates, the upper plate, the lighting device assembly, and an armature of the lighting device removed.
Figure 32:
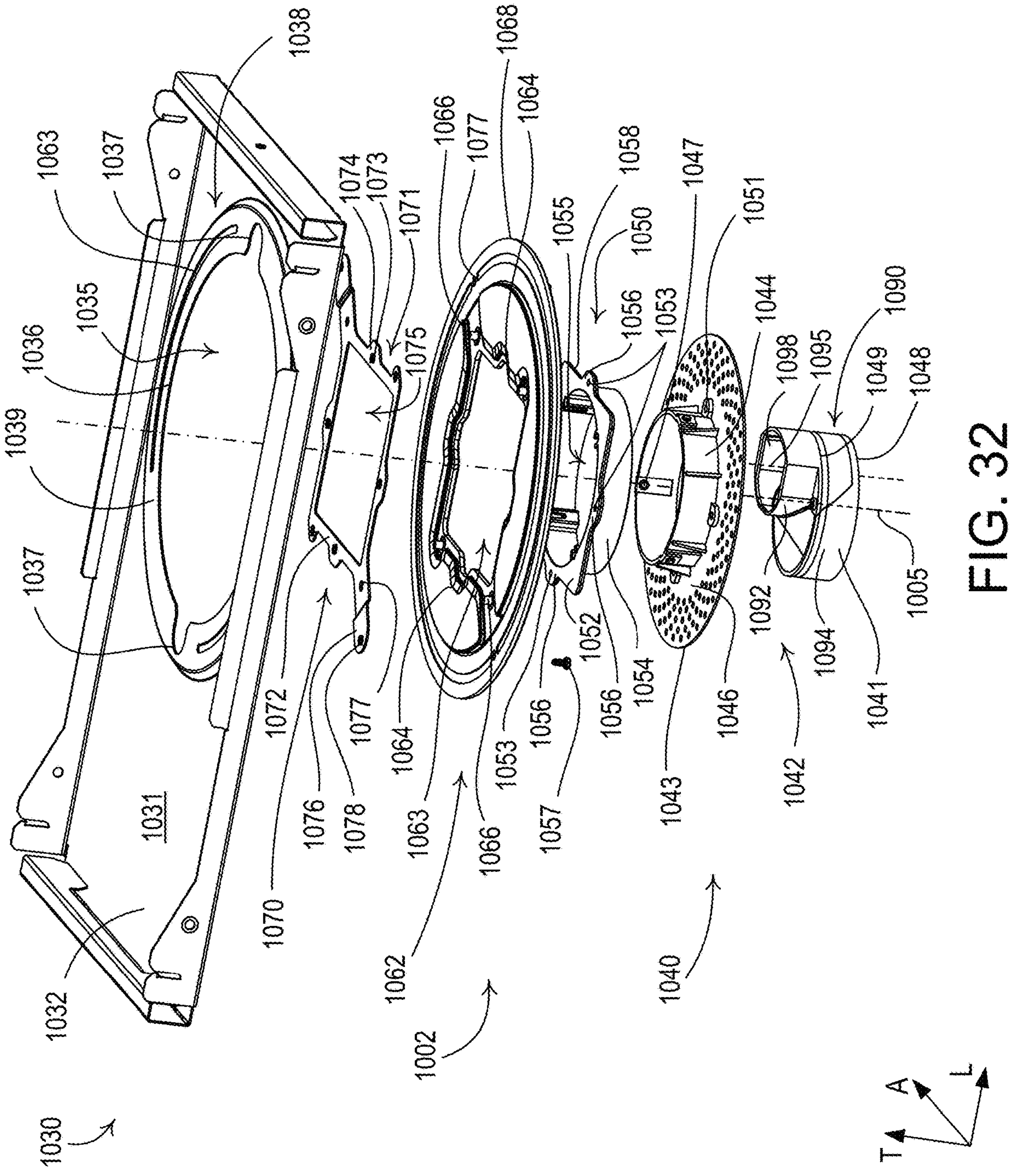
FIG. 32 is an exploded view of the lighting device of FIG. 26 with the side plates, the upper plate, the lighting device assembly, and the armature of the lighting device removed.

FIGS. 26-32 depict another example illumination device, such as a lighting device 1000 (e.g., a controllable LED lighting device). The lighting device 1000 may be configured to be installed within a building structure (e.g., such as a ceiling, wall, etc.). The lighting device 1000 may include a housing 1010, a lighting device assembly 1100, and an armature 1200 for supporting the lighting device assembly 1100. The lighting device 1000 may be configured for providing wall wash lighting. For example, the lighting device 1000 may be configured to shine light emitted by the lighting device assembly 1100 on a wall and/or other vertical surface in the space in which the lighting device 1000 is installed. FIG. 26 is a bottom perspective view of the lighting device 1000. FIG. 27 is an exploded perspective view of the housing 1010 of the lighting device 1000. The housing 1010 may comprise an upper portion 1020 having an upper plate 1022 and a plurality of side plates 1024*a*, 1024*b*, 1024*c*, 1024*d*. The housing 1010 may further comprise a lower portion 1030 comprising a lower plate 1032 configured to be attached to the upper portion 1020. FIG. 28A is a bottom perspective view and FIG. 28B is a bottom view of the lighting device 1000 with the lower portion 1030 of the lighting device 1000 removed. FIG. 29 is a side cross-section view of the lighting device 1000 taken through a center of the lighting device 1000. FIG. 31 is a top perspective view of the lighting device 1000 with the side plates 1024*a*-1024*d*, the upper plate 1022, the lighting device assembly 1100, and the armature 1200 of the lighting device 1000 removed. FIG. 32 is an exploded view of the lighting device 1000 with the side plates 1024*a*-1024*d*, the upper plate 1022, the lighting device assembly 1100, and the armature 1200 of the lighting device 1000 removed.

The housing 1010 may be configured to enclose the lighting device assembly 1100. For example, the housing 1010 may define a cavity 1012. The lighting device assembly 1100 may be configured to be located (e.g., housed) within the cavity 1012. The housing 1010 may be configured to be installed within the building structure. The upper plate 1022 may define an upper surface 1021 and a lower surface 1023, and may be located in a plane that extends in a longitudinal direction L and a lateral direction A. The lower plate 1032 may define an upper surface 1031 and a lower surface 1033, and may be located in a plane that extends in the longitudinal direction L and the lateral direction A. The side plates 1024*a*-1024*d* may extend between the upper plate 1022 and the lower plate (e.g., in a transverse direction T). The cavity 1012 may be defined by the upper plate 1022, the side plates 1024*a*-1024*d*, and the lower portion 1030. The lower portion 1030 of the housing 1010 may be metallic (e.g., at least partially metallic).

The lighting device 1000 may comprise brackets 1016, which may be configured to secure the lighting device 1000 within a building structure (e.g., as shown in FIG. 26). A first bracket of the brackets 1016 may be located on one end of the housing 1010 (e.g., proximate to the side plate 1024*d*). A second bracket of the brackets 1016 may be located on the other end of the housing 1010 (e.g., proximate to the side plate 1024*b*). For example, each of the brackets 1016 may define an arm 1017 and feet 1018 at opposed ends of the arm 1017. The arm 1017 may be adjustable (e.g., in length), for example, to fit within walls and ceilings having support members that are different distances apart. The feet 1018 may be configured to receive fasteners 1019 to secure the lighting device 1000 to the building structure. The brackets 1016 are not shown in FIGS. 27-32.

The housing 1010 may comprise one or more attachment structures 1080 (e.g., as shown in FIG. 26). For example, the attachment structures 1080 may be located at each corner (e.g., the four lower corners) of the housing 1010 (e.g., the upper portion 1020). The attachment structures 1080 may be configured to attach the lower portion 1030 to the upper portion 1020 of the housing 1010 in a similar manner as the attachment structures 480 of the housing 410 shown in FIGS. 11-12B attach the lower portion 430 to the upper portion 420 of the housing 410. Each attachment structure 1080 may comprise an attachment member 1081 at the end of a respective arm 1082 (e.g., a spring arm). For example, the arms 1082 of each attachment member 1081 may be formed in (e.g., cut into) the side plates 1024*b*, 1024*d* of the upper portion 1020 of the housing 1010. The attachment member 1081 of each attachment structure 1080 may extend through a respective opening 1083 in the side plates 1024*a*, 1024*c* (e.g., that are adjacent to the side plates 1024*b*, 1024*d* in which the arms 1082 are formed). The attachment member 1081 of each attachment structure 1080 may comprise a first portion 1084 (e.g., a first plate) that extends through the respective opening 1083 and a second portion 1085 (e.g., a second plate) that extends substantially perpendicular to the first portion 1084 (e.g., substantially parallel to the side plates 1024*a*, 1024*c* in which the openings 1083 are formed). For example, each attachment member 1081 may be bent to form the first portion 1084 and the second portion 1085.

The lower portion 1030 of the housing 1010 may comprise sidewalls 1025 that extend from the upper surface 1031 of the lower plate 1032 (e.g., in the transverse direction T). When the housing 1010 is assembled (e.g., when the lower portion 1030 is attached to the upper portion 1020), the sidewalls 1025 of the lower portion 1030 may extend parallel to the side plates 1024*a*, 1024*c* of the upper portion 1020 within the cavity 1012 of the housing 1010. The attachment structures 1080 of the housing 1010 may further comprise respective attachment plates 1086 formed in the sidewalls 1025. For example, each sidewall 1025 may comprise two attachment plates 1086 (e.g., as shown in FIG. 27). Each of the attachment plates 1086 may be configured to be attached to a respective attachment member 1081 of the upper portion 1020 of the housing 1010. For example, each attachment plate 1086 may define a respective slot

1087 having a snap 1088. The slot 1087 of each attachment plate 1086 is configured to receive the first portion 1084 of the respective attachment member 1081. When the housing 1010 is assembled, the snap 1088 of each attachment plate 1086 may be configured to engage the first portion 1084 of each attachment member 1081 to hold the lower portion 1030 in attachment to the upper portion 1020 of the housing 1010. The second portion 1085 of each attachment member 1081 may extend around (e.g., parallel to) the respective attachment plate 1086 when the housing 1010 is assembled (e.g., as shown in FIG. 26).

To install the lower portion 1030 onto the upper portion 1020 of the housing 1010, the attachment members 1081 (e.g., the first portions 1084) may be inserted into the slots 1087 of the respective attachment plates 1086 (e.g., in the transverse direction T). As the attachment members 1081 (e.g., the first portions 1084) contact the snaps 1088 of the respective slots 1087, the arms 1082 in the upper portion 1020 may be configured to flex (e.g., in towards the cavity 1012 of the housing 1010). When the attachment members 1081 pass the respective snaps 1088, the arms 1082 may be configured to unflex (e.g., at least partially unflex), such that the attachment members 1081 are captured by the respective snaps 1088. For example, the arms 1082 may be partially biased towards the cavity 1012 (e.g., partially flexed) when the respective attachment members 1081 are received in the slots 1087 and captured by the snaps 1088 of the respective attachment plates 1086. The engagement between the attachment members 1081 and the respective snaps 1088 may minimize movement of the lower portion 1030 with respect to the upper portion 1020 in the transverse direction T. To uninstall the lower portion 1030 from the upper portion 1020 of the housing 1010, a user may actuate one or more of the attachment members 1081 to push the attachment member 1081 towards the sidewalls 1025 (e.g., in the longitudinal direction L), such that the attachment members 1081 are not captured by the respective snaps 1088 and may be moved past the respective snaps 1088 (e.g., in the transverse direction T).

The lower portion 1030 of the housing 1010 may further comprise sloped walls 1026 (e.g., wing portions) extending from the respective sidewalls 1025. When the housing 1010 is assembled (e.g., when the lower portion 1030 is attached to the upper portion 1020), the sloped walls 1026 may extend into the cavity 1012 of the housing 1010. The sloped walls 1026 may be configured to facilitate installation of the lower portion 1030 onto the upper portion 1020 of the housing 1010, for example, by being received on inner sides of the side plates 1024*a*, 1024*c* of the upper portion 1020 as the lower portion 1030 is moved towards the upper portion 1020 (e.g., in the transverse direction T). When the housing 1010 is assembled, the sloped walls 1026 may be received in slots 1027 in the respective side plates 1024*a*, 1024*c* of the upper portion 1020 of the housing 1010, such that the sloped walls 1026 may be captured between side edges 1028 of the slots 1027. Engagement between the sloped wall 1026 and the side edges 1028 of the slots 1027 when the housing 1010 is assembled may minimize movement of the lower portion 1030 with respect to the upper portion 1020 in the longitudinal direction L and the lateral direction A.

The lower plate 1032 may comprise a recessed portion 1038 that extends above the upper surface 1031 (e.g., as shown in FIG. 27). The lower plate 1032 (e.g., the lower surface 1033) may comprise an outer opening 1034 (e.g., as shown in FIG. 26). The recessed portion 1038 may be located within an area of the outer opening 1034. The recessed portion 1038 may comprise a rim portion 1039 that surrounds an inner opening 1035 of the lower plate 1032. The rim portion 1039 of the recessed portion 1038 may be positioned in a plane that is parallel to a plane of the upper surface 1031 and/or the lower surface 1033 of the lower plate 1032. The recessed portion 1038 of the lower plate 1032 may extend from the outer opening 1034 (e.g., at the lower surface 1033) to the inner opening 1035 (e.g., at the rim portion 1039).

The lighting device assembly 1100 may be the same as (e.g., identical to) the lighting device assembly 200 of the lighting device 100, the lighting device assembly 500 of the lighting device 400, and/or the lighting device assembly 800 of the lighting device 700. As shown in FIG. 28A, the lighting device assembly 1100 may comprise an optical structure 1110 (e.g., a lens), a reflector 1120, and a light-generation module 1130. The lighting device assembly 1100 (e.g., the light-generation module 1130) may be configured to be wirelessly controllable (e.g., controlled in response to commands received via wireless signals). The light-generation module 1130 of the lighting device assembly 1100 may be configured to emit light and communicate messages (e.g., digital messages) via wireless signals. The light-generation module 1130 may include a printed circuit board 1132, a heat sink 1134, a socket 1136, an antenna 1150 (e.g., a monopole antenna), and an antenna holder 1152. The light-generation module 1130 may include an emitter assembly (e.g., such as emitter assembly 1800 shown in FIGS. 57 and 58) that includes one or more emitters configured to emit the light. The emitter assembly may be mounted to the printed circuit board 1132. The light-generation module 1130 may include a communication circuit (e.g., a wireless communication circuit), such as communication circuit 1944 shown in FIG. 59, that may be mounted to the printed circuit board 1132 and may be in electrical communication with (e.g., electrically coupled to) the antenna 1150 for receiving and/or sending messages (e.g., via wireless signals). For example, the wireless communication circuit of the light generation module 1130 may be configured to communicate the wireless signals at a communication frequency $f_{COMM}$ (e.g., approximately 2.4 GHz).

The optical structure 1110 of the lighting device assembly 1100 may be transparent or translucent, and may be made of any suitable material, for example plastic or glass. The optical structure 1110 may be configured to direct the light emitted by the emitter assembly to shine through a light-exit surface 1115 of the optical structure 1110. The reflector 1120 of the lighting device assembly 1100 may be configured to direct the light emitted by the emitter assembly to shine out through the optical structure 1110. The reflector 1120 may include an inner surface 1126 and an outer surface 1128. The reflector 1120 may define a first opening (e.g., such as the first opening 222 shown in FIG. 10) at a first end 1121 of the reflector 1120 and a second opening 1124 (e.g., such as the second opening 224 shown in FIG. 4) at a second end 1123 of the reflector 1120. The first end 1121 of the reflector 1120 may be located adjacent to the emitter assembly such that the emitter assembly emits light through the first opening. The reflector 1120 may be configured to reflect the light emitted by the emitter assembly towards the second opening 1124. For example, the inner surface 1126 of the reflector 1120 may include a reflective material. The lighting device assembly 1100 may define an axis 1105 that extends through a center of the lighting device assembly 1100. For example, the axis 1105 may extend through a center of the reflector 1120 (e.g., the first opening and the second opening 1124) and a center of the optical structure 1110 of the lighting device assembly 1100.

The reflector 1120 may be at least partially metallic. For example, the inner surface 1126 of the reflector 1120 may be at least partially metallic. The antenna 1150 may be positioned external to the reflector 1120 such that the antenna 1150 is spaced a predetermined distance from the outer surface 1128 of the reflector 1120. For example, the antenna 1150 may extend external to the reflector 1120 from a location adjacent to the first end 1121 of the reflector 1120 towards the second end 1123 of the reflector 1120. As with the antenna holder 252 of the light-generation module 230 shown in FIG. 9A, the antenna holder 1152 may be configured to hold the antenna 1150 external to the reflector 1120 such that the antenna 1150 is spaced the predetermined distance from the outer surface 1128 of the reflector 1120 (e.g., such as the first distance D1 as shown in FIG. 9A). The antenna holder 1152 may be configured such that the antenna 1150 extends (e.g., in the transverse direction T) beyond the second end 1123 of the reflector 1120 (e.g., by the second distance D2 as shown in FIG. 9A) and the antenna holder 1152 extends (e.g., in the transverse direction T) beyond the second end 1123 of the reflector 1120 (e.g., by the third distance D3 as shown in FIG. 9A). In some examples, the antenna 1150 and the antenna holder 1152 may not extend beyond the second end 1123 of the reflector 1120. The socket 1136 of the light-generation module 1130 may be located between the reflector 1120 and the printed circuit board 1132. For example, the socket 1136 may be attached to the heat sink 1134 to at least partially enclose the components mounted to the printed circuit board 1132. The antenna holder 1152 may extend from and/or through the socket 1136 and/or the printed circuit board 1132. The socket 1136 may be configured to removably secure the reflector 1120 to the light-generation module 1130.

The housing 1010 may comprise a trim portion 1040. The trim portion 1040 may be located within the inner opening 1035 in the lower plate 1032 of the housing 1010 and may be configured to direct the light emitted by the light-generation module 1130 to shine on the wall, for example. The trim portion 1040 may include a trim ring 1042 and a collar 1050. The trim ring 1042 may comprise a trim insert 1041 and a trim retainer 1043 (e.g., the trim ring 1042 may define a two-party construction). The trim ring 1042 (e.g., the trim retainer 1043) may include a sleeve 1044 and a plate portion 1046. For example, the plate portion 1046 of the trim retainer 1043 may operate as a mud ring (e.g., a mud plate) configured to provide a flangeless installation appearance for the lighting device 1000 (e.g., such that the trim insert 1041 of the trim ring 1042 presents a knife-edge appearance). The mud plate (e.g., the plate portion 1046) of the trim retainer 1043 may be configured to receive joint compound, for example, to provide the flangeless installation appearance for the lighting device 1000. The trim insert 1041 may define a bottom surface 1048 of the trim ring 1042. The trim insert 1041 (e.g., the bottom surface 1048 of the trim ring 1042) may be, for example, thin to present a knife-edge appearance when the lighting device 1000 is installed. The trim retainer 1043 (e.g., the sleeve 1044) may receive the trim insert 1041 (e.g., as shown in FIG. 32). For example, the trim retainer 1043 (e.g., the sleeve 1044) may comprise ball detents 1047 configured to be received in a groove 1049 in the trim insert 1041 for retaining the trim insert 141 in the trim retainer 143. In some examples, the trim insert 1041 may be integral with the trim retainer 1043 (e.g., the trim ring 1042 may comprise a single-part construction). For example, the trim portion 1040 (e.g., the trim ring 1042) may define an aperture 1045 through which the light emitted by the light-generation module 1130 may be transmitted. The aperture 1045 may be located in a plane that extends in the longitudinal direction L and the lateral direction A at the bottom surface of the plate portion 1046 of the trim ring 1042. For example, the aperture 1045 may have a circular shape (e.g., may be a circle). For example, the aperture 1045 may have a diameter of approximately two inches. The location of the aperture 1045 with the respect to the lighting device assembly 1100 is shown by a first dashed line 1045' in FIG. 28B.

The collar 1050 may be configured to be installed within the inner opening 1035 in the lower plate 1032. The inner opening 1035 may define an inside edge 1036 that may surround the trim portion 1040. The collar 1050 may include a flange portion 1052 and a ring portion 1054. The collar 1050 may define an aperture 1055 through which the light emitted by the light-generation module 1130 may be transmitted. The ring portion 1054 (e.g., the aperture 1055) of the collar 1050 may be configured to receive at least a portion of the trim ring 1042. For example, the trim ring 1042 may be configured to extend through the aperture 1055 of the collar 1050. The collar 1050 (e.g., the flange portion 1052) may define a plurality of tabs 1056. The collar 1050 may support the trim ring 1042, such that the sleeve 1044 of the trim retainer 1043 (e.g., the mud plate) is at least partially received by the ring portion 1054. The trim ring 1042 (e.g., the trim retainer 1043) may define holes 1051 that may be configured to receive fasteners (e.g., screws-now shown) for attaching the trim ring 1042 to the collar 1050. In some examples, the trim ring 142 (e.g., the trim retainer 1043) may comprise clips (e.g., such as the clips 451, 751) that extend from the sleeve 1044 and are configured to clip onto the ring portion 1054 (e.g., the aperture 1055) of the collar 1050 for securing the trim ring 1042 to the collar 1050. The trim portion 1040 may define an axis 1005 that extends through a center of the aperture 1045. For example, the axis 1005 may extend through a center of the trim ring 1042 and the collar 1050 of the trim portion 1040. The trim portion 1040 (e.g., the flange portion 1052 of the collar 1050) may define a rectangular outer edge 1058. It should be appreciated that the trim portion 1040 is not limited to the geometry shown in the figures, instead the trim portion 1040 (e.g., the flange portion 1052 of the collar 1050) may define a circular outer edge. In some examples, the plate portion 1046 of the trim ring 1042 may be configured as a flange and/or bezel (e.g., such as the bezel 146 of the trim ring 142, the bezel 446 of the trim ring 442, and/or the bezel 746 of the trim ring 742).

The housing 1010 may comprise an RF-transparent portion 1060 (e.g., an electrically-non-conductive portion), which may include a non-conductive plate 1062 (e.g., an RF-transmissive or non-shielding plate, such as the non-conductive plates 462, 762) that may be configured to enable the wireless control signals to be transmitted and/or received via the antenna 1150 of the light-generation module 1130 through the inner opening 1035 of the lower plate 1032 of the housing 1010. The non-conductive plate 1062 of the RF-transparent portion 1060 of the housing 1010 may be made from, for example, a material that does not significantly obstruct the propagation of electromagnetic field or waves (e.g., the wireless signals), such as an electrically-non-conductive material (e.g., plastic). The non-conductive plate 1062 (e.g., at least a portion of the non-conductive plate 1062) may be received within the outer opening 1034 of the lower plate 1032 of the housing 1010 (e.g., within the recessed portion 1038). For example, the non-conductive plate 1062 may have an outer edge 1068 configured to be located within the outer opening 1034 of the lower plate 1032 of the housing 1010 (e.g., within the recessed portion 1038). The non-conductive plate 1062 may cover the inner opening 1035 of the lower plate 1032 of the housing 1010 (e.g., at least a portion of the inner opening 1035). In some examples, the non-conductive plate 1062 (e.g., at least a portion of the non-conductive plate 1062) may be received within the opening 1035 in the housing 1010.

The inner opening 1035 of the lower plate 1032 may be sized, for example, to enable the wireless control signals to be transmitted and/or received therethrough. For example, the location of the RF-transparent portion 1060 of the housing 1010 (e.g., the opening in the lower plate of the housing 1010) with the respect to the lighting device assembly 1100 is shown by a second dashed line 1060' in FIG. 28B. The RF-transparent portion 1060 of the housing 1010 may comprise a perimeter 1061 characterized by an area $A_{RF}$ and a diameter $D_{RF}$ (e.g., as shown in FIGS. 26 and 29). The perimeter 1061 of the RF-transparent portion 1060 may be defined by the opening 1035 in the lower plate 1032 of the housing 1030. For example, the size of the RF-transparent portion 1060 may be based on the diameter of the opening 1035 of the lower plate 1032. The diameter $D_{RF}$ of the RF-transparent portion 1060 (e.g., the perimeter 1061) may be approximately equal to a diameter of the inner opening 1035 of the lower plate 1032 (e.g., as shown in FIG. 27). The outer opening 1034 of the lower plate 1032 may be sized (e.g., to set the area $A_{RF}$ and/or the diameter $D_{RF}$ of the RF-transparent portion 1060) so as to enable the wireless control signals to be transmitted and/or received through the outer opening 1034. For example, the diameter $D_{RF}$ of the RF-transparent portion 1060 (e.g., the diameter of the outer opening 1034 of the lower plate 1032) may be approximately 7 inches. The non-conductive plate 1062 may be configured to allow the transmission of the wireless control signals to and/or from the antenna 1150 of the light-generation module 1130.

The non-conductive plate 1062 of the RF-transparent portion 1060 of the housing 1010 may be configured to cover at least a portion of the inner opening 1035 between the trim portion 1040 (e.g., the collar 1050) and the rim portion 1039 of the recessed portion 1038 of the lower plate 1032. The perimeter 1061 of the RF-transparent portion 1060 may surround the trim portion 1040. For example, the RF-transparent portion 1060 of the housing 1010 (e.g., the portion of the non-conductive plate 1062 that covers the inner opening 1035 of the lower plate 1032) may extend radially outward from the collar 1050 towards the inside edge 1036 of the lower plate 1032 that defines the inner opening 1035 (e.g., and also towards the outer opening 1034). The non-conductive plate 1062 may be configured to be substantially parallel to the lower plate 1032 of the housing 1010. The rim portion 1039 of the lower plate 1032 may comprise slots 1063 (e.g., curved slots) for securing the trim portion 1040 to the housing 1010 (e.g., as will be described in greater detail below). When the diameter of the aperture 1045 of the trim portion 1040 is two inches and the transmission frequency $f_{COMM}$ is 2.4 GHZ, the aperture 1045 may not allow for propagation of wireless signals through the aperture 1045 without attenuation. The RF-transparent portion 1060 (e.g., at least the portion of the RF-transparent portion 1060 of the housing 1010 covering the portion of the inner opening 1035 between the trim portion 1040 and the lower plate 1032 of the housing 1010) may provide additional area on the housing 1010 to allow for the transmission of the wireless signals through the housing 1010 (e.g., as will be described in greater detail below).

The non-conductive plate 1062 may define an opening 1065 (e.g., a fixture opening) through which the trim portion 1040 is configured to extend. For example, the opening 1065 of the non-conductive plate 1062 may be configured to receive (e.g., support) the collar 1050. The non-conductive plate 1062 may define posts, such as unformed stakes 1066, which may be used for mounting the non-conductive plate 1062 to the housing 1010 (e.g., as will be described in greater detail below). The flange portion 1052 of the collar 1050 may abut the non-conductive plate 1062 (e.g., at the opening 1065). The opening 1065 of the non-conductive plate 1062 may have a rectangular (e.g., square) shape (e.g., to receive the rectangular outer edge 1058 of the flange portion 1052 of the collar 1050). The non-conductive plate 1062 may be configured to be secured proximate to the inner opening 1035 (e.g., between the inside edge 1036 of the lower plate 1032 and the trim portion 1040). The non-conductive plate 1062 (e.g., the opening 1065 of the non-conductive plate 1062) may define a plurality of notches 1064. Each of the plurality of notches 1064 may be configured to receive a respective one of the tabs 1056 on the flange portion 1052 of the collar 1050. The notches 1064 and the tabs 1056 may be configured to maintain alignment of the trim portion 1040 within the non-conductive plate 1062 (e.g., and within the inner opening 1035 of the lower plate 1032 of the housing 1010). The collar 1050 may define holes 1053 in each of the tabs 1056 that are used for mounting the collar 1050 to the housing 1010 (e.g., as will be described in greater detail below).

In some examples, the aperture 1045 of the trim ring 1042 may have a rectangular (e.g., a square) shape. When the aperture 1045 has a rectangular (e.g., a square) shape, the non-conductive plate 1062 may be configured to support a collar that also has a rectangular (e.g., square) aperture in which the trim portion with the rectangular opening may be received. The collar having the rectangular aperture may also comprise a flange (e.g., such as the flange portion 1052) that defines a rectangular outer edge (e.g., such as the rectangular outer edge 1058), wherein the rectangular aperture may fit within an area defined by the rectangular outer edge. Accordingly, the non-conductive plate 1062 (e.g., the opening 1065) may be configured to receive (e.g., support) trim portions having both circular and rectangular apertures.

The lighting device 1000 (e.g., the housing 1010) may include, for example, a cover assembly 1002 (e.g., a trim assembly). The cover assembly 1002 may include the trim portion 1040 (e.g., the trim ring 1042 and the collar 1050), the non-conductive plate 1062, and a support structure 1070. The support structure 1070 may be configured to support the trim portion 1040 within the opening 1065 of the non-conductive plate 1062 (e.g., within the inner opening 1035 of the lower plate 1032). The support structure 1070 may be configured to connect the trim portion 1040 to the non-conductive plate 1062. The support structure 1070 may include a support bracket 1071. The support structure 1070 (e.g., the support bracket 1071) may extend across the inner opening 1035 in the lower plate 1032 of the housing 1010. The support structure 1070 may be configured to abut the trim portion 1040 and/or the non-conductive plate 1062 when supporting the trim portion 1040 in the opening 1065 of the non-conductive plate 1062. Depending on the material, the support structure 1070 may adversely impact communication of the wireless control signals through the RF-transparent portion 1060 (e.g., through the non-conductive plate 1062), for example, because the support structure 1070 may block and/or redirect a portion of the wireless signals. The overall size of the support structure 1070 may be minimized to avoid interference with the wireless control signals, but also be large enough to appropriately support the trim portion 1040.

The area $A_{RF}$ of the RF-transparent portion 1060 (e.g., within the perimeter 1061) may be characterized by one or more portions that are unobstructed by metallic components, such as the lower plate 1032 and the support structure 1070. For example, the area $A_{RF}$ of the RF-transparent portion 1060 may include a first unobstructed portion 1004*a* that is bounded by the perimeter 1061 of the RF-transparent portion 1060 and the support structure 1070 (e.g., on one side of the support structure 1070) and a second unobstructed portion 1004*b* that is bounded by the perimeter 1061 of the RF-transparent portion 1060 and the support structure 1070 (e.g., on the other side of the support structure 1070). The first and second unobstructed portions 1004*a*, 1004*b* may each be characterized by multiple dimensions, such as chords (e.g., linear lengths, such as the chords 106 of the first and second unobstructed portions 104*a*, 104*b* shown in FIG. 6) between opposing sides of the first and second unobstructed portions 1004*a*, 1004*b*. The chords of the first and second unobstructed portions 1004*a*, 1004*b* may extend in multiple directions in the plane of the lower plate 1032 of the lower portion 1030 of the housing 1010 (e.g., extending in the longitudinal direction L and the lateral direction A). The chords of the first and second unobstructed portions 1004*a*, 1004*b* may have respective lengths that allow RF signals to propagate through the first and second unobstructed portions 1004*a*, 1004*b* with little attenuation. For example, to allow for propagation of the RF signals through the first and second unobstructed portions 1004*a*, 1004*b* of the RF-transparent portion 1060 at the communication frequency $f_{COMM}$ of 2.4 GHz, the lengths of multiple chords of each of the first and second unobstructed portions 1004*a*, 1004*b* may be greater than or equal to approximately three inches.

The support structure 1070 (e.g., the support bracket 1071) may define sides 1072 and extensions 1076 extending from opposed corners of the sides 1072. The sides 1072 of the support bracket 1071 may be connected together to define an opening 1075 of the support structure 1070. Each of the sides 1072 may define a tab 1074 that is configured to align with the tabs 1056 of the collar 1050. The support structure 1070 may define holes 1073 in each of the tabs 1074 that are configured to secure the trim portion 1040 to the housing 1010. For example, fasteners (e.g., screws, such as fasteners 457, 757) may be received through the holes 1073 in the support structure 1070 for securing the support structure 1070 to the trim portion 1040 (e.g., to the collar 1050). In addition, nuts (e.g., such as nuts 459, 759) may be attached to the fasteners for securing the support structure 1070 to the trim portion 1040 (e.g., to the collar 1050). The extensions 1076 may define holes 1077 that are configured to secure the support structure 1070 to the non-conductive plate 1062 (e.g., as shown in FIG. 32). For example, the unformed stakes 1066 of the non-conductive plate 1062 may be received through the holes 1077 of the support structure 1070 and formed (e.g., heated and/or melted as part of a heat-staking process) to produce formed stakes 1069 (e.g., as shown in FIG. 31) for securing the non-conductive plate 1062 to the support structure 1070. The opening 1075 of the support structure 1070 may be aligned with the opening 1065 of the non-conductive plate 1062 when the support structure 1070 is secured to the non-conductive plate 1062.

The non-conductive plate 1062 may support the trim portion 1040 within the inner opening 1035 of the lower plate 1032 of the housing 1010. The trim portion 1040 (e.g., the collar 1050) may be attached to the non-conductive plate 1062 (e.g., via the heat-staking process) and the support structure 1070 may be attached to the trim portion 1040 (e.g., the collar 1050), for example, prior to installation of the non-conductive plate 1062 in the housing 1010. The lower plate 1032 may define notches 1037 around the inner opening 1035. The notches 1037 may allow for insertion of the cover assembly 1002 (e.g., the support structure 1070 when already attached to trim portion 1040, which is attached to the non-conductive plate 1062) into the housing 1010. For example, the cover assembly 1002 (e.g., the non-conductive plate 1062) may be oriented substantially parallel to the lower plate 1032 and the extensions 1076 of the support structure 1070 may be inserted through the notches 1037. After the extensions 1076 of the support structure 1070 are inserted through the notches 1037, the cover assembly 1002 (e.g., the non-conductive plate 1062) may be rotated such that the extensions 1076 of the support structure 1070 move away from the notches 1037 and the rim portion 1039 of the recessed portion 1038 may be captured between the extensions 1076 of the support structure 1070 and the non-conductive plate 1062. The extensions 1076 of the support structure 1070 may be configured to rest on the rim portion 1039 to support the non-conductive plate 1062 within the recessed portion 1038 of the lower plate 1032 (e.g., within the outer opening 1034 and covering the inner opening 1035 of the lower plate 1032).

After the extensions 1076 of the support structure 1070 are resting on the rim portion 1039 of the lower plate 1032 and the non-conductive plate 1062 is positioned within the recessed portion 1038 of the lower plate 1032, the non-conductive plate 1062 may be rotated to appropriately orient the trim portion 1040 in the space in which the lighting device 1000 is installed (e.g., which may be particularly important when the trim portion has a rectangular opening). The extensions 1076 of the support structure 1070 may comprise holes 1078 though which fasteners 1057 (e.g., screws) may be received for securing the support structure 1070 (e.g., and the non-conductive plate 1062) to the housing 1010. The non-conductive plate 1062 may comprise notches 1067 through which the fasteners 1057 that are received in the holes 1078 in the support structure 1070 may extend while the cover assembly 1002 (e.g., the support structure 1070) is being secured to the housing 1010. When the support structure 1070 is attached to the non-conductive plate 1062, the notches 1067 may be aligned with the holes 1078 in the support structure 1070. After the extensions 1076 of the support structure 1070 are inserted through the notches 1037, the cover assembly 1002 (e.g., the non-conductive plate 1062) may be rotated slightly and the extensions 1076 of the support structure 1070 may rest on the rim portion 1039 of the lower plate 1032. The cover assembly 1002 (e.g., the non-conductive plate 1062) may be rotated such that the holes 1078 are aligned with the slots 1063 in the rim portion 1039 of the lower plate 1032. The fasteners 1057 may then be inserted through the notches 1067 in the non-conductive plate 1062, through the respective slots 1063 in the rim portion 1039 of the lower plate 1032, and into the holes 1078 of the support structure 1070 (e.g., in the transverse direction T from the bottom of the lighting device 1000). When the fasteners 1057 are extending through the respective slots 1063 and installed in the holes 1078 but are not fully tightened, the cover assembly 1002 (e.g., the non-conductive plate 1062) may be rotated to appropriately orient the trim portion 1040 within the inner opening 1035. As the cover assembly 1002 (e.g., the non-conductive plate 1062) is rotated, the fasteners 1057 may move through the respective slots 1063 and contact ends of the respective slots 1063 to limit rotation of the cover assembly 1002 (e.g., prevent full rotation of the cover assembly 1002). When the trim portion 1040 is oriented appropriately, the fasteners 1057 may be tightened to secure the cover assembly 1002 (e.g., the trim portion 1040, the non-conductive plate 1062, and the support structure 1070) in place.

Additionally or alternatively, although not shown in the figures, it should be appreciated that the support structure 1070 may be attached to the upper plate 1022 and/or one or more of the side plates 1024*a*-1024*d*. Although the support structure 1070 is shown in the figures as a separate component of the lighting device 1000, it should be appreciated that the support structure 1070 may be formed as part of the lower plate 1032 of the housing 1010, for example, such that the inner opening 1035 comprises two aperture portions. When the inner opening 1035 comprises two opening portions, the RF-transparent portion 1060 may comprise a first non-conductive plate and a second non-conductive plate that are located in respective opening portions of the inner opening 1035. The first and second non-conductive plates within the respective opening portions of the inner opening 1035 may fall within the area $A_{RF}$ of the RF-transparent portion 1060, such that the diameter $D_{RF}$ of the RF-transparent portion 1060 is approximately equal to a diameter of the outermost edges of the opening portions of the inner opening 1035. In one or more other examples, the inner opening 1035 may comprise three or four opening portions, and the RF-transparent portion 1060 may comprise three or four non-conductive plates, respectively.

The armature 1200 of the lighting device 1000 may be attached to the housing 1010. The armature 1200 may be configured to support the lighting device assembly 1100 within the housing 1010 above the aperture 1045 (e.g., as represented by the first dashed line 1045' in FIG. 28B) of the trim portion 1040 in the lower plate 1032 of the housing 1010, for example, such that the light emitted by the emitter assembly may shine through the aperture 1045 of the trim portion 1040 and wireless control signals transmitted by the light-generation module 1130 may be transmitted through the RF-transparent portion 1060 of the housing 1010 (e.g., as represented by the second dashed line 1060' in FIG. 28B). The armature 1200 may be configured to enable rotation of the lighting device assembly 1100 within the housing 1010. The lighting device 1000 may further comprise an interior plate 1011, which may be located inside of the housing 1010 (e.g., as shown in FIGS. 28A and 28B). The interior plate 1011 may be configured to be attached to the upper plate 1022 of the upper portion 1020 of the housing 1010. For example, the interior plate 1011 may comprise holes 1013 (FIG. 29) configured to receive fasteners 1014 (e.g., screws) that may also be received through holes 1015 (FIG. 27) in the upper plate 1022 of the upper portion 1020 of the housing 1010 for securing the interior plate 1011 to the housing 1010. The armature 1200 may be configured to be mounted to the interior plate 1011. The interior plate 1011 may be configured to operate as a heat sink for the light-generation module 1130 of the lighting device assembly 1100. The light-generation module 1130 may be thermally coupled to the interior plate 1011 via the armature 1200.

The trim portion 1040 (e.g., the trim insert 1041) may comprise a wall-wash trim assembly 1090 (e.g., as shown in FIG. 32), which may together operate to collect, reflect, and diffuse the light emitted by the lighting device assembly 1100 (e.g., towards the wall). The wall-wash trim assembly 1090 may comprise a body having a lower body portion 1092 (FIG. 32) and an upper body portion 1094 (e.g., as shown in FIG. 32). The wall-wash trim assembly 1090 may further comprise a lens 1096 (e.g., as shown in FIG. 26), which may be supported by the body of the wall-wash trim assembly 1090 (e.g., the lower body portion 1092 and/or the upper body portion 1094). For example, the wall-wash trim assembly 1090 may operate to minimize generation of a dark band (e.g., a dark area) at the top of a wall, for example, and/or scalloping (e.g., oval-triangular shape of light shining) on the wall. In some examples, the lens 1096 may be located above (e.g., on top of) the lower body portion 1092 of the wall-wash trim assembly 1090, and the upper body portion 1094 may be connected to the lower body portion 1092, such that the lens 1096 is captured between the lower body portion 1092 and the upper body portion 1094.

The trim ring 1042 (e.g., the upper body portion 1094) may comprise a tunnel 1098, which may be configured to collect the light emitted by the emitter assembly of the light-generation module 1130 and reflect the light towards the lens 1096. The tunnel 1098 not be centered within the upper body portion 1094 (e.g., not aligned with the axis 1005 of the trim portion 1040). For example, the tunnel 1098 may be centered about an axis 1095 that is offset from the axis 1005 of the trim portion 1040. The tunnel 1098 may be aligned with the lighting device assembly 1100 (e.g., with the optical structure 1110 and the reflector 1120) to collect the light emitted by the emitter assembly of the light-generation module 1130, such that the upper body portion 1094 may reflect the light towards the lens 1096. The lens 1096 may be positioned at an angle with respect to the plane of the aperture 1045 of the trim portion 1040. The lens 1096 may be configured to direct the light received via the upper body portion 1094 from the lighting device 1000 in a non-vertical direction (e.g., towards the wall). In some examples, the lens 1096 may be configured to direct light in a direction that is nearly horizonal towards the wall.

FIG. 30 is an exploded view of the armature 1200. The armature 1200 may comprise a base portion 1210 and a mounting ring 1216. The armature 1200 may define an axis 1205 that extends through the center of the base portion 1210 and the center of the mounting ring 1216. The axis 1205 of the armature 1200 may be aligned (e.g., coaxial) with the axis 1005 of the trim portion 1040 (e.g., the center of the aperture 1045 of the trim ring 1042). The base portion 1210 may comprise a drum 1212 and a flange 1214. The mounting ring 1216 may be configured to secure the armature 1200 to the housing 1010 (e.g., to the upper plate 1022 of the upper portion 1020 of the housing 1010). For example, the mounting ring 1216 may define a plurality of holes 1215. Each of the plurality of holes 1215 may be configured to receive a respective one of a plurality of fasteners 1218 (e.g., screws) to secure the armature 1200 to the housing 1010. Each of the fasteners 1218 may receive a respective spring 1217. The fasteners 1218 may be configured to be received by corresponding holes 1029 in the upper plate 1022 of the housing 1010 (FIG. 27). The springs 1217 may be configured to bias the mounting ring 1216 towards the upper plate 1022 of the housing 1010. The mounting ring 1216 may define an opening 1219 that is configured to receive the drum 1212 of the base portion 1210. The flange 1214 of the base portion 1210 may be captured between the mounting ring 1216 and the upper plate 1022 of the housing 1010.

The lighting device assembly 1100 (e.g., the light-generation module 1130) may be mounted to the base portion 1210. The drum 1212 of the base portion 1210 may define holes 1213 therethrough. The holes 1213 of the drum 1212 may be configured to receive fasteners 1135 (e.g., screws) of the light-generation module 1130 for attaching the lighting device assembly 1100 to the armature 1200. When the lighting device assembly 1100 is attached to the base portion 1210 of the armature 1200, the light-generation module 1130 (e.g., the optical structure 1110) may be directed straight down in the transverse direction T (e.g., as shown in FIG. 29). For example, the axis 1105 may extend in the transverse direction T when the lighting device assembly 1100 is attached to the base portion 1210 of the armature 1200. As shown in FIG. 28B, the lighting device assembly 1100 may be mounted to the base portion 1210 of the armature 1200 off center from a center (e.g., the axis 1205) of the armature 1200 (e.g., the axis 1105 of the lighting device assembly 1100 may not be aligned with the axis 1205 of the armature 1200). The lighting device assembly 1100 may be located on the opposite side of the axis 1205 of the armature 1200 as the wall on which the lighting device 1000 is configured to shine (e.g., to provide wall wash lighting). The base portion 1210 of the armature 1200 may comprise an indicator 1201 (e.g., such as an arrow), which may be configured to be pointed towards the wall on which the light emitted by the emitter assembly of the lighting device 1000 is configured to shine.

The user may adjust a rotational position of the base portion 1210 around the axis 1205 of the armature 1200 to move (e.g., rotate) the lighting device assembly 1100 around the axis 1205 of the armature 1200 (e.g., such that the light-generation module 1130 may orbit around the axis 1205 of the armature 1200). When the flange 1214 of the base portion 1210 is captured between the mounting ring 1216 and the upper plate 1022 of the housing 1010, the base portion 1210 of the armature 1200 may be configured to rotate within the opening 1219 of the mounting ring 1216 (e.g., around the axis 1205 of the armature 1200). For example, the user may apply a force to the lighting device assembly 1100 to rotate the base portion 1210 around the axis 1205. The springs 1217 may be configured to enable the base portion 1210 to more easily rotate within the opening 1219 of the mounting ring 1216. For example, the springs 1217 may be configured to be compressed to enable the base portion 1210 and the mounting ring 1216 to move away from (e.g., out of contact with) the upper plate 1022 when the base portion 1210 is being rotated. When the user applies the force to the lighting device assembly 1100 to pull the lighting device assembly 1100 in the transverse direction T, the springs 1217 may compress to allow the base portion 1210 and the mounting ring 1216 to move away from the upper plate 1022 of the housing 1010. When the base portion 1210 is not contacting the upper plate 1022 of the housing 1010, the base portion 1210 may be more easily rotated within the opening 1219 of the mounting ring 1216. The lighting device assembly 1100 may be rotated around the axis 1205 of the armature 1200 until the indicator 1201 is directed towards the wall on which the lighting device 1000 is configured to shine, and the light-generation module 1130 is located on the opposite side of the axis 1205 of the armature 1200 as the wall on which the light emitted by the emitter assembly of the lighting device 1000 is configured to shine. As the lighting device assembly 1100 rotates around the axis 1205 of the armature 1200, the antenna 1150 of the light-generation module 1130 remains aligned with (e.g., proximate to) the RF-transparent portion 1060 (e.g., as represented by the second dashed line 1060' shown in FIG. 28B) of the housing 1010.

The armature 1200 may further comprise an inner ring 1220, which may be received between the mounting ring 1216 and the upper plate 1022 of the housing 1010. The inner ring 1220 may define an opening 1222 through which the base portion 1210 may extend (e.g., such that the flange 1214 is received in the opening 1222). The inner ring 1220 may comprise notches 1224 in the opening 1222. The fasteners 1218 for attaching the mounting ring 1216 to the upper plate 1022 of the housing 1010 may extend through the notches 1224. The inner ring 1220 may be configured to prevent free rotation of the base portion 1210. For example, the inner ring 1220 may be configured to prevent more than approximately a full rotation (e.g., greater than approximately 360°) of the base portion 1210. For example, the base portion 1210 may define a tab 1211 configured to contact a tab 1226 on the inner ring 1220 to prevent free rotation of the base portion 1210. The notches 1224 may contact the fasteners 1218 to prevent free rotation of the inner ring 1220. The inner ring 1220 may be able to slip a small amount (e.g., approximately 10 degrees), for example, because the notches 1224 define a length that is longer than the diameter of the fasteners 1218. Enabling the inner ring 1220 to slip the small amount may enable the armature 1200 to rotate at least 360 degrees. If the inner ring 1220 were fixed, the armature 1200 may be prevented from rotating a full 360°.

After the housing 1010 of the lighting device 1000 is installed, an installer may rotate the armature 1200 so that the lighting device assembly 1100 moves around the axis 1205 of the armature 1200 until the indicator 1201 (e.g., the arrow) is pointed towards the wall on which the light emitted by the emitter assembly of the light-generation module 1130 is configured to shine. At this time, the lighting device assembly 1100 may be located on the opposite side of the axis 1205 of the armature 1200 as the wall on which the light emitted by the emitter assembly of the light-generation module 1130 is configured to shine. The trim portion 1040 (e.g., when connected to the non-conductive plate 1062 and the support structure 1070) may be installed into the inner opening 1035 in the lower plate 1032 of the lower portion 1030 of the housing 1010 (e.g., as described above). The cover assembly 1002 (e.g., the trim portion 1040, the non-conductive plate 1062, and the support structure 1070) may then be rotated until the tunnel 1098 of the upper body portion 1094 is aligned with the optical structure 1110 and/or the reflector 1120 of the lighting device assembly 1100 (e.g., as shown in FIG. 29). At this time, the lens 1096 of the wall-wash trim assembly 1090 may be directed towards the wall. When the tunnel 1098 of the upper body portion 1094 is aligned with the lighting device assembly 1100, the fasteners 1057 may be tightened to secure the cover assembly 1002 (e.g., the trim portion 1040, the non-conductive plate 1062, and the support structure 1070) in place.

Figure 33:
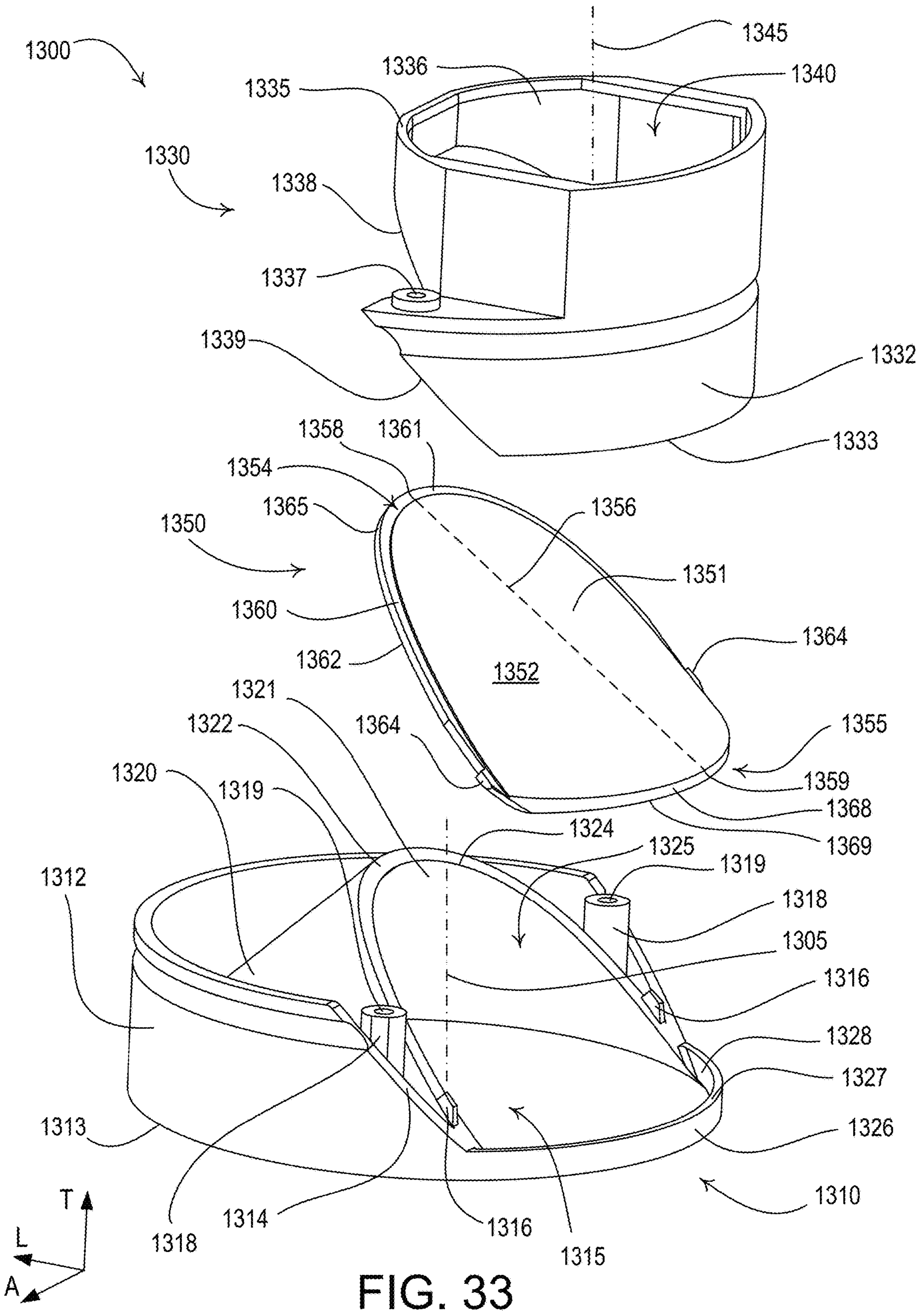
FIG. 33 is an exploded view of an example wall-wash trim assembly.
Figure 34:
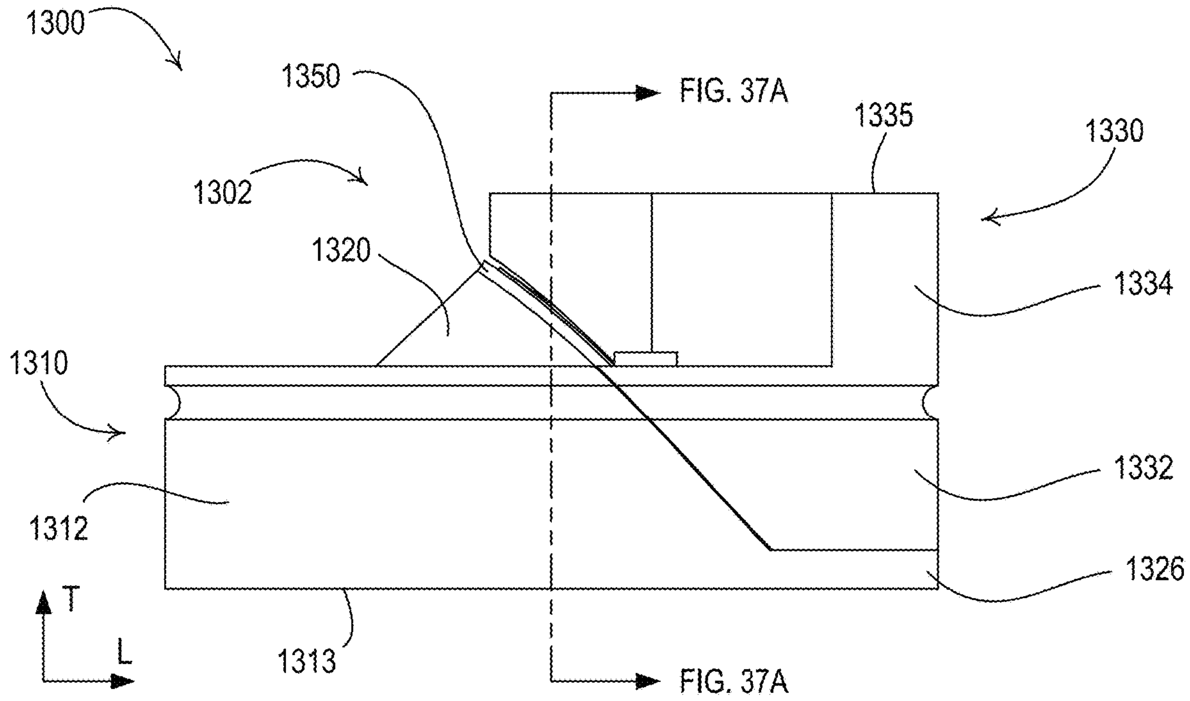
FIG. 34 is a side view of the wall-wash trim assembly of FIG. 33.
Figure 35:
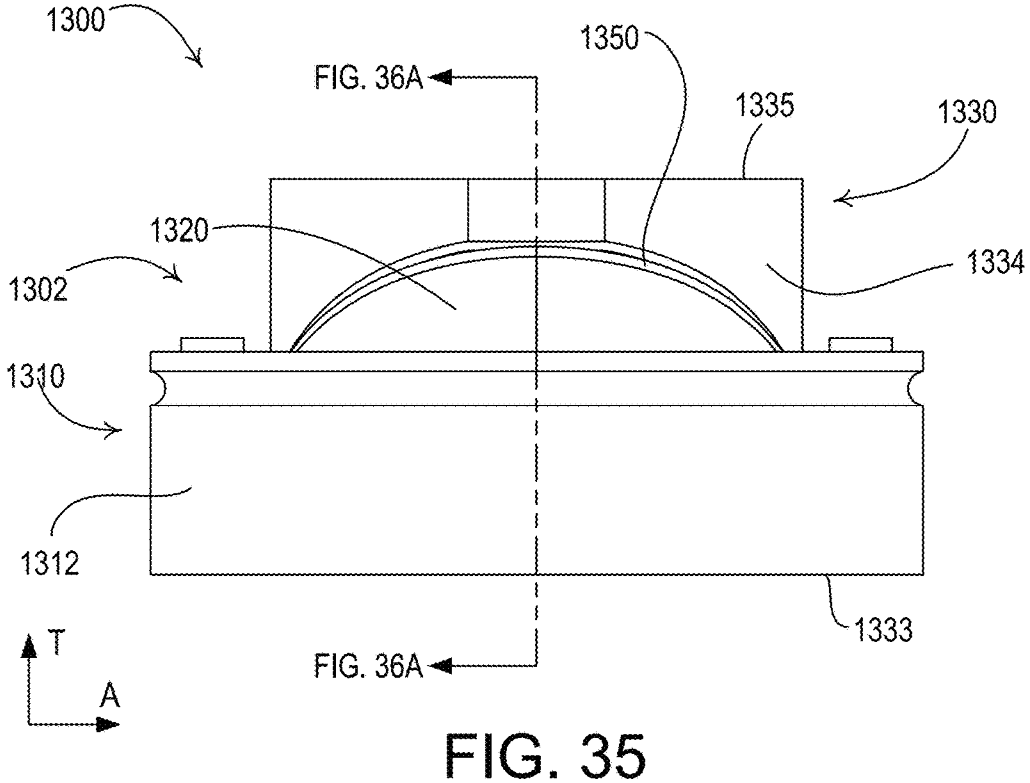
FIG. 35 is a front view of the wall-wash trim assembly of FIG. 33.
Figure 36A:
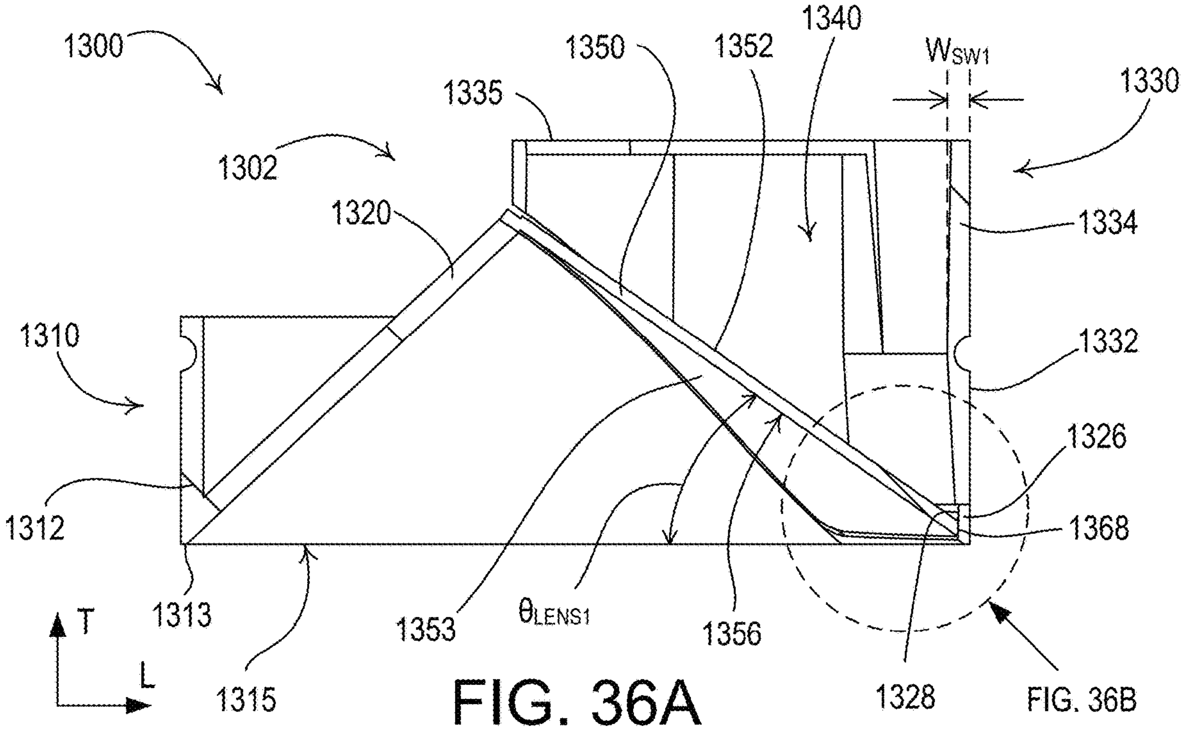
FIG. 36A is a cross-section view of the wall-wash trim assembly of FIG. 33 taken through the line shown on FIG. 35.
Figure 36B:
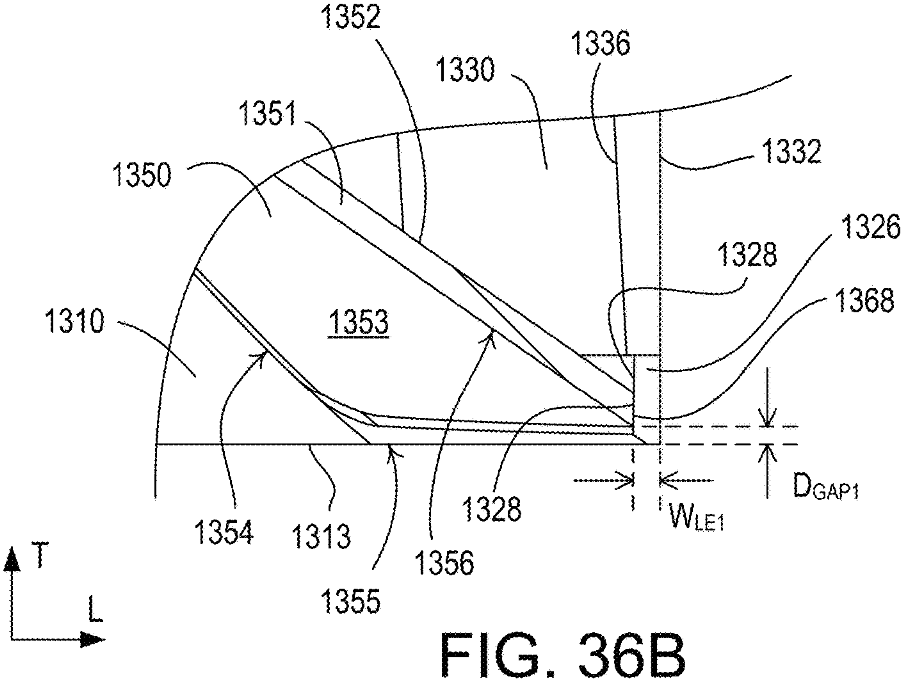
FIG. 36B is an enlarged partial cross-section view of the wall-wash trim assembly as shown in FIG. 36A.
Figure 37:
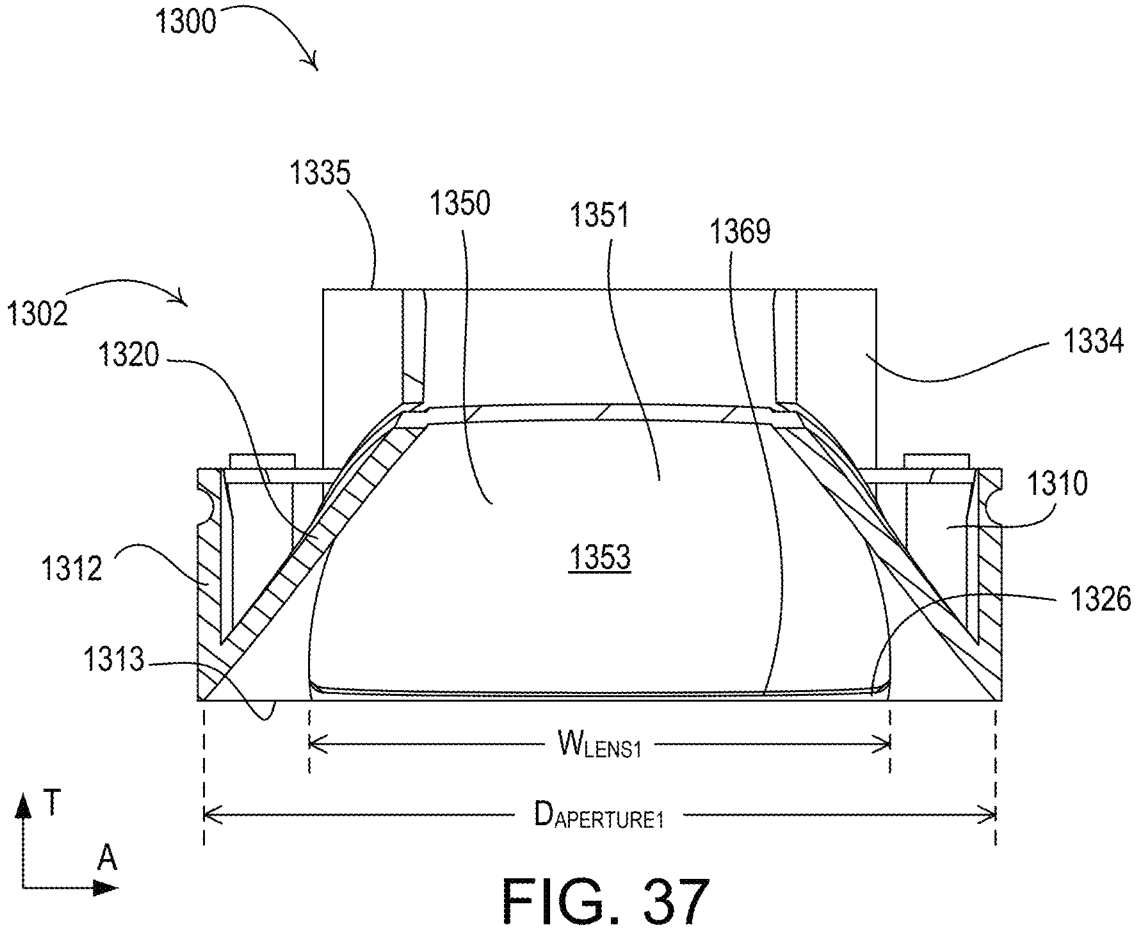
FIG. 37 is a cross-section view of the wall-wash trim assembly of FIG. 33 taken through the line shown on FIG. 34.

FIGS. 33-37A depict an example wall-wash trim assembly 1300 (e.g., the wall-wash trim assembly 1090) that may be configured to be used in a lighting device (e.g., such as the lighting device 1000 shown in FIGS. 26-32). FIG. 33 is an exploded view of the wall-wash trim assembly 1300. FIG. 34 is a side view of the wall-wash trim assembly 1300. FIG. 35 is a front view of the wall-wash trim assembly 1300. FIG. 36A is a side cross-section view of the wall-wash trim assembly 1300 taken through the line shown on FIG. 35. FIG. 36B is an enlarged partial cross-section view of the wall-wash trim assembly 1300 as shown in FIG. 36A. FIG. 37A is a front cross-section view of the wall-wash trim assembly 1300 taken through the line shown on FIG. 34. The wall-wash trim assembly 1300 (e.g., at least a portion of the wall-wash trim assembly 1300) may be configured to collect, reflect, and diffuse the light emitted by a lighting device assembly (e.g., such as the lighting device assembly 200 shown in FIGS. 3-5 and 8-11, the lighting device assembly 500 shown in FIGS. 13-15 and 18, the lighting device assembly 800 shown in FIG. 23, and/or the lighting device assembly 1100 shown in FIGS. 26-32) onto a wall (e.g., to provide wall-wash lighting). For example, the wall-wash trim assembly 1300 (e.g., at least a portion of the wall-wash trim assembly 1300) may be configured to minimize generation of a dark band (e.g., a dark area) at the top of the wall and/or scalloping (e.g., oval-triangular shape of light) on the wall.

The wall-wash trim assembly 1300 may comprise a body 1302 having a lower body portion 1310 (e.g., a base portion) and an upper body portion 1330 (e.g., a light conduit portion). For example, the lower body portion 1310 may define a trim ring of the lighting device in which the wall-wash trim assembly 1300 is installed. The wall-wash trim assembly 1300 may also comprise a lens 1350, which may be supported by the body 1302 of the wall-wash trim assembly 1300 (e.g., the lower body portion 1310 and/or the upper body portion 1330). For example, the lens 1350 may be configured to be secured between the lower body portion 1310 and the upper body portion 1330.

The lower body portion 1310 may define a sidewall 1312, a shroud 1320, and a rim 1326. The lower body portion 1310 may further define a bottom surface 1313 (e.g., a bottom surface of the sidewall 1312 and the rim 1326) and a side surface 1314. The sidewall 1312 may be a first sidewall portion of the body 1302. The sidewall 1312 may be cylindrical and may extend around the shroud 1320 such that the shroud 1320 is located on an interior side of the sidewall 1312. The shroud 1320 may define a trim surface 1321 and a first lens interface surface 1322. The trim surface 1321 may be a lower surface of the shroud 1320 that faces toward the bottom surface 1313. The trim surface 1321 of the shroud 1320 may be, for example, a matte finish (e.g., a black matte finish) in order to minimize reflections of light (e.g., glare) off of the trim surface 1321. For example, the lens 1350 may abut (e.g., rest on) the first lens interface surface 1322 when the lens 1350 is secured between the lower body portion 1310 and the upper body portion 1330. The lower body portion 1310 may define a lens opening 1324 and a channel 1325. The lens opening 1324 may be defined by the shroud 1320 and the rim 1326. The lower body portion 1310 (e.g., the shroud 1320) may define tabs 1316. The tabs 1316 may extend from the first lens interface surface 1322 proximate to the rim 1326. The lower body portion 1310 may define a pair of sleeves 1318 that define respective holes 1319 that are configured to receive fasteners (e.g., screws—not shown) to secure the upper body portion 1330 to the lower body portion 1310.

The lower body portion 1310 may define an aperture 1315 (e.g., such as the aperture 145 of the trim portion 140, the aperture 445 of the trim portion 440, the aperture 745 of the trim portion 740, and/or the aperture 1045 of the trim portion 1040). The aperture 1315 may be surrounded by the bottom surface 1313 of the lower body portion 1310. The channel 1325 of the lower body portion 1310 may extend between the lens opening 1324 and the aperture 1315. The aperture 1315 may be located in a plane that extends in the longitudinal direction L and the lateral direction A at the bottom surface 1313 of the lower body portion 1310 (e.g., which may be called the plane of the aperture 1315). For example, the aperture 1315 may be circle-shaped (e.g., shaped like a circle). The bottom surface 1313 may extend in the plane of the aperture 1315. The lower body portion 1310 may define an axis 1305 that extends through a center of the aperture 1315 (e.g., in the transverse direction T). As shown in FIG. 37A, the aperture 1315 is characterized by a diameter $D_{APERTURE1}$ (e.g., approximately two inches).

The upper body portion 1330 may define a sidewall 1332, a lower surface 1333, an upper surface 1335, and a second lens interface surface 1338. The sidewall 1332 may be a second sidewall portion of the body 1302. The upper body portion 1330 may be secured to the lower body portion 1310, for example, with the lens 1350 between the upper body portion 1330 and the lower body portion 1310. The upper body portion 1330 may define holes 1337 that are configured to receive the fasteners to secure the upper body portion 1330 to the lower body portion 1310. Together, the sidewall 1312 of the lower body portion 1310 and the sidewall 1332 of the upper body portion 1330 may surround (e.g., at least partially surround) the shroud 1320 of the lower body portion 1310 and the lens 1350 when the lens 1350 is secured between the lower body portion 1310 and the upper body portion 1330. The upper body portion 1330 may define a side surface 1339 that is configured to abut the side surface 1314 of the lower body portion 1310. The rim 1326 may extend about at least a portion of a perimeter of the aperture 1315 (e.g., from respective sides of the first lens interface surface 1322). The rim 1326 may have an upper surface 1327. When the upper body portion 1330 is secured to the lower body portion 1310, the lower surface 1333 of the upper body portion 1330 may be configured to abut the upper surface 1327 of the rim 1326.

The upper body portion 1330 may define a tunnel 1340 that extends through the upper body portion 1330. The upper body portion 1330 may comprise a tunnel wall 1334 that surrounds the tunnel 1340. The tunnel 1340 (e.g., the tunnel wall 1334) may define an interior surface 1336 (e.g., which may at least partially surround the tunnel 1340). For example, the upper body portion 1330 may define an axis 1345 that may extend through a center of the tunnel 1340. The wall-wash trim assembly 1300 (e.g., the upper surface 1335 of the upper body portion 1330) may be configured to be located proximate to and aligned with the lighting device assembly, such that the axis 1345 of the upper body portion 1330 is aligned with (e.g., coaxial with) an axis of the lighting device assembly (e.g., the axes 205, 505, 805, 1105). The upper body portion 1330 (e.g., the tunnel 1340) may be configured to collect and reflect the light emitted by the lighting device assembly. For example, the interior surface 1336 of the upper body portion 1330 may be reflective. For example, the upper body portion 1330 may be made from a reflective material (e.g., metal) and/or the interior surface 1336 may be coated with a reflective coating.

The body 1302 of the wall-wash trim assembly 1300 (e.g., the lower body portion 1310) may define a third lens interface surface 1328 (e.g., a reflective lens interface surface), for example, on the rim 1326 of the lower body portion 1310. For example, the lens opening 1324 may be defined by the first lens interface surface 1322 and the third lens interface surface 1328. The third lens interface surface 1328 on the rim 1326 may be reflective (e.g., made from a reflective material and/or coated with a reflective material). For example, the lens 1350 may abut the third lens interface surface 1328 on the rim 1326 of the lower body portion 1310. The third lens interface surface 1328 on the rim 1326 may be oriented, for example, approximately vertical (e.g., approximately perpendicular to the plane of the aperture 1315).

The lens 1350 may comprise a light-transmission portion 1351 having a light-entry surface 1352 (e.g., as shown in FIG. 33) and a light-exit surface 1353 (e.g., as shown in FIG.

37). The lens 1350 may define a first perimeter portion 1354 and a second perimeter portion 1355. The light-transmission portion 1351 of the lens 1350 may be located between (e.g., surrounded by) the first perimeter portion 1354 and the second perimeter portion 1355. The first perimeter portion 1354 may correspond with a shape of the first lens interface surface 1322 of the shroud 1320 of the lower body portion 1310, and the second perimeter portion 1355 may correspond with a shape of the third lens interface surface 1328 on the rim 1326 of the lower body portion 1310. The light-transmission portion 1351 may be made of, for example, a translucent or transparent material. For example, the light-transmission portion 1351 may be diffusive (e.g., to evenly spread the light emitted by the lighting device assembly across the wall).

The second perimeter portion 1355 of the light-transmission portion 1351 may define a lower interface surface 1368 of the lens 1350. The lower interface surface 1368 of the lens 1350 may be oriented, for example, approximately vertical (e.g., approximately perpendicular to the plane of the aperture 1315). The second perimeter portion 1355 may define a lower edge 1369 (e.g., a thin edge and/or a knife edge) of the lens 1350. For example, the second perimeter portion 1355 may define a tapered section that terminates at the lower edge 1369. For example, the second perimeter portion 1355 (e.g., the lower interface surface 1368) may be circle-shaped, i.e., shaped like a circle (e.g., a partial circle) that extends in a plane that is parallel to the aperture 1315. The second perimeter portion 1355 (e.g., the lower interface surface 1368) may be characterized by a radius that is equal to one-half of the diameter $D_{APERTURE1}$ of the aperture 1315 (e.g., such that the second perimeter portion 1355 has the same shape as the aperture 1315). The lower interface surface 1368 of the lens 1350 may be configured to abut the rim 1326 of the lower body portion 1310 (e.g., the third lens interface surface 1328) when the lens 1350 is secured between the upper body portion 1330 and the lower body portion 1310.

The light-transmission portion 1351 of the lens 1350 may be non-planar. The light-transmission portion 1351 of the lens 1350 may define, for example, a concave shape that may extend in a direction away from the aperture 1315 of the lower body portion 1310. For example, the light-entry surface 1352 of the light-transmission portion 1351 may define an outside surface of the concave shape of the lens 1350 and the light-exit surface 1353 of the light-transmission portion 1351 may define an inside surface of the concave shape of the light-transmission portion 1351 of the lens 1350. For example, the second perimeter portion 1355 may define a cut in the oval shape of the first perimeter portion 1354 and the concave shape of the light-transmission portion 1351 of the lens 1350. The intersection of the first perimeter portion 1354 and the second perimeter portion 1355 may occur at a point that is at approximately the middle of the complete oval shape that defines the shape of the first perimeter portion 1354.

The lens 1350 may define a center line 1356 (e.g., a central axis) that extends from a midpoint 1358 of the first perimeter portion 1354 to a midpoint 1359 of the second perimeter portion 1355. The center line 1356 may be linear and may be oriented at an angle $\theta_{LENS1}$ (e.g., approximately 35°) with respect to the plane of the aperture 1315 (e.g., as shown in FIG. 36A). For example, the center line 1356 may define a ridge (e.g., a peak) of the concave shape of the light-transmission portion 1351 of the lens 1350. The light-transmission portion 1351 of the lens 1350 may wrap down from the center line 1356 to the first perimeter portion 1354 to form the concave shape of the light-transmission portion 1351 of the lens 1350 (e.g., as shown in FIG. 33).

The lens 1350 may comprise a support portion 1360 (e.g., a flange) that extends from the light-transmission portion 1351 (e.g., from the first perimeter portion 1354). The support portion 1360 may define an upper support surface 1361 and a lower support surface 1362. The support portion 1360 (e.g., the upper support surface 1361 and the lower support surface 1362) may be oriented at an angle with respect to the plane of the aperture 1315. The support portion 1360 may define an upper edge 1365 of the lens 1350. For example, the first perimeter portion 1354 may be oval shaped, i.e., shaped like an oval (e.g., a partial oval, such as an arc). When the lens 1350 is secured between the lower body portion 1310 and the upper body portion 1330, the lower support surface 1362 may be supported by (e.g., may rest on) the first lens interface surface 1322 of the lower body portion 1310, and the second lens interface surface 1338 of the upper body portion 1330 may be supported by (e.g., may rest on) the upper support surface 1361 of the support portion 1360. The lens 1350 may define fins 1364 that extend from the support portion 1360 on opposed sides of the lens 1350. The fins 1364 may be configured to engage the respective tabs 1316 on the lower body portion 1310 to align the lens 1350 within the wall-wash trim assembly 1300.

The lens 1350 (e.g., the support portion 1360) may be clamped between the upper body portion 1330 and the lower body portion 1310, such that the axis 1345 of the upper body portion 1330 (e.g., the tunnel 1340) is aligned with an axis of the lighting device assembly (e.g., the axes 205, 505, 805, 1105). For example, the lower support surface 1362 of the support portion 1360 of the lens 1350 may be configured to abut the first lens interface surface 1322 of the lower body portion 1310, and the upper support surface 1361 of the support portion 1360 may be configured to abut the second lens interface surface 1338 of the upper body portion 1330. The fasteners may extend through the holes 1337 of the upper body portion 1330 and the holes 1319 of the lower body portion 1310 to secure the upper body portion 1330 to the lower body portion 1310. The lower interface surface 1368 of the lens 1350 may abut the rim 1326 of the lower body portion 1310 (e.g., the third lens interface surface 1328) when the lens 1350 is secured between the upper body portion 1330 and the lower body portion 1310. The fins 1364 of the lens 1350 may be secured between the tabs 1316 and the rim 1326 when the upper body portion 1330 is secured to the lower body portion 1310. When the lens 1350 is secured between the upper body portion 1330 and the lower body portion 1310, the tunnel 1340 of the upper body portion 1330 may be configured to collect and/or reflect the light emitted by the lighting device assembly to the light-entry surface 1352 of the lens 1350, and the light-exit surface 1353 may be configured to emit light through the aperture 1315.

The wall-wash trim assembly 1300 may be configured such that the lower edge 1369 of the lens 1350 is as close to the bottom surface 1313 of the lower body portion 1310 (e.g., the plane of the aperture 1315) as possible. The lower interface surface 1368 of the lens 1350 may abut the third lens interface surface 1328 on the rim 1326 below the upper surface 1327 of the rim 1326 and above the bottom surface 1313 of the lower body portion 1310. For example, the lower edge 1369 of the lens 1350 may not extend past the bottom surface 1313 of the lower body portion 1310. The lower interface surface 1368 of the lens 1350 may contact the third lens interface surface 1328 on the rim 1326 as low as possible on the third lens interface surface 1328, e.g., such that a distance $D_{GAP1}$ between the lower edge 1369 of the lens 1350 and the bottom surface 1313 of the lower body portion 1310 is minimized. For example, the lower interface surface 1328 of the lens 1350 may abut the third lens interface surface 1328 at a location that is closer to the bottom surface 1313 of the lower body portion 1310 than to the upper surface 1327 of the rim 1326. Since the third lens interface surface 1328 on the rim 1326 may be reflective (e.g., may be coated with a reflective coating), the lens 1350 may be configured to conduct light from the wall-wash trim assembly 1300 at as low of a point on the wall-wash trim assembly 1300 as possible (e.g., to minimize a dark band generated on the wall on which the lighting device is shining light).

The second perimeter portion 1355 of the light-transmission portion 1351 of the lens 1350 may intersect with the first perimeter portion 1354, such that a width $W_{LENS1}$ of the lens 1350 near the bottom surface 1313 of the lower body portion 1310 (e.g., near the aperture 1315) is maximized (e.g., as shown in FIG. 37). For example, the intersection of the first perimeter portion 1354 and the second perimeter portion 1355 may occur at a point that is near the middle of the complete oval shape that defines the shape of the first perimeter portion 1354. Maximizing the width $W_{LENS1}$ of the lens 1350 at the second perimeter portion 1355 may help to maximize the amount of light that can shine in a direction (e.g., that is almost horizontal) towards the wall, for example, to minimize the generation of a dark band on the wall near the ceiling.

The bottom surface 1313 of the lower body portion 1310 (e.g., the sidewall 1312 and the rim 1326) may define a lower edge of the wall-wash trim assembly 1300 that has a width $W_{LE1}$ (e.g., as shown in FIG. 36B). The bottom surface 1313 of the lower body portion 1310 (e.g., the lower edge of the wall-wash trim assembly 1300) may be sized such that the wall-wash trim assembly 1300 may present a thin edge appearance (e.g., a knife appearance) when viewed from below the lighting device. For example, the width $W_{RIM1}$ of the bottom surface 1313 of the lower body portion 1310 (e.g., the lower edge of the wall-wash trim assembly 1300) may be smaller than a width $W_{SW1}$ of the tunnel wall 1334 of the upper body portion 1330.

Figure 38:
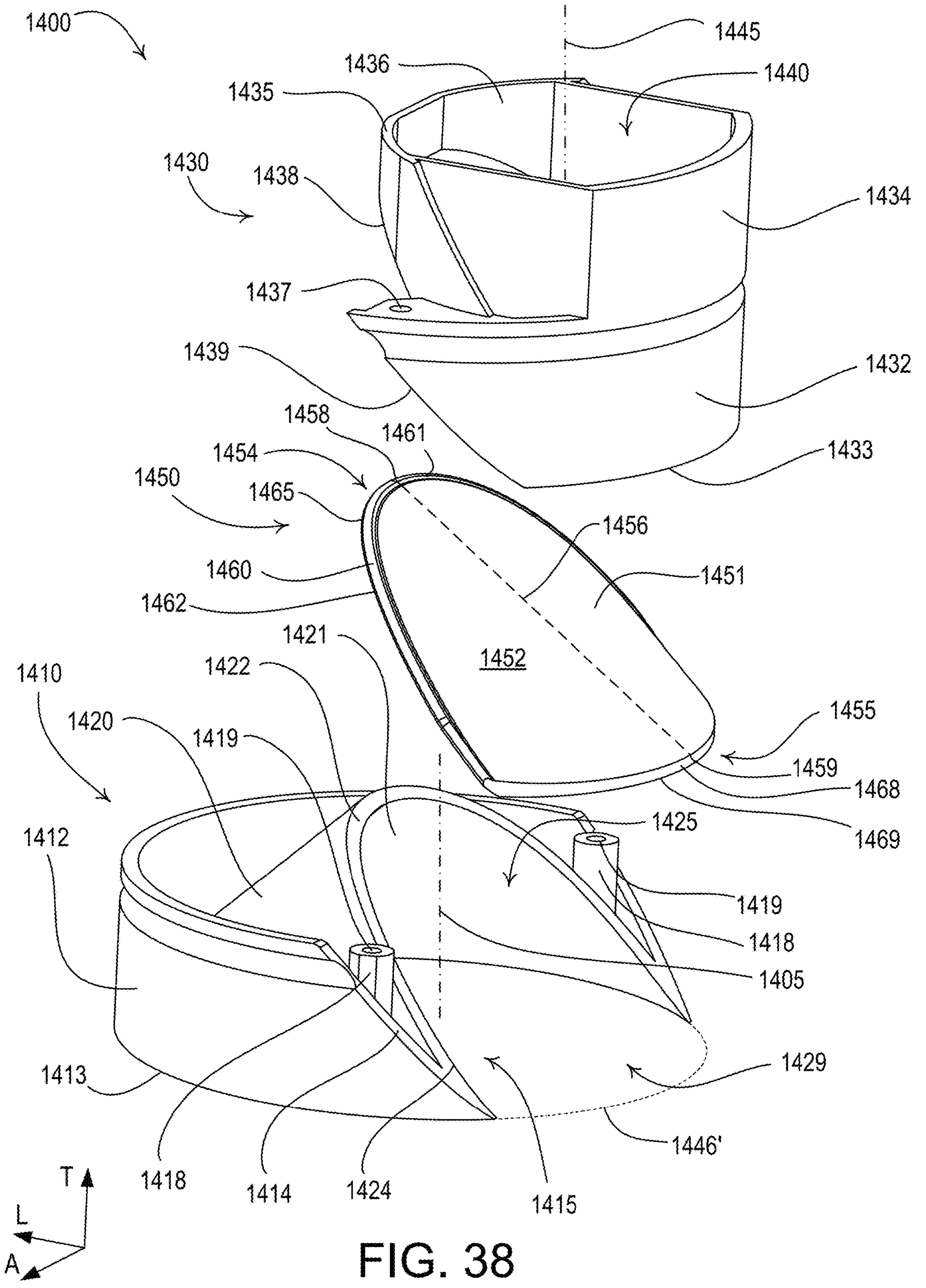
FIG. 38 is an exploded view of another example wall-wash trim assembly.
Figure 39:
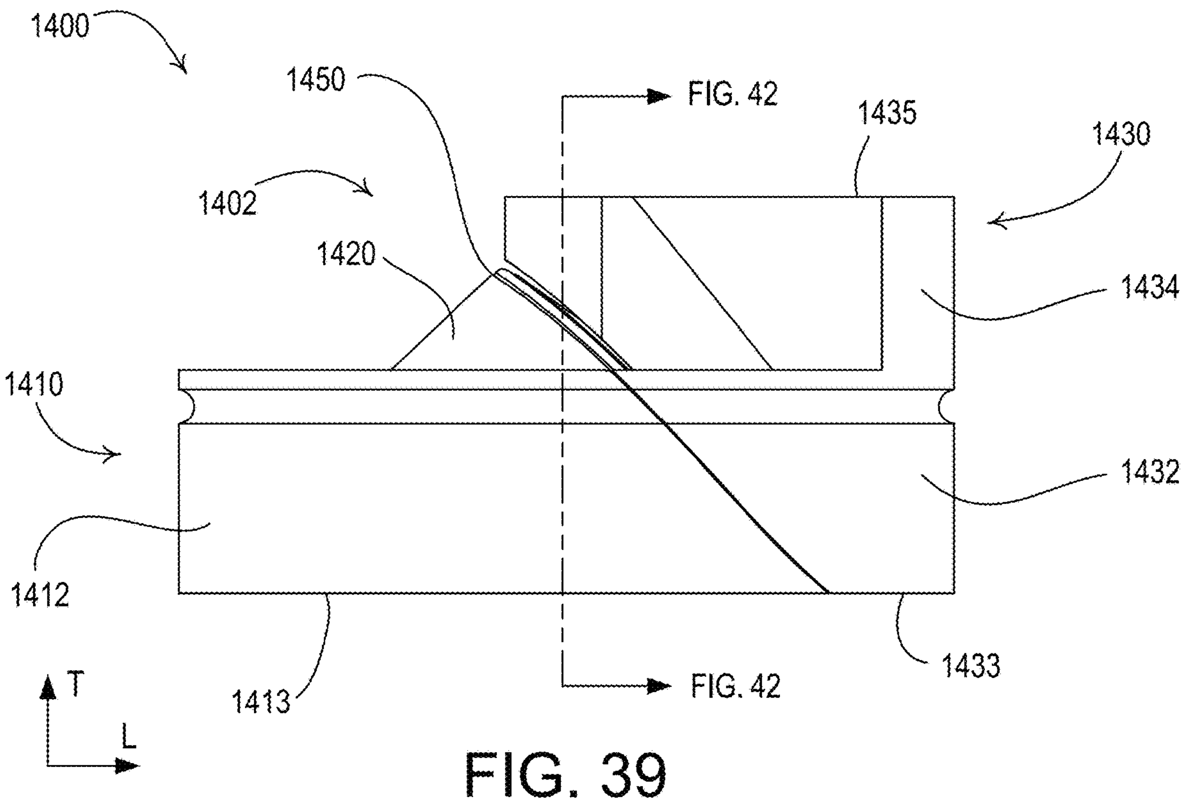
FIG. 39 is a side view of the wall-wash trim assembly of FIG. 38.
Figure 40:
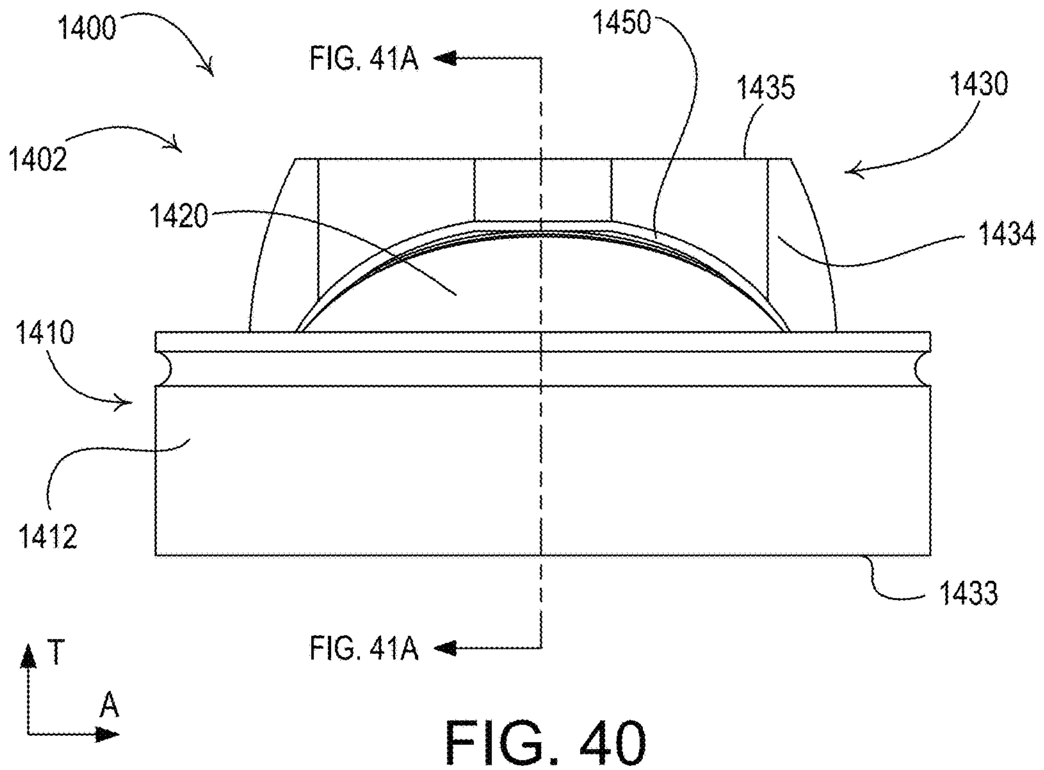
FIG. 40 is a front view of the wall-wash trim assembly of FIG. 38.
Figure 41A:
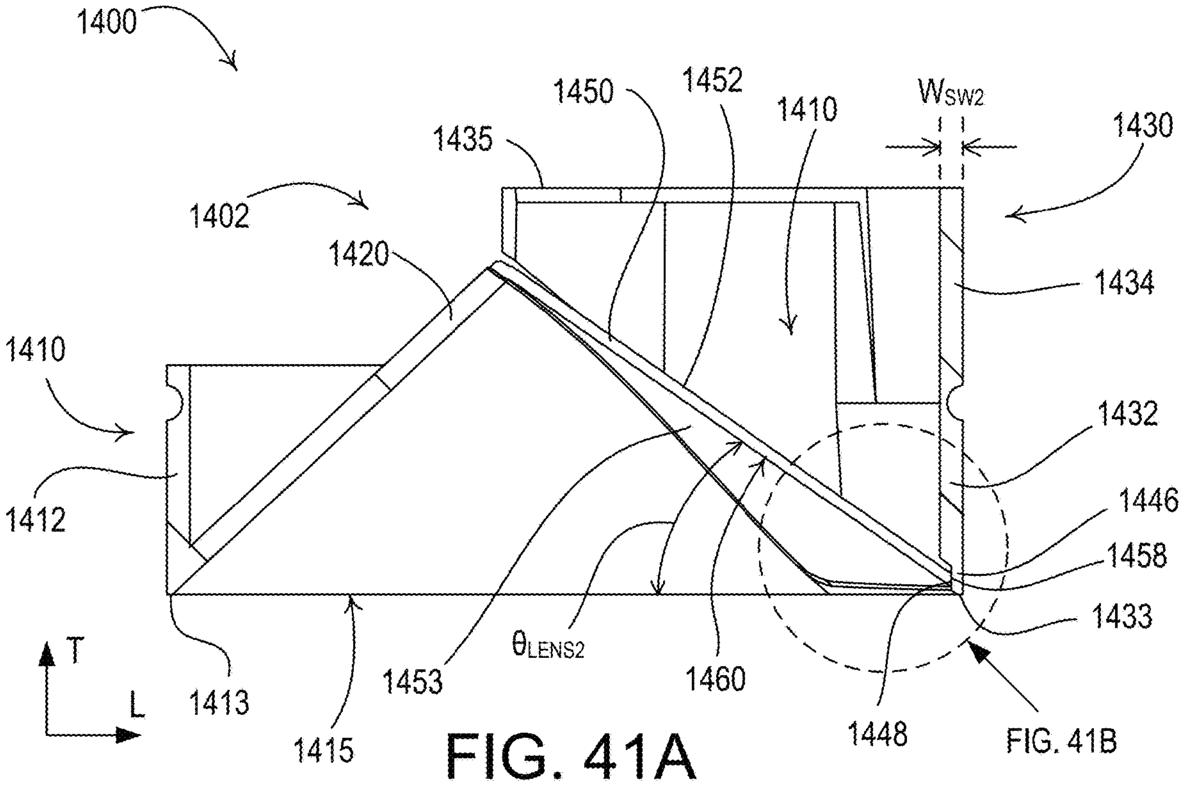
FIG. 41A is a cross-section view of the wall-wash trim assembly of FIG. 38 taken through the line shown on FIG. 40.
Figure 41B:
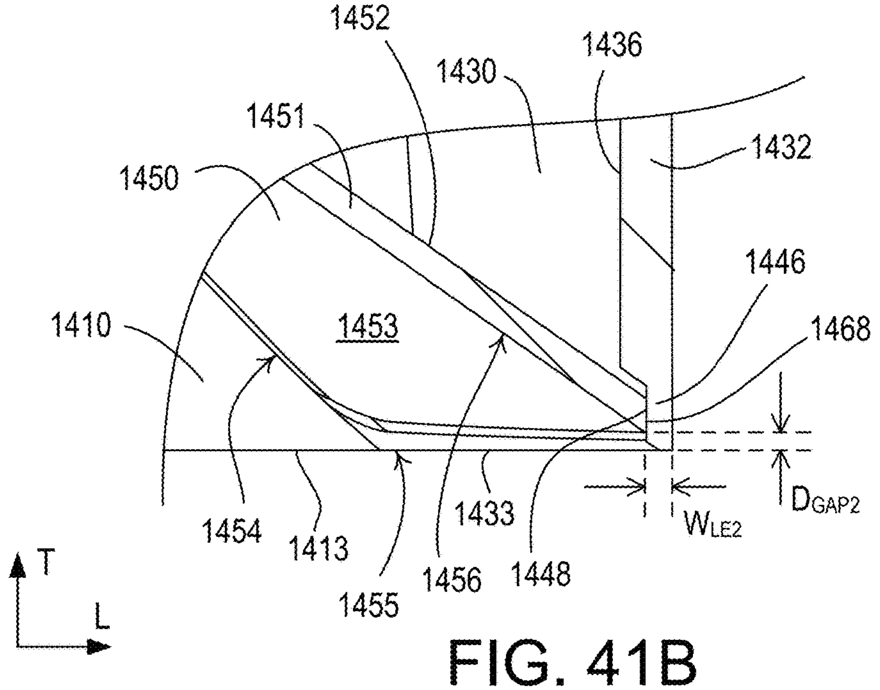
FIG. 41B is an enlarged partial cross-section view of the wall-wash trim assembly as shown in FIG. 41A.
Figure 42:
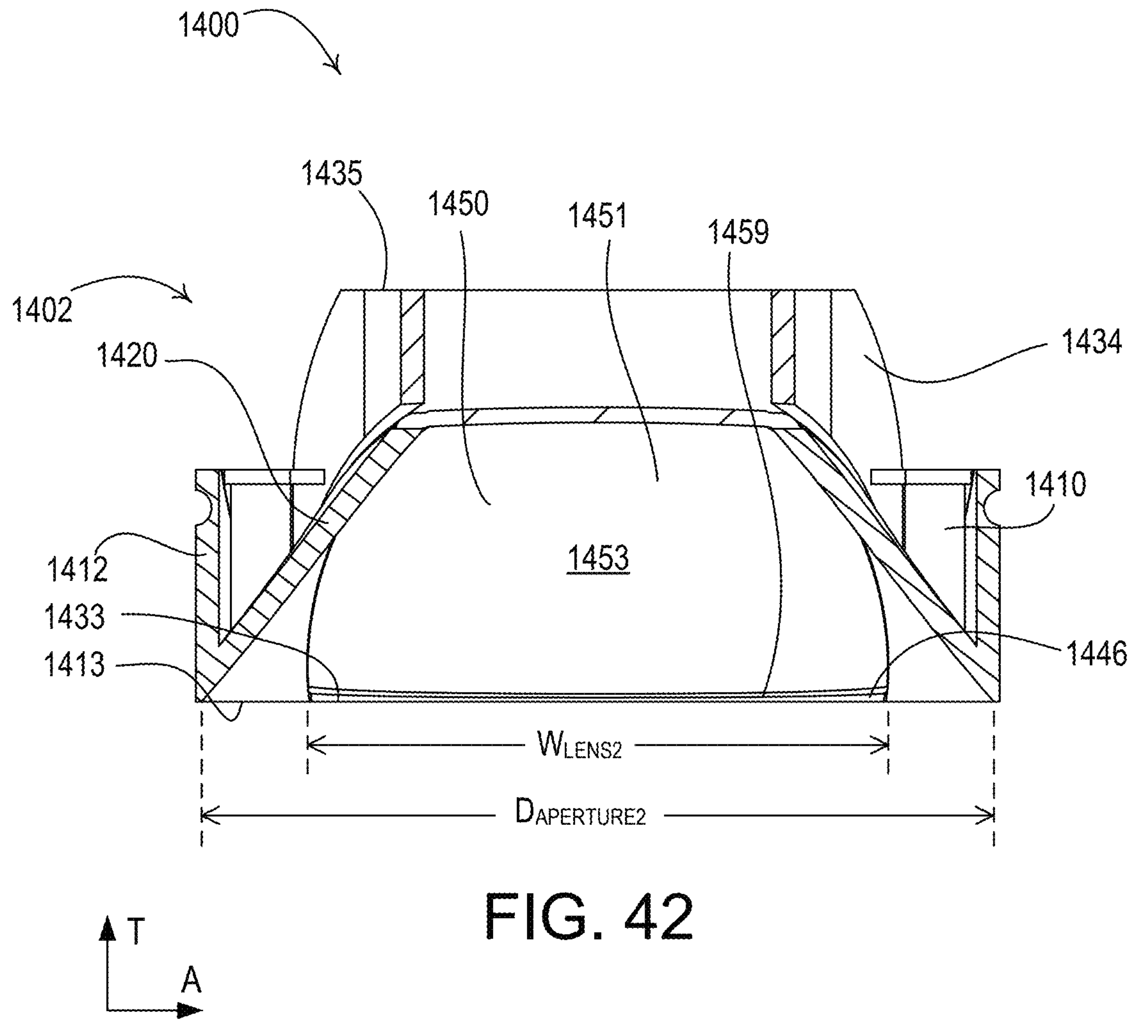
FIG. 42 is a cross-section view of the wall-wash trim assembly of FIG. 38 taken through the line shown on FIG. 39.

FIGS. 38-42 depict an example wall-wash trim assembly 1400 (e.g., the wall-wash trim assembly 1090) that may be configured to be used in a lighting device (e.g., such as the lighting device 1000 shown in FIGS. 26-32). FIG. 38 is an exploded view of the example wall-wash trim assembly 1400. FIG. 39 is a side view of the wall-wash trim assembly 1400. FIG. 40 is a front view of the wall-wash trim assembly 1400. FIG. 41A is a cross-section view of the wall-wash trim assembly 1400 taken through the line shown on FIG. 40. FIG. 41B is an enlarged partial cross-section view of the wall-wash trim assembly 1400 as shown in FIG. 41A. FIG. 42 is a cross-section view of the wall-wash trim assembly 1400 taken through the line shown on FIG. 39. The trim assembly 1400 (e.g., at least a portion of the wall-wash trim assembly 1400) may be configured to collect, reflect, and diffuse the light emitted by a lighting device assembly (e.g., such as the lighting device assembly 200 shown in FIGS. 3-5 and 8-11, the lighting device assembly 500 shown in FIGS. 13-15 and 18, the lighting device assembly 800 shown in FIG. 23, and/or the lighting device assembly 1100 shown in FIGS. 26-32) onto a wall (e.g., to provide wall-wash lighting). For example, the trim assembly 1400 (e.g., at least a portion of the wall-wash trim assembly 1300) may be configured to minimize generation of a dark band (e.g., a dark area) at the top of the wall and/or scalloping (e.g., oval-triangular shape) of light on the wall.

The wall-wash trim assembly 1400 may include a body 1402 having a lower body portion 1410 (e.g., a base portion) and an upper body portion 1430 (e.g., a light conduit portion). Together, the lower body portion 1410' and the upper body portion 1430 may form a trim ring of the lighting device in which the wall-wash trim assembly 1400 is installed. The wall-wash trim assembly 1400 may also comprise a lens 1450, which may be supported by the body 1402 (e.g., the lower body portion 1410 and/or the upper body portion 1430). For example, the lens 1450 may be configured to be secured between the lower body portion 1410 and the upper body portion 1430.

The lower body portion 1410 may define a sidewall 1412 and a shroud 1420. The lower body portion 1410 may define a bottom surface 1413 (e.g., a bottom surface of the sidewall 1412) and a side surface 1414. The sidewall 1412 may be a first sidewall portion of the body 1402. The sidewall 1412 may be cylindrical and may extend around the shroud 1420 such that the shroud 1420 is located on an interior side of the sidewall 1412. The shroud 1420 may define a trim surface 1421 and a first lens interface surface 1422. The trim surface 1421 may be a lower surface of the shroud 1420 that faces toward the bottom surface 1413. The trim surface 1421 of the shroud 1420 may be, for example, a matte finish (e.g., a black matte finish) in order to minimize reflections of light (e.g., glare) off of the trim surface 1421. For example, the lens 1450 may abut (e.g., rest on) the first lens interface surface 1422 when the lens 1450 is secured between the lower body portion 1410 and the upper body portion 1430. The lower body portion 1410 may define a lens opening 1424 and a channel 1425. For example, the lens opening 1424 may be defined by the first lens interface surface 1422. The lower body portion 1410 may define a break 1429 (e.g., a gap) in the bottom surface 1413 of the sidewall 1412. The lower body portion 1410 may define a pair of sleeves 1418 that define respective holes 1419. The lens opening 1424 of the lower body portion 1410 may be defined by the shroud 1420 and the break 1429.

The upper body portion 1430 may define a sidewall 1432, a bottom surface 1433, an upper surface 1435, and a second lens interface surface 1438. The sidewall 1432 may be a second sidewall portion of the body 1402. The upper body portion 1430 may be secured to the lower body portion 1410, for example, with the lens 1450 between the upper body portion 1430 and the lower body portion 1410. The upper body portion 1430 may define holes 1437 that are configured to receive the fasteners to secure the upper body portion 1430 to the lower body portion 1410. The sidewall 1432 of the upper body portion 1430 may be configured to partially surround the lens 1450, when the lens 1450 is secured between the lower body portion 1410 and the upper body portion 1430. Together, the sidewall 1412 of the lower body portion 1410 and the sidewall 1432 of the upper body portion 1430 may surround (e.g., at least partially surround) the shroud 1420 of the lower body portion 1410 and the lens 1450 when the lens 1450 is secured between the lower body portion 1410 and the upper body portion 1430. The upper body portion 1430 may define a side surface 1439 that is configured to abut the side surface 1414 of the lower body portion 1410. The bottom surface 1443 of the upper body portion 1430 may be configured to function as a portion of a bottom surface of the wall-wash trim assembly 1400 (e.g., along with the bottom surface 1413 of the lower body portion 1410) when the upper body portion 1430 is secured to the lower body portion 1410. The upper body portion 1430 (e.g., the sidewall 1432) may define a lip 1446 (e.g., a thin portion) adjacent to the bottom surface 1433.

The lower body portion 1410 (e.g., the sidewall 1312) and the upper body portion 1430 (e.g., the lip 1446 of the sidewall 1432 of the lower body portion 1410) together may define an aperture 1415 (e.g., such as the aperture 145 of the trim portion 140, the aperture 445 of the trim portion 440, the aperture 745 of the trim portion 740, and/or the aperture 1045 of the trim portion 1040). The aperture 1415 may be surrounded and/or formed by the bottom surface 1413 of the lower body portion 1410 and the bottom surface 1433 of the upper body portion 1430 (e.g., the lip 1446). The location of the lip 1446 of the sidewall 1432 of the upper body portion 1430 when the upper body portion 1430 is secured to the lower body portion 1410 is show by a dashed line 1446' in FIG. 38. The channel 1425 of the lower body portion 1410 may extend between the lens opening 1424 and the aperture 1415. The aperture 1415 may be located in a plane that extends in the longitudinal direction L and the lateral direction A at the bottom surface 1413 of the lower body portion 1410 and the bottom surface 1433 of the upper body portion 1430 (e.g., which may be called the plane of the aperture 1415). For example, the aperture 1415 may be circle-shaped (e.g., shaped like a circle). The lower body portion 1410 may define an axis 1405 that extends through a center of the aperture 1415 (e.g., in the transverse direction T). As shown in FIG. 42, the aperture 1415 is characterized by a diameter $D_{APERTURE2}$ (e.g., approximately two inches).

The upper body portion 1430 may define a tunnel 1440 that extends through the upper body portion 1430. The upper body portion 1430 may comprise a tunnel wall 1434 that surrounds the tunnel 1440. The tunnel 1440 (e.g., the tunnel wall 1434) may define an interior surface 1436 (e.g., that may at least partially surround the tunnel 1440). For example, the upper body portion 1430 may define an axis 1445 that may extend through a center of the tunnel 1440. The upper body portion 1430 (e.g., the upper surface 1435) may be configured to be located proximate to and aligned with the lighting device assembly, such that the axis 1445 of the upper body portion 1330 is aligned with (e.g., coaxial with) an axis of the lighting device assembly (e.g., the axes 205, 505, 805, 1105). The upper body portion 1430 (e.g., the tunnel 1340) may be configured to collect and reflect the light emitted by the lighting device assembly. For example, the interior surface 1436 of the upper body portion 1330 may be reflective. For example, the upper body portion 1430 may be made from a reflective material (e.g., metal) and/or the interior surface 1436 may be coated with a reflective coating.

The body 1402 of the wall-wash trim assembly 1400 (e.g., the upper body portion 1430) may define a third lens interface surface 1448 (e.g., a reflective lens interface surface), for example, on the lip 1446 of the sidewall 1432 of the upper body portion 1430. The third lens interface surface 1448 on the lip 1446 of the sidewall 1432 of the upper body portion 1430 may be reflective (e.g., made from a reflective material and/or coated with a reflective material). For example, the lens 1450 may abut the third lens interface surface 1448 on the lip 1446. The third lens interface surface 1448 on the lip 1446 may be oriented, for example, approximately vertical (e.g., approximately perpendicular to the plane of the aperture 1415).

The lens 1450 may comprise a light-transmission portion 1451 having a light-entry surface 1452 (e.g., as shown in FIG. 38) and a light-exit surface 1453 (e.g., as shown in FIG. 42). The lens 1450 may define a first perimeter portion 1454 and a second perimeter portion 1455. The light-transmission portion 1451 of the lens 1450 may be located between (e.g., surrounded by) the first perimeter portion 1454 and the second perimeter portion 1455. The first perimeter portion 1454 may correspond with a shape of the first lens interface surface 1422 of the shroud 1420 of the lower body portion 1410, and the second perimeter portion 1455 may correspond with a shape of the third lens interface surface 1448 on the lip 1446 of the sidewall 1432 of the upper body portion 1430. The light-transmission portion 1451 may be made of, for example, a translucent or transparent material. For example, the light-transmission portion 1451 may be diffusive (e.g., to evenly spread the light emitted by the lighting device assembly across the wall).

The second perimeter portion 1455 of the light-transmission portion 1451 may define a lower interface surface 1468 of the lens 1450. The lower interface surface 1468 of the lens 1450 may be oriented, for example, approximately vertical (e.g., approximately perpendicular to the plane of the aperture 1415). The second perimeter portion 1455 may define a lower edge 1469 (e.g., a thin edge and/or a knife edge) of the lens 1450. For example, the second perimeter portion 1455 may define a tapered section that terminates at the lower edge 1469. For example, the second perimeter portion 1455 (e.g., the lower interface surface 1468) may be circle-shaped, i.e., shaped like a circle (e.g., a partial circle) that extends in a plane that is parallel to the aperture 1415). The second perimeter portion 1455 (e.g., the lower interface surface 1468) may be characterized by a radius that is equal to one-half of the diameter $D_{APERTURE2}$ of the aperture 1415 (e.g., such that the second perimeter portion 1455 has the same shape as the aperture 1415). The lower interface surface 1468 of the lens 1450 may abut the lip 1446 of the sidewall 1432 of the upper body portion 1430 (e.g., the third lens interface surface 1448) when the lens 1450 is secured between the upper body portion 1430 and the lower body portion 1410.

The light-transmission portion 1451 of the lens 1450 may be non-planar. The light-transmission portion 1451 of the lens 1450 may define, for example, a concave shape that may extend in a direction away from the aperture 1415 of the lower body portion 1410. For example, the light-entry surface 1452 of the light-transmission portion 1451 may define an outside surface of the concave shape of the light-transmission portion 1451 of the lens 1450 and the light-exit surface 1453 of the light-transmission portion 1451 may define an inside surface of the concave shape of the light-transmission portion 1451 of the lens 1450. For example, the second perimeter portion 1455 may define a cut in the oval shape of the first perimeter portion 1454 and the concave shape of the light-transmission portion 1451 of the lens 1450. The intersection of the first perimeter portion 1454 and the second perimeter portion 1455 may occur at a point that is at approximately the middle of the complete oval shape that defines the shape of the first perimeter portion 1454.

The lens 1450 may define a center line 1456 (e.g., a central axis) that extends from a midpoint 1458 of the first perimeter portion 1454 to a midpoint 1459 of the second perimeter portion 1455. The center line 1456 may be linear and may be oriented at an angle $\theta_{LENS2}$ (e.g., approximately 35°) with respect to the plane of the aperture 1415 (e.g., as shown in FIG. 41A). For example, the center line 1456 may define a ridge (e.g., a peak) of the concave shape of the light-transmission portion 1451 of the lens 1450. The light-transmission portion 1451 of the lens 1450 may wrap down from the center line 1456 to the first perimeter portion 1454 to form the concave shape of the light-transmission portion 1451 of the lens 1450 (e.g., as shown in FIG. 38).

The lens 1450 may comprise a support portion 1460 (e.g., a lip) that extends from the light-transmission portion 1451 (e.g., from the first perimeter portion 1454). The support portion 1460 may define an upper support surface 1461 and a lower support surface 1462. The support portion 1460 (e.g., the upper support surface 1461 and the lower support surface 1462) may be oriented at an angle with respect to the plane of the aperture 1415. The support portion 1460 may define an upper edge 1465 of the lens 1450. For example, the first perimeter portion 1454 may be oval-shaped, i.e., shaped like an oval (e.g., a partial oval, such as an arc). When the lens 1450 is secured between the lower body portion 1410 and the upper body portion 1430, the lower support surface 1462 may be supported by (e.g., may rest on) the first lens interface surface 1422 of the lower body portion 1410, and the second lens interface surface 1438 of the upper body portion 1430 may be supported by (e.g., may rest on) the upper support surface 1461 of the support portion 1460.

The lens 1450 (e.g., the support portion 1460) may be clamped between the upper body portion 1430 and the lower body portion 1410, such that the axis 1445 of the upper body portion 1430 (e.g., the tunnel 1440) is aligned with an axis of the lighting device assembly (e.g., the axes 205, 505, 805, 1105). For example, the lower support surface 1462 of the support portion 1460 may be configured to abut the first lens interface surface 1422 of the lower body portion 1410, and the upper support surface 1461 of the support portion 1460 may be configured to abut the second lens interface surface 1438 of the upper body portion 1430. The fasteners may extend through the holes 1437 of the light conduit portion and the holes 1419 of the lower body portion 1410 to secure the upper body portion 1430 to the lower body portion 1410. When the lens 1450 is secured between the upper body portion 1430 and the lower body portion 1410, the tunnel 1440 of the upper body portion 1430 may be configured to collect and/or reflect the light emitted by the lighting device assembly to the light-entry surface 1452 of the lens 1450, and the light-exit surface 1453 may be configured to emit light through the aperture 1415.

The wall-wash trim assembly 1400 may be configured such that the lower edge 1469 of the lens 1450 is as close to the bottom surface 1433 of the upper body portion 1430 (e.g., the plane of the aperture 1415) as possible. The lower interface surface 1468 of the lens 1450 may abut the third lens interface surface 1448 on the lip 1446 above the bottom surface 1433 of the upper body portion 1430. For example, the lower edge 1469 of the lens 1450 may not extend past the bottom surface 1433 of the upper body portion 1430. The lower interface surface 1468 of the lens 1450 may contact the third lens interface surface 1448 on the lip 1446 as low as possible on the third lens interface surface 1448, e.g., such that a distance $D_{GAP2}$ between the lower edge 1469 of the lens 1450 and the bottom surface 1433 of the upper body portion 1430 is minimized. Since the third lens interface surface 1448 on the lip 1446 may be reflective (e.g., made of a reflective material and/or coated with a reflective coating), the lens 1450 may be configured to conduct light from the wall-wash trim assembly 1400 at as low of a point on the wall-wash trim assembly 1400 as possible (e.g., to minimize a dark band generated on the wall on which the lighting device is shining light).

The second perimeter portion 1455 of the light-transmission portion 1451 of the lens 1450 may intersect with the first perimeter portion 1454, such that a width $W_{LENS2}$ of the lens 1450 near the bottom surface 1433 of the upper body portion 1430 (e.g., near the aperture 1415) is maximized (e.g., as shown in FIG. 42). For example, the intersection of the first perimeter portion 1454 and the second perimeter portion 1455 may occur at a point that is near the middle of the complete oval shape that defines the shape of the first perimeter portion 1454. Maximizing the width $W_{LENS2}$ of the lens 1450 at the light-entry surface 1452 may help to maximize the amount of light that can shine in a direction (e.g., that is almost horizontal) towards the wall, for example, to minimize the generation of a dark band on the wall near the ceiling.

The bottom surface 1413 of the lower body portion 1410 (e.g., the sidewall 1412) and the bottom surface 1433 of the upper body portion 1430 (e.g., the lip 1446) may define a lower edge of the wall-wash trim assembly 1400 that has a width $W_{LE2}$ (e.g., as shown in FIG. 41B). The bottom surface 1413 of the lower body portion 1410 and the bottom surface 1433 of the upper body portion 1430 (e.g., the lower edge of the wall-wash trim assembly 1400) may be sized such that the wall-wash trim assembly 1400 may present a thin edge appearance (e.g., a knife appearance) when viewed from below the lighting device, for example. For example, the width $W_{LE2}$ of the bottom surface 1413 of the lower body portion 1410 and the bottom surface 1433 of the upper body portion 1430 (e.g., the lower edge of the wall-wash trim assembly 1400) may be smaller than a width $W_{SW2}$ of the tunnel wall 1434 of the upper body portion 1430.

Figure 43:
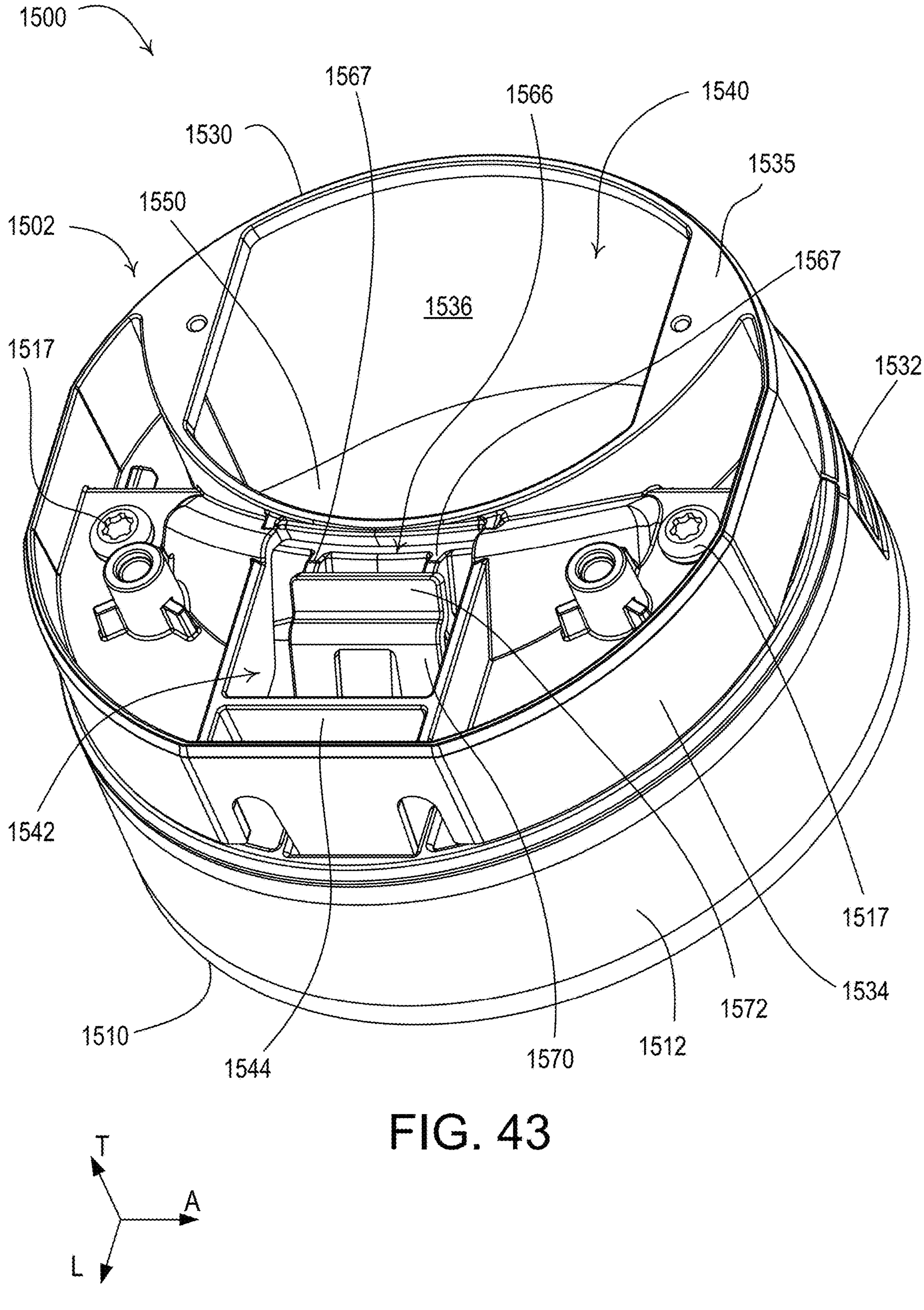
FIG. 43 is a top perspective view of another example wall-wash trim assembly.
Figure 44:
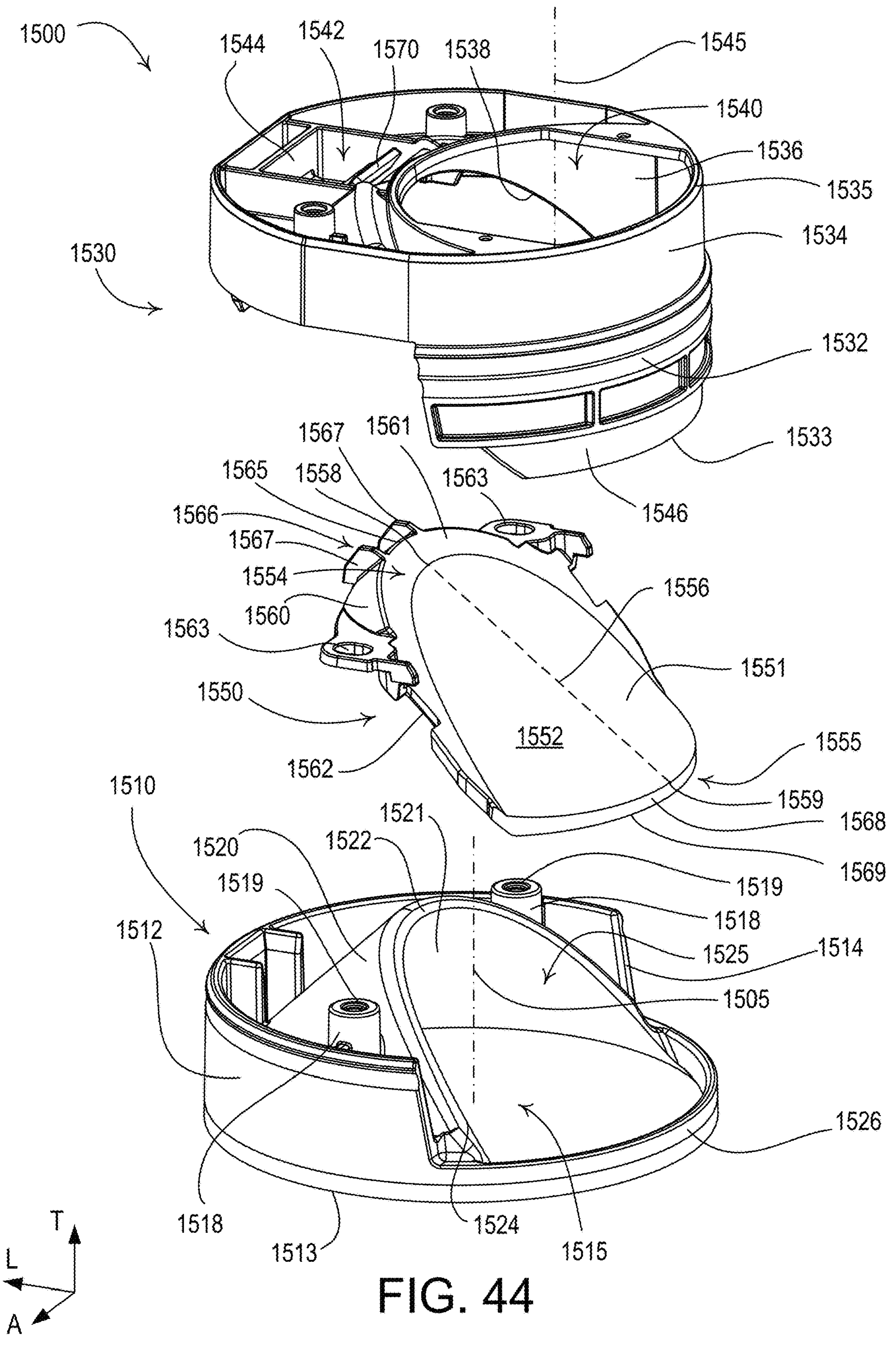
FIG. 44 is an exploded view of the wall-wash trim assembly of FIG. 43.
Figure 45:
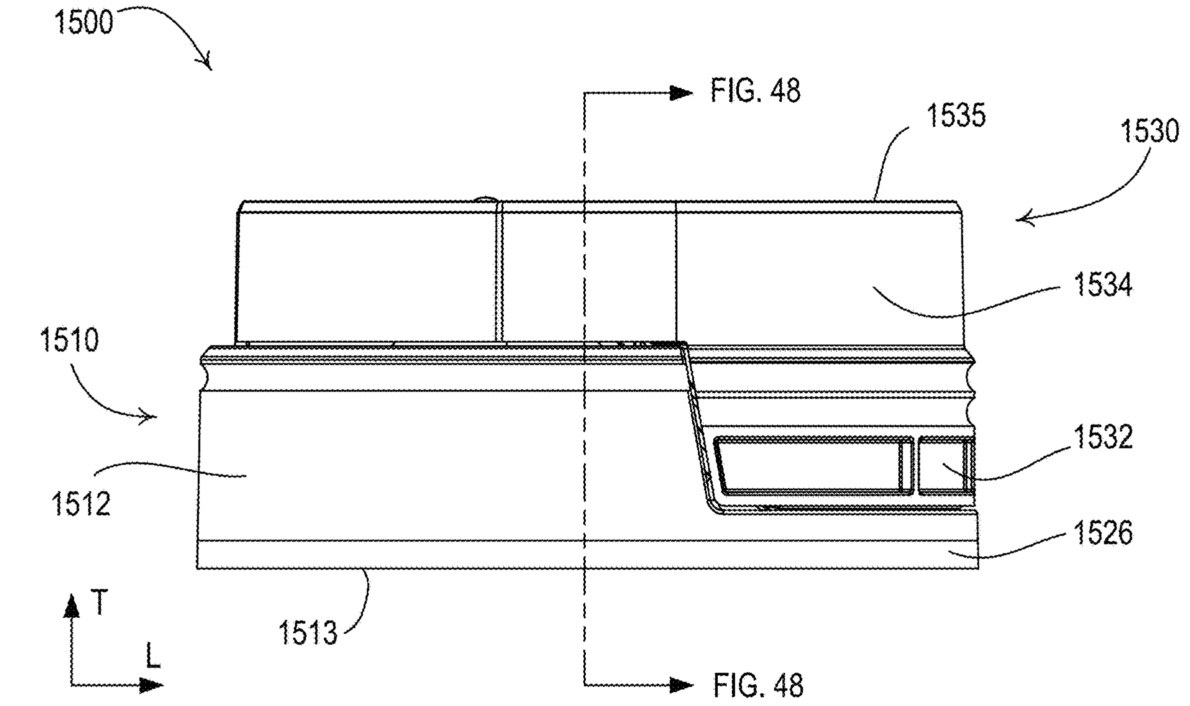
FIG. 45 is a side view of the wall-wash trim assembly of FIG. 43.
Figure 46:
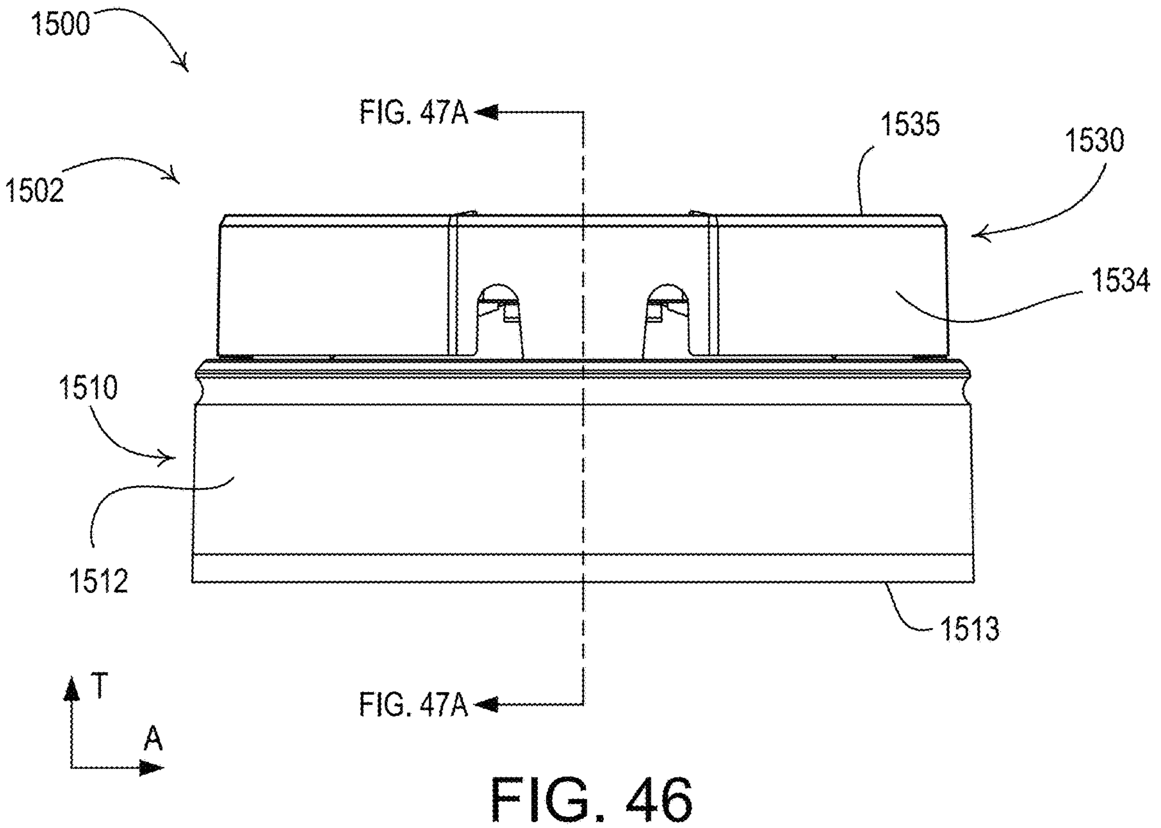
FIG. 46 is a front view of the wall-wash trim assembly of FIG. 43.
Figure 47A:
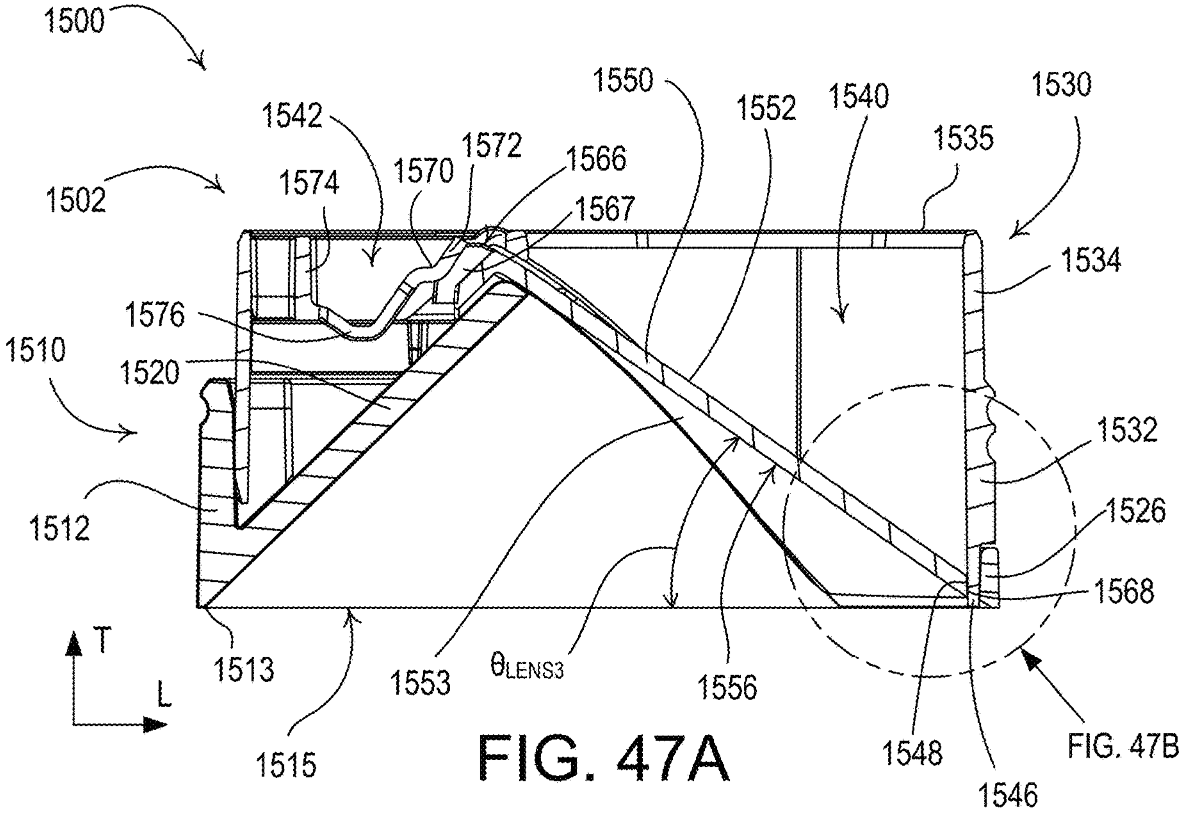
FIG. 47A is a cross-section view of the wall-wash trim assembly of FIG. 43 taken through the line shown on FIG. 46.
Figure 47B:
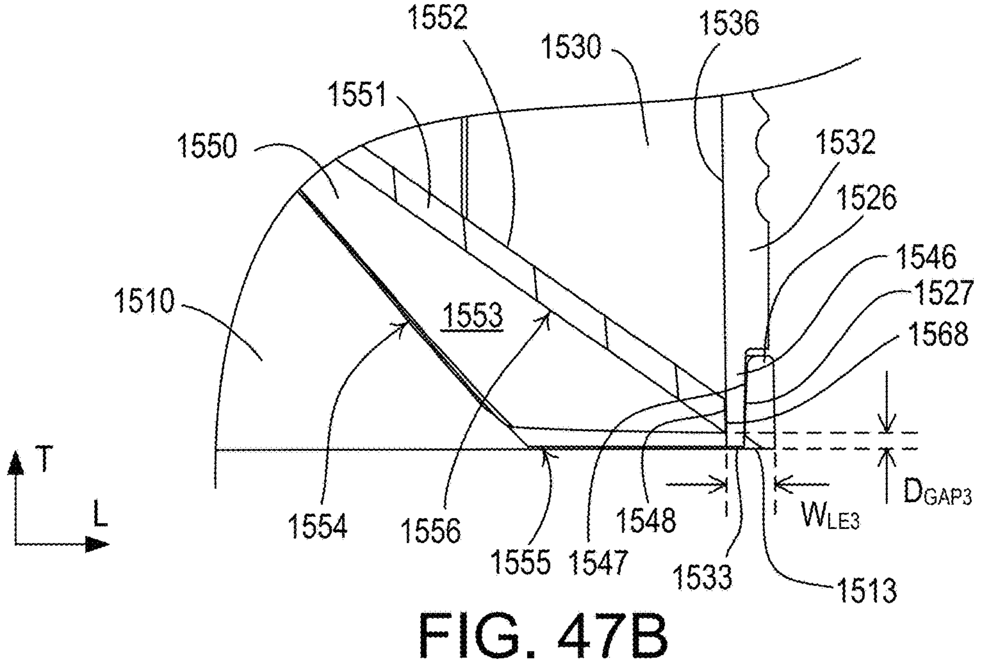
FIG. 47B is an enlarged partial cross-section view of the wall-wash trim assembly as shown in FIG. 47A.
Figure 48:
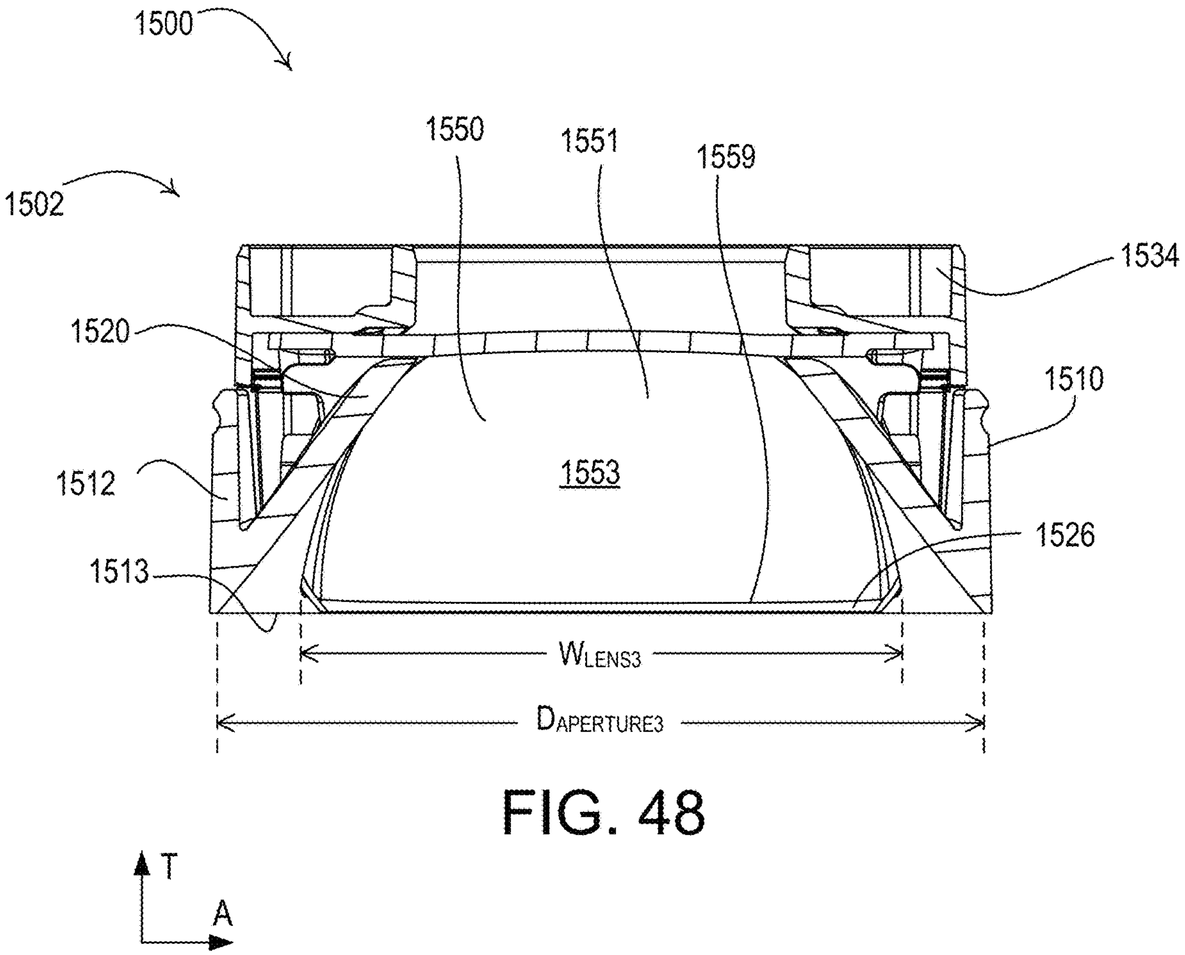
FIG. 48 is a cross-section view of the wall-wash trim assembly of FIG. 43 taken through the line shown on FIG. 45.

FIGS. 43-48 depict an example wall-wash trim assembly 1500 (e.g., the wall-wash trim assembly 1090) that may be configured to be used in a lighting device (e.g., such as the lighting device 1000 shown in FIGS. 26-32). FIG. 43 is a top perspective view of the wall-wash trim assembly 1500. FIG. 44 is an exploded view of the wall-wash trim assembly 1400. FIG. 45 is a side view of the wall-wash trim assembly 1500. FIG. 46 is a front view of the wall-wash trim assembly 1500. FIG. 47A is a side cross-section view of the wall-wash trim assembly 1500 taken through the line shown on FIG. 46. FIG. 47B is an enlarged partial cross-section view of the wall-wash trim assembly 1500 as shown in FIG. 47A. FIG. 48 is a front cross-section view of the wall-wash trim assembly 1500 taken through the line shown on FIG. 45. The wall-wash trim assembly 1500 (e.g., at least a portion of the wall-wash trim assembly 1500) may be configured to collect, reflect, and diffuse the light emitted by a lighting device assembly (e.g., such as the lighting device assembly 200 shown in FIGS. 3-5 and 8-11, the lighting device assembly 500 shown in FIGS. 13-15 and 18, the lighting device assembly 800 shown in FIG. 23, and/or the lighting device assembly 1100 shown in FIGS. 26-32) onto a wall (e.g., to provide wall-wash lighting). For example, the wall-wash trim assembly 1500 (e.g., at least a portion of the wall-wash trim assembly 1500) may be configured to minimize generation of a dark band (e.g., a dark area) at the top of the wall and/or scalloping (e.g., oval-triangular shape of light) on the wall.

The wall-wash trim assembly 1500 may include a body 1502 having a lower body portion 1510 (e.g., a base portion) and an upper body portion 1530 (e.g., a light conduit portion). For example, the lower body portion 1510 may define a trim ring of the lighting device in which the wall-wash trim assembly 1500 is installed. The wall-wash trim assembly 1500 may also comprise a lens 1550, which may be supported by the body 1502 (e.g., the lower body portion 1510 and/or the upper body portion 1530). For example, the lens 1550 may be configured to be secured between the lower body portion 1510 and the upper body portion 1530.

The lower body portion 1510 may define a sidewall 1512, a shroud 1520, and a rim 1526. The sidewall 1512 may be a first sidewall portion of the body 1502. The lower body portion 1510 may define a bottom surface 1513 (e.g., a bottom surface of the sidewall 1512 and the rim 1526). The sidewall 1512 may be cylindrical and may extend around the shroud 1520 such that the shroud 1520 is located on an interior side of the sidewall 1512. The shroud 1520 may define a trim surface 1521 and a first lens interface surface 1522. The trim surface 1521 may be a lower surface of the shroud 1520 that faces toward the bottom surface 1513. The trim surface 1521 of the shroud 1520 may be, for example, a matte finish (e.g., a black matte finish) in order to minimize reflections of light (e.g., glare) off of the trim surface 1521. For example, the lens 1550 may abut (e.g., rest on) the first lens interface surface 1522 when the lens 1550 is secured between the lower body portion 1510 and the upper body portion 1530. The lower body portion 1510 may define a lens opening 1524 and a channel 1525. The lens opening 1524 may be defined by the shroud 1520 and the rim 1526. The lower body portion 1510 further may define a pair of sleeves 1518 that define respective holes 1519 that are configured to receive fasteners 1517 (e.g., screws) to secure the upper body portion 1530 to the lower body portion 1510.

The lower body portion 1510 may define an aperture 1515 (e.g., such as the aperture 145 of the trim portion 140, the aperture 445 of the trim portion 440, the aperture 745 of the trim portion 740, and/or the aperture 1045 of the trim portion 1040). The aperture 1515 may be surrounded by the bottom surface 1513 of the lower body portion 1510. The channel 1525 of the lower body portion 1510 may extend between the lens opening 1524 and the aperture 1515. The aperture 1515 may be located in a plane that extends in the longitudinal direction L and the lateral direction A at the bottom surface 1513 of the lower body portion 1510 (e.g., which may be called the plane of the aperture 1515). For example, the aperture 1515 may be circle-shaped (e.g., shaped like a circle). The rim 1526 may extend about at least a portion of a perimeter of the aperture 1515 (e.g., from respective sides of the first lens interface surface 1522). The bottom surface 1513 may extend in the plane of the aperture 1515. The lower body portion 1510 may define an axis 1505 that extends through a center of the aperture 1515 (e.g., in the transverse direction T). As shown in FIG. 48, the aperture 1515 is characterized by a diameter $D_{APERTURE3}$ (e.g., approximately two inches).

The upper body portion 1530 may define a first sidewall 1532 and a second sidewall 1534. The first sidewall 1532 and the second sidewall 1534 may define a second sidewall portion of the body 1502. The upper body portion 1530 may also define a bottom surface 1533, an upper surface 1535, and a second lens interface surface 1538. The upper body portion 1530 may be secured to the lower body portion 1510, for example, with the lens 1550 between the upper body portion 1530 and the lower body portion 1510. The upper body portion 1530 may define holes (not shown) that are configured to receive the fasteners 1517 to secure the upper body portion 1530 to the lower body portion 1510. Together, the sidewall 1512 of the lower body portion 1510 and the first and second sidewalls 1532, 1534 of the upper body portion 1530 may surround (e.g., at least partially surround) the shroud 1520 of the lower body portion 1510 and the lens 1550 when the lens 1550 is secured between the lower body portion 1510 and the upper body portion 1530. The upper body portion 1530 (e.g., the first sidewall 1532) may define a lip 1546 (e.g., a thin portion) adjacent to the bottom surface 1533. When the upper body portion 1530 is secured to the lower body portion 1510, the lip 1546 of the first sidewall 1532 of the upper body portion 1530 may extend between the rim 1526 of the lower body portion 1510 and the lens 1550.

The upper body portion 1530 may comprise a tunnel 1540 that extends through the upper body portion 1530. The tunnel 1540 may define an interior surface 1536 (e.g., which may at least partially surround the tunnel 1540). For example, the upper body portion 1530 may define an axis 1545 that may extend through a center of the tunnel 1540. The upper body portion 1530 (e.g., the upper surface 1535) may be configured to be located proximate to and aligned with the lighting device assembly, such that the axis 1545 of the upper body portion 1530 is aligned with (e.g., coaxial with) an axis of the lighting device assembly (e.g., the axes 205, 505, 805, 1105). The upper body portion 1530 (e.g., the tunnel 1540) may be configured to collect and reflect the light emitted by the lighting device assembly. For example, the interior surface 1536 of the upper body portion 1530 may be reflective. For example, the upper body portion 1530 may be made from a reflective material (e.g., metal) and/or the interior surface 1536 may be coated with a reflective coating.

The body 1502 of the wall-wash trim assembly 1500 (e.g., the upper body portion 1530) may define a third lens interface surface 1548 (e.g., a reflective lens interface surface), for example, on the lip 1546 of the upper body portion 1530. For example, the lens opening 1524 may be defined by the first lens interface surface 1522 and the third lens interface surface 1548. The third lens interface surface 1548 on the lip 1546 of the first sidewall 1532 of the upper body portion 1530 may be reflective (e.g., made from a reflective material and/or coated with a reflective material). For example, the lens 1550 may abut the third lens interface surface 1548 on the lip 1546. The third lens interface surface 1548 on the lip 1546 may be oriented, for example, approximately vertical (e.g., approximately perpendicular to the plane of the aperture 1515). The lip 1546 may define an outer abutment surface 1547 that is on the opposed side of the lip 1546 as the third lens interface surface 1548. The outer abutment surface 1547 may be approximately perpendicular to the plane of the aperture 1515. The rim 1526 may define an inner abutment surface 1527. The inner abutment surface may face toward the lens 1550. When the upper body portion 1530 is secured to the lower body portion 1510, the outer abutment surface 1547 of the lip 1546 may abut the inner abutment surface 1527 of the rim 1526.

The lens 1550 may comprise a light-transmission portion 1551 having a light-entry surface 1552 (e.g., as shown in FIG. 44) and a light-exit surface 1553 (e.g., as shown in FIG. 48). The lens 1550 may define a first perimeter portion 1554 and a second perimeter portion 1555. The light-transmission portion 1551 of the lens 1550 may be located between (e.g., surrounded by) the first perimeter portion 1554 and the second perimeter portion 1555. The first perimeter portion 1554 may correspond with a shape of the first lens interface surface 1522 of the shroud 1520 of the lower body portion 1510, and the second perimeter portion 1555 may correspond with a shape of the third lens interface surface 1548 on the lip 1546 of the first sidewall 1532 of the upper body portion 1530. The light-transmission portion 1551 may be made of, for example, a translucent or transparent material. For example, the light-transmission portion 1551 may be diffusive (e.g., to evenly spread the light emitted by the lighting device assembly across the wall).

The second perimeter portion 1555 of the light-transmission portion 1551 may define a lower interface surface 1568 of the lens 1550. The lower interface surface 1568 of the lens 1550 may be oriented, for example, approximately vertical (e.g., approximately perpendicular to the plane of the aperture 1515). The second perimeter portion 1555 may define a lower edge 1569 (e.g., a thin edge and/or a knife edge) of the lens 1550. For example, the second perimeter portion 1555 may define a tapered section that terminates at the lower edge 1569. For example, the second perimeter portion 1555 (e.g., the lower interface surface 1568) may be circle-shaped, i.e., shaped like a circle (e.g., a partial circle) that extends in a plane that is parallel to the aperture 1515. The second perimeter portion 1555 (e.g., the lower interface surface 1568) may be characterized by a radius that is equal to one-half of the diameter $D_{APERTURE3}$ of the aperture 1515 (e.g., such that the second perimeter portion 1555 has the same shape as the aperture 1515). The lower interface surface 1568 of the lens 1550 may be configured to abut the lip 1546 of the first sidewall 1532 of the upper body portion 1530 (e.g., the third lens interface surface 1548) when the lens 1550 is secured between the upper body portion 1530 and the lower body portion 1510.

The light-transmission portion 1551 of the lens 1550 may be non-planar. The light-transmission portion 1551 of the lens 1550 may define, for example, a concave shape that may extend in a direction away from the aperture 1515 of the lower body portion 1510. For example, the light-entry surface 1552 of the light-transmission portion 1551 may define an outside surface of the concave shape of the light-transmission portion 1551 of the lens 1550 and the light-exit surface 1553 of the light-transmission portion 1551 may define an inside surface of the concave shape of the light-transmission portion 1551 of the lens 1550. For example, the second perimeter portion 1555 may define a cut in the oval shape of the first perimeter portion 1554 and the concave shape of the light-transmission portion 1551 of the lens 1550. The intersection of the first perimeter portion 1554 and the second perimeter portion 1555 may occur at a point that is at approximately the middle of the complete oval shape that defines the shape of the first perimeter portion 1554.

The lens 1550 may define a center line 1556 (e.g., a central axis) that extends from a midpoint 1558 of the first perimeter portion 1554 to a midpoint 1559 of the second perimeter portion 1555. The center line 1556 may be linear and may be oriented at an angle $\theta_{LENS3}$ (e.g., approximately 35°) with respect to the plane of the aperture 1515 (e.g., as shown in FIG. 47A). For example, the center line 1556 may define a ridge (e.g., a peak) of the concave shape of the light-transmission portion 1551 of the lens 1550. The light-transmission portion 1551 of the lens 1550 may wrap down from the center line 1556 to the first perimeter portion 1554 to form the concave shape of the light-transmission portion 1551 of the lens 1550 (e.g., as shown in FIG. 44).

The lens 1550 may comprise a support portion 1560 connected to the light-transmission portion 1551 (e.g., at the first perimeter portion 1554). The support portion 1560 may define an upper support surface 1561 and a lower support surface 1562. The upper support surface 1561 and the lower support surface 1562 of the support portion 1560 may both be oriented at an angle with respect to the plane of the aperture 1515. The support portion 1560 may define an upper end 1565 of the lens 1550. For example, the first perimeter portion 1554 may be oval shaped, i.e., shaped like an oval (e.g., a partial oval, such as an arc). When the lens 1550 is secured between the lower body portion 1510 and the upper body portion 1530, the lower support surface 1562 of the support portion 1560 may be supported by (e.g., may rest on) the first lens interface surface 1522 of the lower body portion 1510, and the second lens interface surface 1538 of the upper body portion 1530 may be supported by (e.g., may rest on) the upper support surface 1561 of the support portion 1560. The support portion 1560 of the lens 1550 may define holes 1563 that are configured to receive the fasteners 1517 when the upper body portion 1530 is secured to the lower body portion 1510.

The lens 1550 (e.g., the support portion 1560) may be clamped between the upper body portion 1530 and the lower body portion 1510, such that the axis 1545 of the upper body portion 1530 (e.g., the tunnel 1540) is aligned with an axis of the lighting device assembly (e.g., the axes 205, 505, 805, 1105). The fasteners 1517 may extend through the holes of the upper body portion 1530, the holes 1563 of the support portion 1560 of the lens 1550, and the holes 1519 of the lower body portion 1510 to secure the upper body portion 1530 to the lower body portion 1510. The lower support surface 1562 of the support portion 1560 may be configured to abut the first lens interface surface 1522 of the lower body portion 1510, and the upper support surface 1561 of the support portion 1560 may be configured to abut the second lens interface surface 1538 of the upper body portion 1530. The lower interface surface 1568 of the lens 1550 may abut the rim 1526 of the first sidewall 1532 of the upper body portion 1530 (e.g., the third lens interface surface 1548) when the lens 1550 is secured between the upper body portion 1530 and the lower body portion 1510. When the lens 1550 is secured between the upper body portion 1530 and the lower body portion 1510, the tunnel 1540 of the upper body portion 1530 may be configured to collect and/or reflect the light emitted by the lighting device assembly to the light-entry surface 1552 of the lens 1550, and the light-exit surface 1553 may be configured to emit light through the aperture 1515.

The wall-wash trim assembly 1500 may be configured such that the lower edge 1569 of the lens 1550 is as close to the bottom surface 1513 of the lower body portion 1510 (e.g., the plane of the aperture 1515) as possible. The lower interface surface 1568 of the lens 1550 may abut the third lens interface surface 1548 on the lip 1546 above the bottom surface 1513 of the lower body portion 1510. For example, the lower edge 1569 of the lens 1550 may not extend past the bottom surface 1513 of the lower body portion 1510. The lower interface surface 1568 of the lens 1550 may contact the third lens interface surface 1548 on the lip 1546 as low as possible on the third lens interface surface 1548, e.g., such that a distance $D_{GAP3}$ between the lower edge 1569 of the lens 1550 and the bottom surface 1513 of the lower body portion 1510 is minimized. For example, the lower interface surface 1568 of the lens 1550 may abut the third lens interface surface 1548 at a location that is closer to the bottom surface 1513 of the lower body portion 1510 than to an upper surface of the rim 1526. Since the third lens interface surface 1548 on the lip 1546 may be reflective (e.g., may be coated with a reflective coating), the lens 1550 may be configured to conduct light from the wall-wash trim assembly 1500 at as low of a point on the wall-wash trim assembly 1500 as possible (e.g., to minimize a dark band generated on the wall on which the lighting device is shining light).

The second perimeter portion 1555 of the light-transmission portion 1551 of the lens 1550 may intersect with the first perimeter portion 1554, such that a width $W_{LENS3}$ of the lens 1550 near the bottom surface 1513 of the lower body portion 1510 (e.g., near the aperture 1515) is maximized (e.g., as shown in FIG. 48). For example, the intersection of the first perimeter portion 1554 and the second perimeter portion 1555 may occur at a point that is near the middle of the complete oval shape that defines the shape of the first perimeter portion 1554. Maximizing the width $W_{LENS3}$ of the lens 1550 at the second perimeter portion 1555 may help to maximize the amount of light that can shine in a direction (e.g., that is almost horizontal) towards the wall, for example, to minimize the generation of a dark band on the wall near the ceiling.

The bottom surface 1513 of the lower body portion 1510 (e.g., the sidewall 1512 and the rim 1526) and the bottom surface 1533 of the upper body portion 1530 (e.g., the lip 1546) may define a lower edge of the wall-wash trim assembly 1500 that has a width $W_{LE3}$ (e.g., as shown in FIG. 47B). The bottom surface 1513 of the lower body portion 1510 and the bottom surface 1533 of the upper body portion 1530 (e.g., the lower edge of the wall-wash trim assembly 1500) may be sized such that the wall-wash trim assembly 1500 may present a thin edge appearance (e.g., a knife appearance) when viewed from below the lighting device. The bottom surface 1513 of the lower body portion 1510 may be substantially coplanar (e.g., flush) with the bottom surface 1533 of the first sidewall 1532 of the upper body portion 1530 (e.g., as shown in FIG. 47B).

The wall-wash trim assembly 1500 may further comprise a spring 1570 that may be configured to bias the lens 1550 towards the lip 1546 of the first sidewall 1532 of the upper body portion 1530. The spring 1570 may be located in a recess 1542 of the upper body portion 1530. For example, the recess 1542 may be open at the upper surface 1535 of the upper body portion 1530. The spring 1570 may comprise a first portion 1572, a second portion 1574, and a bent portion 1576 (e.g., as shown in FIG. 47A). The first portion 1572 may be connected to the second portion 1574 via the bent portion 1576, such that the first portion 1572 is oriented at an angle with respect to the second portion 1574. The second portion 1574 of the spring 1570 may be fixedly connected to the upper body portion 1530. For example, the second portion 1574 of the spring 1570 may be connected to a wall 1544 (e.g., an interior wall) of the upper body portion 1530 (e.g., which may be a wall of the recess 1542). The spring 1570 may be, for example, formed as part of (e.g., integral with) the upper body portion 1530 (e.g., molded together with the upper body portion 1530). In some examples, the spring 1570 may be a separate part from the upper body portion 1530 (e.g., made of a different material than the upper body portion 1530, such as metal) and may be fixedly attached to the wall 1544 of the upper body portion 1530 via fasteners or other attachment mechanisms.

The second portion 1574 of the spring 1570 may be biased towards the lens 1550. The second portion 1574 may be configured to abut (e.g., a apply a force to) a contact portion 1566 of the lens 1550 to bias (e.g., push) the lens 1550 toward the lip 1546 of the first sidewall 1532 of the upper body portion 1530 (e.g., in the longitudinal direction L and the transverse direction T). For example, the contact portion 1566 of the lens 1550 may comprise one or more ribs 1567 that extend from the support portion 1560 of the lens 1550 (e.g., in the longitudinal direction L and the transverse direction T). The second portion 1574 may be configured to abut the one or more ribs 1567, for example, to bias the lens 1550 toward the lip 1546. The spring 1570 may be configured to bias the lens 1550 against the lip 1546 of the first sidewall 1532 of the upper body portion 1530, such that the lower interface surface 1568 of the lens 1550 makes good contact with the third lens interface surface 1548 on the lip 1546. Biasing the lens 1550 against the lip 1546 using the spring 1570 may help to minimize the distance $D_{GAP3}$ between the lower edge 1569 of the lens 1550 and the bottom surface 1513 of the lower body portion 1510 and maximizing the width $W_{LENS3}$ of the lens 1550 at the second perimeter portion 1555.

Figure 49:
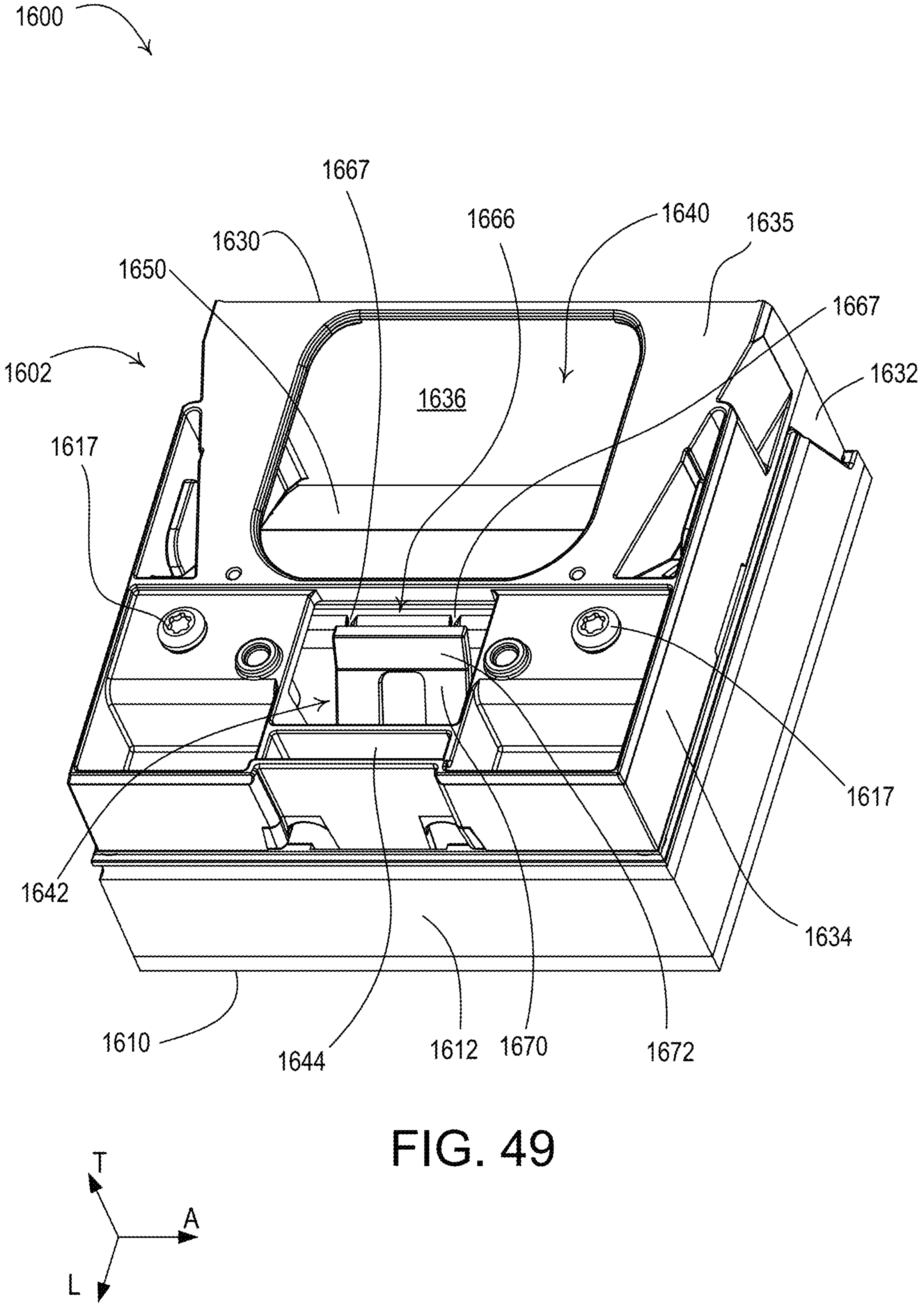
FIG. 49 is a top perspective view of another example wall-wash trim assembly.
Figure 50:
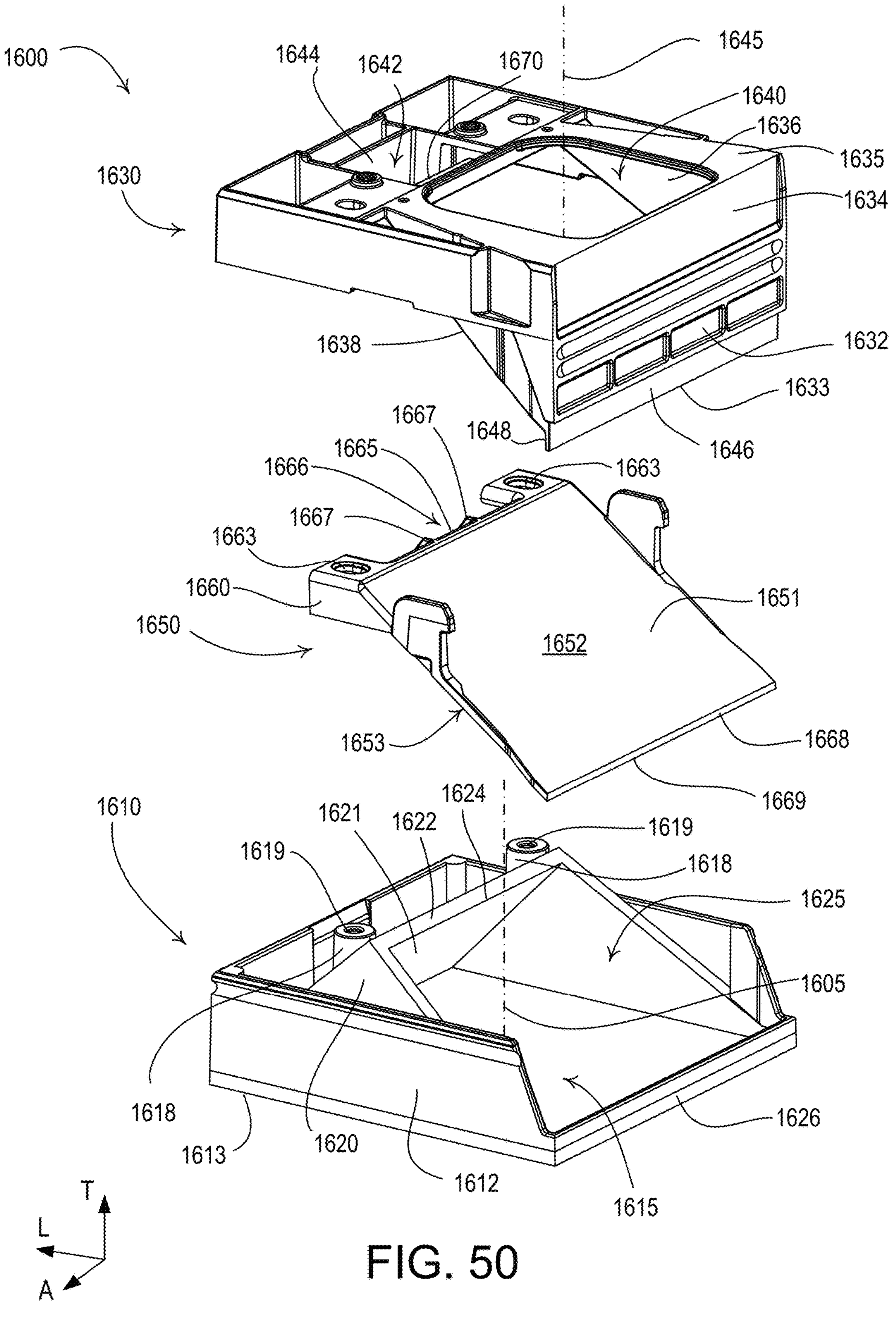
FIG. 50 is an exploded view of the wall-wash trim assembly of FIG. 49.
Figure 51:
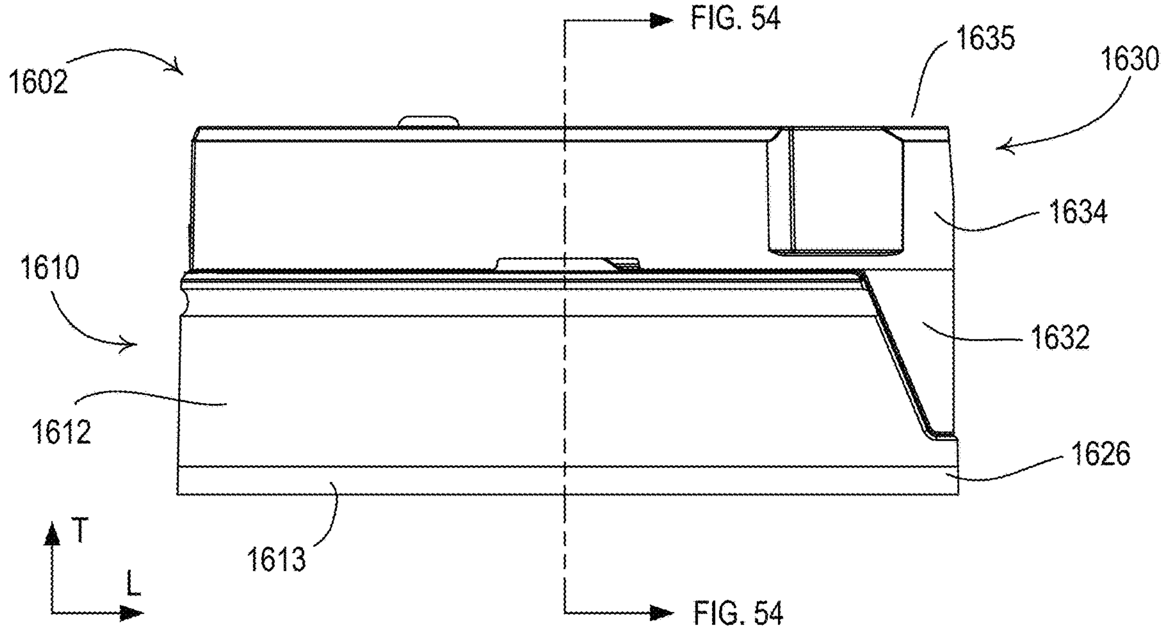
FIG. 51 is a side view of the wall-wash trim assembly of FIG. 49.
Figure 52:
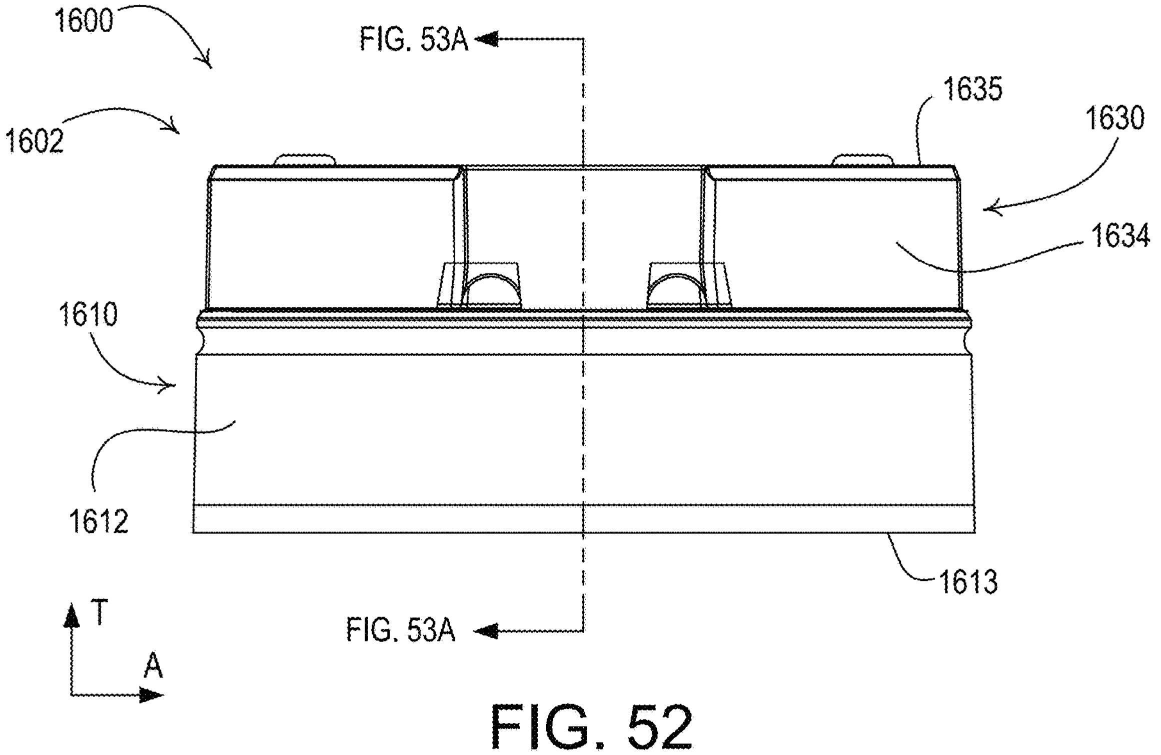
FIG. 52 is a front view of the wall-wash trim assembly of FIG. 49.
Figure 53A:
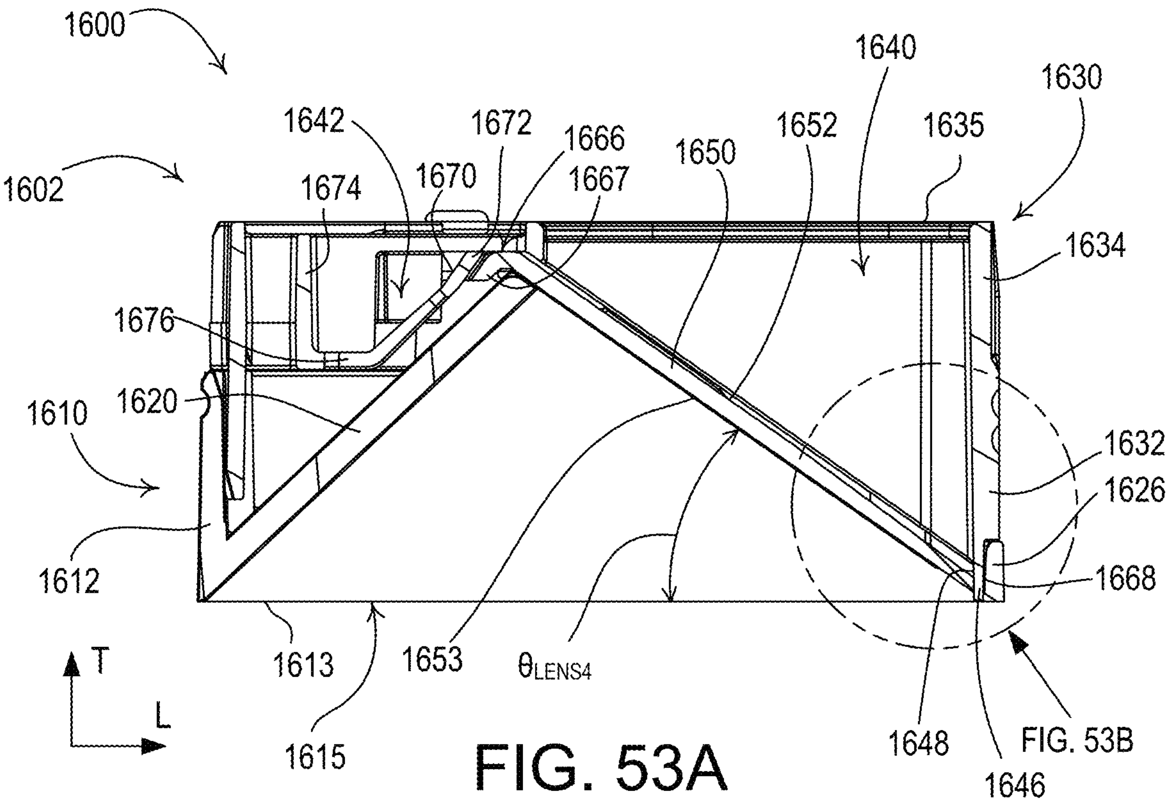
FIG. 53A is a cross-section view of the wall-wash trim assembly of FIG. 49 taken through the line shown on FIG. 52.
Figure 53B:
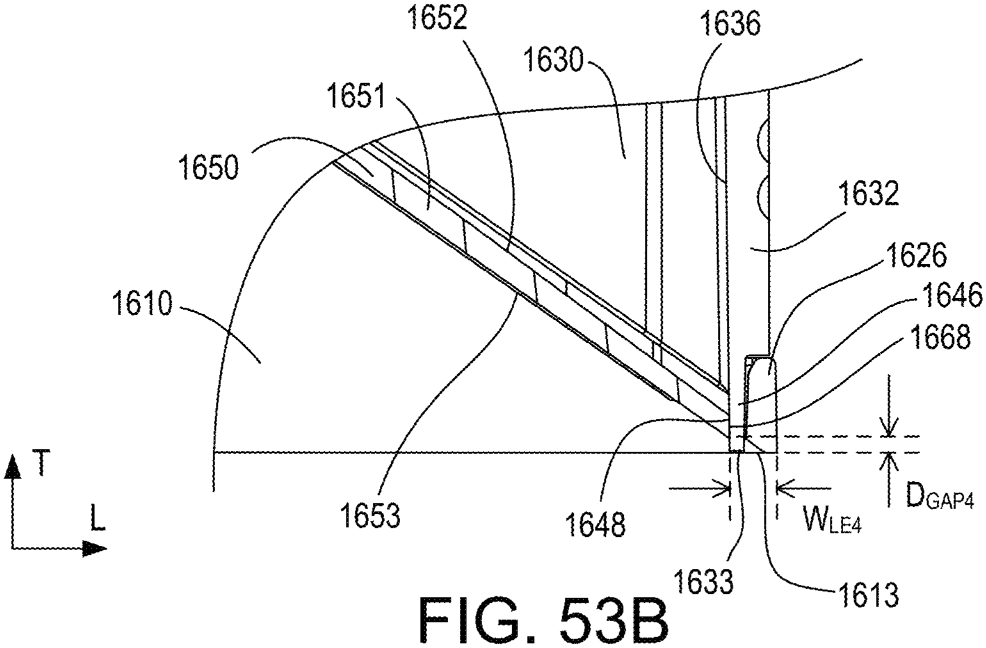
FIG. 53B is an enlarged partial cross-section view of the wall-wash trim assembly as shown in FIG. 47A.
Figure 54:
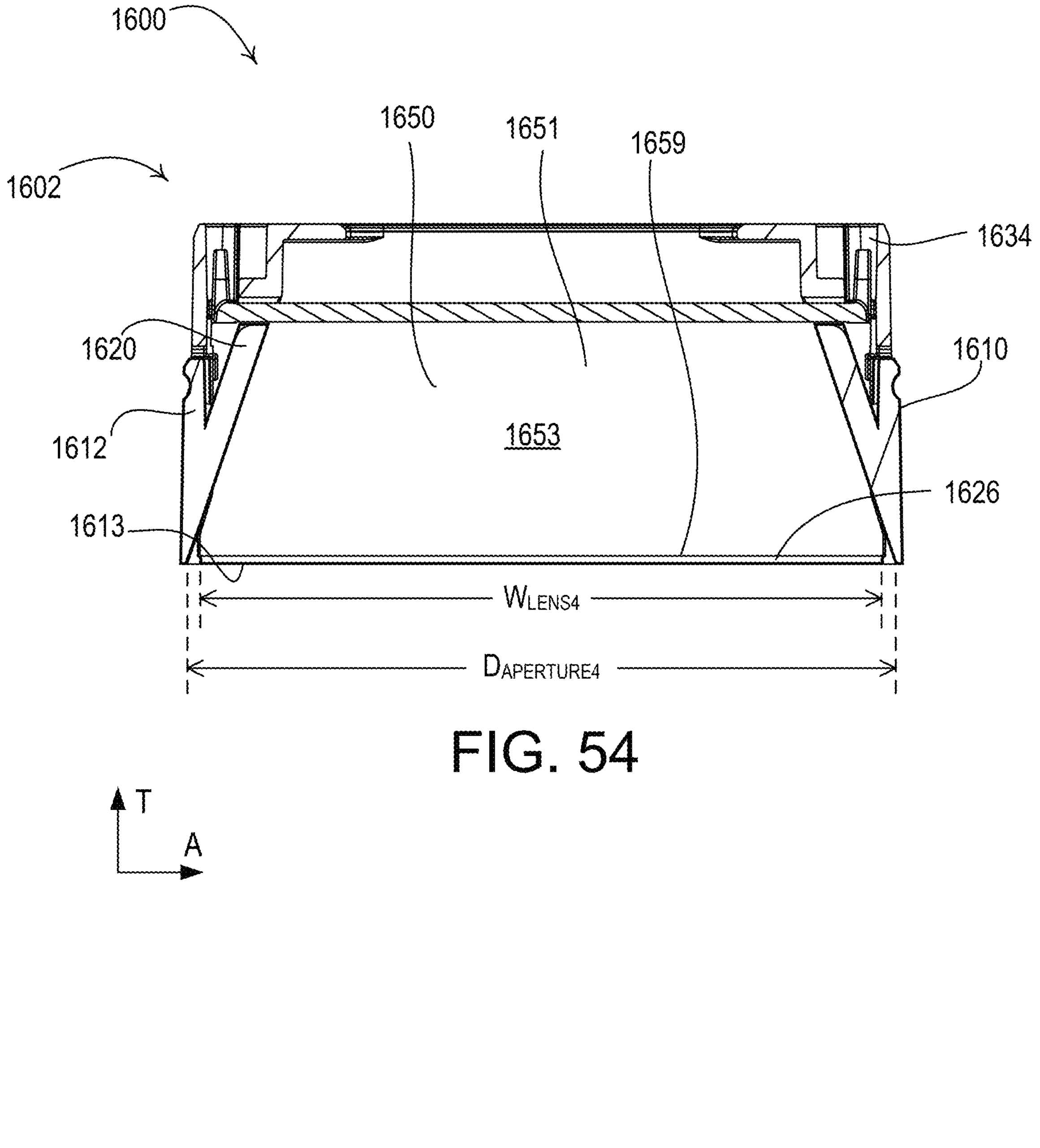
FIG. 54 is a cross-section view of the wall-wash trim assembly of FIG. 49 taken through the line shown on FIG. 51.

FIGS. 49-54 depict an example wall-wash trim assembly 1600 (e.g., such as the wall-wash trim assembly 1090) that may be configured to be used in a lighting device (e.g., such as the lighting device 1000 shown in FIGS. 26-32). FIG. 49 is a top perspective view of the wall-wash trim assembly 1600. FIG. 50 is an exploded view of the wall-wash trim assembly 1400. FIG. 51 is a side view of the wall-wash trim assembly 1500. FIG. 52 is a front view of the wall-wash trim assembly 1600. FIG. 53A is a side cross-section view of the wall-wash trim assembly 1500 taken through the line shown on FIG. 52. FIG. 53B is an enlarged partial cross-section view of the wall-wash trim assembly 1600 as shown in FIG. 53A. FIG. 54 is a front cross-section view of the wall-wash trim assembly 1600 taken through the line shown on FIG. 51. The wall-wash trim assembly 1600 (e.g., at least a portion of the wall-wash trim assembly 1600) may be configured to collect, reflect, and diffuse the light emitted by a lighting device assembly (e.g., such as the lighting device assembly 200 shown in FIGS. 3-5 and 8-11, the lighting device assembly 500 shown in FIGS. 13-15 and 18, the lighting device assembly 800 shown in FIG. 23, and/or the lighting device assembly 1100 shown in FIGS. 26-32) onto a wall (e.g., to provide wall-wash lighting). For example, the wall-wash trim assembly 1600 (e.g., at least a portion of the wall-wash trim assembly 1600) may be configured to minimize generation of a dark band (e.g., a dark area) at the top of the wall and/or scalloping (e.g., oval-triangular shape of light) on the wall.

The wall-wash trim assembly 1600 may include a body 1602 having a lower body portion 1610 (e.g., a base portion) and an upper body portion 1630 (e.g., a light conduit portion). For example, the lower body portion 1610 may define a trim ring of the lighting device in which the wall-wash trim assembly 1600 is installed. The wall-wash trim assembly 1600 may also comprise a lens 1650, which may be supported by the body 1602 (e.g., the lower body portion 1610 and/or the upper body portion 1630). For example, the lens 1650 may be configured to be secured between the lower body portion 1610 and the upper body portion 1630.

The lower body portion 1610 may define a sidewall 1612, a shroud 1620, and a rim 1626. The sidewall 1612 may be a first sidewall portion of the body 1602. The lower body portion 1610 may define a bottom surface 1613 (e.g., a bottom surface of the sidewall 1612 and the rim 1626). The sidewall 1612 may be cylindrical and may extend around the shroud 1620 such that the shroud 1620 is located on an interior side of the sidewall 1612. The shroud 1620 may define a trim surface 1621 and a first lens interface surface 1622. The trim surface 1621 may be a lower surface of the shroud 1620 that faces toward the bottom surface 1613. The trim surface 1621 of the shroud 1620 may be, for example, a matte finish (e.g., a black matte finish) in order to minimize reflections of light (e.g., glare) off of the trim surface 1621. For example, the lens 1650 may abut (e.g., rest on) the first lens interface surface 1622 when the lens 1650 is secured between the lower body portion 1610 and the upper body portion 1630. The lower body portion 1610 may define a lens opening 1624 and a channel 1625. The lens opening 1624 may be defined by the shroud 1620 and the rim 1626. The lower body portion 1610 further may define a pair of sleeves 1618 that define respective holes 1619 that are configured to receive fasteners 1617 (e.g., screws) to secure the upper body portion 1630 to the lower body portion 1610.

The lower body portion 1610 may define an aperture 1615 (e.g., such as the aperture 145 of the trim portion 140, the aperture 445 of the trim portion 440, the aperture 745 of the trim portion 740, and/or the aperture 1045 of the trim portion 1040). The aperture 1615 may be surrounded by the bottom surface 1613 of the lower body portion 1610. The channel 1625 of the lower body portion 1610 may extend between the lens opening 1624 and the aperture 1615. The aperture 1615 may be located in a plane that extends in the longitudinal direction L and the lateral direction A at the bottom surface 1613 of the lower body portion 1610 (e.g., which may be called the plane of the aperture 1615). For example, the aperture 1615 may be square-shaped (e.g., shaped like a square). The bottom surface 1613 may extend in the plane of the aperture 1615. The lower body portion 1610 may define an axis 1605 that extends through a center of the aperture 1615 (e.g., in the transverse direction T). As shown in FIG. 54, the aperture 1615 may be characterized by a length and a width that are both equal to a distance $D_{APERTURE4}$ (e.g., approximately two inches).

The upper body portion 1630 may define a first sidewall 1632 and a second sidewall 1634. The first sidewall 1632 and the second sidewall 1634 may define a second sidewall portion of the body 1602. The upper body portion 1630 may also define a bottom surface 1633, an upper surface 1635, and a second lens interface surface 1638. The upper body portion 1630 may be secured to the lower body portion 1610, for example, with the lens 1650 between the upper body portion 1630 and the lower body portion 1610. The upper body portion 1630 may define holes (not shown) that are configured to receive the fasteners 1617 to secure the upper body portion 1630 to the lower body portion 1610. Together, the sidewall 1612 of the lower body portion 1610 and the first and second sidewalls 1632, 1634 of the upper body portion 1630 may surround (e.g., at least partially surround) the shroud 1620 of the lower body portion 1610 and the lens 1650 when the lens 1650 is secured between the lower body portion 1610 and the upper body portion 1630. The upper body portion 1630 (e.g., the first sidewall 1632) may define a lip 1646 (e.g., a thin portion) adjacent to the bottom surface 1633. When the upper body portion 1630 is secured to the lower body portion 1610, the lip 1646 of the first sidewall 1632 of the upper body portion 1630 may extend between the rim 1626 of the lower body portion 1610 and the lens 1650.

The upper body portion 1630 may comprise a tunnel 1640 that extends through the upper body portion 1630. The tunnel 1640 may define an interior surface 1636 (e.g., which may at least partially surround the tunnel 1640). For example, the upper body portion 1630 may define an axis 1645 that may extend through a center of the tunnel 1640. The upper body portion 1630 (e.g., the upper surface 1635) may be configured to be located proximate to and aligned with the lighting device assembly, such that the axis 1645 of the upper body portion 1630 is aligned with (e.g., coaxial with) an axis of the lighting device assembly (e.g., the axes 205, 505, 805, 1105). The upper body portion 1630 (e.g., the tunnel 1640) may be configured to collect and reflect the light emitted by the lighting device assembly. For example, the interior surface 1636 of the upper body portion 1630 may be reflective. For example, the upper body portion 1630 may be made from a reflective material (e.g., metal) and/or the interior surface 1636 may be coated with a reflective coating.

The body 1602 of the wall-wash trim assembly 1600 (e.g., the upper body portion 1630) may define a third lens interface surface 1648 (e.g., a reflective lens interface surface), for example, on the lip 1646 of the upper body portion 1610. For example, the lens opening 1624 may be defined by the first lens interface surface 1622 and the third lens interface surface 1648. The third lens interface surface 1648 on the lip 1646 of the first sidewall 1632 of the upper body portion 1630 may be reflective (e.g., made from a reflective material and/or coated with a reflective material). For example, the lens 1650 may abut the third lens interface surface 1648 on the lip 1646. The third lens interface surface 1648 on the lip 1646 may be oriented, for example, approximately vertical (e.g., approximately perpendicular to the plane of the aperture 1615).

The lens 1650 may comprise a light-transmission portion 1651 having a light-entry surface 1652 (e.g., as shown in FIG. 50) and a light-exit surface 1653 (e.g., as shown in FIG. 54). For example, the light-transmission portion 1651 of the lens 1650 may be planar (e.g., substantially planar). The light-transmission portion 1651 of the lens 1650 may be oriented at an angle $\theta_{LENS4}$ (e.g., approximately 35°) with respect to the plane of the aperture 1615 (e.g., as shown in FIG. 53A). The light-transmission portion 1651 may be made of, for example, a translucent or transparent material. For example, the light-transmission portion 1651 may be diffusive (e.g., to evenly spread the light emitted by the lighting device assembly across the wall).

The light-transmission portion 1651 may define a lower interface surface 1668 of the lens 1650. The lower interface surface 1668 of the lens 1650 may be oriented, for example, approximately vertical (e.g., approximately perpendicular to the plane of the aperture 1615). The light-transmission portion 1651 may have a lower edge 1669 (e.g., a thin edge and/or a knife edge) of the lens 1650 (e.g., adjacent to the lower interface surface 1668). For example, the light-transmission portion 1651 may comprise a tapered section that terminates at the lower edge 1669. For example, the lower interface surface 1668 may be straight (e.g., linear). The lower interface surface 1668 of the lens 1650 may be configured to abut the lip 1646 of the first sidewall 1632 of the upper body portion 1630 (e.g., the third lens interface surface 1648) when the lens 1650 is secured between the upper body portion 1630 and the lower body portion 1610. The light-transmission portion 1551 of the lens 1650 may be characterized a width $W_{LENS4}$ at the lower edge 1669 (e.g., as shown in FIG. 54).

The lens 1650 may comprise a support portion having a plurality of support members 1660 (e.g., two support members 1660). The support members 1660 may be connected to the light-transmission portion 1651 at an upper side 1665 of the light-transmission portion 1651. The support members 1660 of the lens 1650 may define respective holes 1663 that are configured to receive the fasteners 1617 when the upper body portion 1630 is secured to the lower body portion 1610.

The lens 1650 (e.g., the support members 1660) may be clamped between the upper body portion 1630 and the lower body portion 1610, such that the axis 1645 of the upper body portion 1630 (e.g., the tunnel 1640) is aligned with an axis of the lighting device assembly (e.g., the axes 205, 505, 805, 1105). The fasteners 1617 may extend through the holes of the upper body portion 1630, the holes 1663 of the support members 1660 of the lens 1650, and the holes 1619 of the lower body portion 1610 to secure the upper body portion 1630 to the lower body portion 1610. The light-exit surface 1653 of the light-transmission portion 1651 of the lens 1650 may be supported by (e.g., may rest on and/or abut) the first lens interface surface 1622 of the lower body portion 1610, and the second lens interface surface 1638 of the upper body portion 1630 may be supported by (e.g., may rest on and/or abut) the light-entry surface 1652 of the light-transmission portion 1651 of the lens 1650. The lower interface surface 1668 of the lens 1650 may abut the rim 1626 of the first sidewall 1632 of the upper body portion 1630 (e.g., the third lens interface surface 1648) when the lens 1650 is secured between the upper body portion 1630 and the lower body portion 1610. When the lens 1650 is secured between the upper body portion 1630 and the lower body portion 1610, the tunnel 1640 of the upper body portion 1630 may be configured to collect and/or reflect the light emitted by the lighting device assembly to the light-entry surface 1652 of the lens 1650, and the light-exit surface 1653 may be configured to emit light through the aperture 1615.

The wall-wash trim assembly 1600 may be configured such that the lower edge 1669 of the lens 1650 is as close to the bottom surface 1613 of the lower body portion 1610 (e.g., the plane of the aperture 1615) as possible. The lower interface surface 1668 of the lens 1650 may abut the third lens interface surface 1648 on the lip 1646 above the bottom surface 1613 of the lower body portion 1610. For example, the lower edge 1669 of the lens 1650 may not extend past the bottom surface 1613 of the lower body portion 1610. The lower interface surface 1668 of the lens 1650 may contact the third lens interface surface 1648 on the lip 1646 as low as possible on the third lens interface surface 1648, e.g., such that a distance $D_{GAP4}$ between the lower edge 1669 of the lens 1650 and the bottom surface 1613 of the lower body portion 1610 is minimized. Since the third lens interface surface 1648 on the lip 1646 may be reflective (e.g., may be coated with a reflective coating), the lens 1650 may be configured to conduct light from the wall-wash trim assembly 1600 at as low of a point on the wall-wash trim assembly 1600 as possible (e.g., to minimize a dark band generated on the wall on which the lighting device is shining light).

The bottom surface 1613 of the lower body portion 1610 (e.g., the sidewall 1612 and the rim 1626) and the bottom surface 1633 of the upper body portion 1630 (e.g., the lip 1646) may define a lower edge of the wall-wash trim assembly 1600 that has a width $W_{LE4}$ (e.g., as shown in FIG. 53B). The bottom surface 1613 of the lower body portion 1610 and the bottom surface 1633 of the upper body portion 1630 (e.g., the lower edge of the wall-wash trim assembly 1600) may be sized such that the wall-wash trim assembly 1600 may present a thin edge appearance (e.g., a knife appearance) when viewed from below the lighting device. The bottom surface 1613 of the lower body portion 1610 may be substantially coplanar (e.g., flush) with the bottom surface 1633 of the first sidewall 1632 of the upper body portion 1630 (e.g., as shown in FIG. 53B).

The wall-wash trim assembly 1600 may further comprise a spring 1670 that may be configured to bias the lens 1650 towards the lip 1646 of the first sidewall 1632 of the upper body portion 1630. The spring 1670 may be located in a recess 1642 of the upper body portion 1630. For example, the recess 1642 may be open at the upper surface 1635 of the upper body portion 1630. The spring 1670 may comprise a first portion 1672, a second portion 1674, and a bent portion 1676 (e.g., as shown in FIG. 53A). The first portion 1672 may be connected to the second portion 1674 via the bent portion 1676, such that the first portion 1672 is oriented at an angle with respect to the second portion 1674. The second portion 1674 of the spring 1670 may be fixedly connected to the upper body portion 1630. For example, the second portion 1674 of the spring 1670 may be connected to a wall 1644 (e.g., an interior wall) of the upper body portion 1630 (e.g., which may be a wall of the recess 1642). The spring 1670 may be, for example, formed as part of (e.g., integral with) the upper body portion 1630 (e.g., molded together with the upper body portion 1630). In some examples, the spring 1670 may be a separate part from the upper body portion 1630 (e.g., made of a different material than the upper body portion 1630, such as metal) and may be fixedly attached to the wall 1644 of the upper body portion 1630 via fasteners or other attachment mechanisms.

The second portion 1674 of the spring 1670 may be biased towards the lens 1650. The second portion 1674 may be configured to abut (e.g., a apply a force to) a contact portion 1666 of the lens 1650 to bias (e.g., push) the lens 1650 towards the lip 1646 of the first sidewall 1632 of the upper body portion 1630 (e.g., in the longitudinal direction L and the transverse direction T). For example, the contact portion 1666 of the lens 1650 may comprise one or more ribs 1667 that extend from the support members 1660 of the lens 1650 (e.g., in the longitudinal direction L and the transverse direction T). The second portion 1674 may be configured to abut the one or more ribs 1667, for example, to bias the lens 1650 toward the lip 1646. The spring 1670 may be configured to bias the lens 1650 against the lip 1646 of the first sidewall 1632 of the upper body portion 1630, such that the lower interface surface 1668 of the lens 1650 makes good contact with the third lens interface surface 1648 on the lip 1646. Biasing the lens 1650 against the lip 1646 using the spring 1670 may help to minimize the distance $D_{GAP4}$ between the lower edge 1669 of the lens 1650 and the bottom surface 1613 of the lower body portion 1610.

Figure 55:
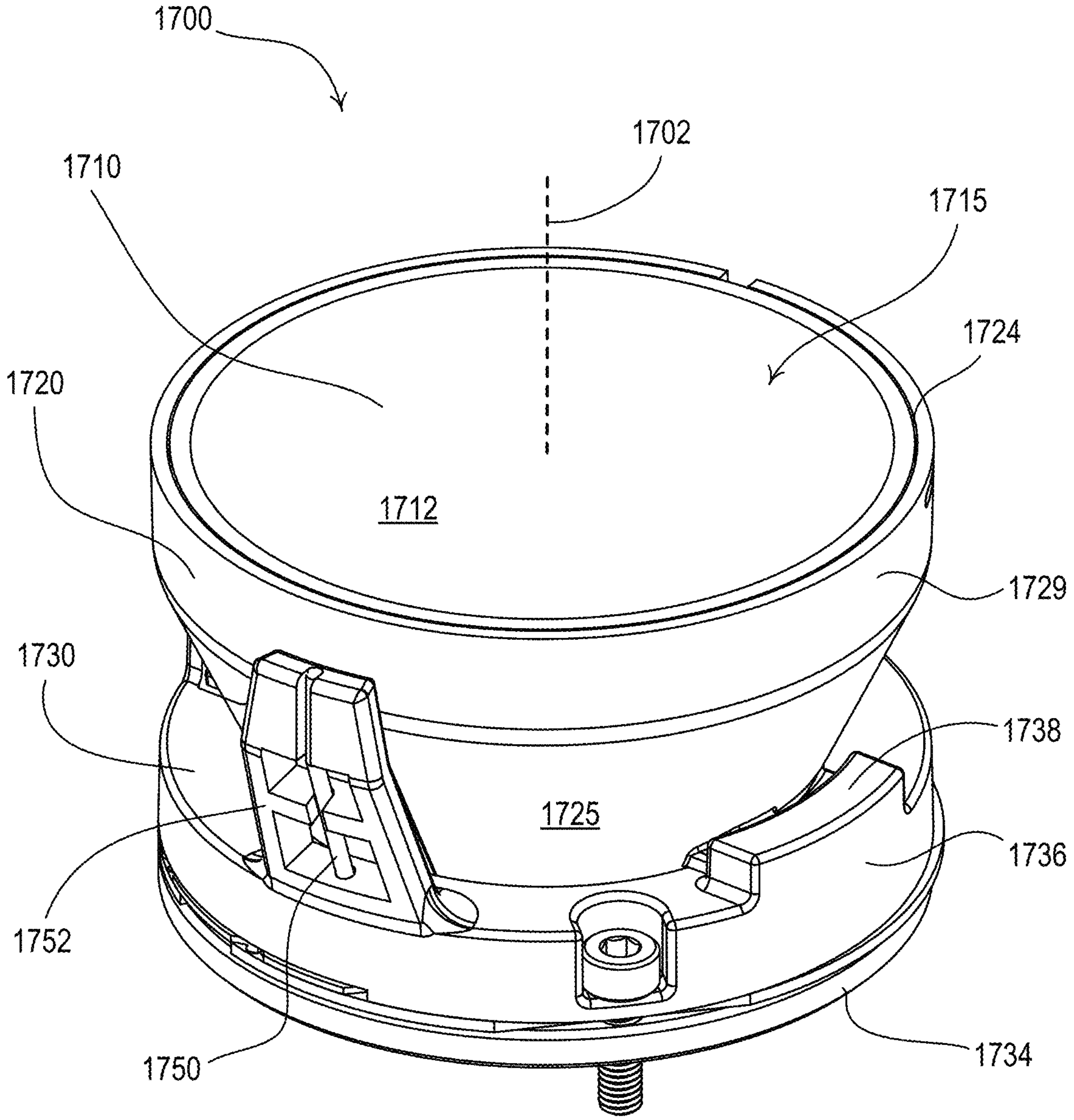
FIG. 55 is a perspective view of an example lighting device assembly.
Figure 56:
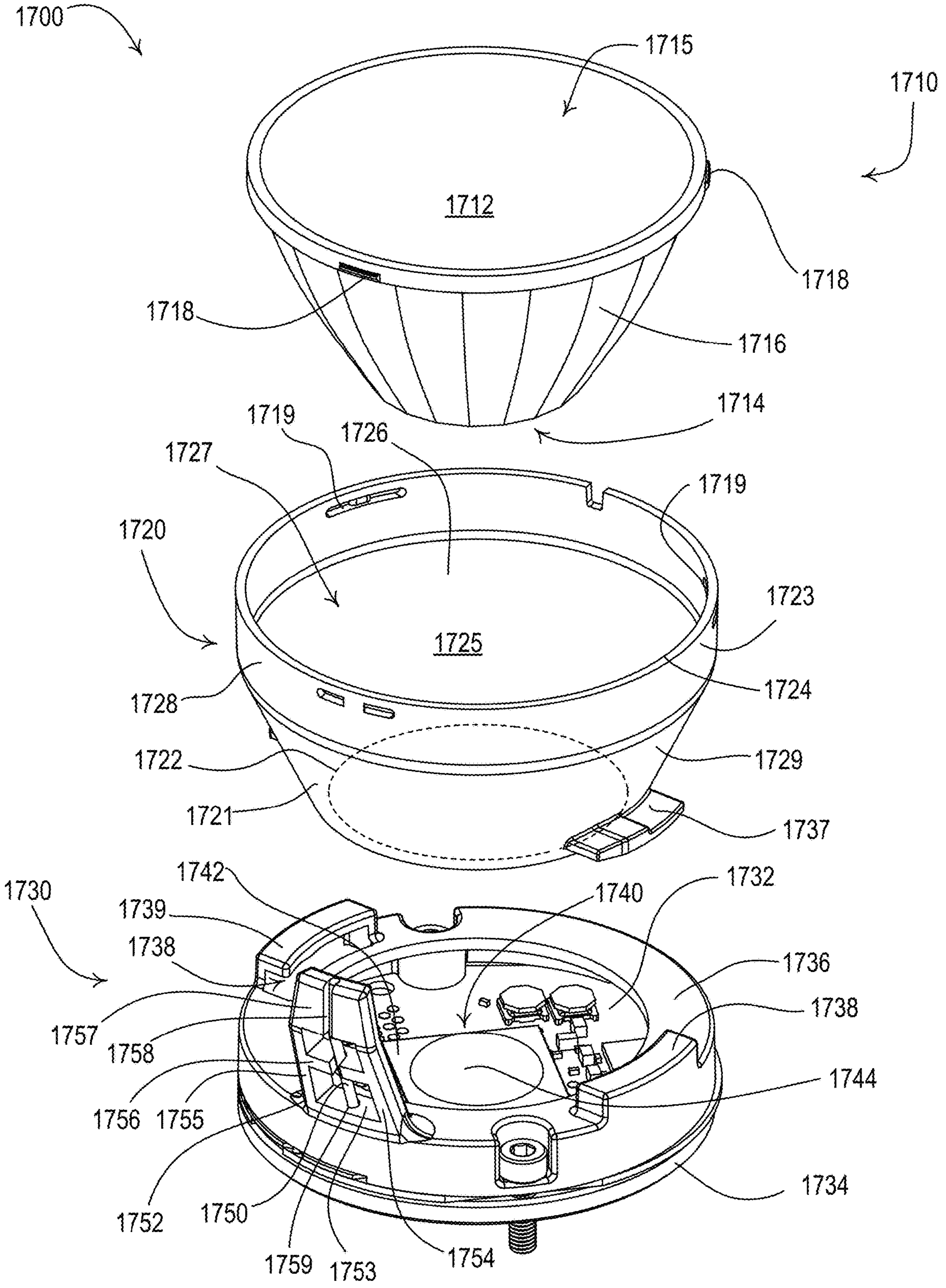
FIG. 56 is a partially exploded view of the lighting device assembly of FIG. 55.

FIGS. 55 and 56 depict another example lighting device assembly 1700 (e.g., such as the lighting device assemblies 200, 500, 800, 1100) configured to be installed within a lighting device (e.g., such as the lighting devices 100, 400, 700, 1000). FIG. 55 is a perspective view of the lighting device assembly 1700. FIG. 56 is a partially exploded view of the lighting device assembly 1700. The lighting device assembly 1700 may comprise an optical structure 1710 (e.g., a lens), a reflector 1720, and a light-generation module 1730. The light-generation module 1730 may comprise a printed circuit board 1732, a heat sink 1734, and a socket 1736. The light-generation module 1730 may include an emitter assembly 1740 (e.g., an emitter module) having one or more emitters, such as light-emitting diodes (LEDs) (not shown) and/or one or more detectors (e.g., detection LEDs) mounted to a substrate 1742, which may be mounted to the printed circuit board 1732. The printed circuit board 1732 also may have mounted thereto electrical circuitry including one or more drive circuits for controlling the amount of power delivered to the emitters of emitter assembly 1740, one or more control circuits for controlling the drive circuits, and one or more wireless communication circuits for communicating wireless signals (e.g., radio-frequency (RF) signals) with external devices. The printed circuit board 1732 may be located between the heat sink 1734 and the socket 1736.

The emitter assembly 1740 may include an optical element, such as a dome 1744 that is configured to enclose the one or more emitters and the one or more detectors mounted to the substrate 1742. The emitter assembly 1740 may be configured to emit light (e.g., through the dome 1744). The substrate 1742 may be a ceramic substrate formed from an aluminum nitride or an aluminum oxide material or some other reflective material, and may function to improve output efficiency of the emitter assembly 1740 by reflecting light out of the dome 1744. The dome 1744 may include an optically-transmissive material, such as silicon or the like, and may be formed through an over-molding process, for example. A surface of the dome 1744 may be textured (e.g., lightly textured), for example, to increase light scattering and promote color mixing, as well as to reflect a portion (e.g., a small amount) of the emitted light back toward the detectors mounted on the substrate 1742, e.g., about 5% (e.g., when the detectors are included). The emitters of the emitter assembly 1740 may be thermally coupled to the heat sink 1734 via the substrate 1742 and the printed circuit board 1732. The heat sink 1734 may be configured to dissipate heat generated by the emitters of the emitter assembly 1740. A thermally-conductive substance may be disposed between the printed circuit board 1732 and the heat sink 1734.

The optical structure 1710 may comprise a body 1712 having a light-entry portion 1714, a light-exit portion 1715, and a side wall 1716. For example, the side wall 1716 may define a total internal reflection (TIR) surface (not shown) within the body 1712 of the optical structure 1710. The side wall 1716 may be smooth and/or may be faceted as shown in FIG. 56, although other variations are possible. The reflector 1720 may comprise a body 1725 (e.g., a conically-shaped body) having a first opening 1722 (e.g., which is illustrated as a dashed line in FIG. 56) at a first end 1721 of the reflector 1720, a second opening 1724 at a second end 1723 of the reflector 1720, and a side wall 1729 extending between the first opening 1722 and the second opening 1724. The body 1725 of the reflector 1720 may define a cavity 1727 (FIG. 56) in which the optical structure 1710 may be received (e.g., as shown in FIG. 55). The body 1725 of the reflector 1720 may include an inner surface 1726 and an outer surface 1728. The reflector 1720 may be at least partially metallic. For example, the inner surface 1726 of the reflector 1720 may include a reflective material (e.g., may be at least partially metallic). The optical structure 1710 may comprise tabs 1718 configured to be received in corresponding recesses 1719 in the reflector 1720 for holding the optical structure 1710 within the cavity 1727 of the reflector 1720.

The socket 1736 may at least partially enclose the printed circuit board 1732. The socket 1736 may comprise two or more catches 1738 (e.g., connectors) that may be evenly spaced around the socket 1736. The reflector 1720 may define tabs 1737 proximate to the first opening 1722 of the reflector 1720. The tabs 1737 may extend (e.g., radially outward) from the outer surface 1728 adjacent to the first opening 1722 of the reflector 1720. The catches 1738 on the socket 1736 may each define a respective slot 1739 in which one of the tabs 1737 of the reflector 1720 may be received (e.g., slidingly received) for connecting the reflector 1720 to the light-generation module 1730. The lighting device assembly 1700 may define a central axis 1702 about which the optical structure 1710, the reflector 1720, and the emitter assembly 1740 of the light-generation module 1730 may be centered.

When the lighting device assembly 1700 is assembled (e.g., as shown in FIG. 55), the emitters of the emitter assembly 1740 may be configured to emit light through the dome 1744 and the first opening 1722 of the reflector 1720, and onto the light-entry portion 1714 of the optical structure 1710. The optical structure 1710 may be configured to conduct the light received by the light-entry portion 1714 towards the light-exit portion 1715, such that the light may shine through the second opening 1724 of the reflector 1720. For example, the light-exit portion 1715 of the optical structure 1710 may be circular to match a circular shape of the second opening 1724 of the reflector 1720. The TIR surface defined by the side wall 1716 of the optical structure 1710 may be configured to reflect light towards the light-exit portion 1715 (e.g., as will be described in greater detail below). In addition, the reflector 1720 may be configured to reflect the light towards the light-exit portion 1715 of the optical structure 1710.

The light-generation module 1730 may also comprise an antenna 1750 (e.g., the antenna 250 of the light-generation module 230, the antenna 550 of the light-generation module 530, the antenna 850 of the light-generation module 830, and/or the antenna 1150 of the light-generation module 1130). The antenna 1750 may be electrically coupled to the one or more wireless communication circuits mounted to the printed circuit board 1732. The one or more wireless communication circuit may be configured to transmit and/or receive messages via wireless signals from/to external control devices via the antenna 1750. For example, the wireless communication circuit(s) may include a radio-frequency (RF) transceiver coupled to the antenna 1750 for transmitting and/or receiving RF signals. In addition, the wireless communication circuit(s) may be an RF transmitter for transmitting RF signals and an RF receiver for receiving RF signals. As another example, the wireless communication circuit(s) may be an infrared (IR) transmitter and/or receiver for transmitting and/or receiving IR signals. The antenna 1750 may be held in place by an antenna holder 1752. The antenna holder 1752 may be connected to (e.g., extend from) the printed circuit board 1732 and/or the socket 1736. The antenna 1750 may be located external to the reflector 1720 such that the antenna 1750 is spaced a predetermined distance from the outer surface 1728 of the reflector 1720. For example, the antenna 1750 may extend external to the reflector 1720 from a location adjacent to the first opening 1722 of the reflector 1720 towards the second opening 1724 of the reflector 1720.

The antenna holder 1752 may be configured to hold the antenna 1750 such that the antenna 1750 is spaced a predetermined distance (e.g., such as the distance D1 shown in FIGS. 9 and 10) from the outer surface 1728 of the reflector 1720. The antenna holder 1752 may define a base portion 1753, side portions 1754, 1755, a connecting portion 1756, and an upper portion 1757. The base portion 1753 may be proximate to the socket 1736 (e.g., and the printed circuit board 1732). The upper portion 1757 may be distal (e.g., and cantilevered) from the socket 1736. The side portions 1754, 1755 may extend between the base portion 1753 and the upper portion 1757. The connecting portion 1756 may extend between the two side portions 1754, 1755. The antenna holder 1752 may define a channel 1758 that is configured to receive (e.g., and retain) the antenna 1750. The channel 1758 may extend through the upper portion 1757 and the connecting portion 1756. The antenna holder 1752 may define an aperture 1759 that is configured to receive the antenna 1750. For example, the antenna 1750 may extend from the printed circuit board 1732 to the antenna holder 1752 (e.g., the channel 1758) via the aperture 1759.

Figure 57:
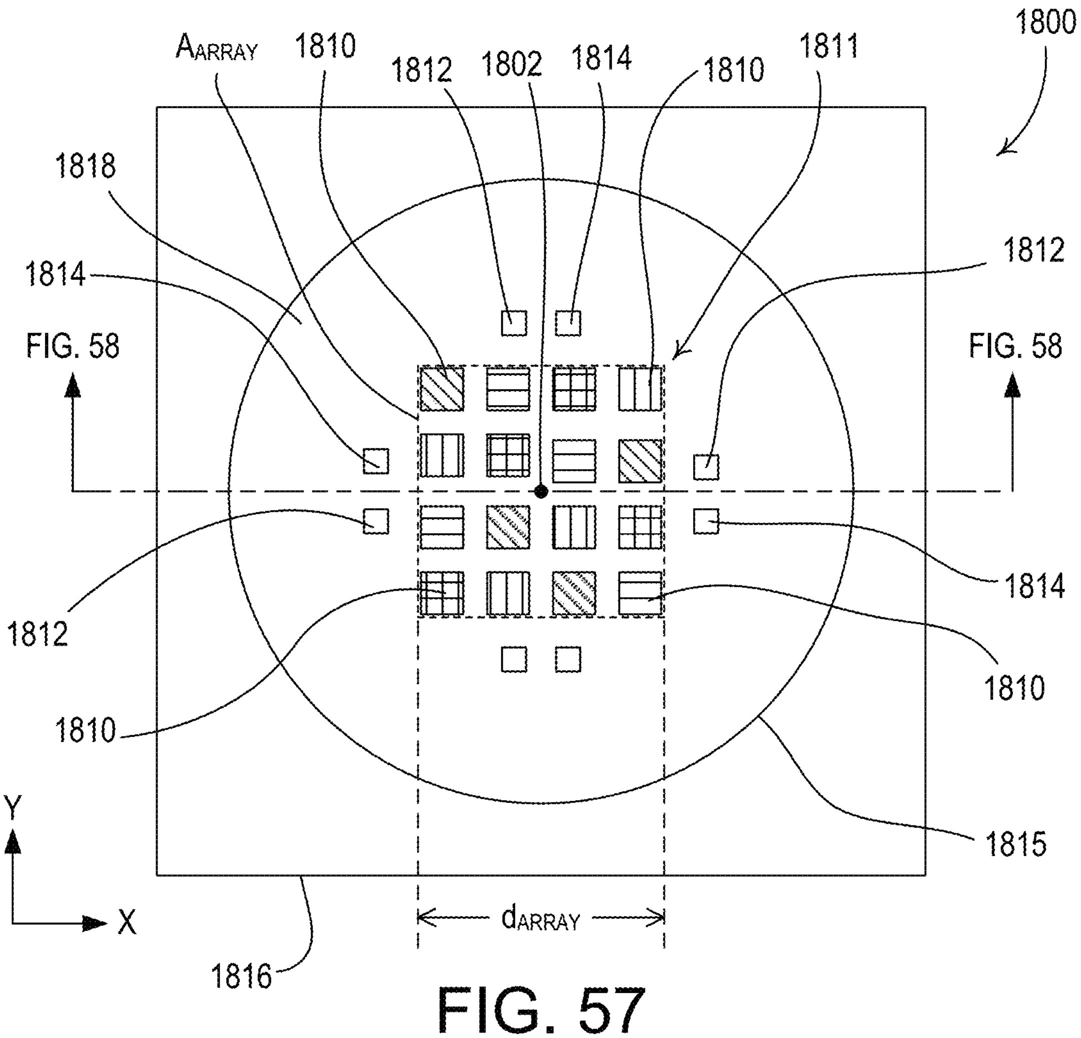
FIG. 57 is a top view of an example emitter assembly (e.g., an emitter module) of a lighting device (e.g., such as the lighting device of FIG. 1, the lighting device of FIG. 11, the lighting device of FIG. 21, and/or the lighting device of FIG. 26) and/or a lighting device assembly (e.g., such as the lighting device assembly of FIG. 55).
Figure 58:
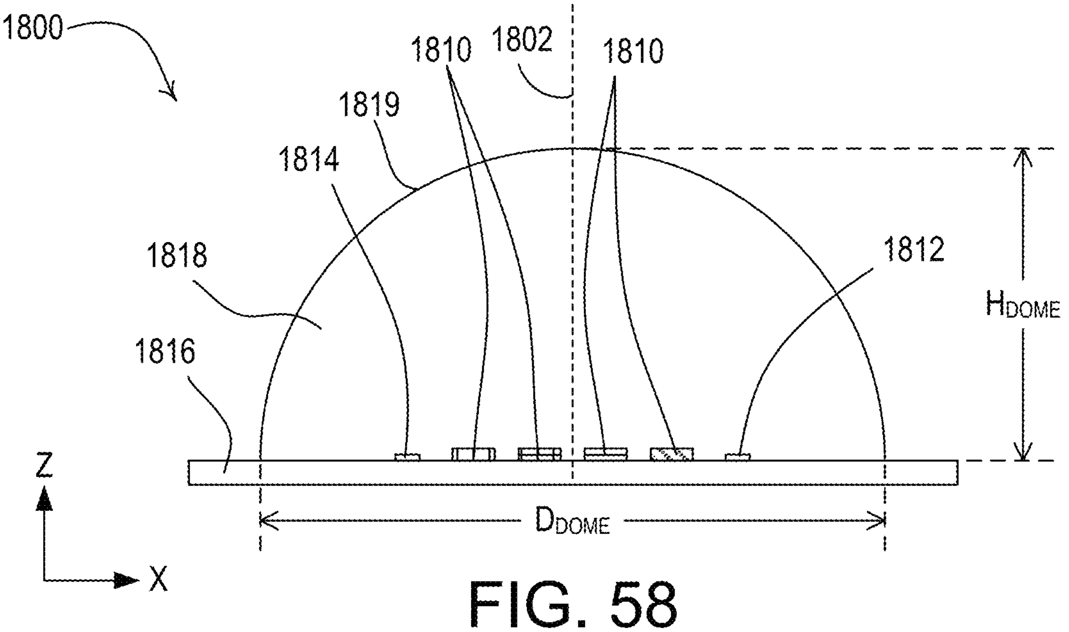
FIG. 58 is a side cross-section view of the emitter assembly of FIG. 57 taken through the center of the emitter assembly (e.g., through the line shown in FIG. 57).

FIG. 57 is a top view of an example emitter assembly 1800 (e.g., an emitter module) of a lighting device and/or a lighting device assembly, which may be deployed as an emitter assembly of any of the lighting devices 100, 400, 700, 1000, and/or the emitter assembly 1740 of the lighting device assembly 1700 shown in FIGS. 55 and 56. FIG. 58 is a side cross-section view of the emitter assembly 1800 taken through the center of the emitter assembly 1800 (e.g., through the line shown in FIG. 57). The emitter assembly 1800 may comprise an array 1811 of emitters 1810 (e.g., emission LEDs). In some examples, the emitter assembly

1800 may also include (e.g., optionally include) one or more detectors 1812, 1814 (e.g., detection LEDs). For example, the emitter assembly 1800 may comprise sixteen emitters 1810 and eight detectors 1812, 1814, although other variations are possible. In some examples, the array 1811 may include more or less emitters 1810 than shown in FIG. 57. While two types of the detectors 1812, 1814 are shown in FIG. 57, the emitter assembly 1800 may include more or less detectors depending on the emitters 1810. In addition, different configurations of the detectors 1812, 1814 may be used.

The emitters 1810 and the detectors 1812, 1814 may be mounted to a substrate 1816 (e.g., a board) and may be encapsulated by an optical element, such as a dome 1818. For example, the substrate 1816 may be a ceramic substrate formed from an aluminum nitride or an aluminum oxide material or some other reflective material. In addition, the substrate 1816 may comprise a printed circuit board (PCB), such as a rigid PCB (e.g., made from an FR4 material) and/or a metal core PCB. The array 1811 of the emitters 1810 may be located within an area $A_{ARRAY}$, which may be shaped as, for example, a square. For example, the array 1811 of the emitters 1810 (e.g., the area $A_{ARRAY}$) may have sides having respective lengths that are each equal to a distance $d_{ARRAY}$ (e.g., approximately 6.2 millimeters). The dome 1818 may have an outer periphery 1815 that surrounds the emitters 1810 and the detectors 1812, 1814 (e.g., as shown in FIG. 57). The emitter assembly 1800 may define a central axis 1802 about which the area $A_{ARRAY}$ of the array 1811 of the emitters 1810 and the dome 1818 may be centered.

The emitter assembly 1800 may include multiple "chains" of the emitters 1810 (e.g., series-coupled emitters). The emitters 1810 of each chain may be coupled in series and may conduct the same drive current. Each chain may include emitters 1810 that produce illumination at the same peak emission wavelength (e.g., emit light of the same color). The emitters 1810 of different chains may emit light of different colors. For example, the emitter assembly 1800 may comprise four differently-colored chains of emitters 1810 (e.g., red, green, blue, and white or yellow). The array 1811 of the emitters 1810 may include a chain of four red emitters, a chain of four green emitters, a chain of four blue emitters, and a chain of four white or yellow emitters. The individual emitters 1810 in each chain may be scattered about the array, and arranged so that no color appears twice in any row, column, or diagonal, to improve color mixing within the emitter assembly 1800. Other variations of numbers of the emitters 1810 per chain, the colors of the emitters 1810, the numbers of the colors of the emitters 1810, the number of chains of the emitters 1810, etc., may be used. In addition, patterns other than a square array may be used. Other variations are possible.

The detectors 1812, 1814 may be located in pairs close to each edge of the array 1811 of the emitters 1810 and/or in the middle of the array 1811 of the emitters 1810 as shown in FIG. 57. Similar to the emitters 1810, the detectors 1812, 1814 may be LEDs that can be used to emit or receive optical or electrical signals. When the detectors 1812, 1814 are coupled to receive optical signals and emit electrical signals, the detectors may produce currents indicative of incident light from, for example, an emitter, a plurality of emitters, or a chain of emitters. The detectors 1812, 1814 may be any devices that produce currents indicative of incident light, such as a silicon photodiode or an LED. For example, the detectors 1812, 1814 may each be an LED having a peak emission wavelength in the range of approximately 550 nm to 700 nm, such that the detectors may not produce photocurrent in response to infrared light (e.g., to reduce interference from ambient light). For example, the first detectors 1812 of each pair of detectors may comprise a small red, orange or yellow LED, which may be used to measure a luminous flux of the light emitted by the red LEDs of the emitters 1810. The second detectors 1814 may comprise a green LED, which may be used to measure a respective luminous flux of the light emitted by each of the green and blue LEDs of the emitters 1810. Both of the first and second detectors 1812, 1814 may be used to measure the luminous flux of the white LED of the emitters 1810 at different wavelengths (e.g., to characterize the spectrum of the light emitted by the white LED). The first detectors 1812 may be coupled in parallel in the emitter assembly 1800. Similarly, the second detectors 1814 may be coupled in parallel in the emitter assembly 1800. Other variations are possible.

The dome 1818 may comprise, for example, an optically-transmissive material (e.g., a translucent and/or transparent material), such as silicon or the like, and may be formed through an over-molding process, for example. The dome 1818 may be a solid structure comprising the optically-transmissive material filled in between the substrate 1816 and an outer surface 1819 of the dome 1818. The outer surface 1819 of the dome 1818 may be textured (e.g., lightly textured), for example, to increase light scattering and promote color mixing, as well as to reflect a portion (e.g., a small amount) of the light emitted by the emitters 1810 back toward the detectors 1812, 1814 mounted on the substrate 1816, e.g., about 5% (e.g., when the detectors 1812, 1814 are included). The dome 1818 may be characterized by a diameter $D_{DOME}$ (e.g., approximately 16 millimeters) in a plane of the emitters 1810, where the diameter $D_{DOME}$ may be generally dependent on the size of the array 1811 of emitters 1810 (e.g., the distance $d_{ARRAY}$). The dome 1818 may be characterized by a height $H_{DOME}$, which may be approximately equal to half of the diameter $D_{DOME}$ of the dome 1818 (e.g., approximately 8 millimeters). For example, the dome 1818 may have a curved profile, such that the dome 1818 may be approximately a hemisphere (e.g., have a hemispherical shape). The emitters 1810, the detectors 1812, 1814, the substrate 1816, and the dome 1818 may form an optical system. The array 1811 of emitters 1810 may be located as close as possible together to the central axis 1802 of the emitter assembly 1800, so as to approximate a centrally-located point source.

Figure 59:
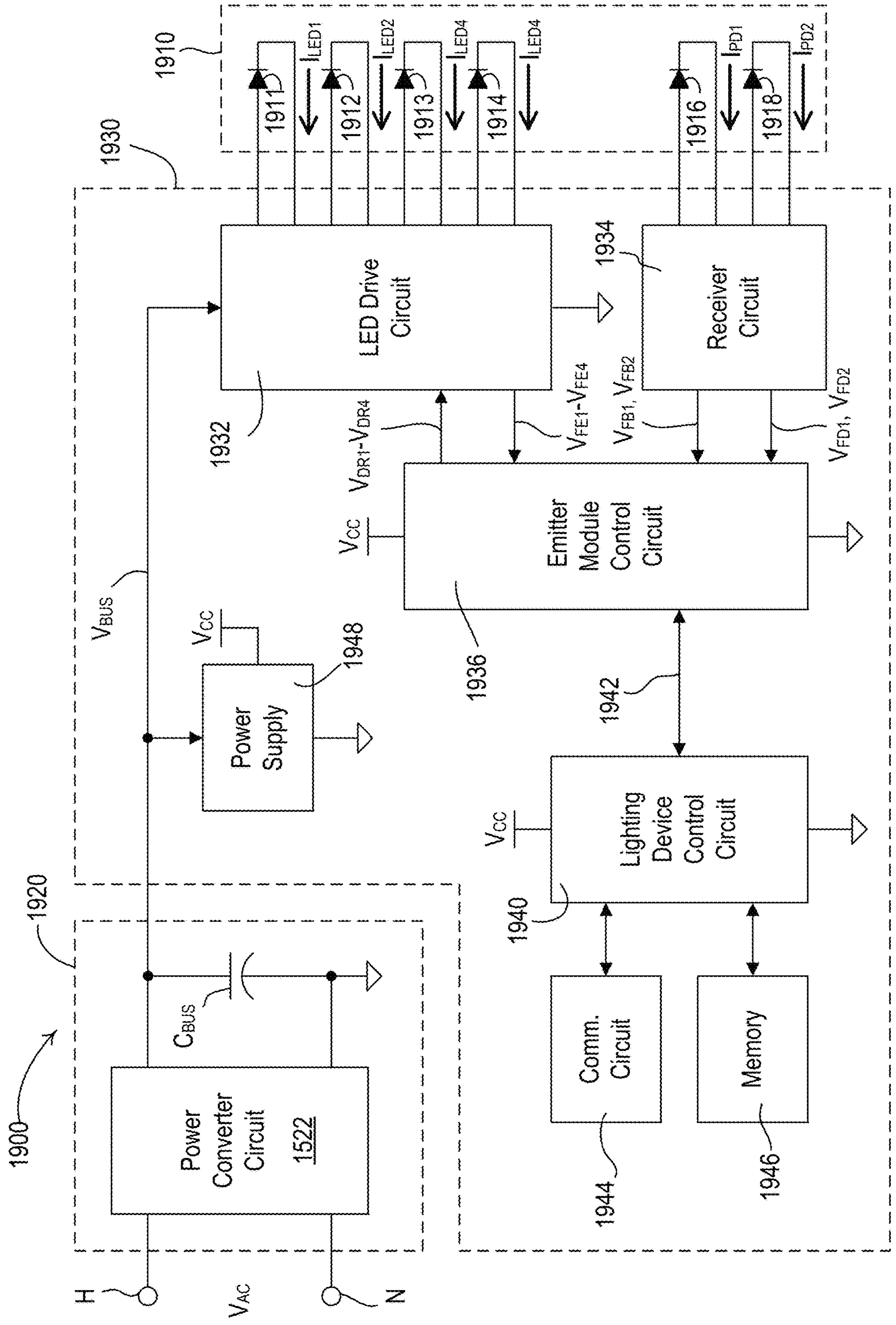
FIG. 59 is a simplified block diagram of an example controllable lighting device, such as the lighting device of FIG. 1, the lighting device of FIG. 11, the lighting device of FIG. 21, and/or the lighting device of FIG. 26.

FIG. 59 is a simplified block diagram of an example lighting device 1900, such as a controllable lighting device (e.g., the lighting devices 100, 400, 700, 1000). The lighting device 1900 may comprise one or more emitter assemblies 1910 (e.g., the emitter assembly 1740 shown in FIG. 56 and/or the emitter assembly 1800 shown in FIGS. 57 and 58). For example, the emitter assembly 1910 of the lighting device 1900 may include one or more emitters 1911, 1912, 1913, 1914. Each of the emitters 1911-1914 is shown in FIG. 59 as a single LED, but may each comprise a plurality of LEDs connected in series (e.g., a chain of LEDs), a plurality of LEDs connected in parallel, or a suitable combination thereof, depending on the particular lighting system. In addition, each of the emitters 1911-1914 may comprise one or more organic light-emitting diodes (OLEDs). For example, the first emitter 1911 may represent a chain of red LEDs, the second emitter 1912 may represent a chain of blue LEDs, the third emitter 1913 may represent a chain of green LEDs, and the fourth emitter 1914 may represent a chain of white or amber LEDs. The emitters 1911-1914 may be controlled to adjust a brightness (e.g., a luminous flux or an intensity level) and/or a color (e.g., a color temperature) of a cumulative light output of the lighting device 1900. The emitter assembly 1910 may also comprise one or more detectors 1916, 1918 (e.g., photodiodes) that may produce respective photodiode currents $I_{PD1}$, $I_{PD2}$ (e.g., detector signals) in response to incident light. For example, the first detector 1916 may represent a single red, orange or yellow LED or multiple red, orange or yellow LEDs in parallel, and the second detector 1918 may represent a single green LED or multiple green LEDs in parallel. The emitter assembly 1910 may be mounted on a light-generation printed circuit board of a lighting device assembly of the lighting device 1900 (e.g., the printed circuit board 232 of the light-generation module 230 of the lighting device assembly 200, the printed circuit board 532 of the light-generation module 530 of the lighting device assembly 500, the printed circuit board of the light-generation module 830 of the lighting device assembly 800, the printed circuit board 1132 of the light-generation module 1130 of the lighting device assembly 1100, and/or the printed circuit board 1732 of the light-generation module 1730 of the lighting device assembly 1700).

The lighting device 1900 may comprise a power conversion stage 1920. For example, the power conversion stage 1920 may be located (e.g., mounted inside of a housing of the lighting device 1900 (e.g., the housing 110, the housing 410, the housing 710, and/or the housing 1010). The power conversion stage 1920 may comprise a power converter circuit 1922, which may receive a source voltage, such as an AC mains line voltage $V_{AC}$, via a hot connection H and a neutral connection N. The power converter circuit 1922 may generate a DC bus voltage VBUS (e.g., approximately 15-20V) across a bus capacitor $C_{BUS}$. The power converter circuit 1922 may comprise, for example, a boost converter, a buck converter, a buck-boost converter, a flyback converter, a single-ended primary-inductance converter (SEPIC), a Cuk converter, or any other suitable power converter circuit for generating an appropriate bus voltage. The power converter circuit 1922 may provide electrical isolation between the AC power source and the emitters 1911-1914, and may operate as a power factor correction (PFC) circuit to adjust the power factor of the lighting device 1900 towards a power factor of one. The circuitry of the power conversion stage 1920 may be mounted to a power printed circuit board that is external to the lighting device assembly that includes the light-generation printed circuit board to which the emitter assembly 1910 is mounted.

The lighting device 1900 may comprise a light-generation module stage 1930 (e.g., the light-generation module 230, the light-generation module 530, the light-generation module 830, the light-generation module 1130, and/or the light-generation module 1730). The circuitry of the light-generation module stage 1930 may be mounted to the light-generation printed circuit board to which the emitter assembly 1910 is also mounted. The light-generation module stage 1930 may comprise an LED drive circuit 1932 for controlling (e.g., individually controlling) the power delivered to and the luminous flux of the light emitted of each of the emitters 1911-1914 of the emitter assembly 1910. The LED drive circuit 1932 may receive the bus voltage VBUS from the power-converter circuit 1922 of the power conversion stage 1920. For example, the light-generation module stage 1930 may be electrically coupled to the power conversion stage 1920, for example, via a cable that has two or more electrical conductors and extends through the housing of the lighting device 1900 between the power conversion stage 1920 and the light-generation module stage 1930. The LED drive circuit 1932 may adjust magnitudes of respective LED drive currents $I_{LED1}$, $I_{LED2}$, $I_{LED3}$, $I_{LED4}$ conducted through the emitters 1911-1914. The LED drive circuit 1932 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 1932 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The light-generation module stage 1930 may comprise a receiver circuit 1934 that may be electrically coupled to the detectors 1916, 1918 of the emitter assembly 1910 for generating respective optical feedback signals $V_{FB1}$, $V_{FB2}$ in response to the photodiode currents $I_{PD1}$, $I_{PD2}$. The receiver circuit 1934 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The light-generation module stage 1930 may comprise an emitter control circuit 1936 for controlling the LED drive circuit 1932 to control the intensities of the emitters 1911-1914 of the emitter assembly 1910. The emitter control circuit 1936 may comprise, for example, a microprocessor, a microcontroller, a programmable logic device (PLD), an application specific integrated circuit (ASIC), a field-programmable gate array (FPGA), or any other suitable processing device or controller. The emitter control circuit 1936 may generate one or more drive signals $V_{DR1}$, $V_{DR2}$, $V_{DR3}$, $V_{DR4}$ for controlling the respective regulation circuits in the LED drive circuit 1932. The emitter control circuit 1936 may receive the optical feedback signals $V_{FB1}$, $V_{FB2}$ from the receiver circuit 1934 for determining the luminous flux $L_E$ of the light emitted by the emitters 1911-1914.

The emitter control circuit 1936 may receive a plurality of emitter forward-voltage feedback signals $V_{FE1}$, $V_{FE2}$, $V_{FE3}$, $V_{FE4}$ from the LED drive circuit 1932 and a plurality of detector forward-voltage feedback signals $V_{FD1}$, $V_{FD2}$ from the receiver circuit 1934. The emitter forward-voltage feedback signals $V_{FE1}$-$V_{FE4}$ may be representative of the magnitudes of the forward voltages of the respective emitters 1911-1914, which may indicate temperatures $T_{E1}$, $T_{E2}$, $T_{E3}$, $T_{E4}$ of the respective emitters. If each emitter 1911-1914 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 1916, 1918, which may indicate temperatures $T_{D1}$, $T_{D2}$ of the respective detectors. For example, the detector forward-voltage feedback signals $V_{FD1}$, $V_{FD2}$ may be equal to the forward voltages VED of the respective detectors 1916, 1918.

The lighting device 1900 may comprise a lighting device control circuit 1940 that may be electrically coupled to the emitter control circuit 1936 via a communication bus 1942 (e.g., an $I^2C$ communication bus). The lighting device control circuit 1940 may be configured to control the emitter assembly 1910 to control the brightness (e.g., luminous flux) and/or the color (e.g., color temperature and/or full color) of the cumulative light emitted by the lighting device 1900. The lighting device control circuit 1940 may comprise, for example, a microprocessor, a microcontroller, a programmable logic device (PLD), an application specific integrated circuit (ASIC), a field-programmable gate array (FPGA), or any other suitable processing device or controller. The lighting device control circuit 1940 may be configured to adjust (e.g., dim) a present intensity $L_{PRES}$ (e.g., a present brightness) of the cumulative light emitted by the lighting device 1900 towards a target intensity $L_{TRGT}$ (e.g., a target brightness), which may range across a dimming range of the controllable lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 1940 may be configured to adjust a present color temperature $T_{PRES}$ of the cumulative light emitted by the lighting device 1900 towards a target color temperature $T_{IRGT}$, which may range between a cool-white color temperature (e.g., approximately 3100-4500 K) and a warm-white color temperature (e.g., approximately 2000-3000 K).

The lighting device 1900 may comprise a communication circuit 1944 coupled to the lighting device control circuit 1940. The communication circuit 1944 may comprise a wireless communication circuit, such as, for example, a radio-frequency (RF) transceiver coupled to an antenna (e.g., the antenna 250 of the light-generation module 230, the antenna 550 of the light-generation module 530, the antenna 850 of the light-generation module 830, the antenna 1150 of the light-generation module 1130, and/or the antenna 1750 of the light-generation module 1730) for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. For example, the communication circuit 1944 may be configured to communicate the wireless signals via the antenna at a communication frequency $f_{COMM}$ (e.g., approximately 2.4 GHz). The communication circuit 1944 may be coupled to the hot connection H and the neutral connection N of the lighting device 1900 for transmitting a control signal via the electrical wiring using, for example, a power-line carrier (PLC) communication technique. The lighting device control circuit 1940 may be configured to determine the target intensity $L_{TRGT}$ for the lighting device 1900 in response to messages (e.g., digital messages) received via the communication circuit 1944.

The lighting device 1900 may comprise a memory 1946 configured to store operational characteristics of the lighting device 1900 (e.g., the target intensity $L_{TRGT}$, the target color temperature $T_{TRGT}$, the low-end intensity $L_{LE}$, the high-end intensity $L_{HE}$, etc.). The memory 1946 may be implemented as an external integrated circuit (IC) or as an internal circuit of the lighting device control circuit 1940. The lighting device 1900 may comprise a power supply 1948 that may receive the bus voltage VBUS and generate a supply voltage $V_{CC}$ for powering the lighting device control circuit 1940 and other low-voltage circuitry of the lighting device.

When the lighting device 1900 is on, the lighting device control circuit 1940 may be configured to control the emitter assembly 1910 to emit light substantially all of the time. The lighting device control circuit 1940 may be configured to control the emitter assembly 1910 to disrupt the normal emission of light to measure one or more operational characteristics of the emitter modules during periodic measurement intervals. For example, during the measurement intervals, the emitter control circuit 1936 may be configured to individually turn on each of the different-colored emitters 1911-1914 of the emitter assembly 1910 (e.g., while turning off the other emitters) and measure the luminous flux of the light emitted by that emitter using one of the two detectors 1916, 1918. For example, the emitter control circuit 1936 may turn on the first emitter 1911 of the emitter assembly 1910 (e.g., at the same time as turning off the other emitters 1912, 1913, 1914 and determine the luminous flux $L_E$ of the light emitted by the first emitter 1911 in response to the first optical feedback signal $V_{FB1}$ generated from the first detector 1916. In addition, the emitter control circuit 1936 may be configured to drive the emitters 1911-1914 and the detectors 1916, 1918 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 1900 may be stored in the memory 1946 as part of a calibration procedure performed during manufacturing of the lighting device 1900. Calibration values may be stored for each of the emitters 1911-1914 and/or the detectors 1916, 1918 of the emitter assembly 1910. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 1911-1914 using an external calibration tool, such as a spectrophotometer. The values for the emitter forward voltages, photodiode currents, and detector forward voltages may be measured internally to the lighting device 1900. The calibration values for each of the emitters 1911-1914 and/or the detectors 1916, 1918 may be measured at a plurality of different drive currents, and/or at a plurality of different operating temperatures.

After installation, the lighting device control circuit 1940 of the lighting device 1900 may use the calibration values stored in the memory 1946 to maintain a constant light output from the emitter assembly 1910. The lighting device control circuit 1940 may determine target values for the luminous flux to be emitted from the emitters 1911-1914 to achieve the target intensity $L_{TRGT}$ and/or the target color temperature $T_{TRGT}$ for the lighting device 1900. The lighting device control circuit 1940 may determine the magnitudes for the respective drive currents $I_{LED1}$-$I_{LED4}$, for the emitters 1911-1914 based on the determined target values for the luminous flux to be emitted from the emitters 1911-1914. When the age of the lighting device 1900 is zero, the magnitudes of the respective drive currents $I_{LED1}$-$I_{LED4}$ for the emitters 1911-1914 may be controlled to initial magnitudes $I_{LED-INITIAL}$. The light output of the emitter assembly 1910 may decrease as the emitters 1911-1914 age. The lighting device control circuit 1940 may be configured to increase the magnitudes of the drive current IDR for the emitters 1911-1914 to adjusted magnitudes $I_{LED-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

What is claimed is:

1. A lighting device configured to be installed within a building structure, the lighting device comprising:

a lighting device assembly including a light-generation module having an emitter assembly configured to emit light and a wireless communication circuit configured to communicate wireless signals; and a housing configured to be installed within the building structure and to at least partially enclose the lighting device assembly, the housing comprising a lower plate and a trim portion that defines an aperture configured to enable the light emitted by the emitter assembly to be transmitted out of the housing, the trim portion located within a first opening in the lower plate;

wherein the housing further comprises a radio-frequency-transparent (RF-transparent) portion having a perimeter that is defined by the first opening in the lower plate and surrounds the trim portion, the RF-transparent portion configured to allow the wireless signals to be communicated by the light-generation module through the lower plate of the housing.

2. The lighting device of claim 1, wherein the RF-transparent portion of the housing comprises a non-conductive plate covering at least a portion of the first opening in the lower plate.

3. The lighting device of claim 2, wherein the non-conductive plate comprises a second opening, and the housing further comprises a support structure configured to support the trim portion within the second opening of the non-conductive plate.

4. The lighting device of claim 3, wherein the support structure comprises a support bracket attached to the non-conductive plate, the support bracket configured to connect the trim portion to the non-conductive plate.

5. The lighting device of claim 4, wherein the support bracket of the support structure is configured to extend across the first opening of the lower plate of the housing, wherein the support bracket of the support structure is configured to rest on the lower plate of the housing to support the non-conductive plate such that the non-conductive plate covers the first opening in the lower plate of the housing.

6. The lighting device of claim 5, wherein the lower plate comprises a recessed portion surrounding the first opening in the lower plate of the housing, the non-conductive plate configured to be located below the lower plate in the recessed portion of the lower plate, such that the non-conductive plate covers the first opening in the lower plate of the housing, wherein the recessed portion of the lower plate comprises a rim portion that surrounds the first opening in the lower plate of the housing, the rim portion comprising slots configured to receive fasteners that are received through third openings in the non-conductive plate for securing the non-conductive plate to the lower plate of the housing.

7. The lighting device of claim 6, wherein the fasteners are configured to move through the slots to orient the trim portion within the first opening in the lower plate of the housing, and the non-conductive plate is configured to be secured in place when the fasteners are tightened.

8. The lighting device of claim 6, wherein the support bracket comprises sides that are connected together to define a fourth opening that is aligned with the second opening of the non-conductive plate and extensions that extend opposed corners of the sides and are configured to rest on the lower plate, the rim portion further comprising notches through which the extensions of the support bracket are configured to be inserted to install the non-conductive plate within the first opening in the lower plate.

9. The lighting device of claim 4, wherein the non-conductive plate is supported by the lower plate and arranged over the first opening in the lower plate, and wherein the non-conductive plate is configured to rest on the lower plate of the housing and to rotate to orient the trim portion within the first opening in the lower plate, the non-conductive plate comprising third openings configured to receive fasteners for securing the non-conductive plate to the lower plate of the housing.

10. The lighting device of claim 9, wherein the lower plate further comprises notches through which the non-conductive plate is configured to be inserted to install the non-conductive plate over the first opening in the lower plate.

11. The lighting device of claim 9, wherein the support bracket comprises sides that are connected together to define a fourth opening that is aligned with the second opening of the non-conductive plate and extensions that extend opposed corners of the sides and are configured to rest on the lower plate, the extensions of the support bracket comprising openings configured to receive the fasteners for securing the support bracket to the non-conductive plate.

12. The lighting device of claim 9, wherein the lower plate further comprises tabs located around the first opening in the lower plate and configured to position the non-conductive plate over the first opening in the lower plate.

13. The lighting device of claim 4, wherein the trim portion comprises a trim ring that defines the aperture of the trim portion and a collar that is configured to support the trim ring within the first opening in the lower plate.

14. The lighting device of claim 13, wherein the non-conductive plate extends radially outward from the collar to an inside edge of the first opening in the lower plate.

15. The lighting device of claim 13, wherein the collar is configured to be attached to the support structure, such that the collar is received in the second opening of the non-conductive plate.

16. The lighting device of claim 13, wherein the trim ring comprises at least two clips configured to attach the trim ring to the collar.

17. The lighting device of claim 13, wherein the trim ring comprises a trim insert configured to be received within a trim retainer.

18. The lighting device of claim 4, wherein the support structure is formed as part of the lower plate of the housing, such that the first opening in the lower plate is formed by two opening portions, and wherein the non-conductive plate is a first non-conductive plate, the lighting device further comprising a second non-conductive plate, wherein the first non-conductive plate and the second non-conductive plate are located in each of the two opening portions of the lower plate of the housing.

19. The lighting device of claim 4, wherein the support bracket comprises two or more portions that are configured to attach to the trim portion.

20. The lighting device of claim 3, wherein the RF-transparent portion of the housing is characterized by an area within the perimeter of the RF-transparent portion, the area of the RF-transparent portion comprising one or more unobstructed portions located between the perimeter of the RF-transparent portion and the support structure, the one or more unobstructed portions of the RF-transparent portion characterized by a plurality of dimensions having respective lengths that enable propagation of wireless signals through the RF-transparent portion.

21. The lighting device of claim 2, wherein the non-conductive plate is configured to be substantially parallel to the lower plate.

22. The lighting device of claim 2, wherein the lower plate of the housing is metallic.

23. The lighting device of claim 1, wherein the housing further comprises an upper plate and a plurality of side plates between the upper plate and the lower plate, the housing defining a cavity in which the light-generation module is located, and wherein the lighting device further comprises an armature attached to the housing and configured to support the light-generation module within the housing above the first opening in the lower plate of the housing such that the light emitted by the light-generation module is emitted through the aperture of the trim portion and the wireless signals are communicated through the RF-transparent portion of the housing.

24. The lighting device of claim 23, wherein the armature comprises a first portion configured to rotate with respect to the upper plate of the housing and a second portion configured to tilt with respect to the first portion to adjust a tilt angle of the lighting device assembly.

25. The lighting device of claim 24, wherein the first portion of the armature comprises a base plate and opposed side plates, and the second portion of the armature comprises a body with a mounting portion and a heat sink portion, the body of the second portion tiltably coupled between the opposed side plates of the first portion, the lighting device assembly mounted to the mounting portion of the second portion, such that the heat sink portion is thermally-coupled to the lighting device assembly.

26. The lighting device of claim 24, wherein the first portion of the armature comprises a base portion and an arm portion that extends from the base portion and defines a first curved surface, and the second portion of the armature comprises an adapter plate that defines a second curved surface configured to slide across the first curved surface of the arm portion of the first portion.

27. The lighting device of claim 23, wherein the trim portion comprises a wall-wash trim assembly having a body and a lens positioned at an angle and configured to direct light in a non-vertical direction, the body of the wall-wash trim assembly having a tunnel configured to collect the light emitted by the light-generation module and reflect the light towards the lens, the tunnel defining a first axis that is offset from a second axis defined by the aperture of the trim portion, and wherein the armature comprises a base portion configured to rotate with respect to the upper plate of the housing, the light-generation module mounted to the base portion, such that a third axis defined by the light-generation module is offset from a fourth axis defined by the armature, the base portion configured to be rotated to position the light-generation module such that the light embittered by the light-generation module is collected by the tunnel of the body of the trim portion, and wherein the base portion is configured to be rotated until the third axis defined by the light-generation module is aligned with the first axis of the tunnel of the body of the wall-wash trim assembly.

28. The lighting device of claim 25, wherein the armature is attached to the upper plate of the housing.

29. The lighting device of claim 23, wherein the housing comprises an attachment structure having an attachment member at an end of a respective arm formed in one of the side plates of the housing, the attachment member configured to engage a snap on a lower portion of the housing that comprises the lower plate to secure the lower portion to an upper portion of the housing that comprises the upper plate and the plurality of side plates.

30. The lighting device of claim 1, wherein the light-generation module further comprises:

a plurality of emitters in the emitter assembly that are configured to emit the light; and an antenna configured to receive the wireless signals, and wherein the lighting device assembly further comprises:

a reflector that surrounds the plurality of emitters, the reflector comprising an outer surface, wherein the antenna of the light-generation module is located external to the reflector such that the antenna is spaced a predetermined distance from the outer surface of the reflector.

31. The lighting device of claim 30, wherein the reflector comprises a first end located adjacent to the plurality of emitters and a second end opposite the first end, and defines a third opening at the first end and a fourth opening at the second end, the first end of the reflector being located adjacent to the plurality of emitters such that the plurality of emitters emit the light through the third opening, and wherein the reflector comprises an inner surface configured to reflect the light emitted by the plurality of emitters towards the fourth opening.

32. The lighting device of claim 30, wherein the light-generation module comprises an antenna holder that is configured to receive a portion of the antenna, the antenna holder configured to maintain the spacing between the antenna and the reflector, and wherein the antenna defines a distal end that extends beyond a lens of the lighting device assembly in an axial direction.

* * * * *